US010154758B2

(12) United States Patent
Ochoa et al.

(10) Patent No.: US 10,154,758 B2
(45) Date of Patent: Dec. 18, 2018

(54) SYSTEM FOR MIXING BEVERAGES AND METHOD OF DOING THE SAME

(71) Applicant: Gudpod Corp., Carefree, AZ (US)

(72) Inventors: Gian-Carlo Ochoa, Wilton, CT (US); Brendan J. Duffy, Sandy Hook, CT (US); Chris Penna, Guilford, CT (US); Gary Van Deursen, Essex, CT (US); Ben W. Fagen, Enfield, CT (US)

(73) Assignee: Gudpod Corp., Carefree, AZ (US)

( * ) Notice: Subject to any disclaimer, the term of this patent is extended or adjusted under 35 U.S.C. 154(b) by 121 days.

(21) Appl. No.: 15/129,364

(22) PCT Filed: Feb. 23, 2015

(86) PCT No.: PCT/US2015/017142
§ 371 (c)(1),
(2) Date: Sep. 26, 2016

(87) PCT Pub. No.: WO2015/148027
PCT Pub. Date: Oct. 1, 2015

(65) Prior Publication Data
US 2017/0112326 A1 Apr. 27, 2017

Related U.S. Application Data

(63) Continuation-in-part of application No. 14/278,762, filed on May 15, 2014, now Pat. No. 8,960,999.
(Continued)

(51) Int. Cl.
*A47J 43/044* (2006.01)
*B01F 7/16* (2006.01)
(Continued)

(52) U.S. Cl.
CPC ............. *A47J 43/044* (2013.01); *B01F 7/161* (2013.01); *B01F 7/18* (2013.01);
(Continued)

(58) Field of Classification Search
CPC .... A47J 2043/04454; A47J 2043/04472; A47J 43/044; B01F 15/0087; B01F 15/00058;
(Continued)

(56) References Cited

U.S. PATENT DOCUMENTS 1,101,199 A * 6/1914 Legg et al. ........... B01F 7/1635
222/229
1,233,823 A 7/1917 Tiger
(Continued)

FOREIGN PATENT DOCUMENTS

EP 0 244 583 A1 11/1987
EP 1 500 359 A1 1/2005
(Continued)

OTHER PUBLICATIONS

Partial Supplementary European Search Report in European Patent Application No. 15768759.1, dated Nov. 27, 2017 (16 pages).
(Continued)

*Primary Examiner* — Tony G Soohoo
(74) *Attorney, Agent, or Firm* — Nixon Peabody LLP

(57) ABSTRACT

A module includes a housing, a sealing feature, a locking feature, and an agitator. The housing has an opening separating inner and outer surfaces and a boss that extends through the housing such that part of the outer surface forms an inner bore of the boss having a terminus pointing toward the opening. The agitator has a base, a shaft, and a mixing element coupled to the base such that the base, in cooperation with the sealing feature, circumferentially seals the opening of the housing to form a cavity defined by the inner surface. The shaft passes through the inner bore. The locking feature when engaged permits independent or simultaneous translational and rotational movement of the shaft while an area between the terminus of the boss and the shaft remains
(Continued)

mechanically sealed during the movement against liquid or powder encroachment into a clean area of the inner bore.

23 Claims, 81 Drawing Sheets

Related U.S. Application Data

(60) Provisional application No. 61/972,020, filed on Mar. 28, 2014.

(51) Int. Cl.
    *B01F 7/18*           (2006.01)
    *B01F 15/00*         (2006.01)

(52) U.S. Cl.
    CPC .... *B01F 15/00058* (2013.01); *B01F 15/0087* (2013.01); *A47J 2043/04454* (2013.01); *A47J 2043/04472* (2013.01); *B01F 2015/00084* (2013.01); *B01F 2215/0022* (2013.01); *B01F 2215/0032* (2013.01)

(58) Field of Classification Search
    CPC .... B01F 2015/00084; B01F 2215/0032; B01F 2215/0022
    USPC .......................... 206/219, 221; 366/192, 193
    See application file for complete search history.

(56) References Cited

U.S. PATENT DOCUMENTS

| | | | | |
|---|---|---|---|---|
| 1,412,401 A * | 4/1922 | Gotfredsen | ........... | A47J 43/044 366/251 |
| 1,496,611 A | 6/1924 | Siegel | | |
| 1,713,119 A * | 5/1929 | Flegel | ................... | A47J 43/044 366/206 |
| 2,021,626 A | 11/1935 | Flegel | | |
| 2,110,498 A * | 3/1938 | Carnahan | ............... | A47J 43/044 366/203 |
| 2,851,257 A * | 9/1958 | Morgan | ................... | B01F 7/245 366/195 |
| 3,061,279 A | 10/1962 | Reed | | |
| 3,134,577 A | 5/1964 | Bollmeier | | |
| 3,240,391 A | 3/1966 | Garton | | |
| 3,323,320 A * | 6/1967 | Conz | ...................... | A23G 9/16 366/251 |
| 3,738,619 A | 6/1973 | Shirae | | |
| 4,160,602 A | 7/1979 | Benz | | |
| 4,193,698 A | 3/1980 | Gartner | | |
| 4,195,730 A | 4/1980 | Hunt | | |
| 4,315,570 A * | 2/1982 | Silver | ................ | B65D 81/3222 206/221 |
| 4,324,494 A * | 4/1982 | Pryor | ..................... | A47J 31/401 222/129.3 |
| 4,357,861 A * | 11/1982 | Di Girolamo | ....... | G05D 23/275 99/323.3 |
| 4,408,690 A * | 10/1983 | Ferrero | ................. | B01F 13/002 206/219 |
| 4,502,377 A * | 3/1985 | Hall, Jr. | ................... | A23G 9/04 366/318 |
| 4,547,076 A | 10/1985 | Maurer | | |
| 4,703,770 A | 11/1987 | Arzberger | | |
| 5,150,967 A * | 9/1992 | Neilson | ................... | A23G 9/045 366/197 |
| 5,328,263 A | 7/1994 | Neilson | | |
| 5,439,289 A * | 8/1995 | Neilson | ................. | A23G 9/045 366/206 |
| 5,634,714 A | 6/1997 | Guild | | |
| 5,766,665 A | 6/1998 | Miller | | |
| 5,863,118 A | 1/1999 | Ackels | | |
| 5,865,538 A | 2/1999 | Walker | | |
| 5,957,335 A * | 9/1999 | Otto | ................... | B65D 81/3211 141/100 |
| 6,071,006 A * | 6/2000 | Hochstein | ............ | A47J 43/042 366/242 |
| 6,318,889 B1 * | 11/2001 | Hansen, Sr. | ............. | A23G 9/12 366/286 |
| 6,341,887 B1 * | 1/2002 | Hansen, Sr. | ........... | A23G 9/228 366/138 |
| 6,527,207 B1 * | 3/2003 | Farrell | ................. | A23G 7/0018 241/199.12 |
| 6,616,323 B2 * | 9/2003 | McGill | ................... | A47J 36/06 366/201 |
| 6,647,863 B2 | 11/2003 | Lang | | |
| 6,706,300 B1 | 3/2004 | Lassota | | |
| 6,708,735 B1 | 3/2004 | Kenihan | | |
| 7,144,150 B2 | 12/2006 | Farrell | | |
| 7,461,970 B2 * | 12/2008 | Brown | ................ | B01F 15/0267 241/199.12 |
| 7,503,687 B2 * | 3/2009 | Heinhold | ............... | A23G 9/045 366/197 |
| 7,648,049 B1 * | 1/2010 | Lassota | ................. | A47J 31/401 222/129.1 |
| 7,854,104 B2 | 12/2010 | Cronin | | |
| 7,856,920 B2 | 12/2010 | Schmed | | |
| 7,959,348 B2 * | 6/2011 | Hogan | ................ | B01F 7/00116 366/196 |
| 8,337,074 B2 | 12/2012 | Wild | | |
| 8,763,515 B2 * | 7/2014 | Farrell | .................... | A23G 9/045 99/275 |
| 8,807,823 B2 * | 8/2014 | Williams | ................ | B01F 7/161 366/197 |
| 8,844,426 B2 | 9/2014 | Ochoa | | |
| 8,960,999 B1 * | 2/2015 | Ochoa | ................. | A47J 43/044 366/207 |
| 9,010,992 B2 * | 4/2015 | Hansen, Sr. | ............. | A23G 9/22 366/286 |
| 9,399,547 B2 * | 7/2016 | Bartoli | ............... | B65D 85/8043 |
| 9,474,417 B1 * | 10/2016 | Pryor, Jr. | ................ | B01F 7/161 |
| 9,833,109 B2 * | 12/2017 | Farrell | ................... | A47J 43/044 |
| 2002/0009017 A1 | 1/2002 | Kolar | | |
| 2002/0048215 A1 | 4/2002 | McGill | | |
| 2004/0155061 A1 | 8/2004 | Roth | | |
| 2005/0169101 A1 * | 8/2005 | Brown | ................ | B01F 15/0267 366/192 |
| 2005/0174884 A1 * | 8/2005 | Farrell | ................ | B01F 7/1605 366/347 |
| 2005/0193896 A1 * | 9/2005 | McGill | ................... | A47J 39/006 99/348 |
| 2005/0201198 A1 * | 9/2005 | Farrell | ................ | A47J 43/0705 366/138 |
| 2008/0067172 A1 | 3/2008 | Wilhelm | | |
| 2008/0073307 A1 * | 3/2008 | Sweeney | ............ | B65D 51/2864 215/228 |
| 2008/0223741 A1 | 9/2008 | Nyambi | | |
| 2008/0279040 A1 * | 11/2008 | Neilson | ................ | B01F 7/1605 366/176.1 |
| 2009/0065570 A1 | 3/2009 | Peters | | |
| 2009/0179042 A1 | 7/2009 | Milan | | |
| 2009/0293735 A1 | 12/2009 | Van Dillen | | |
| 2010/0136064 A1 | 6/2010 | Shatkina | | |
| 2010/0154645 A1 | 6/2010 | Nosler | | |
| 2010/0163509 A1 | 7/2010 | Hoffa | | |
| 2010/0173856 A1 | 7/2010 | Denk | | |
| 2011/0120316 A1 | 5/2011 | Castellani | | |
| 2012/0024861 A1 * | 2/2012 | Otsuka | .................. | A61J 1/2093 220/502 |
| 2012/0087203 A1 * | 4/2012 | Williams | ................ | B01F 7/161 366/138 |
| 2012/0121768 A1 | 5/2012 | Lai | | |
| 2012/0171186 A1 | 7/2012 | Liang | | |
| 2013/0058184 A1 * | 3/2013 | Hansen | .................... | A23G 9/22 366/138 |
| 2014/0001207 A1 * | 1/2014 | Dyrbye | ................. | B65D 51/2828 222/129 |
| 2014/0335482 A1 | 11/2014 | Aronis | | |
| 2014/0336817 A1 | 11/2014 | Ochoa | | |
| 2015/0065587 A1 | 3/2015 | Ochoa | | |

(56) References Cited

U.S. PATENT DOCUMENTS

| | | | |
|---|---|---|---|
| 2015/0135965 A1 | 5/2015 | Lo Foro | |
| 2015/0329282 A1* | 11/2015 | Bartoli | B65D 85/8043 426/115 |
| 2017/0112326 A1* | 4/2017 | Ochoa | A47J 43/044 |

FOREIGN PATENT DOCUMENTS

| | | |
|---|---|---|
| FR | 2507573 | 12/1982 |
| WO | WO 2013/033786 | 3/2013 |
| WO | WO 2013/130576 | 9/2013 |
| WO | WO 2015/148027 | 10/2015 |

OTHER PUBLICATIONS

Extended European Search Report in European Patent Application No. 15768759.1, dated Mar. 7, 2018 (13 pages).

International Search Report, PCT/US2015/017142, dated Jul. 14, 2015 (6 pages).

Written Opinion of the International Searching Authority, PCT/US2015/017142, dated Jul. 14, 2015 (14 pages).

International Search Report in PCT/AU2012/001072, dated Nov. 20, 2012 (5 pages).

International Preliminary Report on Patentability and Written Opinion in PCT/AU2012/001072, dated Mar. 12, 2014 (7 pages).

International Search Report in PCT/US2013/027982, Russian Patent Office, dated Jul. 11, 2013 (2 pages).

Written Opinion of the International Searching Authority in PCT/US2013/027982, Russian Patent Office, dated Jun. 3, 2013 (4 pages).

Extended European Search Report for Application No. EP 13755305.3, dated Oct. 30, 2015 (6 pages).

Gudpod, "Gudpod—The New Pod Based Supplement Delivery", https://www.youtube.com/watch?v=FAj8uhN2rag YouTube, published Mar. 3, 2016.

Susan Harmon, "Susan Elle Harmon at the Arnold with the Gudpod and Proactive Health Magazine", https://www.youtube.com/watch?v=UqM-M_N2to4 YouTube, published Mar. 11, 2016.

* cited by examiner

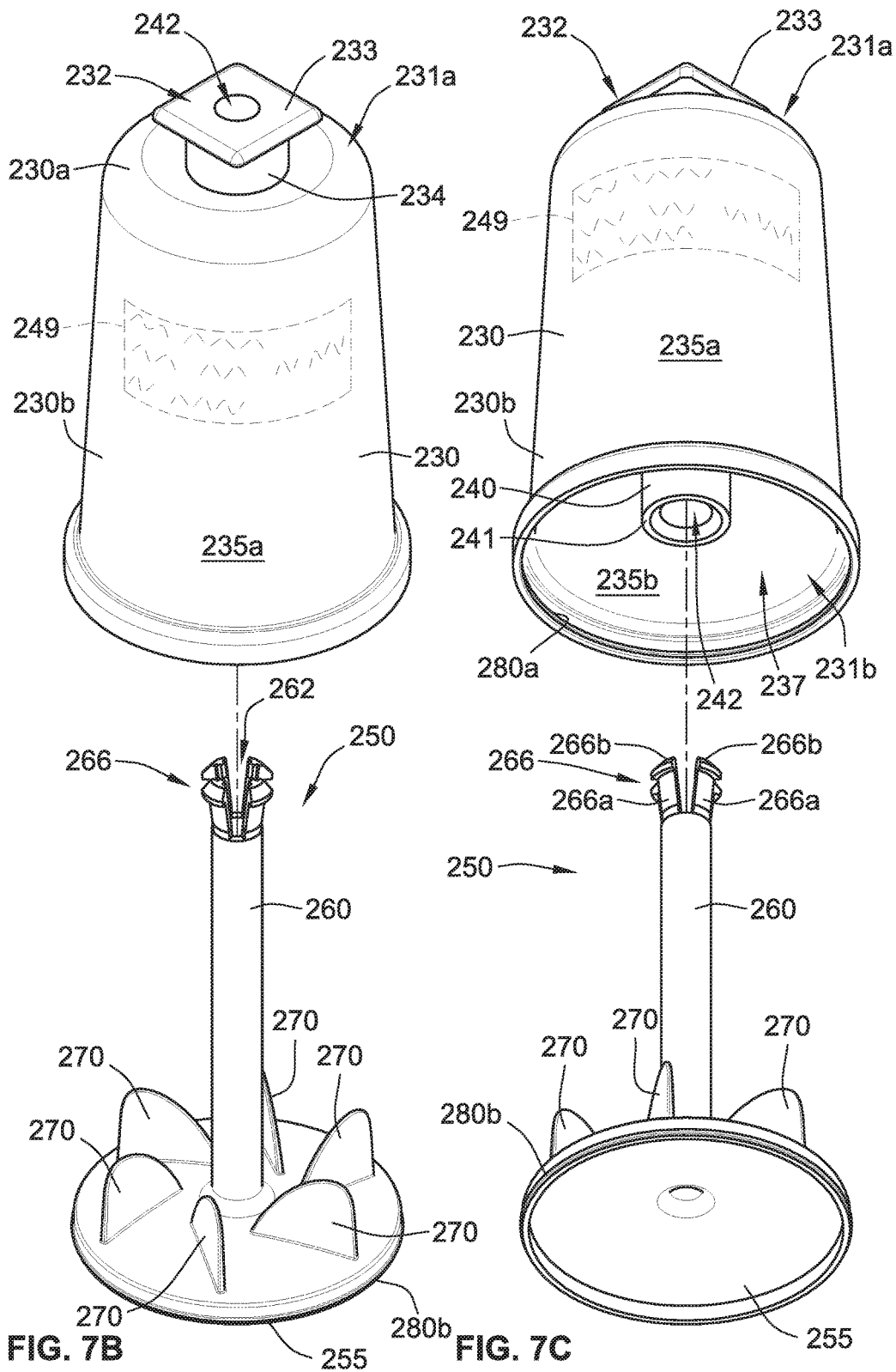

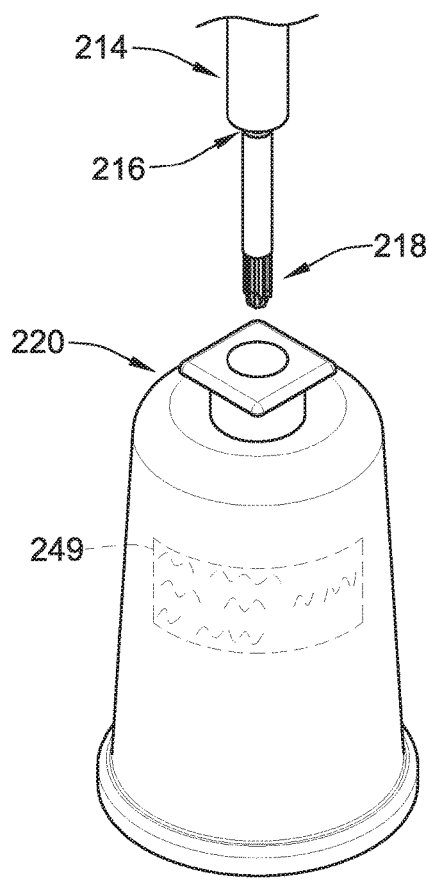
FIG. 9A
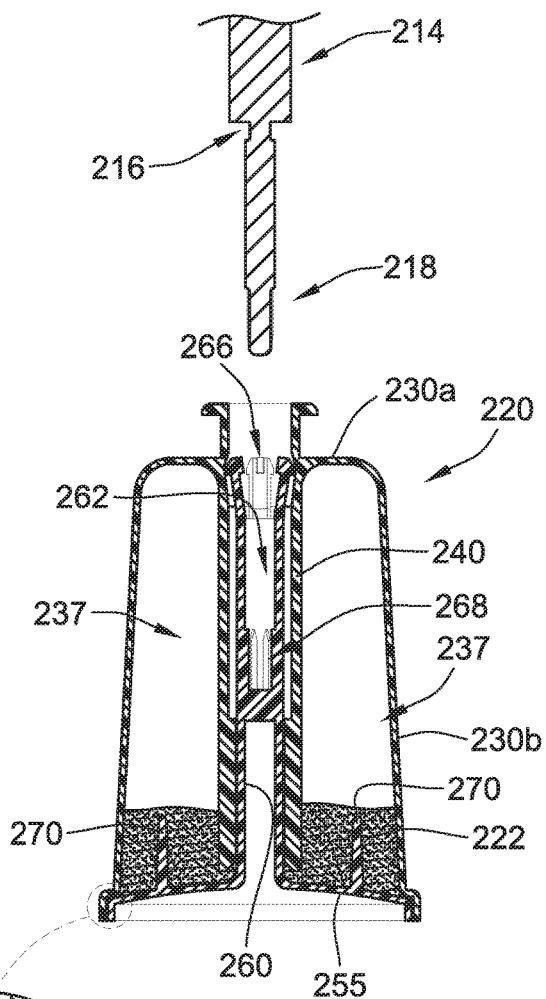
FIG. 9B
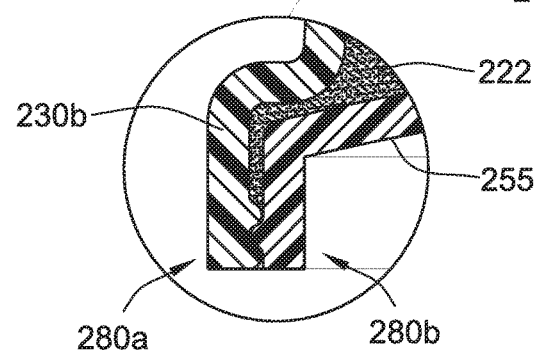

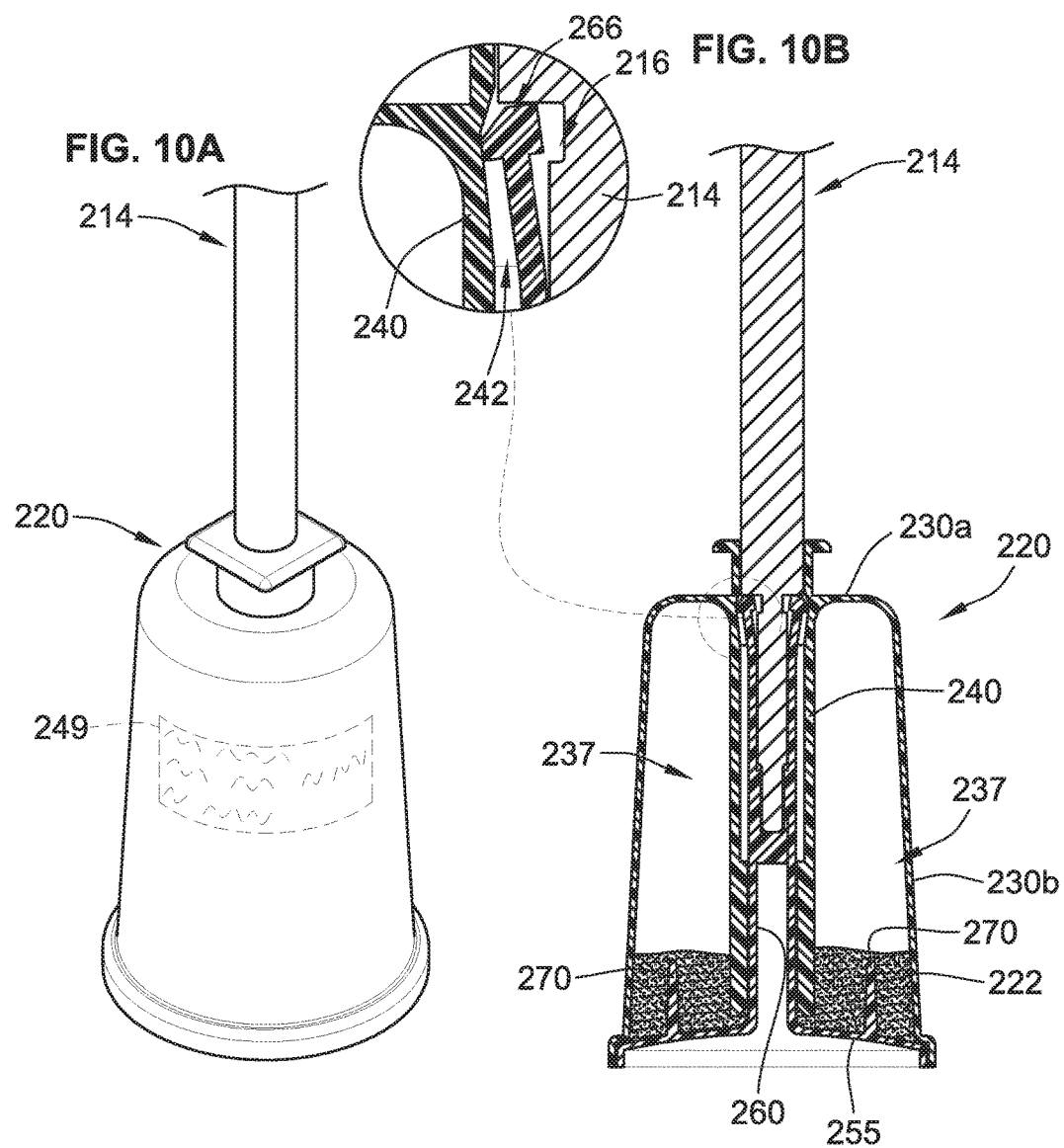

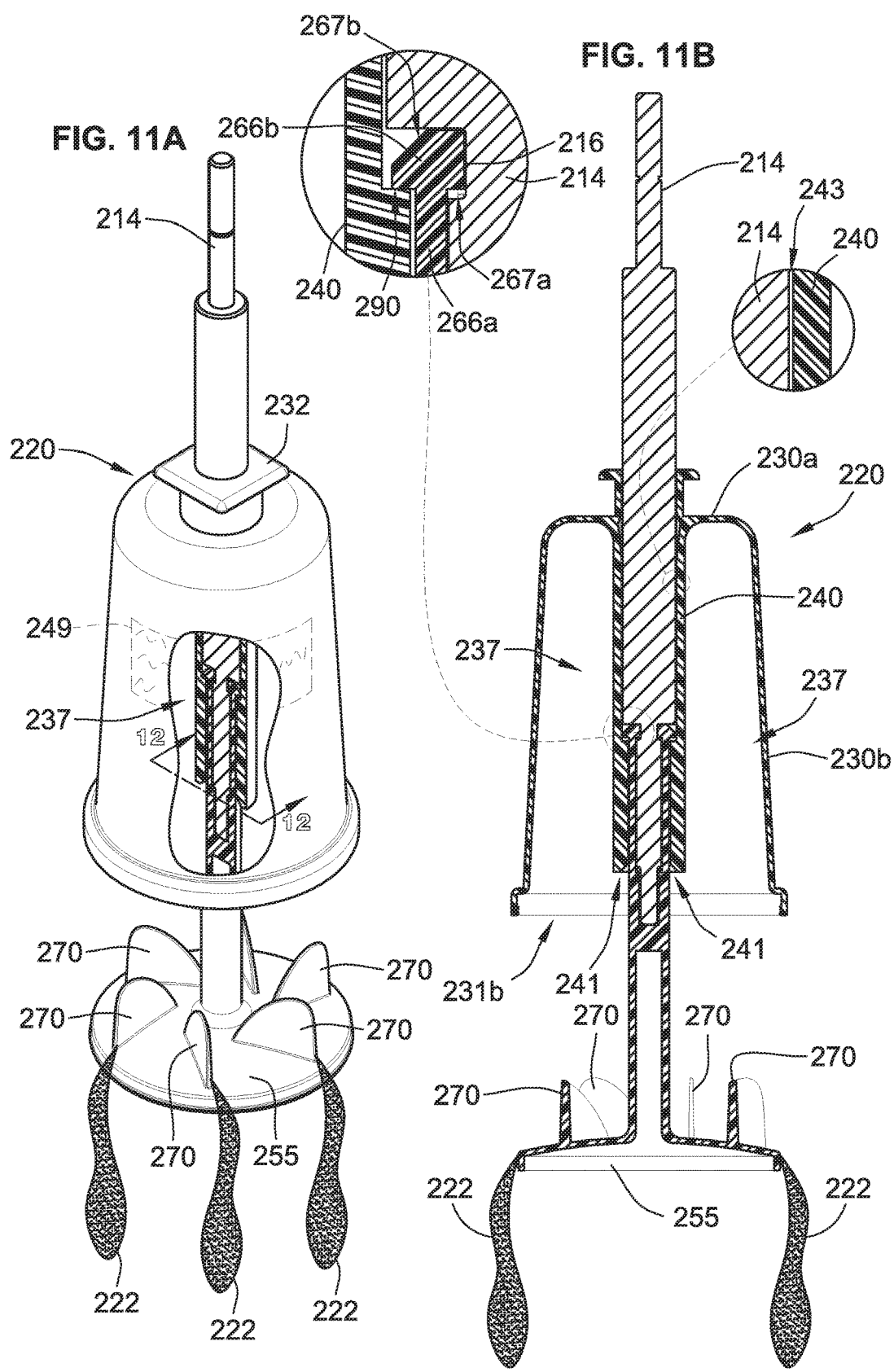

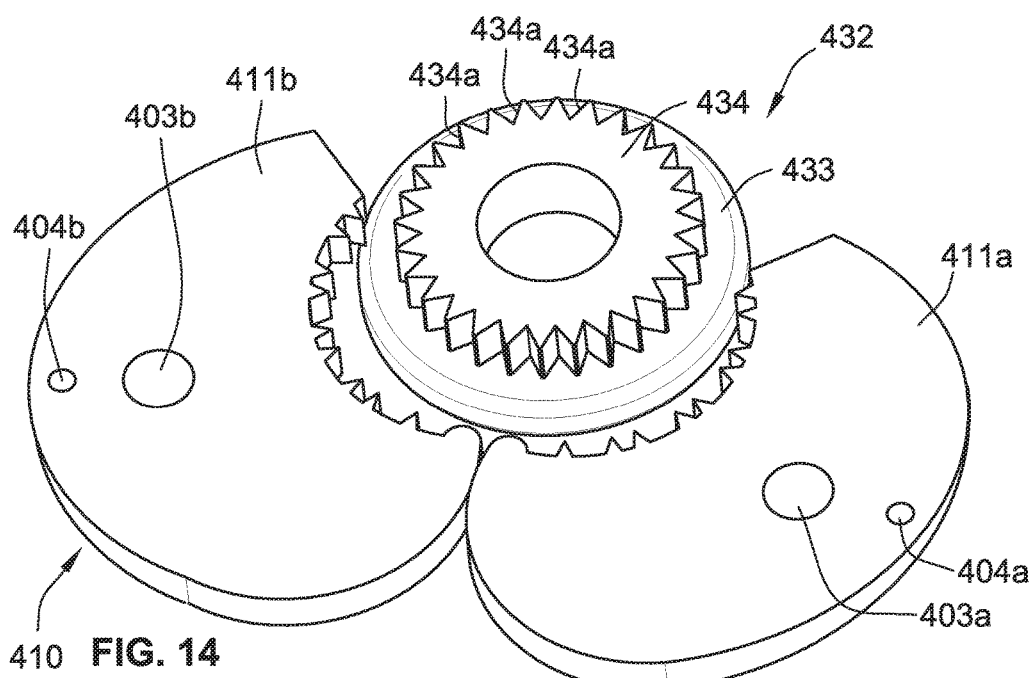
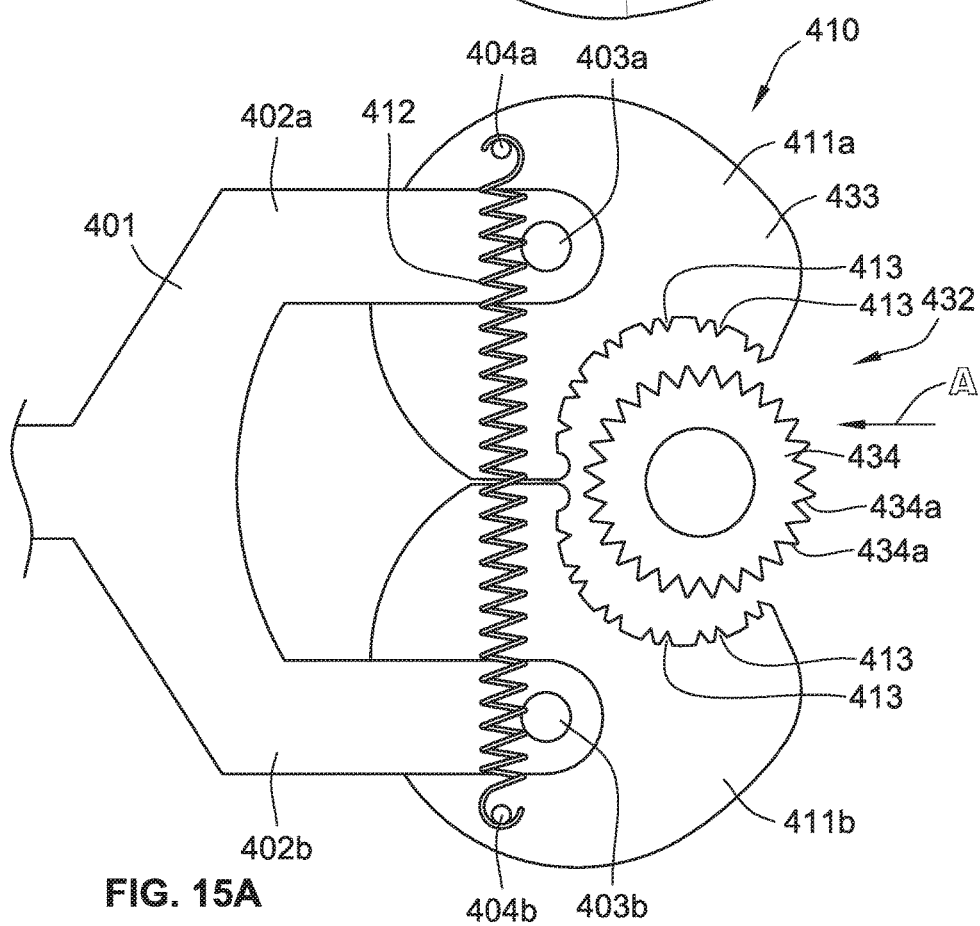
FIG. 14
FIG. 15A

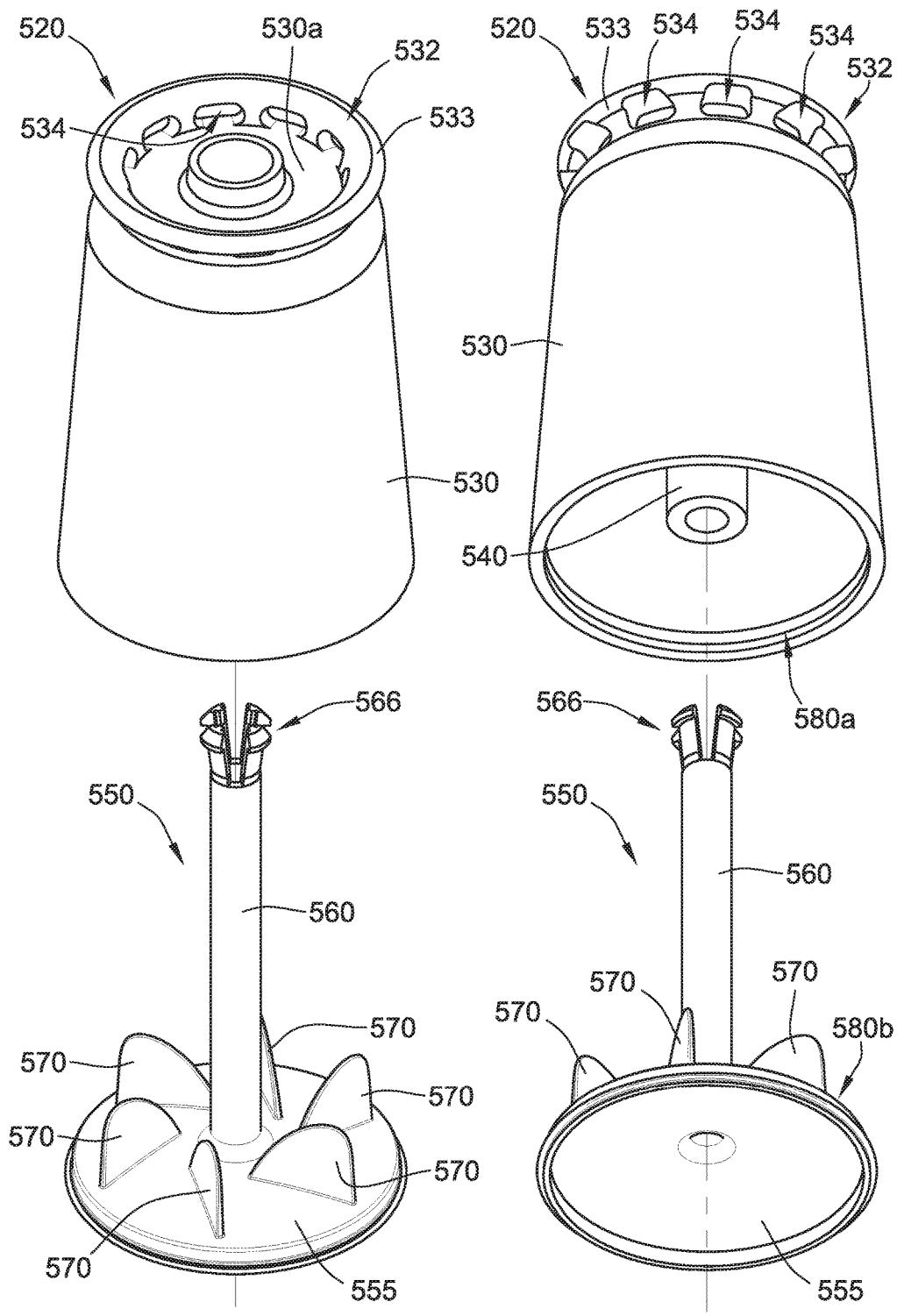

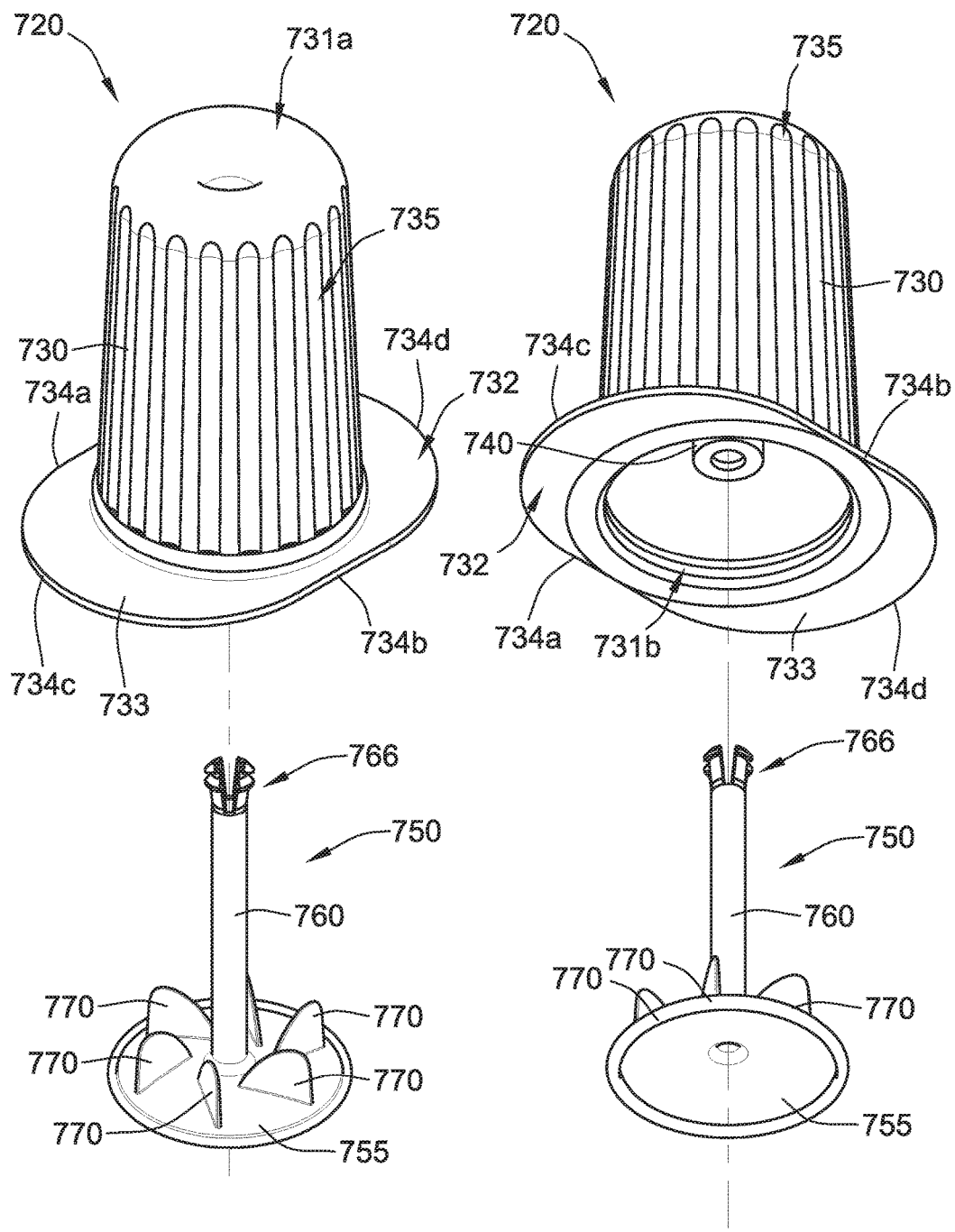

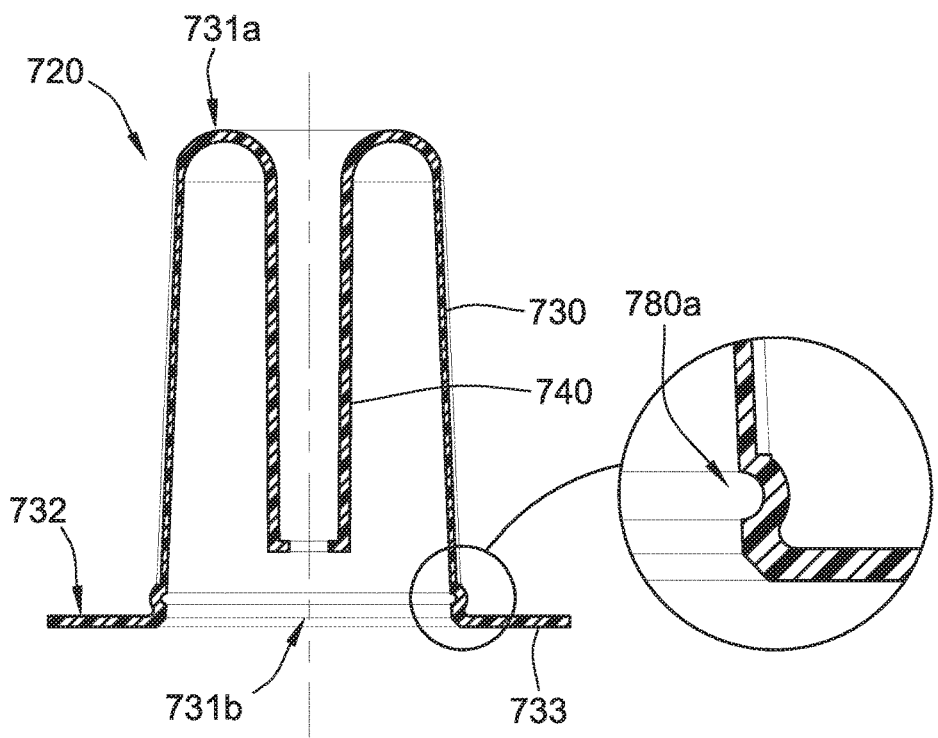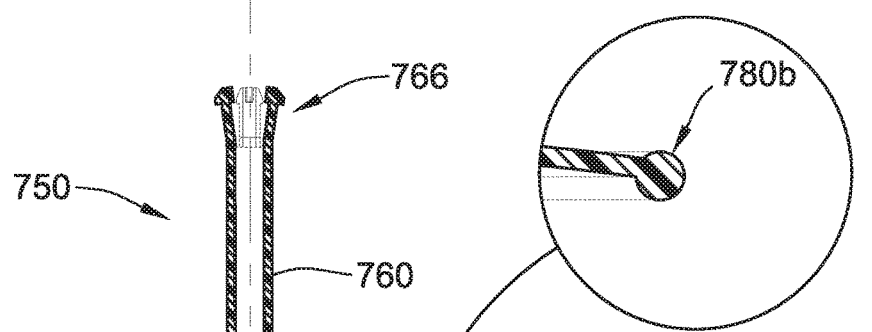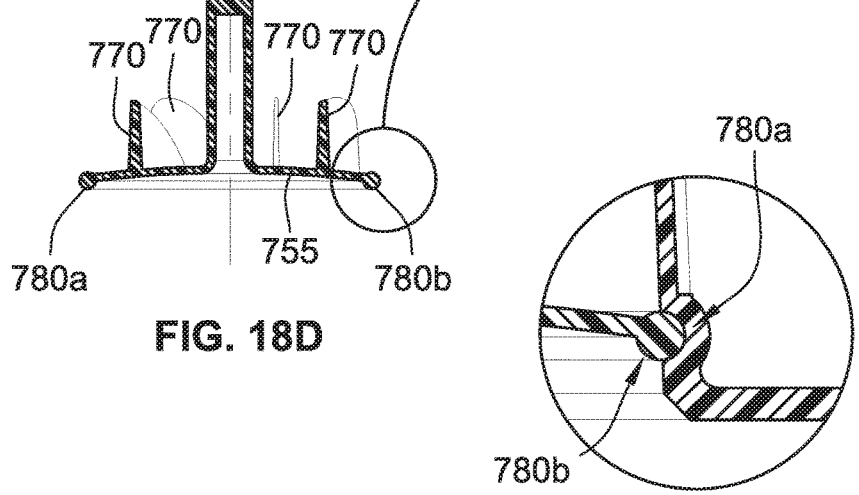
FIG. 18D
FIG. 18E

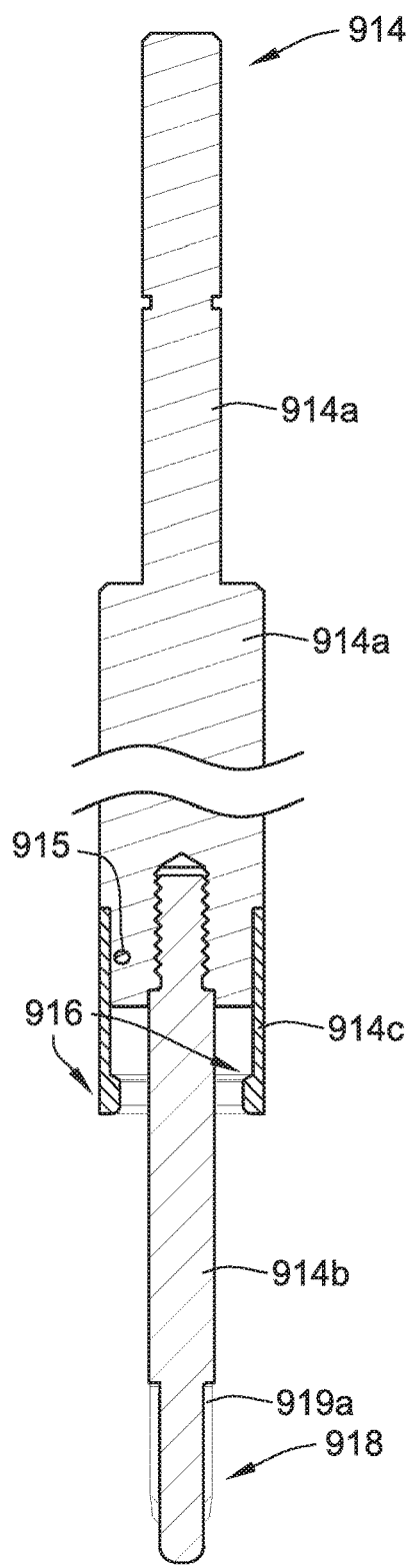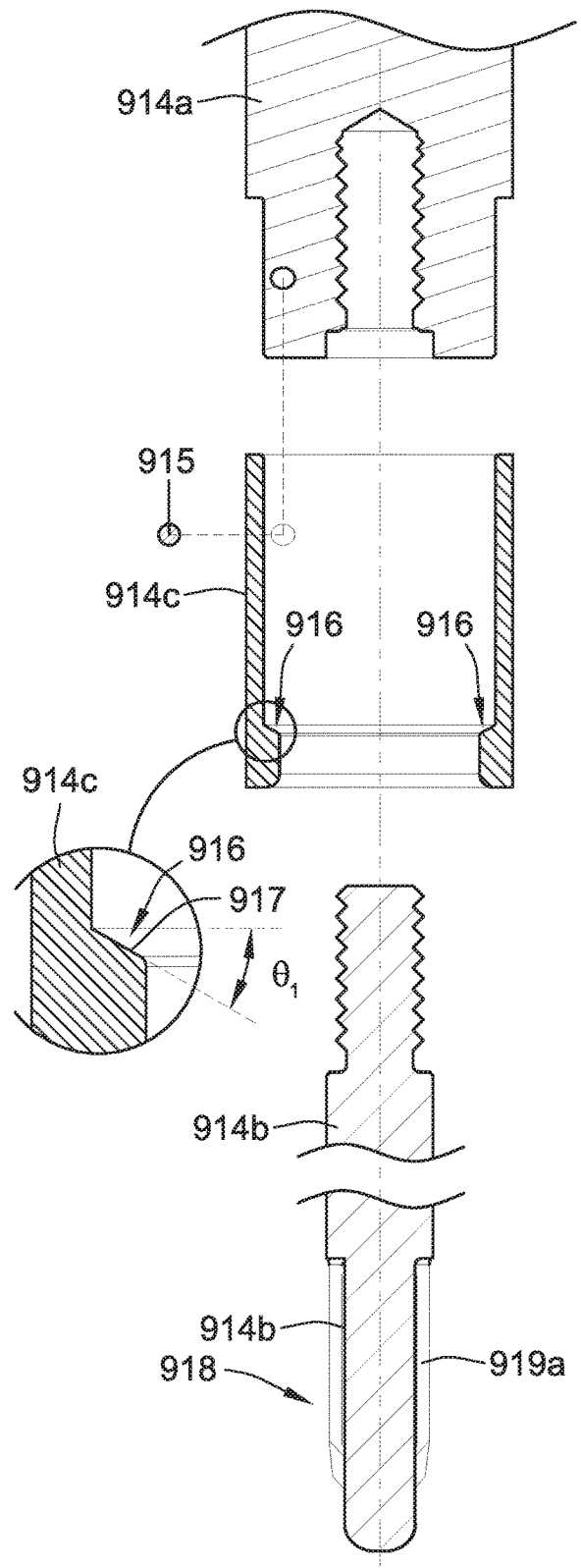
FIG. 20B
FIG. 20C

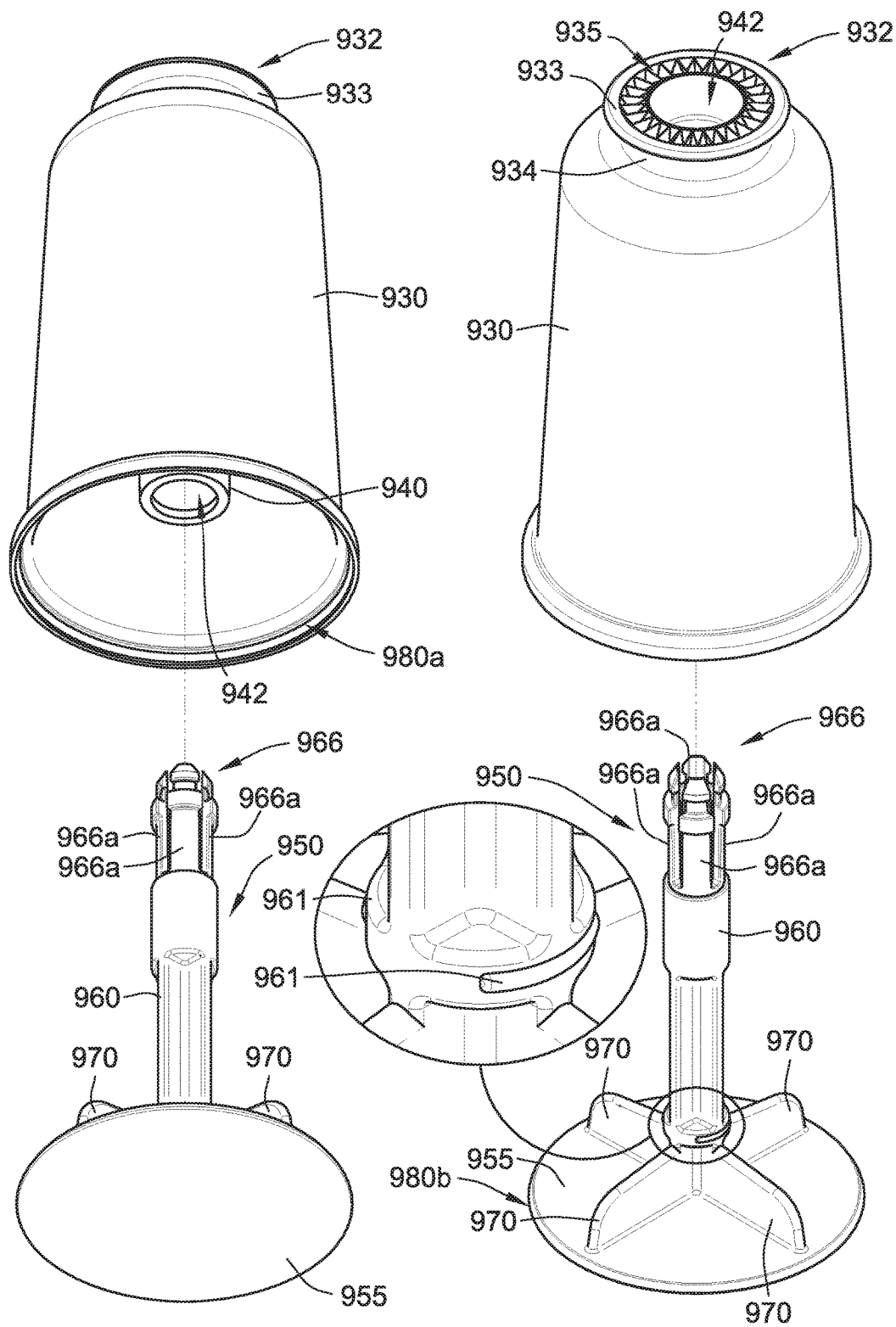

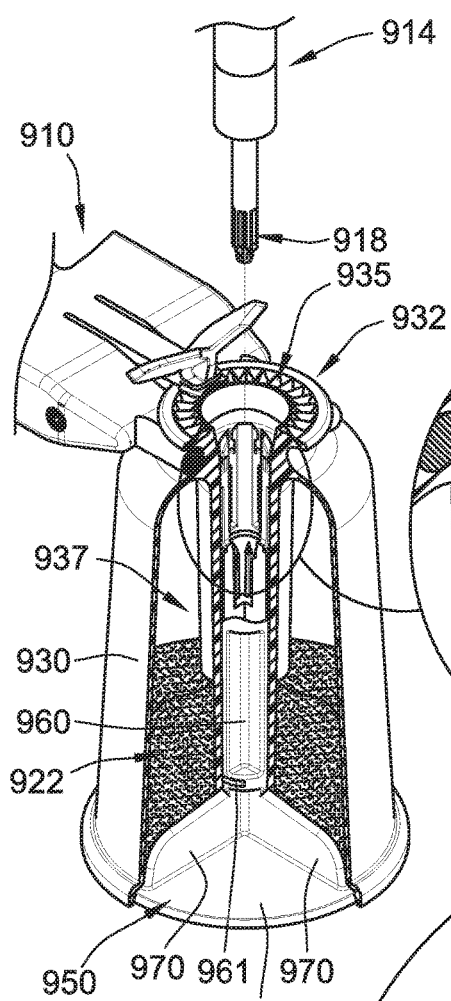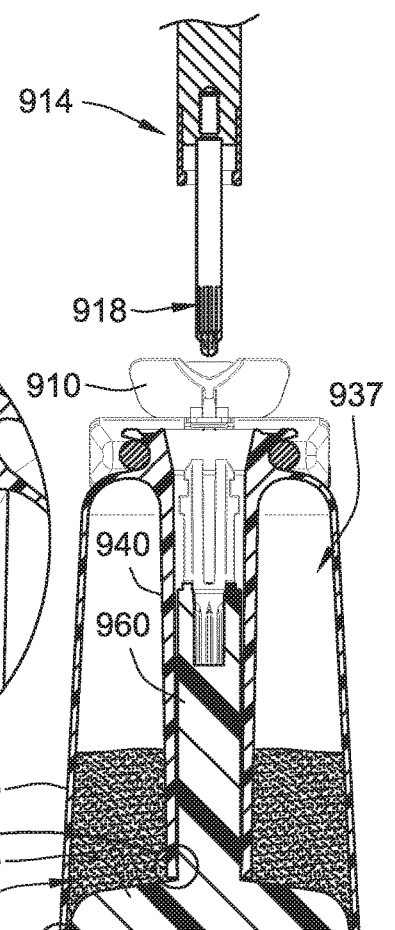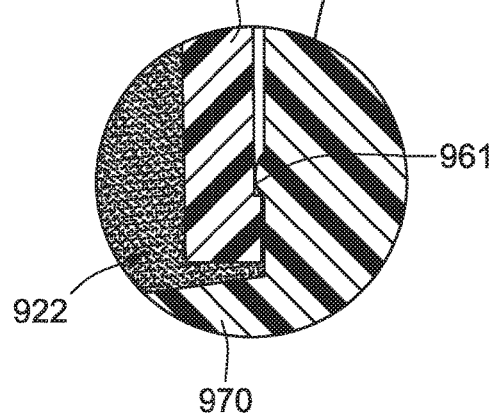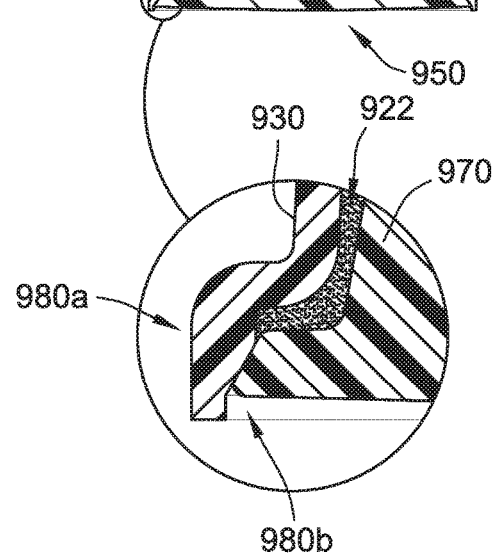
FIG. 21E
FIG. 21F

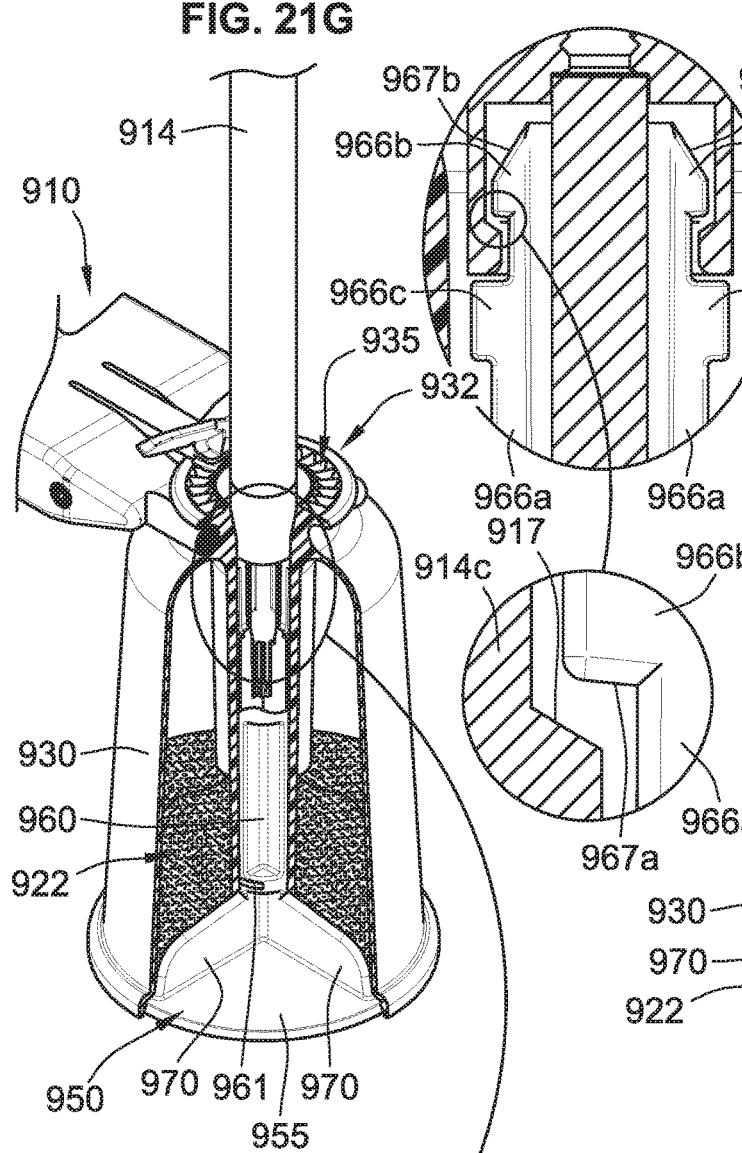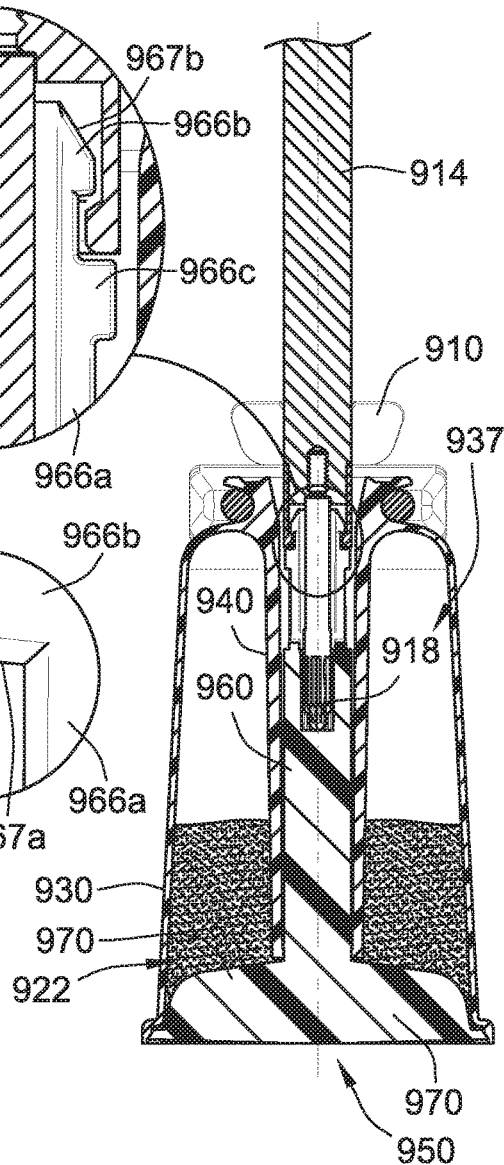

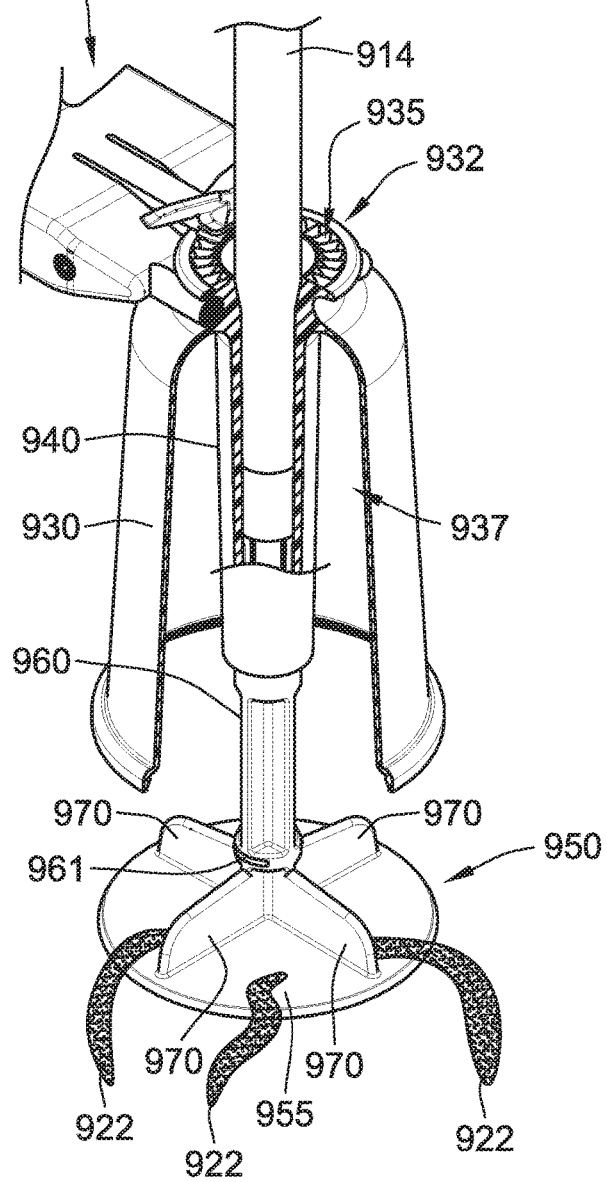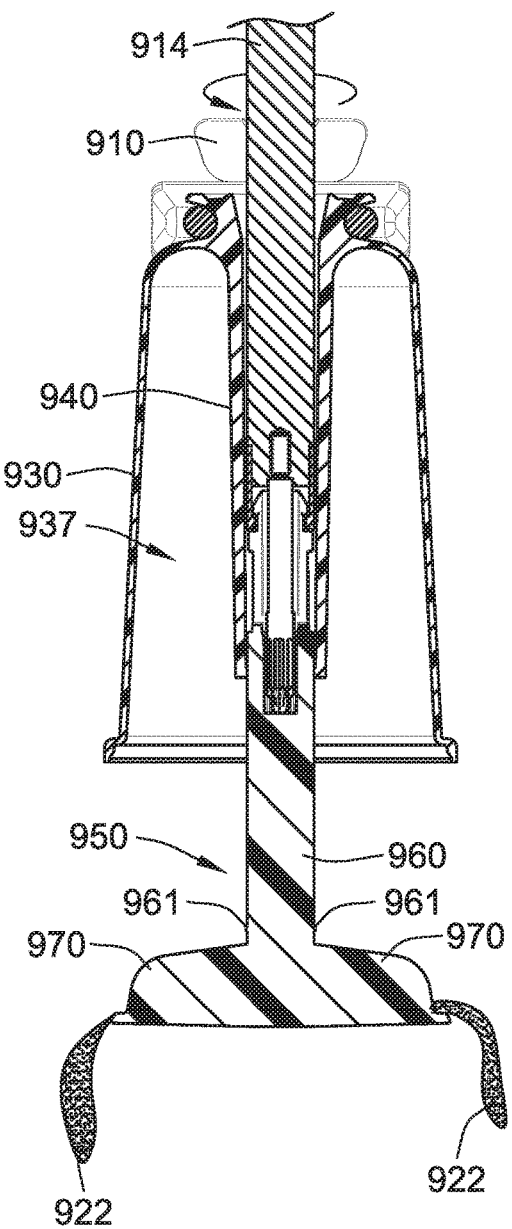

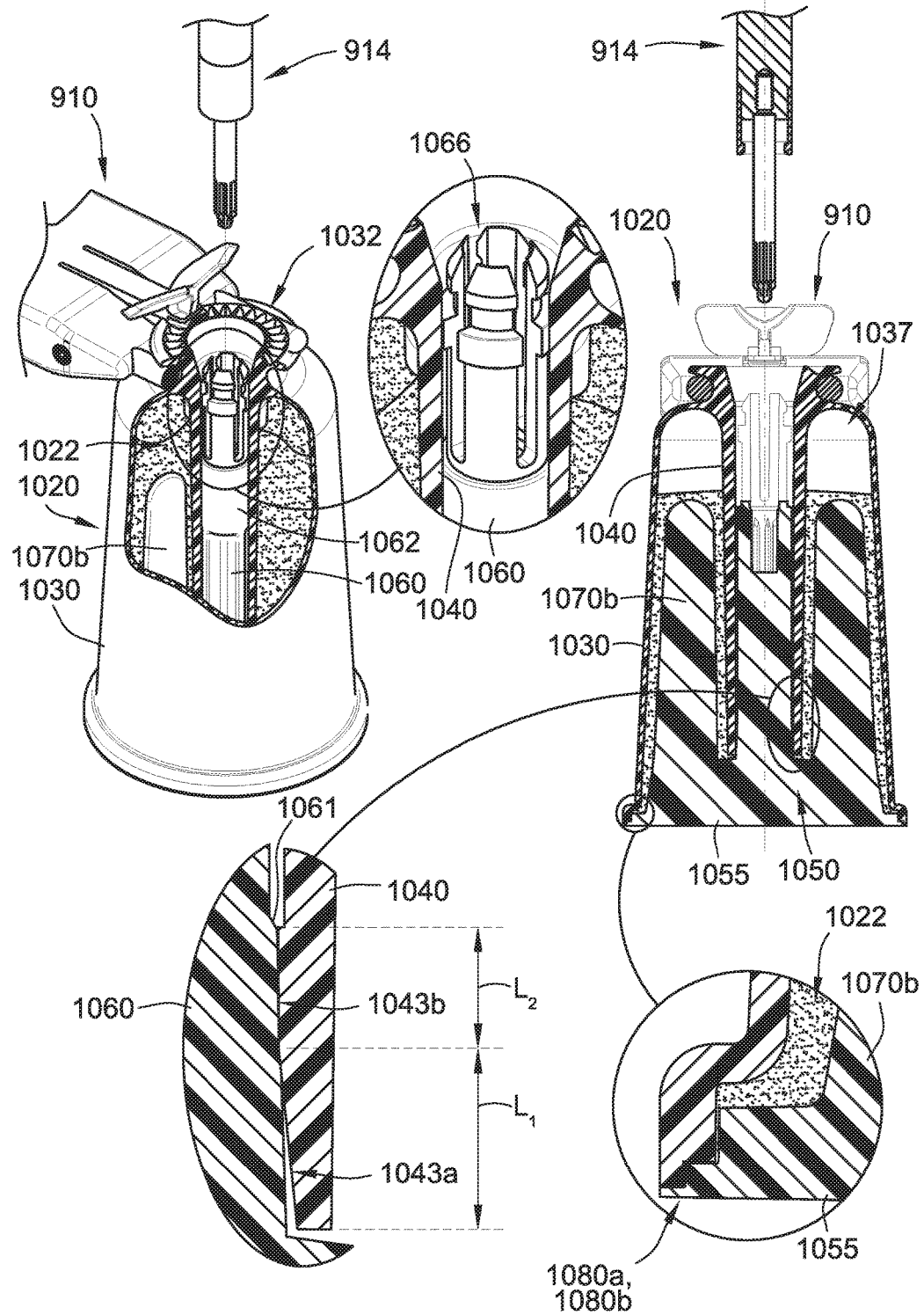

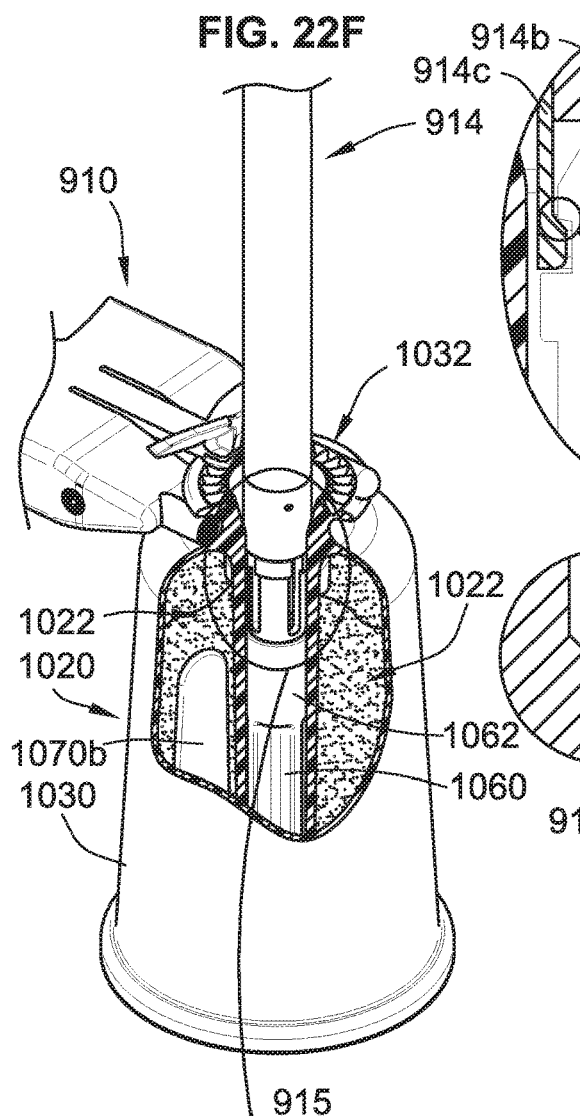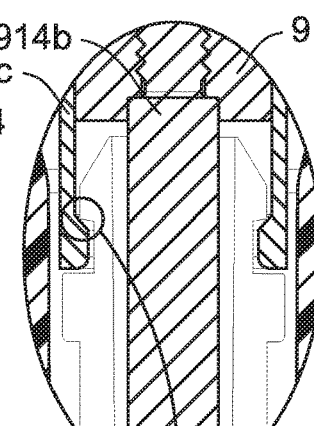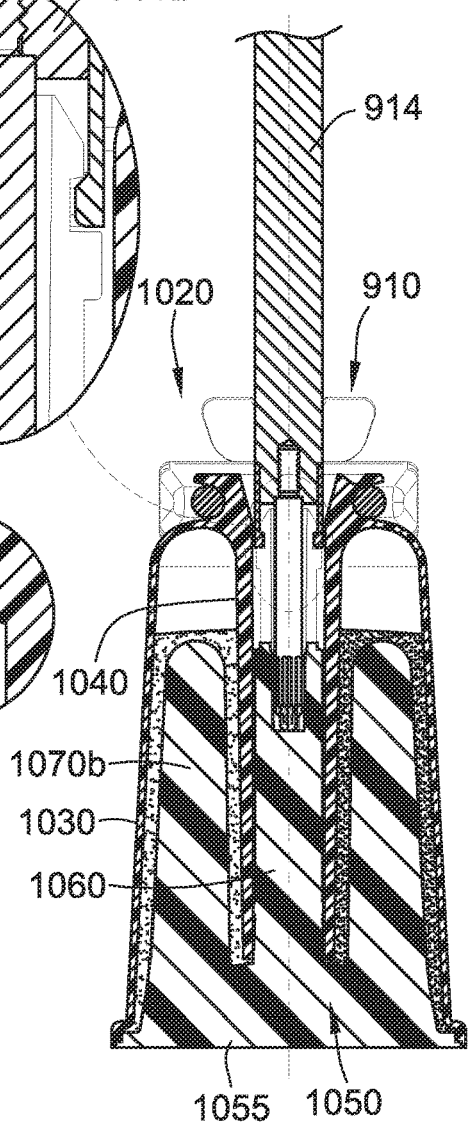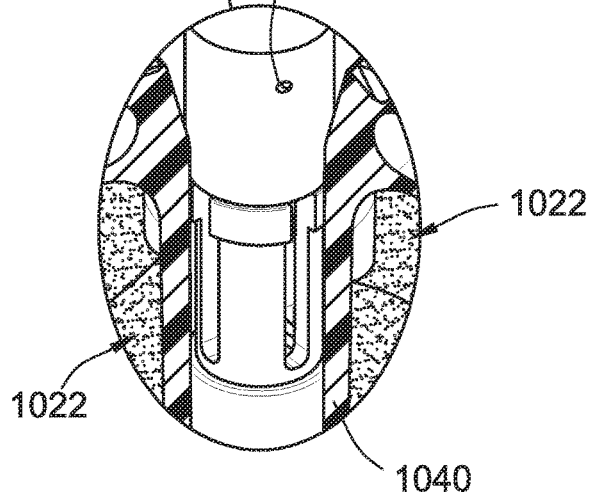

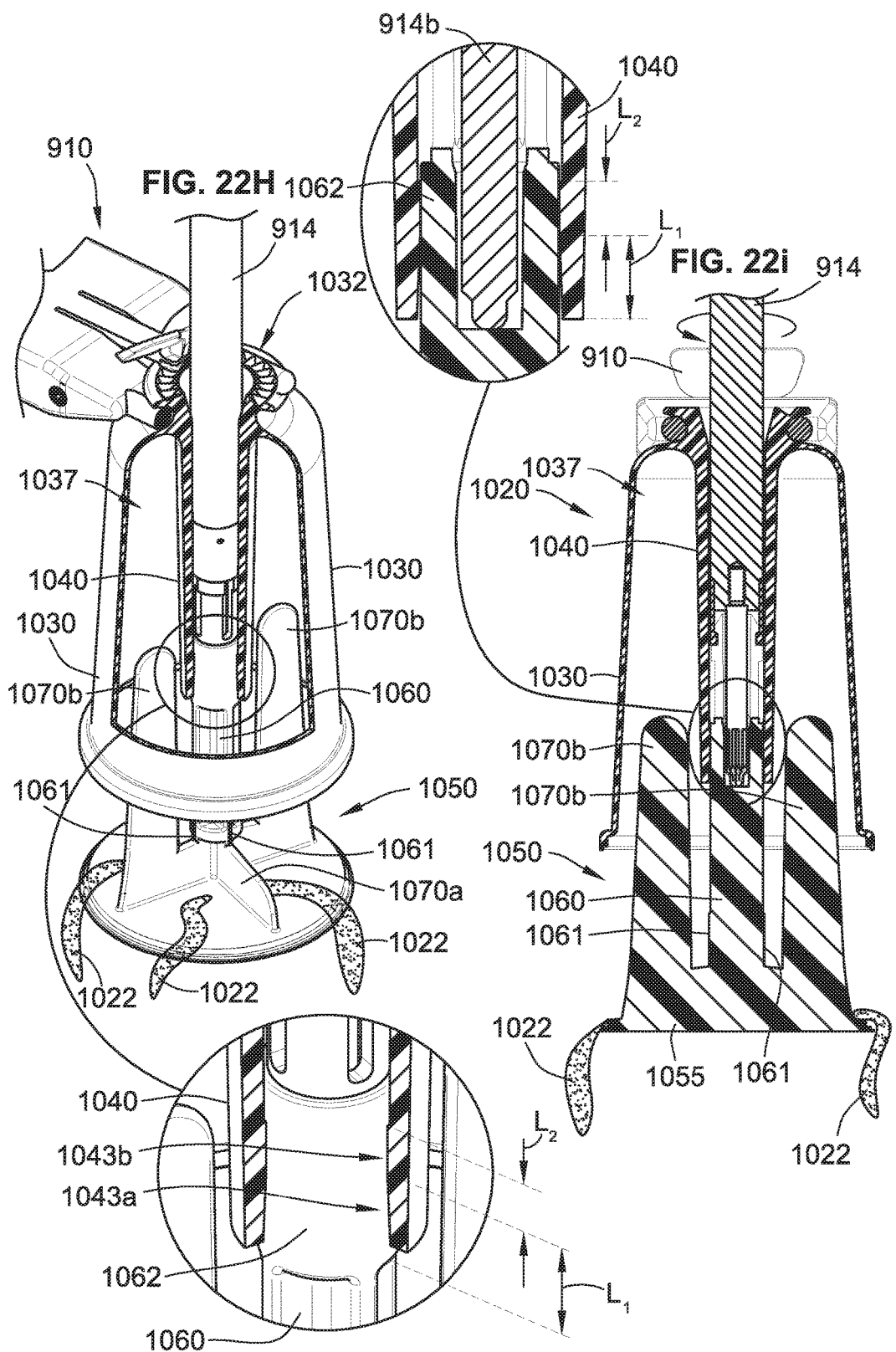

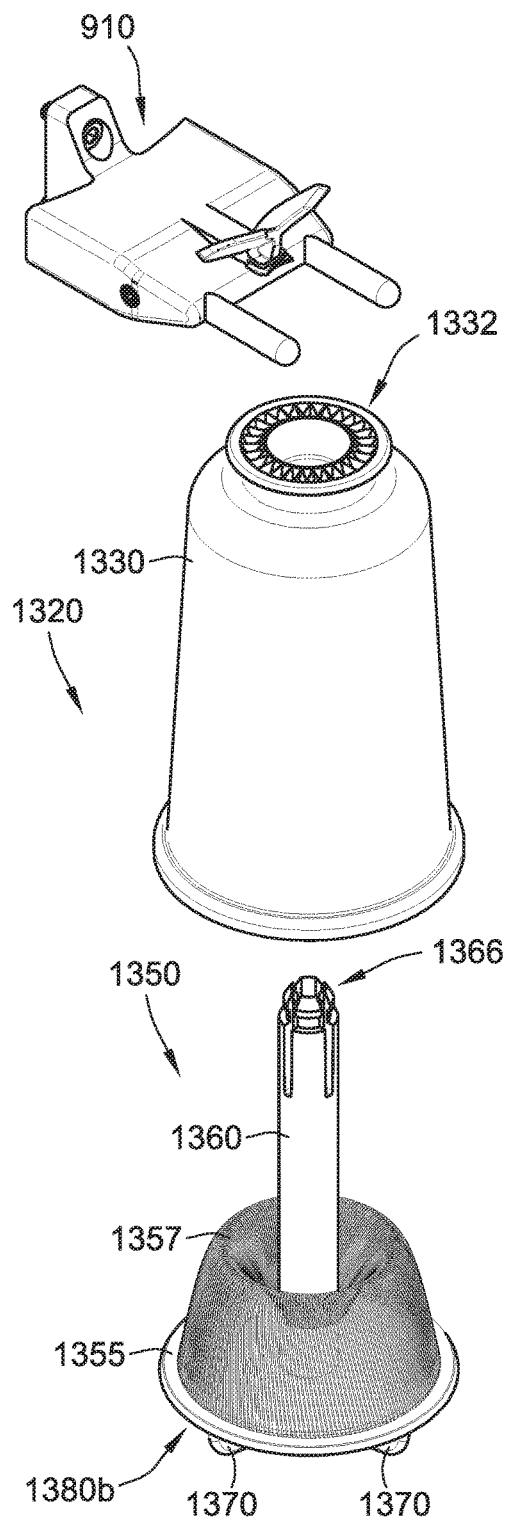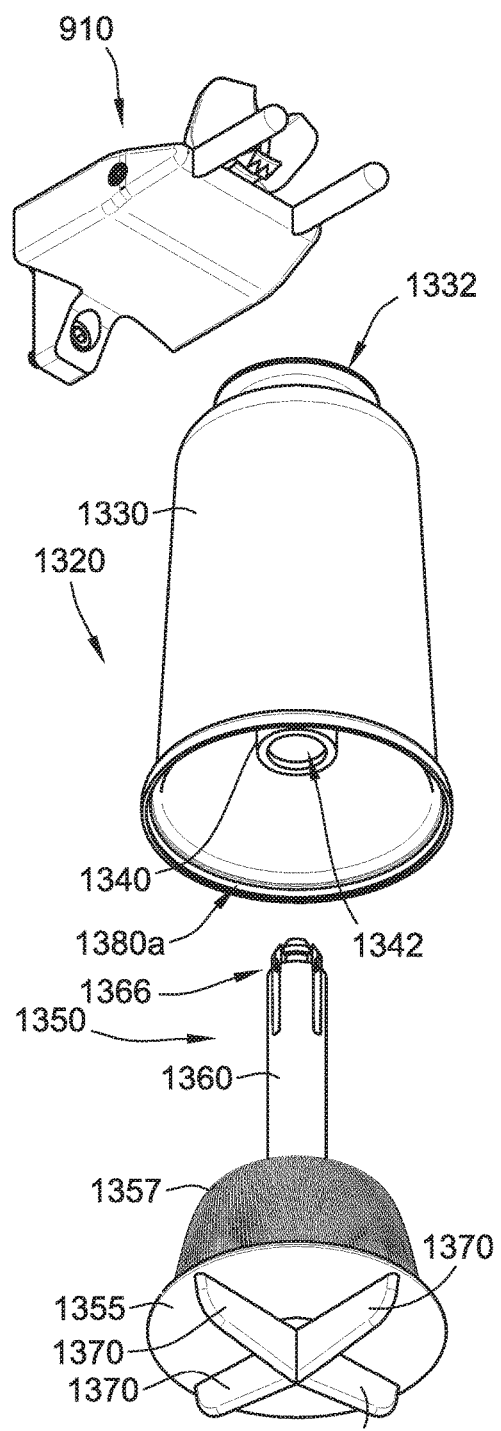
FIG. 25A
FIG. 25B

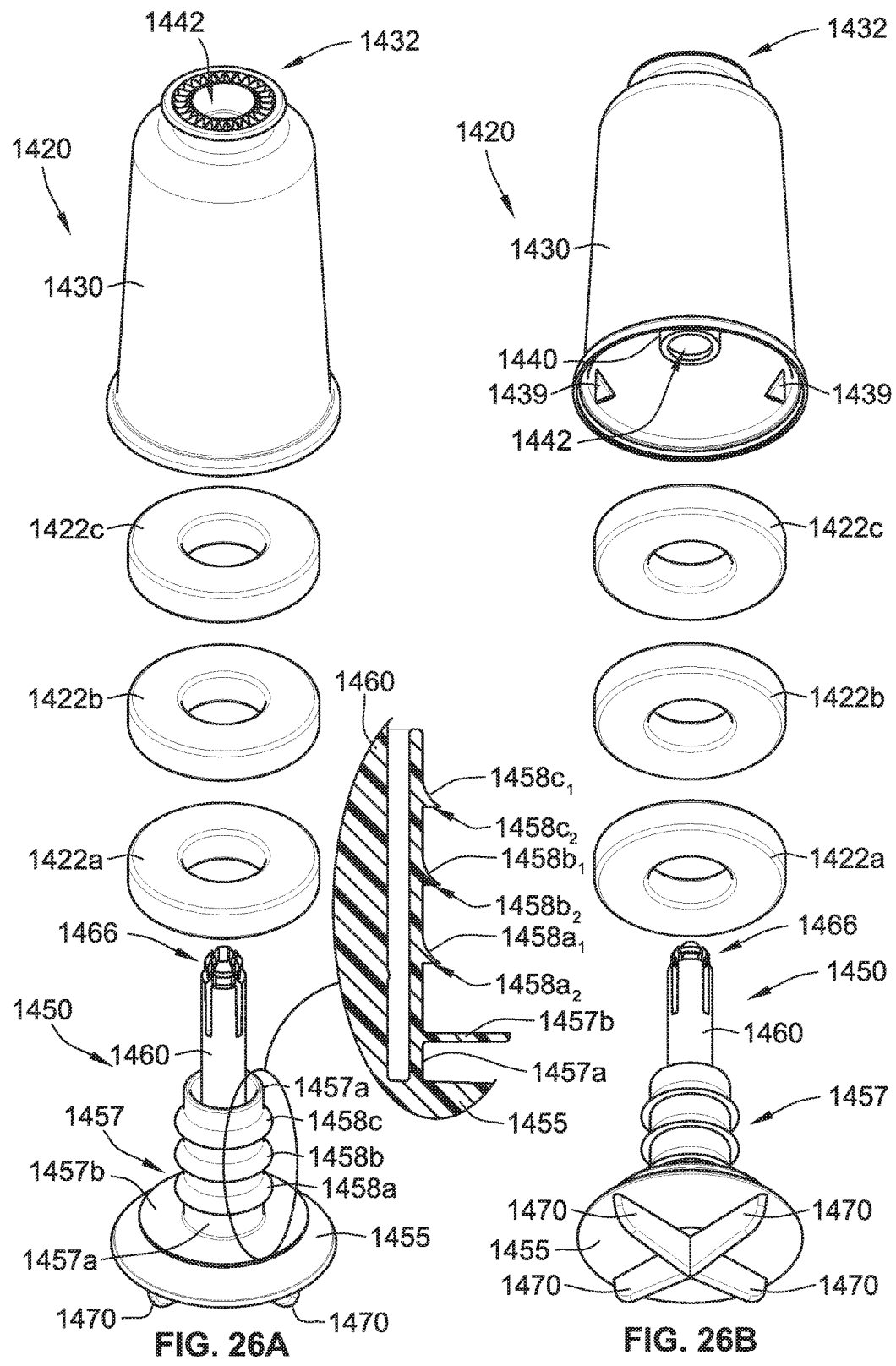

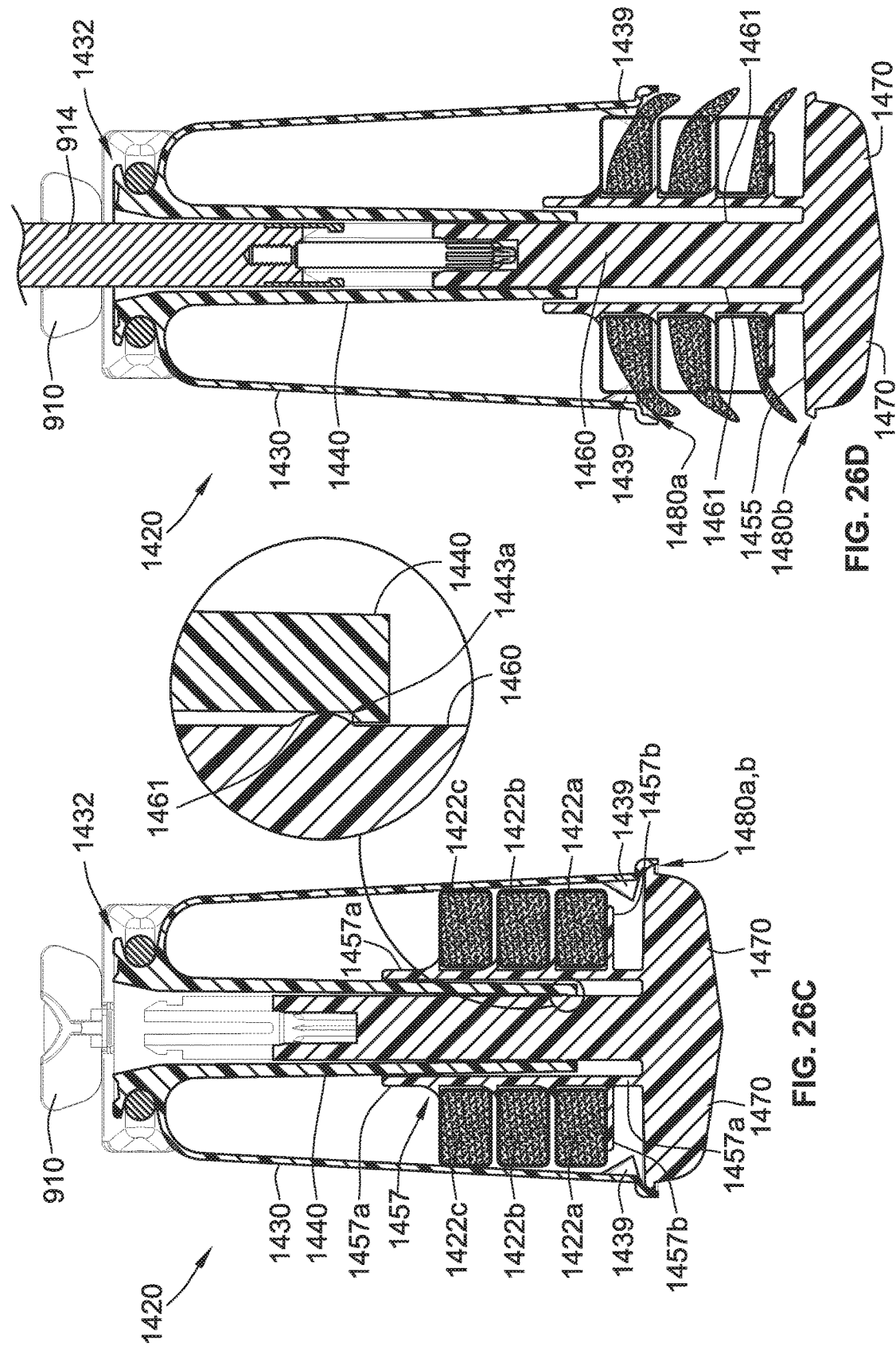

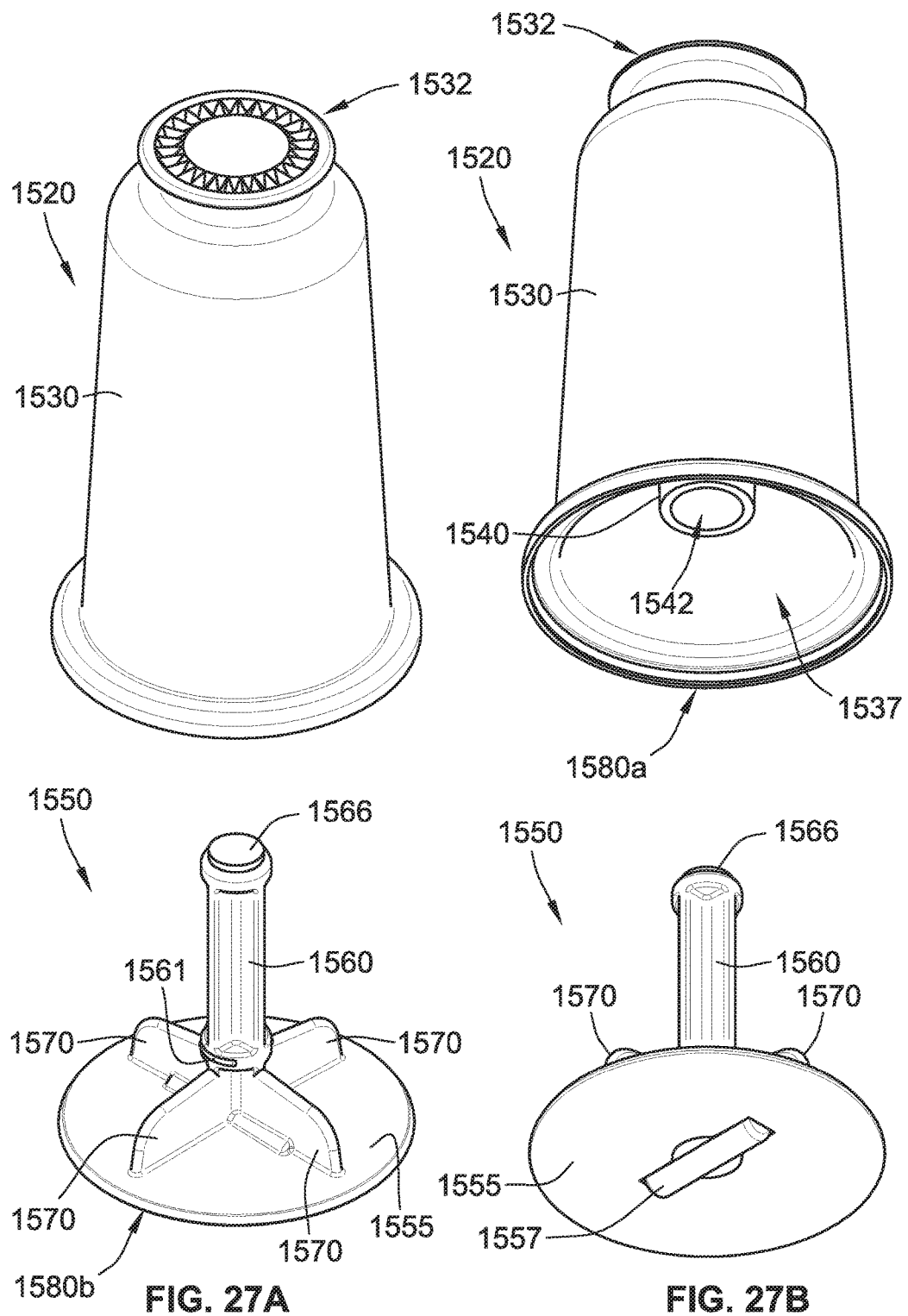

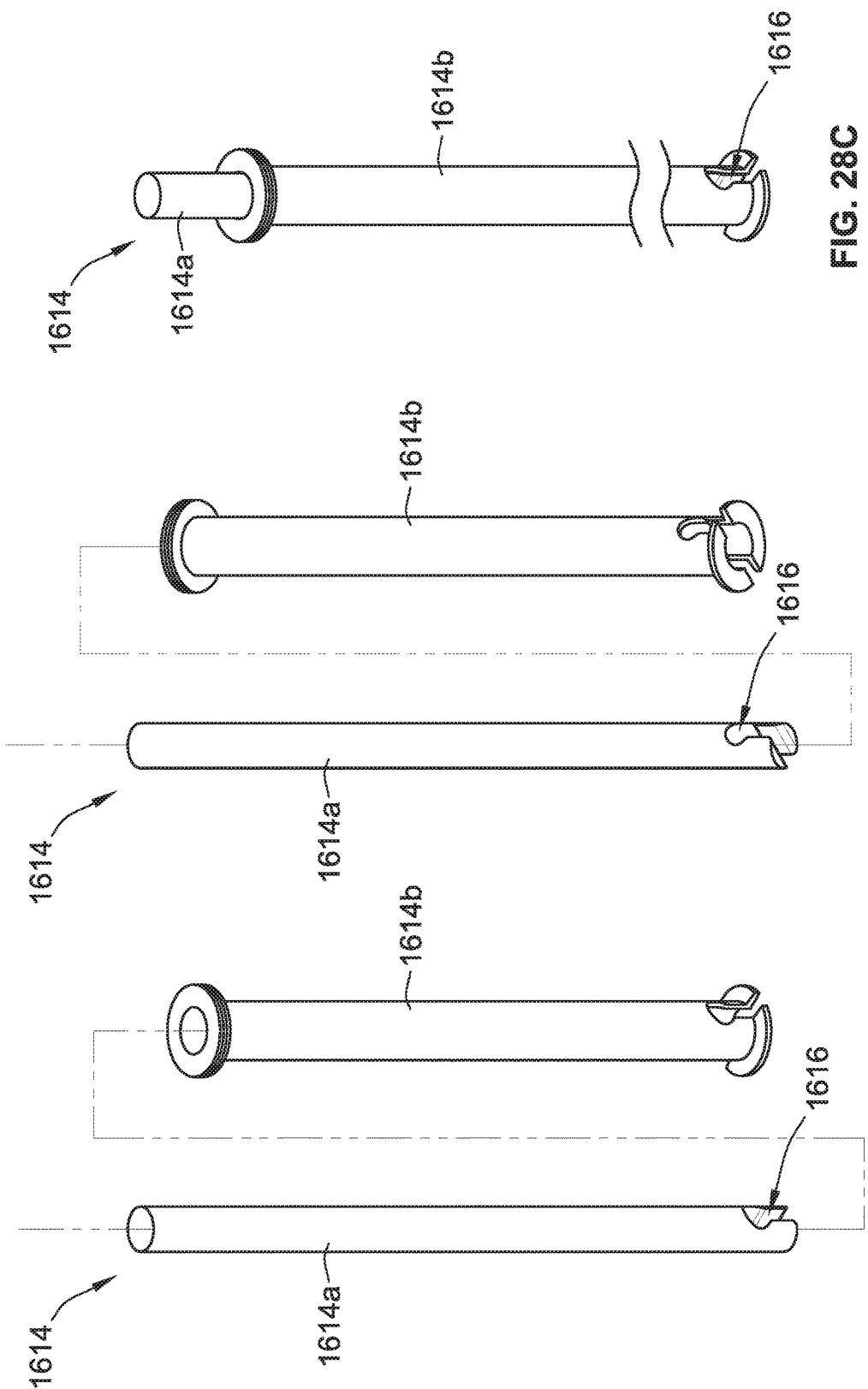

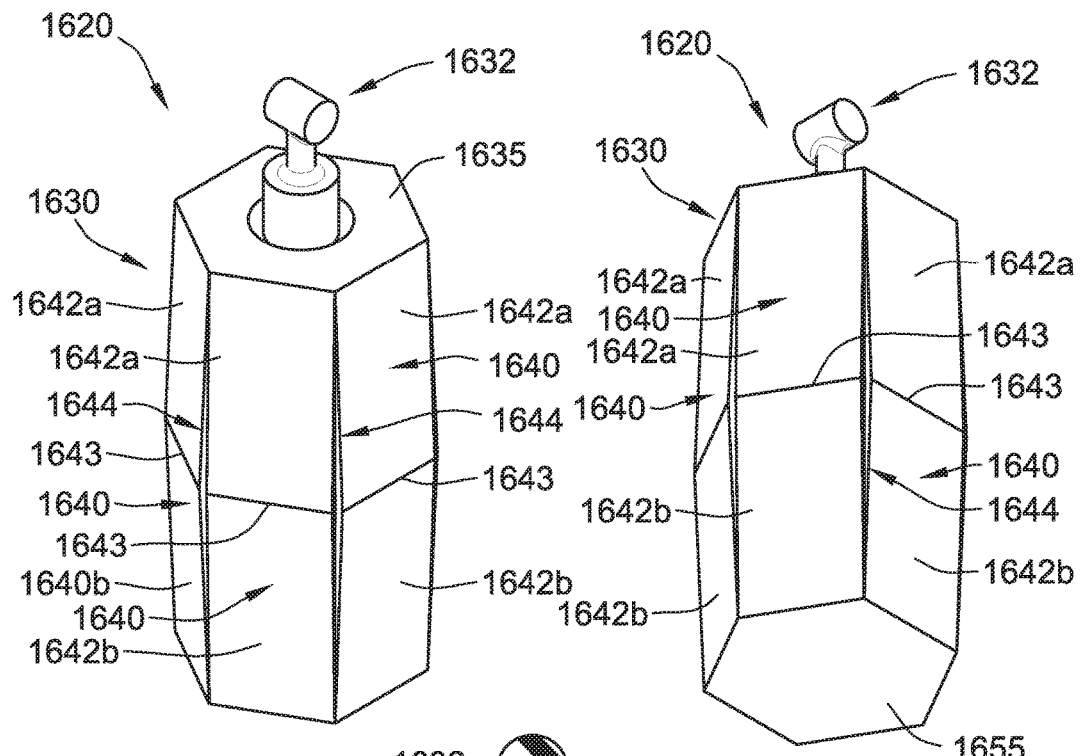
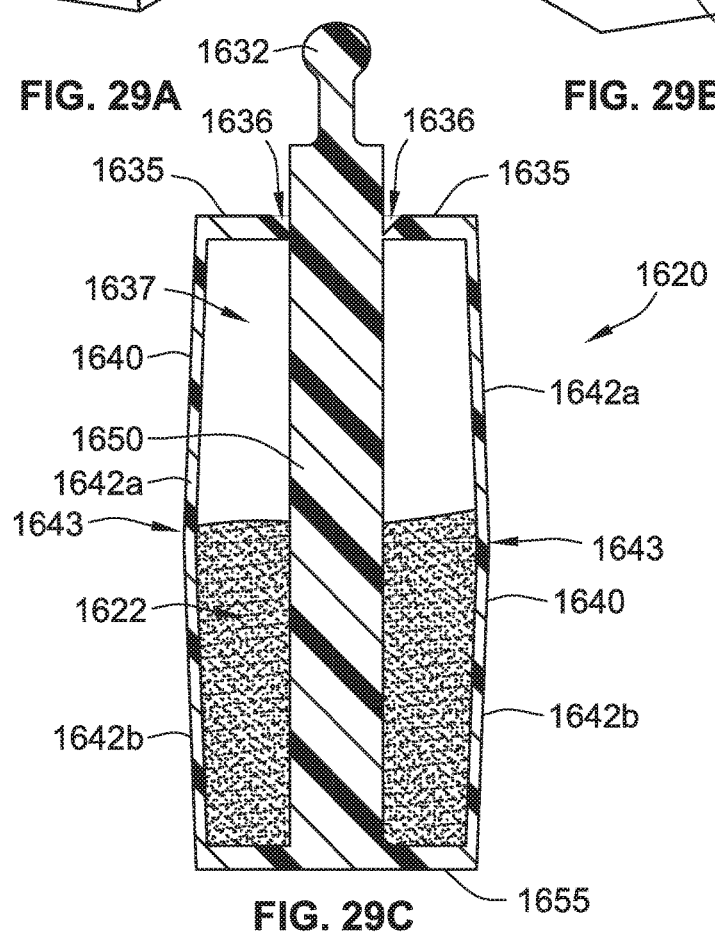

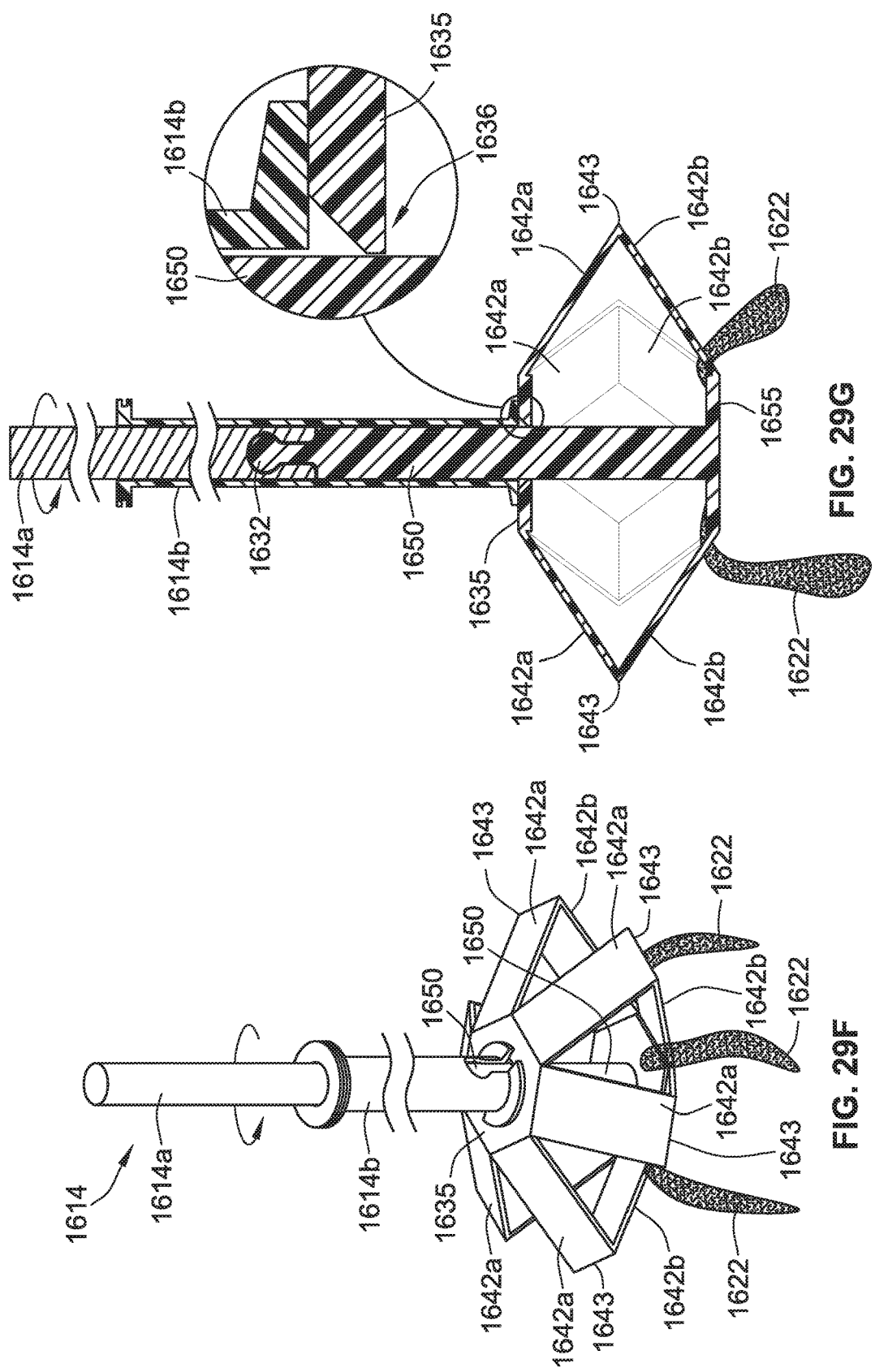

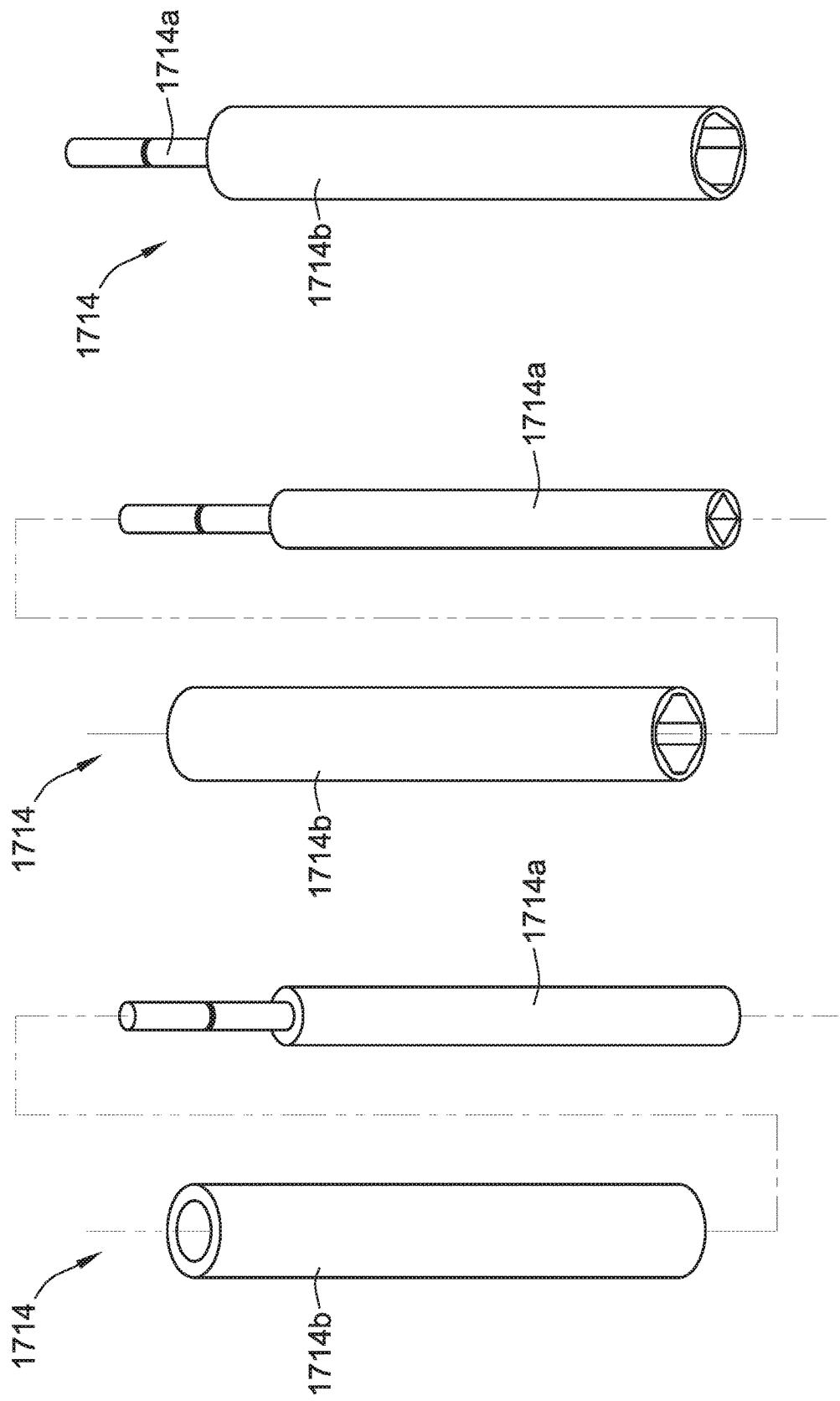

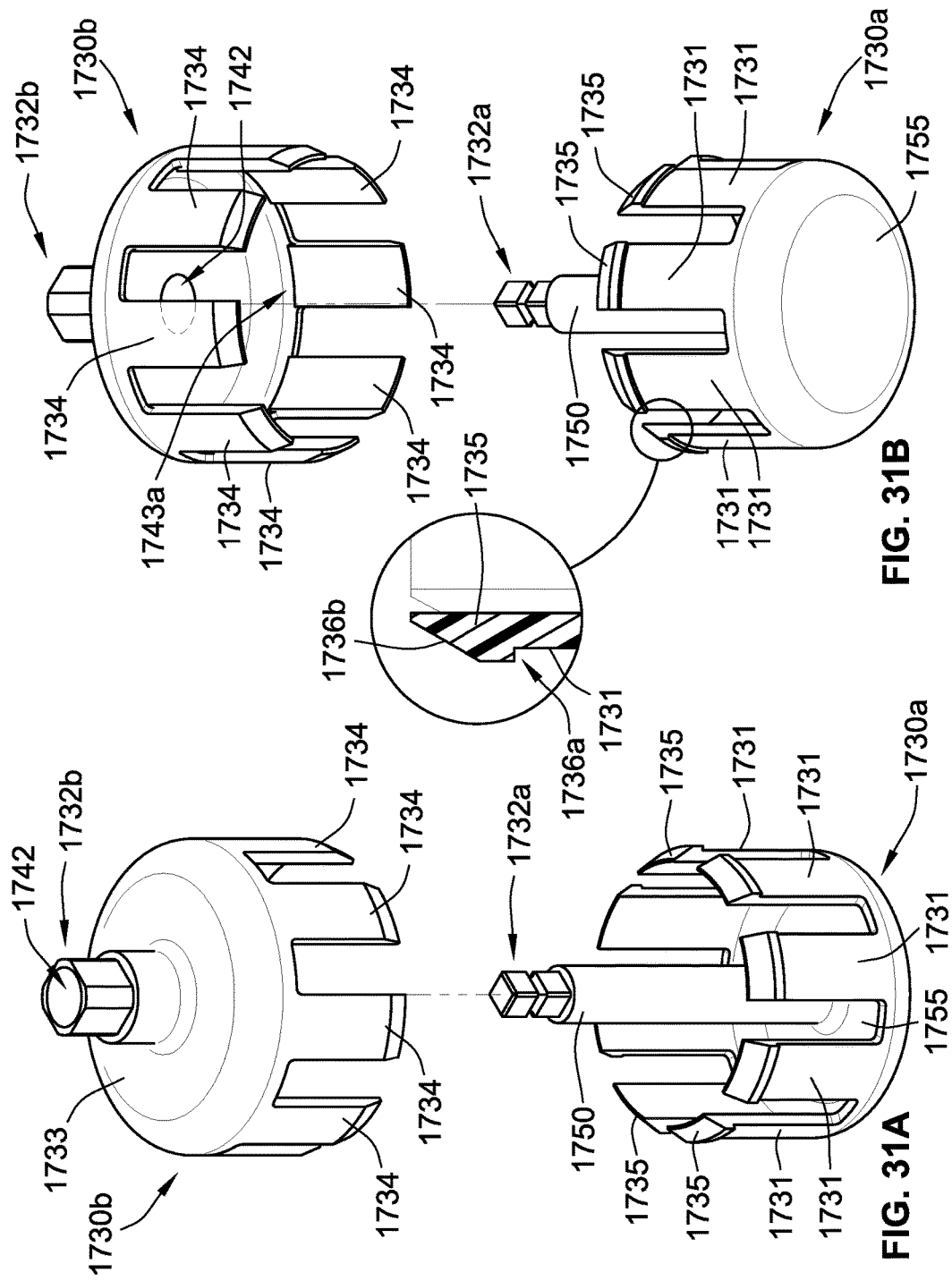

SYSTEM FOR MIXING BEVERAGES AND METHOD OF DOING THE SAME

CROSS-REFERENCE TO RELATED APPLICATIONS

This application is a National Stage of International Application No. PCT/US15/017142, filed Feb. 23, 2015, which is a continuation-in-part of prior application Ser. No. 14/278,762, filed May 15, 2014, which claims the benefit of U.S. Provisional Application No. 61/972,020, filed Mar. 28, 2014; the International Application No. PCT/US15/017142, filed Feb. 23, 2015 claims the benefit of U.S. Provisional Application No. 61/972,020, filed Mar. 28, 2014, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to systems for mixing beverages and, more particularly, to a system for mixing nutraceutical beverages using a compounding module having built-in mixing elements and storing nutraceutical-beverage material to be mixed therein.

BACKGROUND

Known beverage mixing systems exist for mixing, for example, water with powder. One example of such a known beverage mixing system is a blender. When using a blender to mix beverages, typically, the blending container and blade therein is washed/rinsed between drinks. Another example of a known beverage mixing system uses a plastic pod with beverage material to be mixed therein and passes a stream of hot water through the pod and out an aperture created in the bottom of the pod, thereby mixing the beverage. With respect to certain nutraceutical beverages, these known beverage mixing systems, and others, have significant drawbacks. Specifically, because some nutraceutical beverages can include pharmaceuticals therein, these known systems would have to be thoroughly cleaned between mixing one drink to the next to avoid cross contamination of the pharmaceuticals therein. The present disclosure is directed toward solving these and other problems.

SUMMARY OF THE INVENTION

According to an aspect of the present disclosure, a beverage mixing system is disclosed in which dry or liquid compounds contained within a removable compounding module or pod are physically isolated from all moving mechanical parts of a stationary part of the beverage mixing system. The stationary part (e.g., the part of the beverage mixing system sitting on a counter and not the vessel and not the pod) of the beverage mixing system can include a drive shaft or other moving structure that contacts part of the compounding module. Such moving mechanical structures of the beverage mixing system that physically interface with any part of the compounding module are physically isolated from becoming contaminated by any material contained within the removable compounding module, which in some cases can include pharmaceutical materials. Accordingly, the operator or user of the beverage mixing system does not have to clean the moving mechanical structures from consecutive usages of one compounding module to another, nor need to worry about cross-contamination of any material contained within one compounding module to another. Of course, any moving structures of the compounding module can be completely immersed in the material contained in the compounding module. For example, the compounding module is a one-time use, discardable item, which is inserted into a holder of the stationary part of the beverage mixing system (or otherwise coupled thereto), the contents of the compounding module are removed into a drinking vessel or container, and the module is removed from the holder following use and finally discarded.

According to another aspect of the present disclosure, which can be related to any other aspect disclosed herein, the moving mechanical part or parts of the stationary part of the beverage mixing system involved in mixing the material contained within a compounding module into a homogeneous and optionally isotropic liquid solution can be operable to move in two or more distinct and independent or coordinated motions. For example, in aspects in which the beverage mixing system includes a drive shaft, the drive shaft can be configured to impart a translation motion (e.g., up and down) to at least a portion of the compounding module relative to a beverage container or vessel. Independently or simultaneously, the drive shaft can also be configured to impart a rotational motion (clockwise and/or anti-clockwise) to at least a portion of the compounding module. These two types of motions of the drive shaft can be coordinated to move the drive shaft and the at least a portion of the compounding module according to any combination of up, down, clockwise, or anti-clockwise motions to produce a homogenous and/or isotropic liquid solution in which the material from the compounding module is thoroughly and uniformly interspersed throughout a precursor liquid. In some implementations of the present disclosure, the drive shaft can impart a variety of other motions to the at least a portion of the compounding module, such as, for example, churning, vibrating, pulsing, etc. As mentioned above, the moving mechanical structures of the beverage mixing system can be isolated from any material contained within the compounding module.

According to a further aspect of the present disclosure, which can be related to any other aspect disclosed herein, the compounding module has a removable base that couples as a stirring or mixing element, and this removable base provides a hermetically sealed interface with the rest of the compounding module so that material contained therein does not leak or spill out and so that foreign contaminants external to the compounding module do not impinge the interior of the compounding module. When the compounding module includes pharmaceutical material, it is important that this material remain completely inside the compounding module until use, and that external matter or effects (e.g., humidity) outside the compounding module cannot taint or contaminate the material contained within the compounding module. The removable base can include an element involved in mixing the material contained within the compounding module into a precursor liquid provided in a drinking vessel or container. This removable base can be retracted back into the rest of the compounding module following use, so that the compounding module together with the removable base can be discarded as a unitary unit.

It should be emphasized that the moving parts of the stationary part of the beverage mixing system involved in mixing can be directed toward or away from an opening of a drinking vessel or container, or the drinking vessel itself can be moved toward or away from the moving parts involved in mixing, or a combination of both are expressly contemplated. The present disclosure also contemplates a drinking vessel or container that houses the compounding module as a unitary unit (similar to a thermos), with the compounding module having a mixing element to agitate a precursor liquid together with material contained within the compounding module in situ without having to move the compounding module and the drinking vessel relative to one another. Part of the compounding module interfaces with a moving part of a stationary part of the beverage mixing system. The stationary part refers to the part of the mixing system that rests on a surface during use. The drinking vessel and compounding module are removable from the mixing system, though they become part of it when inserted therein during operational use. The term "drinking vessel" is not intended to mean that an animal (e.g., a human) actually drinks from this vessel. For example, the contents of the drinking vessel may be poured into another vessel, which is provided to an animal to drink or ingest.

According to a still further aspect of the present disclosure, which can be related to any other aspect disclosed herein, the stationary part of the beverage mixing system includes a coupling mechanism or holder that securely holds the compounding module relative to the drinking vessel so that when a moving part of the stationary part of the beverage mixing system interfaces with a moving part of the compounding module, a non-moving part of the compounding module remains in a relative fixed position. By "relative" it is contemplated that the coupling mechanism or holder can move with the compounding module, while allowing relative movement of the corresponding moving parts. As discussed above, the moving part of the stationary part of the beverage mixing system is capable of translation motion and rotational motion, and these two motions can be carried out while the compounding module is coupled to the coupling mechanism or holder of the stationary part without imparting those same motions to the non-moving part of the compounding module. In other words, for example, the non-moving part of the compounding module does not move in the same manner as the particular movement being imparted to the moving part of the stationary part of the beverage mixing system and/or to the moving part of the compounding module.

Relatedly, the compounding module itself includes a coupler that is received in the coupling mechanism or holder of the stationary part of the beverage mixing system either manually (e.g., by a human positioning the compounding module in the coupling mechanism) and/or automatically (e.g., by a robot automatically positioning the compounding module in the coupling mechanism or by the compounding module automatically falling into engagement with the coupling mechanism like in a vending machine-type configuration). These two interfaces, on both compounding module and on the stationary part, allow the compounding module to be easily inserted into and removed from the stationary part with a minimum number of acts on the part of the operator (e.g., human or machine) required for insertion and removal. The insertion and removal procedures are frustration-free, and in some aspects, require only a single, one-handed action by the operator. In other aspects, a maximum of two actions (one or two-handed) are required by the operator (e.g., human or machine) for insertion and removal. For example, one action can insert the module into the coupling mechanism or holder, and another action can lock the module into the coupling mechanism or holder. Alternately, a single action can both couple the module relative to the coupling mechanism or holder as well as fix the module relative to the coupling mechanism or holder. The reverse of the action or actions or a different action or actions can be required to remove the module from the coupling mechanism or holder. An action can be defined as being initiated by the user's touching a structure (e.g., the module or the stationary part) and completed when the user stops touching that same structure while using only one motion in one direction between starting to touch and stopping the touch. If the user is required to touch another structure to affect complete insertion or removal of the module relative to the stationary part, or is required to change the motion in a different direction, this is defined to be a further action. Thus, a "single-action insertion" would start by the user grasping the module and moving it into position for insertion, and inserting the same by one motion in one direction into the coupling mechanism or holder of the stationary part, which causes the module to be securely received by the coupling mechanism or holder. The user releases the module, thereby completing the single-action insertion. Likewise, to release the module using a "single-action removal," the user starts by grasping the module and pulling it a direction away from the coupling mechanism or holder to completely release the module from the coupling mechanism or holder that previously held it in place relative to the stationary part. Optionally, a twisting action can also be required as part of insertion or removal of the module, but this can be carried out without the user's having to release the module from being grasped. The mixing or agitation can be carried out automatically following proper insertion (and optionally once the beverage mixing system confirms that a properly sized drinking vessel is also present), or the user can activate an interface, such as a physical pushbutton or button on a touchscreen of the beverage mixing system, to initiate mixing or agitation. In some aspects, the coupling of the module with the stationary part should be "orientation agnostic," meaning that it does not matter what orientation the user inserts the module into the coupling mechanism or holder to be received securely relative thereto. Here, orientation does not mean right-side-up (e.g., base of the module pointing toward the drinking vessel) versus upside-down (e.g., base of the module pointing away from the drinking vessel), but rather an orientation taken along an axis passing from a top of the module to its base.

According to yet another aspect of the present disclosure, which can be related to any aspect disclosed herein, the compounding module has a form or shape that ensures that substantially all of the material contained within the module exits the module when its base is removed. Of course, when the material takes a powder or slurry form, some of the material will stick to the inner walls of the module due to attraction forces, so the term "substantially all" allows that some material will remain stuck to the inner walls of the module. However, what is not desired is for a meaningful portion of the material to remain within the module when the base has been removed. For example, in aspects in which gravity is the only force acting upon the material to cause it to exit the compounding module, the form or shape of the compounding module can be designed to ensure a maximal amount of material will succumb to the gravitational force acting upon it. The shape or form contemplated herein also allows for some "clumping" of the material to occur, such as due to humidity or other environmental effects external to the module during storage or transportation, but notwithstanding any such clumping, most or substantially all of the material will still exit the module during operational use. For example, sharp transitions inside the module should be avoided, so that the material constantly encounters smooth or gently rounded transitions throughout the interior of the compounding module. The compounding modules should accommodate different amounts of material as well, for example, so different sizes of compounding modules should have the same form factor to be used within the same beverage mixing system with no further accommodation or modification thereto. In a very specific but non-limiting example, it has been found that a housing resembling an elongated, "Bundt" cake design works very well for a range of materials and environmental conditions. This design also advantageously fulfills another aspect disclosed herein in which the moving parts of the stationary part of the beverage mixing system are physically isolated from any material in the compounding module. Principles for a well-designed module include no sharp transitions or corners in the interior of the housing, optional smooth protrusions or channels, and/or an optional hydrophobic coating inside the housing, such as when the material takes on a slurry form instead of a dry material.

Alternately or additionally to the form factor of the module containing the material, a dislodging element can be provided from within the module or external to the module to disrupt the material contained within the interior cavity of the module. For example, inside the module can be dislodging structures (e.g., elongated mixing elements or mixing blades), such as in the form of fingers or extensions, that break up any clumps or material that does not succumb to gravity. Particularly for materials that include a pharmaceutical, it can be important to ensure that the proper dosage is dispensed, so any clumping or adherence of residual material inside the module following dispensation of the material should be avoided. Or, a structure or structures external to the module can enter the interior of the module to dislodge any residual material therefrom. Or, the module itself can be moved by translation or rotation or both relative to a structure that enters the interior of the module to disrupt and dislodge any residual material.

According to a further aspect of the present disclosure, which can be related to any other aspect disclosed herein, the mixing system (e.g., a beverage mixing system) lacks a drive shaft that engages the compounding module. The compounding module can be translated up and down by being held by, for example, finger-like devices around a neck or coupler of the module, and the agitator (the part that goes into the liquid to agitate the liquid and material into a homogeneous and/or isotropic drink or beverage) can include a magnet that magnetically couples the agitator to the interior of the housing of the module until the agitator is ready to be drawn into the liquid. To do so, one or more energized coils can be supplied around or proximate the base on which a drinking vessel containing a liquid is placed to cause rotation of the agitator of the module relative to a vertical axis. Thus, in these examples, one or more magnets and one or more energized coils can be utilized to cause independent or concurrent translation and rotation of the agitator of the module during agitation.

According to a further aspect of the present disclosure, which can be related to any other aspect disclosed herein, the agitator portion is held securely to the housing of the module by a seal, as mentioned above, during storage, but following dispensation of the material contained within the housing, the agitator portion is drawn back toward the housing and coupled to the housing so that both the agitator and housing can be removed as a unitary piece and then discarded. Many different examples are provided of providing a sealing interface between the agitator and the housing of the compounding module. Sonic welding techniques can be used alone and/or in conjunction with a foil or foil-like material that is broken or sliced just prior to agitation. Mechanical seals are described having interference fit or snap-fit or crush-fit features. It is important for the agitator to remain coupled to the mixing system during agitation, which can be vigorous and involve different types of motions, such as up-down and clockwise and anti-clockwise rotations, which would tend to cause the agitator portion to become separated from the mixing system and fall into the beverage container. To avoid this undesirable scenario, various features (e.g., undercuts in a collar portion of a drive shaft having a specific angle and locking tabs having a specific angle) are described for agitator retention during agitation. It should be noted also that the agitator can be separated from the housing in one direction (e.g., downwards), but is retracted back toward the housing in the opposite direction (e.g., upwards), which allows for different retention features to be engaged during both movements. For example, to dislodge the agitator during a downward movement can involve overcoming a holding force that opposes gravity, whereas retracting and securing the agitator portion relative to the housing following agitation can involve forcing the agitator portion against one or more other structures on or inside the housing of the module to create an engagement or interference fit that allows both the agitator portion together with the housing to be removed as a unitary piece from the mixing system and then discarded or reused or recycled.

According to a further aspect of the present disclosure, which can be related to any other aspect disclosed herein, in aspects where the mixing system includes a drive shaft, an anti-wobbling feature is disclosed whereby the agitator portion as it is rotating, for example, during agitation, is held straight and true relative to an axis to avoid wobbling, which could cause the agitator to break or deform during agitation or cause liquid to splash or splatter out of the drinking vessel during agitation. Registration structures (e.g., bearing surfaces) are disclosed for ensuring a co-axial engagement between the agitator and the drive shaft. Poka-yoke or puzzle-fit structures are also contemplated to ensure proper alignment of the agitator relative to a drive shaft. In implementations involving magnetic coupling to cause agitator translation and/or rotation during agitation, all structures that form the agitator are designed to be symmetric about the rotation axis to minimize wobbling.

While some examples above contemplate having the material (e.g., nutraceutical compound) exploit gravity by falling out of the bottom of the housing when the agitator is decoupled therefrom into the drinking vessel below, according to a further aspect of the present disclosure, which can be related to any other aspect disclosed herein, the modules can be designed so that the material falls away from the sides of the module. For example, a crushable module is contemplated whereby the module is compressed or compacted into a shorter profile, causing one or more sides of the module to deform or move and create openings for the material inside the housing to exit the housing. Once the material has been dispensed, the crushed or compacted module itself can do double-duty as an agitator and be utilized to mix the material into the liquid. In another example, the module is not crushable but has multiple interfacing parts that when moved relative to one another create one or more openings to allow the material to exit the housing.

According to a further aspect of the present disclosure, which can be related to any other aspect disclosed herein, the user can customize a beverage by selecting from among multiple packages (e.g., compound rings) that contain different materials. For example, each package can resemble a donut or toroid, a pie-shaped part, a spoke on a wheel, an "L" shaped cylinder, a rectangular shaped cylinder, a circular shaped cylinder, etc. and contain a different material. One package may contain a certain nutritional supplement, and another may contain a pharmaceutical. The user can select 1, 2, 3, or more of these packages, manually stack them together relative to a shaft either attached to the mixing system or associated with the agitator, and have all of the packages' contents dispensed simultaneously or sequentially into a liquid of choice. Alternatively, the user can select ingredients using an input device of a mixing machine and the machine can cause corresponding ones of the packages to be included in the module for mixing. According to yet another alternative, the user can select ingredients using an input device of a mixing machine and the machine can cause certain ones of the packages in the module to be opened and others to not be opened during mixing. Security features embedded on the packages, such as RFID tags, can be used to prevent the user from making combinations that would be harmful, such as an overdose of a pharmaceutical. The packages can be discardable or dissolvable into the liquid so that they dissolve and disappear during agitation.

While some aspects contemplate dispensing some or all of the material contained within a module, according to a further aspect of the present disclosure, which can be related to any other aspect disclosed herein, the material can be contained at all times within the module during agitation. For example, when the material is tea leaves, for example, a bag-like structure (e.g., mesh) is incorporated into the module to retain the tea leaves. The agitator is separated from the housing during agitation to expose the tea leaves contained within the bag-like structure to the liquid. Once steeped, the bag-like structure is drawn back toward the housing together with the tea leaves, and the entire module can then be removed and discarded or recycled. Tea leaves are just one example of many materials that would not be dispensed into the liquid. Coffee grinds, roots, other cellular material, spices, flavoring elements, to name a few, are also contemplated. Use of the bag-like structure (e.g., mesh) advantageously allows for different dosages of ingredients to be released into a liquid during steeping and/or mixing. For example, if material (e.g., a hard aspirin pill) were in the bag-like structure, the mixing system can alter the time the module agitates the material in the bag-like structure such that all of or a portion of (e.g., half) the material therein (e.g., aspirin) dissolves allowing for different dosing of the material/ingredient. Specifically, for example, if it takes aspirin material in a pill form-factor in the bag-like structure (e.g., mesh) a total of two minutes to fully dissolve with agitation in water, if a user desired only a half dose, the mixing system could be programmed to cause the module to only agitate the aspirin material in the water for one minute to give a half dose (e.g., for a child).

According to a still further aspect of the present disclosure, which can be related to any other aspect disclosed herein, each compounding module can include a machine-readable tangible medium or structure (e.g., a unique identifier), such as a barcode or QR code printed on a label, an RFID tag, an NFC chip, etc. For convenience, these media or structures will simply be referred to as a code. Each code can be used to track uses of the compounding modules, and the beverage mixing system can store this usage information. For example, when the compounding module includes a pharmaceutical material, the beverage mixing system can automatically send signals to a pharmacy or physician for reordering a further batch of compounding modules with an appropriate prescribed amount of pharmaceutical(s). Each code can also be used by the beverage mixing system to authenticate the compounding module. Particularly when pharmaceutical material is present, ensuring that only approved compounding modules are used is important to prevent intentional or inadvertent improper ingestion of pharmaceuticals or dispensation to the wrong individual. In this respect, the beverage mixing system can include a graphical user interface (GUI) that requires the user to authenticate his or her credentials prior to allowing dispensation of the contents of the compounding module into a drinking vessel. In this aspect, the beverage mixing system has two levels of authentication—one at the user level to authenticate an identity of the user, and one at the module level to authenticate that the module is from an approved source. The beverage mixing system can also use the code to track usage history to prevent an overdose or excessive consumption, for example. When the compounding module material includes a material of interest, such as, for example, a pharmaceutical and/or any other material that may be dangerous in large quantities (e.g., excessive calcium in older males, excessive iron in small children), the beverage mixing system can extract from the code a frequency of dispensation of the material of interest, and only permit the dispensation of the material of interest at the time intervals extracted from the code. In some implementations, when the compounding module does not include a pharmaceutical, but instead, for example, contains a nutritional supplement, the beverage mixing system can extract from the code a recommended minimum frequency of consumption of the nutritional supplement and permit the user to dispense the material at the time intervals extracted from the code. It should be emphasized that the beverage mixing system can accommodate the possible presence of pharmaceuticals in the compounding modules disclosed herein. Extracting information from the compounding module itself, such as via a code, is an important aspect, as well as authenticating an identity of a user of the beverage mixing system.

What follows in this summary section is several specific examples, which are not exhaustive of every conceivable aspect disclosed herein but which are contemplated by the present disclosure.

According to some implementations of the present disclosure, a compounding module for use in a beverage mixing system includes a housing, a sealing feature, a locking feature, and an agitator. The housing has an opening separating an inner surface from an outer surface. The housing also has a boss that extends through the housing such that part of the outer surface of the housing forms an inner bore of the boss having a terminus pointing toward the opening. The agitator has a base, a shaft, and a mixing element coupled to the base such that the base, in cooperation with the sealing feature, circumferentially seals the opening of the housing to form a cavity defined by the inner surface. The shaft passes through the inner bore. The locking feature when engaged permits independent or simultaneous translational and rotational movement of the shaft while an area between the terminus of the boss and the shaft remains mechanically sealed during the movement against liquid or powder encroachment into a clean area of the inner bore.

According to some implementations of the present disclosure, a compounding module for use with a beverage mixing system includes a housing and an agitator. The housing defines an interior cavity and includes a boss that extends from a first end of the housing into the interior cavity towards a second opposing end of the housing. The boss defines an inner bore. The agitator includes a base, a shaft, and a mixing element. The shaft of the agitator extends from the base and is slidably coupled to the boss such that the agitator is movable between a sealed position and an unsealed position. A portion of the shaft of the agitator defines an inner bore to be engaged by a drive shaft of the beverage mixing system during operation of the beverage mixing system. When the drive shaft engages the inner bore of the shaft of the agitator, the boss of the housing in conjunction with the shaft of the agitator isolate the drive shaft from the interior cavity of the housing.

According to some implementations of the present disclosure, a method of mixing a beverage using a compounding module and a beverage mixing system includes coupling the compounding module to the beverage mixing system. The compounding module includes an agitator slidably coupled to a housing defining an interior cavity. The housing includes a boss that extends from a first end of the housing into the interior cavity towards a second opposing end of the housing. The agitator has a base, a shaft, and a mixing element. The shaft of the agitator is non-rotationally engaged with a drive shaft of the beverage mixing system. The agitator is caused to move from a sealed position to an unsealed position such that the agitator translates relative to the housing. The drive shaft is rotated thereby causing the agitator to rotate in a corresponding manner. During the rotating and during the translating, the drive shaft is isolated from the interior cavity of the housing using the boss of the housing and the shaft of the agitator.

According to some implementations of the present disclosure, a compounding module including nutraceutical material for use with a nutraceutical beverage mixing system, the compounding module having a sealed configuration and an unsealed configuration, includes a housing and an agitator. The housing has a first end and a second opposing end defining an interior cavity. The first end of the housing includes a coupler to be engaged by a coupling mechanism of the nutraceutical beverage mixing system, thereby preventing the housing from rotating or translating relative to the coupling mechanism. The housing includes a boss that extends into the cavity from the first end of the housing towards the second end of the housing and defines an inner bore. The inner bore of the boss allows a portion of a drive shaft of the nutraceutical beverage mixing system to pass therethrough. The second end of the housing is open and includes a sealing feature. The agitator includes a base, a shaft, and a plurality of mixing elements. The shaft of the agitator has a first end adjacent to the base and a second opposing end. The shaft of the agitator extends generally perpendicular from the base. The shaft of the agitator slides within the inner bore of the housing. The plurality of mixing elements extends generally perpendicular from the base. A portion of the shaft of the agitator defines an inner bore to be engaged by the drive shaft. The inner bore of the shaft of the agitator has a plurality of agitator splines therein. The plurality of agitator splines defines a plurality of agitator channels therebetween to receive a plurality of drive shaft splines of the drive shaft when the drive shaft is engaged with the inner bore of the shaft of the agitator. The second end of the shaft of the agitator includes a collet to engage a notch of the drive shaft when the compounding module is in the unsealed configuration. The base includes a sealing feature to mate with the sealing feature of the housing when the compounding module is in the sealed configuration. When the drive shaft is engaged with the inner bore of the shaft of the agitator, the boss of the housing in conjunction with the shaft of the agitator isolate the drive shaft from the nutraceutical material when the compounding module is in the sealed configuration and the unsealed configuration.

Additional aspects of the present disclosure will be apparent to those of ordinary skill in the art in view of the detailed description of various implementations, which is made with reference to the drawings, a brief description of which is provided below.

BRIEF DESCRIPTION OF THE DRAWINGS

FIG. 7B is an exploded perspective view of the compounding module of FIG. 7A;

FIG. 7C is an exploded perspective view of the compounding module of FIG. 7A;

FIG. 9A is a partial perspective view of the drive shaft of the beverage mixing system and the compounding module in a first position according to some aspects of the present disclosure;

FIG. 9B is a partial cross-sectional view of the drive shaft of the beverage mixing system and the compounding module in the first position of FIG. 9A;

FIG. 10A is a partial perspective view of the drive shaft of the beverage mixing system and the compounding module in a second position according to some aspects of the present disclosure;

FIG. 10B is a partial cross-sectional view of the drive shaft of the beverage mixing system and the compounding module in the second position of FIG. 10A;

FIG. 11A is a partial perspective view of the drive shaft of the beverage mixing system and the compounding module in a third position according to some aspects of the present disclosure;

FIG. 11B is a partial cross-sectional view of the drive shaft of the beverage mixing system and the compounding module in the third position of FIG. 11A;

FIG. 14 is a partial perspective view of an alternative coupler and coupling mechanism according to some implementations of the present disclosure;

FIG. 15A is a top view of the alternative coupler and coupling mechanism of FIG. 14 in an open position;

FIG. 16B is an exploded perspective view of the alternative compounding module of FIG. 16A;

FIG. 16C is an exploded perspective view of the alternative compounding module of FIG. 16A;

FIG. 18B is an exploded perspective view of the alternative compounding module of FIG. 18A;

FIG. 18C is an exploded perspective view of the alternative compounding module of FIG. 18A;

FIG. 18D is an exploded cross-sectional view of the alternative compounding module and the alternative coupling mechanism of FIG. 18A;

FIG. 18E is a partial cross-sectional view of a sealing feature of the alternative compounding module of FIG. 18A;

FIG. 20B is a cross-sectional view of the alternative drive shaft of FIG. 20A;

FIG. 20C is an exploded cross-sectional view of the alternative drive shaft of FIG. 20A;

FIG. 21B is an exploded perspective view of the module of FIG. 21A;

FIG. 21C is an exploded perspective view of the module of FIG. 21A;

FIG. 21E is a partial perspective view of the module of FIG. 21A coupled to the coupling mechanism of FIG. 21A relative to a portion of the drive shaft of FIG. 20A in a loading position with a portion of the module removed to illustrate an interior thereof;

FIG. 21F is a front cross-sectional view of FIG. 21E;

FIG. 21G is a partial perspective view of the module of FIG. 21A coupled to the coupling mechanism of FIG. 21A relative to a portion of the drive shaft of FIG. 20A in an engaged position with a portion of the module removed to illustrate an interior thereof;

FIG. 21H is a front cross-sectional view of FIG. 21G;

FIG. 21I is a partial perspective view of the module of FIG. 21A coupled to the coupling mechanism of FIG. 21A relative to a portion of the drive shaft of FIG. 20A in an operating position with a portion of the module removed to illustrate an interior thereof;

FIG. 21J is a front cross-sectional view of FIG. 21I;

FIG. 22D is a partial perspective view of the module of FIG. 22A in an assembled configuration coupled to the coupling mechanism of FIG. 21A relative to a portion of the drive shaft of FIG. 20A in a loading position with a portion of the module removed to illustrate an interior thereof;

FIG. 22E is a front cross-sectional view of FIG. 22D;

FIG. 22F is a partial perspective view of the module of FIG. 22A in an assembled configuration coupled to the coupling mechanism of FIG. 21A relative to a portion of the drive shaft of FIG. 20A in an engaged position with a portion of the module removed to illustrate an interior thereof;

FIG. 22G is a front cross-sectional view of FIG. 22F;

FIG. 22H is a partial perspective view of the module of FIG. 22A in an assembled configuration coupled to the coupling mechanism of FIG. 21A relative to a portion of the drive shaft of FIG. 20A in an operating position with a portion of the module removed to illustrate an interior thereof;

FIG. 22I is a front cross-sectional view of FIG. 22H;

FIG. 25A is an exploded perspective view of a module including a mesh relative to a coupling mechanism of a beverage mixing system according to some implementations of the present disclosure;

FIG. 25B is an exploded perspective view of the module of FIG. 25A relative to the coupling mechanism of FIG. 25A;

FIG. 26A is an exploded perspective view of a module including a stacking structure according to some implementations of the present disclosure;

FIG. 26B is an exploded perspective view of the module of FIG. 26A;

FIG. 26C is a front cross-sectional view of the module of FIG. 26A in an assembled, sealed position coupled to coupling mechanism of a beverage mixing system;

FIG. 26D is a front cross-sectional view of the module of FIG. 26A in an assembled, unsealed position coupled to the coupling mechanism and relative to a portion of the drive shaft of FIG. 20A in an operating position;

FIG. 27A is an exploded perspective view of a module including a drive magnet according to some implementations of the present disclosure;

FIG. 27B is an exploded perspective view of the module of FIG. 27A;

FIG. 28A is an exploded perspective view of an alternative drive shaft according to some implementations of the present disclosure;

FIG. 28B is an exploded perspective view of the alternative drive shaft of FIG. 28A;

FIG. 28C is an assembled perspective view of the alternative drive shaft of FIG. 28A;

FIG. 29A is a perspective view of a module in a sealed, uncrushed position according to some implementations of the present disclosure;

FIG. 29B is a perspective view of the module of FIG. 29A in the sealed, uncrushed position;

FIG. 29C is a front cross-sectional view of the module of FIG. 29A in the sealed, uncrushed position;

FIG. 29F is a perspective view of the module of FIG. 29A in the unsealed, crushed position coupled to the drive shaft of FIG. 28C;

FIG. 29G is a front cross-sectional view of FIG. 29F;

FIG. 30A is an exploded perspective view of an alternative drive shaft according to some implementations of the present disclosure;

FIG. 30B is an exploded perspective view of the alternative drive shaft of FIG. 30A;

FIG. 30C is an assembled perspective view of the alternative drive shaft of FIG. 30A;

FIG. 31A is an exploded perspective view of a module according to some implementations of the present disclosure;

FIG. 31B is an exploded perspective view of the module of FIG. 31A;

Figure 1A:
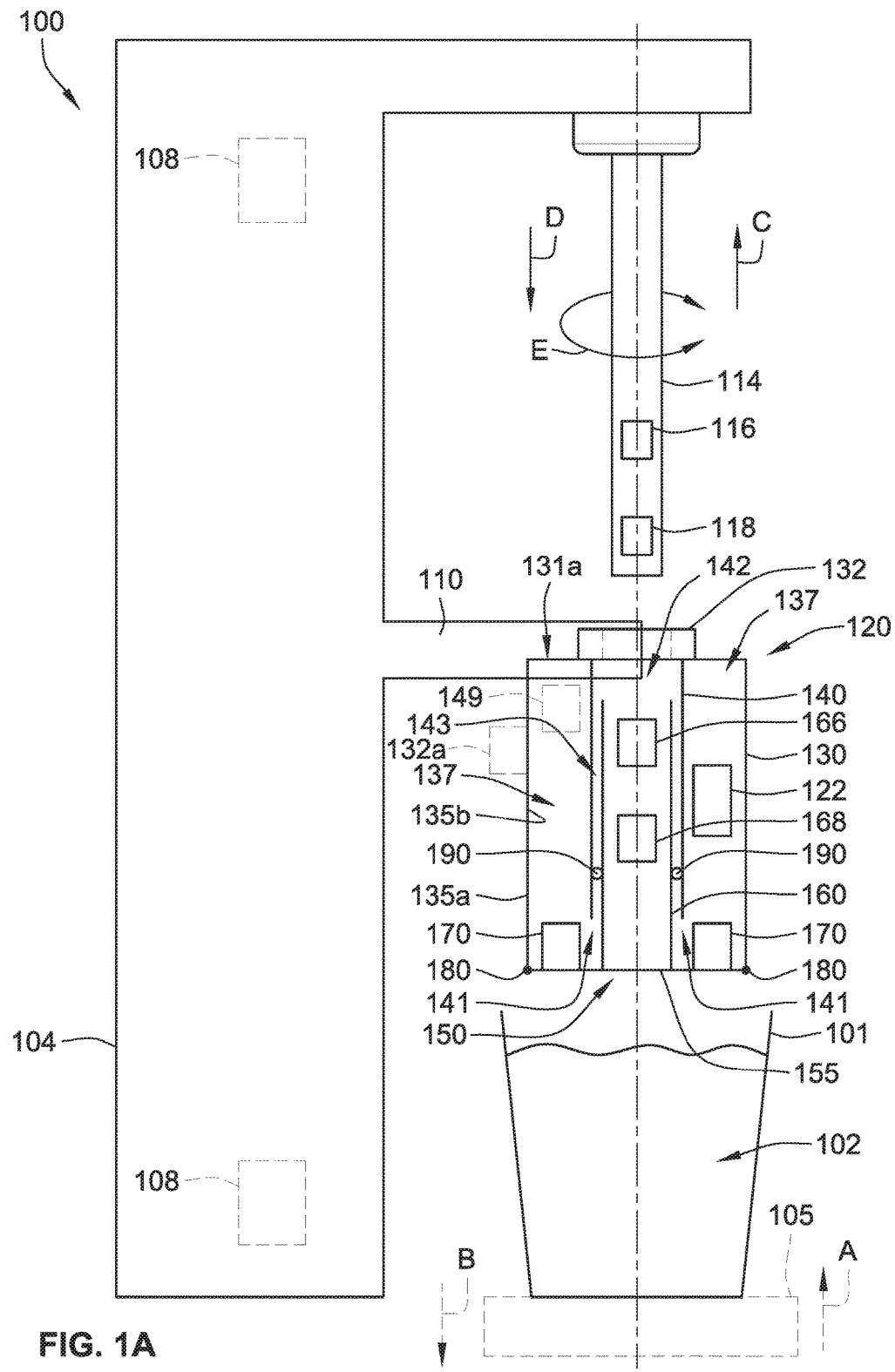
FIG. 1A is a block schematic diagram of a beverage mixing system and a compounding module in a first position according to some aspects of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is intended to cover all modifications, equivalents, and alternatives falling within the spirit and scope of the present disclosure as defined by the appended claims.

DETAILED DESCRIPTION

While this disclosure is susceptible to embodiment in many different forms, there is shown in the drawings and will herein be described in detail preferred implementations of the disclosure with the understanding that the present disclosure is to be considered as an exemplification of the principles of the disclosure and is not intended to limit the broad aspect of the disclosure to the implementations illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

It will be understood that the term "nutraceutical," indicates a portmanteau of the words "nutrition" and "pharmaceutical," and as used herein is a food or food product that reportedly provides health and/or medical benefits, including the prevention and treatment of disease, and that this food or food product may be of any kind, but can be the form of a dry or fluid (e.g., a slurry) concentrate intended for combination with a liquid (such as water) prior to ingestion by an end user. Nothing herein will limit the interpretation to requiring a pharmaceutical product. It will also be understood that nutraceutical may additionally include those compounds, vitamins, flavorings, minerals, drugs, or pharmaceutical compositions (without limit to any) that are believed to have a physiological benefit or provide protection against chronic disease. With recent developments in cellular-level nutraceutical agents the proposed use will be understood as non-limiting and is to be broadly interpreted to include any complementary and/or alternative therapies now known or later developed. It will further be understood that nutraceutical may additionally or alternatively include probiotics, viruses, antibodies, DNA, RNA, any other living organisms, or any combinations thereof.

Referring to FIG. 1, a beverage mixing system 100 for mixing a beverage in a vessel 101 is illustrated as a block diagram. A compounding module 120 including a nutraceutical compound 122 therein is coupled to the beverage mixing system 100. The vessel 101 includes a fluid 102 (e.g., water) to be mixed with the nutraceutical compound 122 to create a mixed beverage having a homogeneous consistency suitable for drinking. The vessel 101 is positioned on an optional base 105 of a body 104 of the beverage mixing system 100. The base 105 can be integral with the body 104 or separate. In some implementations, the base 105 is stationary, yet in some alternative implementations, the base 105 is movable with respect to the body 104 in the direction of arrows A and B (e.g., the base 105 translates upward and/or downward relative to the body 104).

The beverage mixing system 100 includes the body 104, the optional base 105, one or more motors 108, a coupling mechanism 110, and drive shaft 114. The motors 108 are operable to cause one or more portions of the beverage mixing system 100 to move. For example, the motors 108 can cause the drive shaft 114 to translate along its axis generally upward in the direction of arrow C and/or generally downward in the direction of arrow D. For another example, the same motor 108 or one or more different motors 108 can cause the drive shaft 114 to rotate clockwise or counterclockwise in the directions of arrow E. For another example, the motors 108 can cause a portion of the housing 104 of the beverage mixing system 100 to translate relative to another portion of the housing 104.

The motors 108 can be controlled (e.g., by one or more controllers and/or computers) to cause the drive shaft 114 to translate and rotate individually or simultaneously. By simultaneously, it is meant that the drive shaft 114 can rotate and translate at the exact same time or at almost the same time. For example, the drive shaft 114 can translate from a first position/loading position shown in FIG. 1A to a second position/engaged position shown in FIG. 1B without rotating. For another example, the drive shaft 114 can rotate about its axis when the drive shaft 114 is in a third position/operating position shown in FIG. 1C without translating. For yet another example, the drive shaft 114 can rotate at the same exact time that the drive shaft 114 is translating from the engaged position (FIG. 1B) to the operating position (FIG. 1C), vice versa.

Alternatively to the drive shaft 114 translating, the optional base 105 of the beverage mixing system 100 can translate in the direction of arrows A and/or B to impart the same general motions as if the drive shaft 114 were translating relative to the compounding module 120.

The drive shaft 114 includes a translation locking feature 116 and a rotation locking feature 118 that are operable to engage with corresponding locking features (e.g., translation locking feature 166 and rotation locking feature 168) of the compounding module 120 to lock relative translation and rotation of the drive shaft 114 with an agitator 150 of the compounding module 120 as described herein.

The compounding module 120 includes a housing 130 and the agitator 150. The housing 130 has a first end 131a and a second open end 131b (FIG. 1C). The second open end 131b separates an outer surface 135a of the housing 130 from an inner surface 135b of the housing 130. The housing 130 includes a cavity 137 for storing the nutraceutical compound 122 (FIGS. 1A and 1B) prior to mixing the beverage in the operation position (FIG. 1C). The cavity 137 is generally defined by the inner surface 135b of the housing 130 and a portion of the agitator 150.

The housing 130 includes a coupler 132 protruding from the first end 131a of the housing 130. The coupler 132 is operable to be engaged by the coupling mechanism 110 of the beverage mixing system 100. The engagement of the coupler 132 with the coupling mechanism 110 prevents relative rotation and relative translation of the housing 130 with respect to the beverage mixing system 100. That is, the coupling mechanism 110 grabs and locks the coupler 132 in place to hold the housing 130 of the compounding module 120 during a mixing operation (shown in FIG. 1C).

The housing 130 also includes a boss 140 that extends through the housing 130 from the first end 131a towards the second open end 131b (FIG. 1C). The boss 140 defines an inner bore 142 that extends the entire length of the boss 140. Part of the outer surface 135a of the housing 130 forms the inner bore 142 of the boss 140. That is, the outer surface 135a of the housing 130 and an inside surface of the inner bore 142 are contiguous like, for example, the outer surface of a bunt cake pan. The boss 140 includes a terminus or end 141 that points toward the second open end 131b (FIG. 1C) of the housing 130.

The housing 130 can be made of any material or combination of materials, such as, for example, plastic, metal, rubber, etc. The housing 130 can have any shape, such as, for example, the housing can have a generally cup-like shape, a circular shape/cross-section, a square shape/cross-section, a triangular shape/cross-section, a polygonal shape/cross-section. The housing 130 can have any size, such as, for example, between about one inch and about five inches in height, more preferably, the housing 130 is about three inches in height. The housing 130 is between about one half inch and three inches in diameter/width, more preferably, the housing is about two inches in diameter/width. The housing 130 can be transparent, opaque, or a combination thereof.

The housing 130 can include one or more optional module identifiers 149 on the outer surface 135a, the inner surface, 135b, or in-between (i.e., built into the housing 130). The optional module identifiers 149 can be a label, a sticker, printed directly on the housing 130, a QR code, a barcode, a near field communication ("NFC") chip, a radio frequency identification ("RFID") tag, an indicia, or any combination thereof. The optional module identifiers 149 can include and/or represent any combination of the following information: contents of the compounding module 120 (e.g., what nutraceutical compound 122 is contained therein), mixing information/program for mixing the nutraceutical compound 122 sufficiently to obtain a homogeneous mixture/solution, lot information of the nutraceutical compound 122, an expiration date of the nutraceutical compound 122, reorder information, manufacturer information (e.g., name, address, website, etc.), authentication information to authenticate a user or consumer of the nutraceutical compound, etc.

While the coupler 132 is shown and described as protruding from the first end 131a of the housing 130, the coupler 132 can protrude from any portion of the housing 130, such as, for example, the side of the housing 130 illustrated by optional side coupler 132a, the bottom of the housing 130 (not shown), etc.

The agitator 150 of the compounding module 120 has a base 155, a shaft 160, and mixing elements 170. The shaft 160 and mixing elements 170 extend generally perpendicular from the base 155. A portion of the shaft 160 is positioned within the inner bore 142 of the boss 140. As is evident from a comparison of FIGS. 1A and 1C, the shaft 160 is slidably coupled to the boss 140 such that the agitator 150 can translate in the direction of arrow D from a sealed position (FIG. 1A) to an unsealed position (FIG. 1C).

When the agitator 150 is in the sealed position (FIG. 1A), a sealing feature 180 of the compounding module 120 circumferentially seals the cavity 137 of the housing 130, thereby protecting the nutraceutical compound 122 contained therein from, for example, moisture, dirt, etc. outside the compounding module 120. The sealing feature 180 can be integral with the housing 130, the base 155, or both. The sealing feature 180 can include, for example, a snap fit connection between the base 155 and the housing 130, a threaded connection between the base 155 and the housing 130, a glue connection between the base 155 and the housing 130, a welded connection (e.g., sonic welding) between the base 155 and the housing 130, a tape connection between the base 155 and the housing 130, a press-fit connection between the base 155 and the housing 130, etc. In some implementations, the sealing feature 180 includes a seal that is separate and distinct from the housing 130 and the agitator 150. For example, the sealing feature 180 includes a gasket (e.g., a rubber gasket, a plastic gasket, etc.) positioned between the housing 130 and the base 155.

The shaft 160 includes a translation locking feature 166 and a rotation locking feature 168. The translation locking feature 166 corresponds with the translation locking feature 116 of the drive shaft 114 and the rotation locking feature 168 corresponds with the rotation locking feature 118 of the drive shaft 114.

Figure 1B:
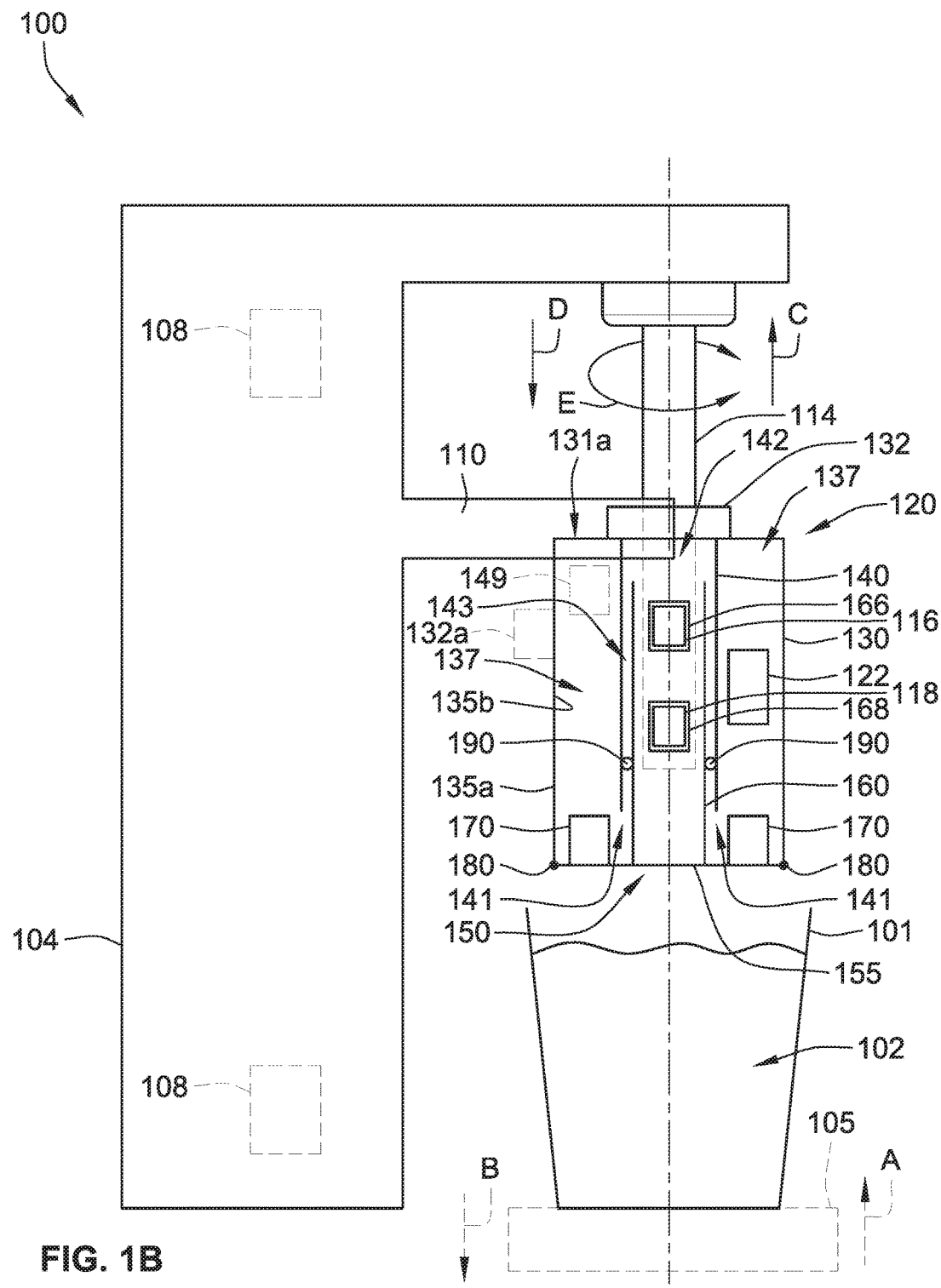
FIG. 1B is a block schematic diagram of the beverage mixing system and the compounding module of FIG. 1A in a second position.
Figure 1C:
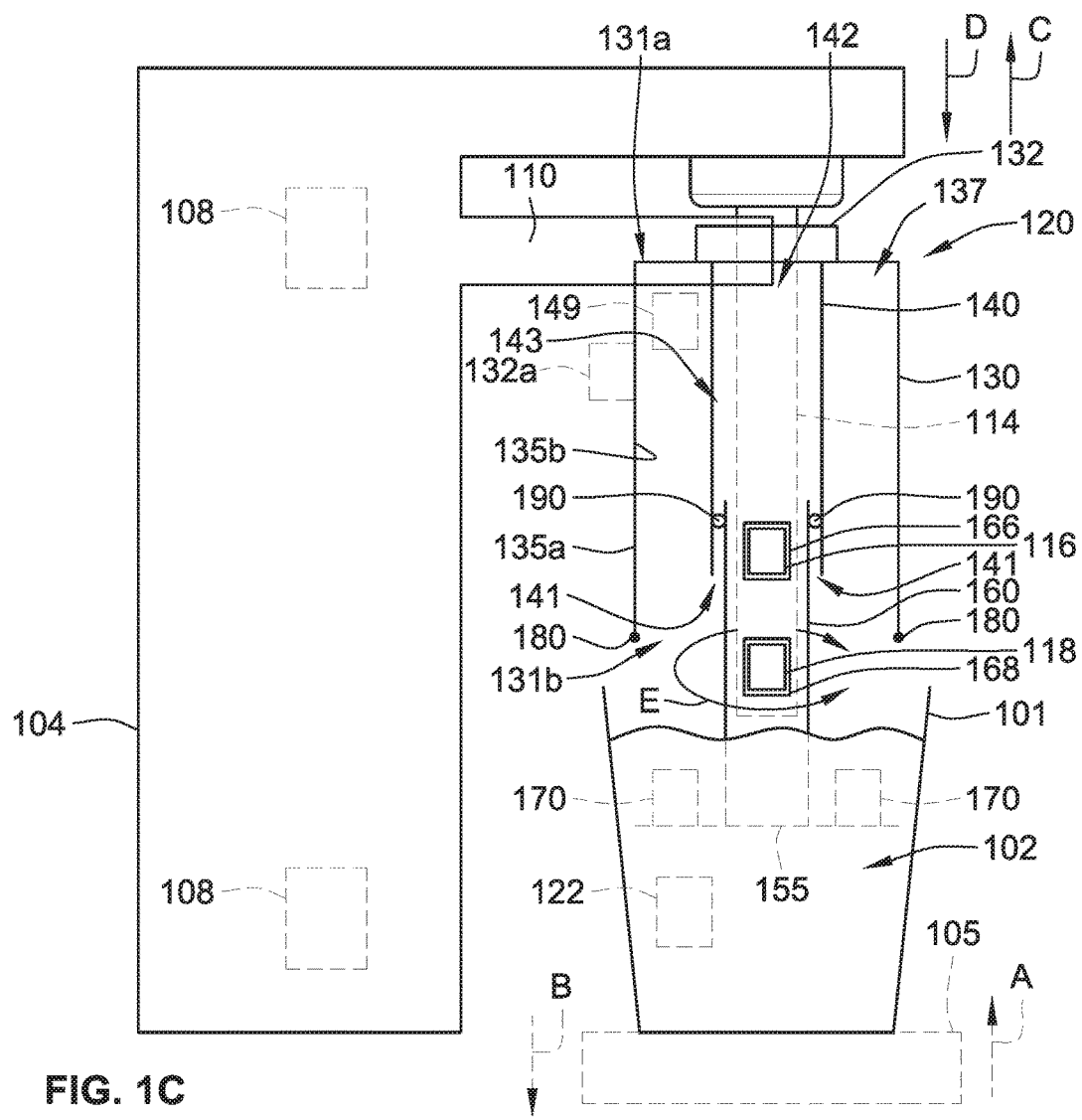
FIG. 1C is a block schematic diagram of the beverage mixing system and the compounding module of FIG. 1A in a third position.

As is evident from a comparison of FIGS. 1A, 1B, and 1C, as the drive shaft 114 translates in the direction of arrow D from the first position/loading position (FIG. 1A), the drive shaft 114 initially passes through an opening in the coupler 132 and then reaches the inner bore 142 of the boss 140. Continued translation of the drive shaft 114 in the direction of arrow D causes the translation locking feature 116 and the rotation locking feature 118 of the drive shaft 114 to engage the translation locking feature 166 and the rotation locking feature 168 of the shaft 160 of the agitator 150 in the second position/locked position (FIG. 1B), thereby locking relative translation and relative rotation of the drive shaft 114 and the agitator 150. The relative translation and the relative rotation remain locked during translation of the drive shaft 114 and the agitator 150 between the second position/locked position (FIG. 1B) and a third position/operating position (FIG. 1C). That is, the relative locked translation and rotation of the drive shaft 114 and the agitator 150 remain locked while the drive shaft 114 is located between the locked position (FIG. 1B) and the operating position (FIG. 1C).

Further translation of the drive shaft 114 in the direction of arrow D causes the agitator 150 to slide relative to the housing 130. Specifically, the base 155 separates from the housing 130, thereby breaking the sealing feature 180, and the shaft 160 slides in the direction of arrow D within the inner bore 142 of the boss 140. As the agitator 150 translates in the direction of arrow D, the mixing elements 170 on the base 155 are positioned within the fluid 102 in the vessel 101 and the nutraceutical compound 122 begins to fall due to gravity from the cavity 137 and into the vessel 101 (FIG. 1C).

After the drive shaft 114 translates into the operating position (FIG. 1C), thereby positioning the agitator 150 within the vessel 101, rotation of the agitator 150 can commence to mix the fluid 102 and the nutraceutical compound 122 therein into a homogeneous consistency suitable for drinking. As the drive shaft 114 rotates, the agitator 150 rotates therewith such that the mixing elements 170 mix the fluid 102 and the nutraceutical compound 122. During the mixing, the drive shaft 114 can solely rotate or additionally translate.

It is contemplated that, depending on the contents of the nutraceutical compound 122, various mixing programs can be used by the beverage mixing system 100. For example, for a first nutraceutical compound, the beverage mixing system 100 uses a first mixing program where only rotation is imparted to the agitator 150. For another example, for a second nutraceutical compound, the beverage mixing system 100 uses a second mixing program where the agitator constantly rotates while translating between the second position (FIG. 1B) and the third position (FIG. 1C). For yet a third example, for a third nutraceutical compound, the beverage mixing system 100 uses a third mixing program where the agitator 150 is rotated for thirty seconds in the third position (FIG. 1C), then the agitator 150 is translated in the direction of arrow C to a fourth position (not shown), and then the agitator 150 is again rotated for an additional thirty seconds. Various other mixing programs are contemplated as falling within this disclosure.

During the operation of the beverage mixing system 100, the drive shaft 114 is isolated from encroachment by the fluid 102 and/or the nutraceutical compound 122. That is, while the compounding module 120 relies on the drive shaft 114 to impart rotation and/or translation to the agitator 150, the compounding module protects the drive shaft 114 from becoming contaminated by the fluid 102 and/or the nutraceutical compound 122 during the mixing operation (FIG. 1C). Such isolation is beneficial because it allows the beverage mixing system 100 to be used by multiple beverage drinkers using different nutraceutical compounds 122 without having to worry about cross contamination occurring due to residual material being left on the drive shaft 114 from beverage mixing to beverage mixing. Further, such isolation reduces the level of maintenance/cleaning required to operate the beverage mixing system 100 compared to other systems that do not isolate the drive shaft.

Specifically, the drive shaft 114 is isolated by a mechanical seal 190 between the inner bore 142 of the boss 140 and the shaft 160 of the agitator 150 that prevents encroachment by the fluid 102 and/or the nutraceutical compound 122 into a clean area 143. The clean area 143 is an area between the inner bore 142 and the shaft 160 and that is above the mechanical seal 190. The mechanical seal 190 can be integral with the boss 140, the shaft 160, or both. The mechanical seal 190 can include an undercut and/or a notch in the inner bore 142 of the boss 140 and a corresponding protrusion in the shaft 160. In some implementations, the mechanical seal 190 can occur due to, for example, a relatively tight slidable coupling between the boss 140 and the shaft 160. In some implementations, the mechanical seal 190 includes a seal that is separate and distinct from the boss 140 and the shaft 160. For example, the mechanical seal 190 can include a gasket (e.g., a rubber gasket, a plastic gasket, etc.) positioned between the inner bore 142 and the shaft 160. Regardless of the configuration of the mechanical seal 190, the mechanical seal 190 aids in preventing encroachment of the fluid 102 and/or the nutraceutical compound 122 into the clean area 143, which aids in preventing contamination of the drive shaft 114.

A method of using the beverage mixing system 100 will now be described in reference to FIGS. 1A-1C. Initially, the compounding module 120 is coupled to the beverage mixing system 100 by mating the coupler 132 of the compounding module 120 with the coupling mechanism 110 of the beverage mixing system 100. The mating includes locking or snapping the coupler 132 into the coupling mechanism 110 in a non-rotational fashion to prevent rotation and translation of the housing 130 relative to the coupling mechanism 110. Then the drive shaft 114 is engaged with the agitator 150 by translating the drive shaft 114 in the direction of arrow D. Alternatively, the optional base 105 is translated in the direction of arrow A. The translating of the drive shaft in the direction of arrow D occurs until the translating and rotation locking features 116, 118 of the drive shaft 114 engage and lock with the translating and rotation locking features 166, 168 of the shaft 160 of the agitator 150 as shown in FIG. 1B. Then the translating continues such that the drive shaft 114 forces the base 155 of the agitator 150 to separate from the housing 130, thereby breaking the seal of the sealing feature 180 (FIG. 1C) and allowing the nutraceutical compound 122 to fall from the cavity 137 and into the vessel 101. Continued translating of the drive shaft 114 in the direction of arrow D occurs until the agitator 150 is in the operating position (FIG. 1C). With the agitator 150 in the operating position (FIG. 1C), the drive shaft 114 rotates causing the agitator 150 to rotate in a corresponding fashion. The rotation of the agitator 150 causes the mixing elements 170 to spin in the fluid 102, thereby causing the nutraceutical compound 122 to mix with the fluid 102 in the vessel 101. After the fluid 102 and the nutraceutical compound 122 are mixed to satisfaction, the drive shaft 114 begins to translate back to its loading position (FIG. 1A) in the direction of arrow C. As the agitator 150 is locked to the drive shaft 114, the agitator 150 also translates in the direction of arrow C until the base 155 of the agitator 150 engages the housing 130, thereby causing the sealing feature 180 to reengage. The reengagement of the sealing feature 180 causes the agitator 150 to be coupled to the housing 130 such that the agitator remains in its sealed position (FIGS. 1A and 1B). While the drive shaft 114 continues to translate in the direction of arrow C, due to the engagement of the base 155 with the housing 130, the agitator 150 no longer translates with the drive shaft 114. Specifically, continued translation of the drive shaft 114 in the direction of arrow C causes the translating and rotation locking features 116, 118 of the drive shaft 114 to disengage from the translating and rotation locking features 166, 168 of the shaft 160 of the agitator 150. The drive shaft 114 continues to translate in the direction of arrow C until the drive shaft 114 returns to its original loading position (FIG. 1A). After the drive shaft 114 returns to the loading position (FIG. 1A), the used compounding module 120 is removed from the beverage mixing system 100 by disengaging the coupler 132 from the coupling mechanism 110. As the drive shaft 114 was isolated during the mixing operation, the beverage mixing system 100 is immediately ready for another beverage mixing cycle with a new compounding module attached thereto.

Figure 2:
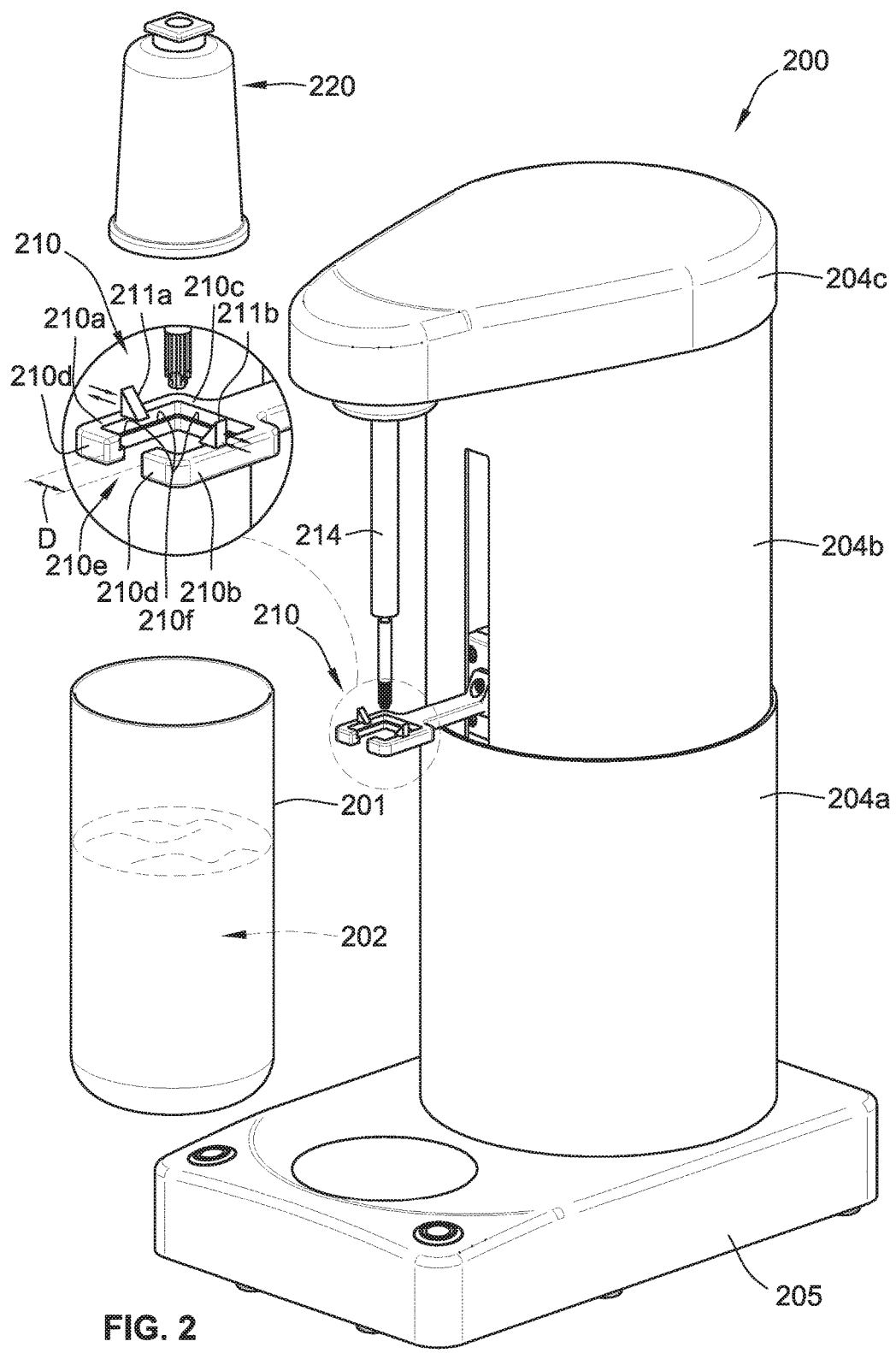
FIG. 2 is a perspective view of a beverage mixing system and a compounding module according to some aspects of the present disclosure.

Referring to FIG. 2, a beverage mixing system 200 is shown that is similar to the beverage mixing system 100 shown in FIG. 1A-1C and described herein. The beverage mixing system 200 includes a fixed body portion 204a, a translating body portion 204b, a lid body portion 204c, a base 205, a coupling mechanism 210, and a drive shaft 214. The fixed body portion 204a, the translating body portion 204b, and the lid body portion 204c are the same as, or similar to, the body 104 shown in FIGS. 1A-1C and described herein. The base 205 is the same as, or similar to, the optional base 105 shown in FIGS. 1A-1C and described herein. The coupling mechanism 210 is the same as, or similar to, the coupling mechanism 110 shown in FIGS. 1A-1C and described herein. The drive shaft 214 is the same as, or similar to, the drive shaft 114 shown in FIGS. 1A-1C and described herein.

One, some or all of the beverage mixing systems described herein are intended to be stationary by resting on a surface, such as a countertop, whereas in one, some, or all implementations, the compounding module described herein is removable from the stationary part of the beverage mixing system.

As shown in FIG. 2, a vessel 201 containing a fluid 202 (e.g., water) therein can be used with the beverage mixing system 200 in conjunction with a compounding module 220 to mix a beverage. The vessel 201 and the compounding module 220 are the same as, or similar to, the vessel 101 and the compounding module 120 shown in FIGS. 1A-1C and described herein.

Figure 3:
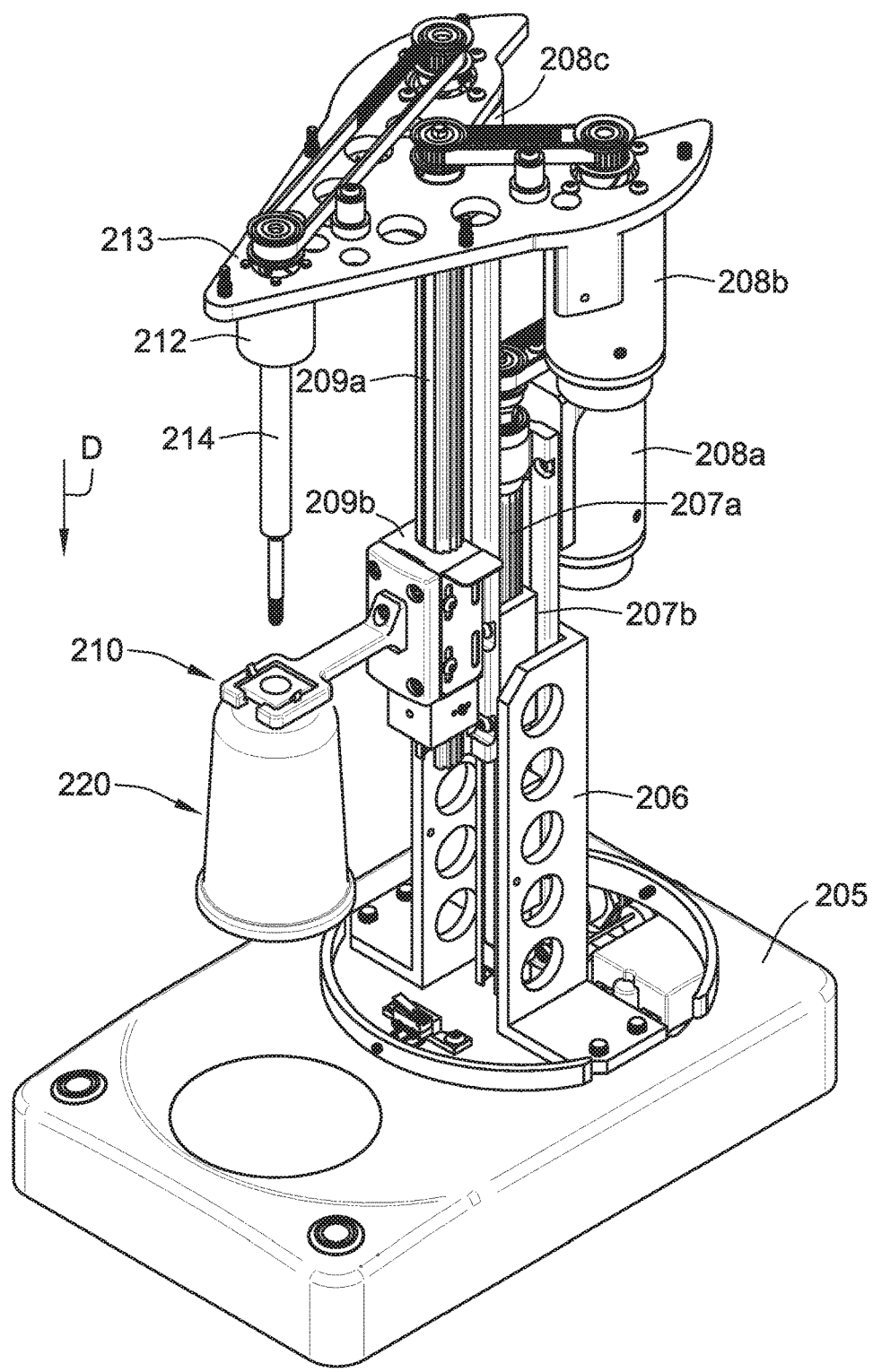
FIG. 3 is a perspective view of the beverage mixing system of FIG. 2 with an outer housing removed to illustrate several internal components and with the compounding module coupled to the beverage mixing system according to some aspects of the present disclosure.

Referring to FIG. 3, the beverage mixing system 200 is shown with the body portions 204a, 204b, and 204c removed to illustrate several internal components of the beverage mixing system 200. FIG. 3 also illustrates the compounding module 220 coupled to the beverage mixing system 200 via the coupling mechanism 210 with the drive shaft 214 being in a loading position. With the drive shaft 214 in the loading position (FIG. 3), the coupling mechanism 210 is readily accessible to load the compounding module 220.

As best shown in FIG. 2, the coupling mechanism 210 includes four walls 210a,b,c,d in a generally square orientation that corresponds to a generally square orientation of a head 233 (FIGS. 7A, 7B, 7D) of the coupler 232. Various other orientations for the walls 210a,b,c,d and the head 233 are possible (e.g., rectangular, oval, triangular, polygonal, etc.) so long as the orientations provide an anti-rotational function between the coupling mechanism 210 and the housing 230 of the compounding module 220.

The first and the second walls 210a,b of the coupling mechanism 210 are generally parallel. Similarly, the third and the fourth walls 210c,d of the coupling mechanism 210 are generally parallel. Further, the third and fourth walls 210c,d are generally perpendicular to the first and second walls 210a,b forming the generally square orientation of the coupling mechanism 210. While the first, second, and third walls are generally contiguous, the fourth wall 210d includes an opening 210e therein having a width D. The opening 210e is wide enough such that a base 234 (FIGS. 7A, 7B, 7D) of the coupler 232 can pass therethrough. Each of the walls 210a,b,c,d forms a seating surface or ledge 210f that is suitable for supporting the head 233 when the compounding module 220 is loaded in the beverage mixing system 200. The coupling mechanism 210 also includes a pair of biased locking tabs 211a,b for removably retaining the compounding module 220 in the coupling mechanism 210 during operation of the beverage mixing system 200.

When loading the compounding module 220, an operator of the beverage mixing system 200 first positions the base 234 of the coupler 232 adjacent to the opening 210e in the fourth wall 210d with the head 233 of the coupler 232 positioned vertically above the walls 210a,b,c,d. Then the operator slides the base 234 through the opening 210e such that the head 233 is positioned above the biased locking tabs 211a,b and generally aligned with the seating surface 210f. Then the operator presses the coupler 232 vertically downward causing a bottom surface of the head 233 to engage the biased locking tabs 211a,b and move the biased locking tabs 211a,b horizontally outward, thereby allowing the head 233 to move vertically downward past the biased locking tabs 211a,b. After clearing the biased locking tabs 211a,b, the head 233 is seated on the seating surface 210f of the four walls 210 210a,b,c,d and the biased locking tabs 211a,b return to their biased home position locking the compounding module 220 in its vertical position. Specifically, the head 233 is positioned between the biased locking tabs 211a,b and the seating surface 210f. Due to the geometry of the walls 210a,b,c,d and the seating surface 210f therein, such a placement of the head 233 of the coupler 232 also locks rotational movement of the head 233 and, thus, the housing 230 of the compounding module 220.

Figure 4:
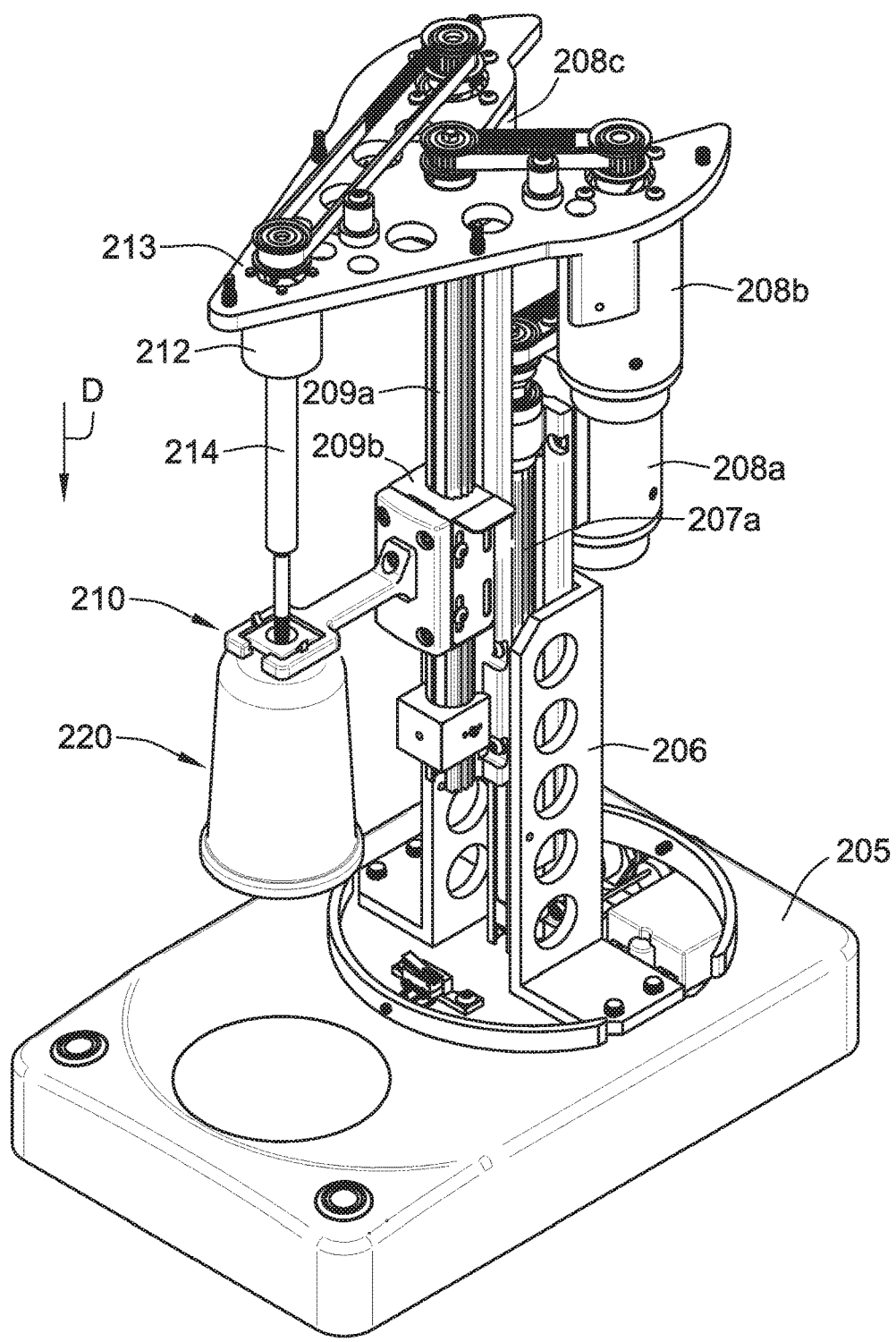
FIG. 4 is a perspective view of the beverage mixing system and compounding module of FIG. 3 with a drive shaft of the beverage mixing system engaging the compounding module in a first position.

After the compounding module 220 is loaded (FIG. 3), as described in relation to FIGS. 1A-1C, the drive shaft 214 translates in the direction of arrow D to engage the compounding module 220. As shown in FIG. 4, the drive shaft 214 has translated in the direction of arrow D and is about to engage the compounding module 220. Continued translation of the drive shaft 214 in the direction of arrow D causes the drive shaft to engage the compounding module 220 and position the beverage mixing system 200 in the operating position as shown in FIG. 5.

Figure 6:
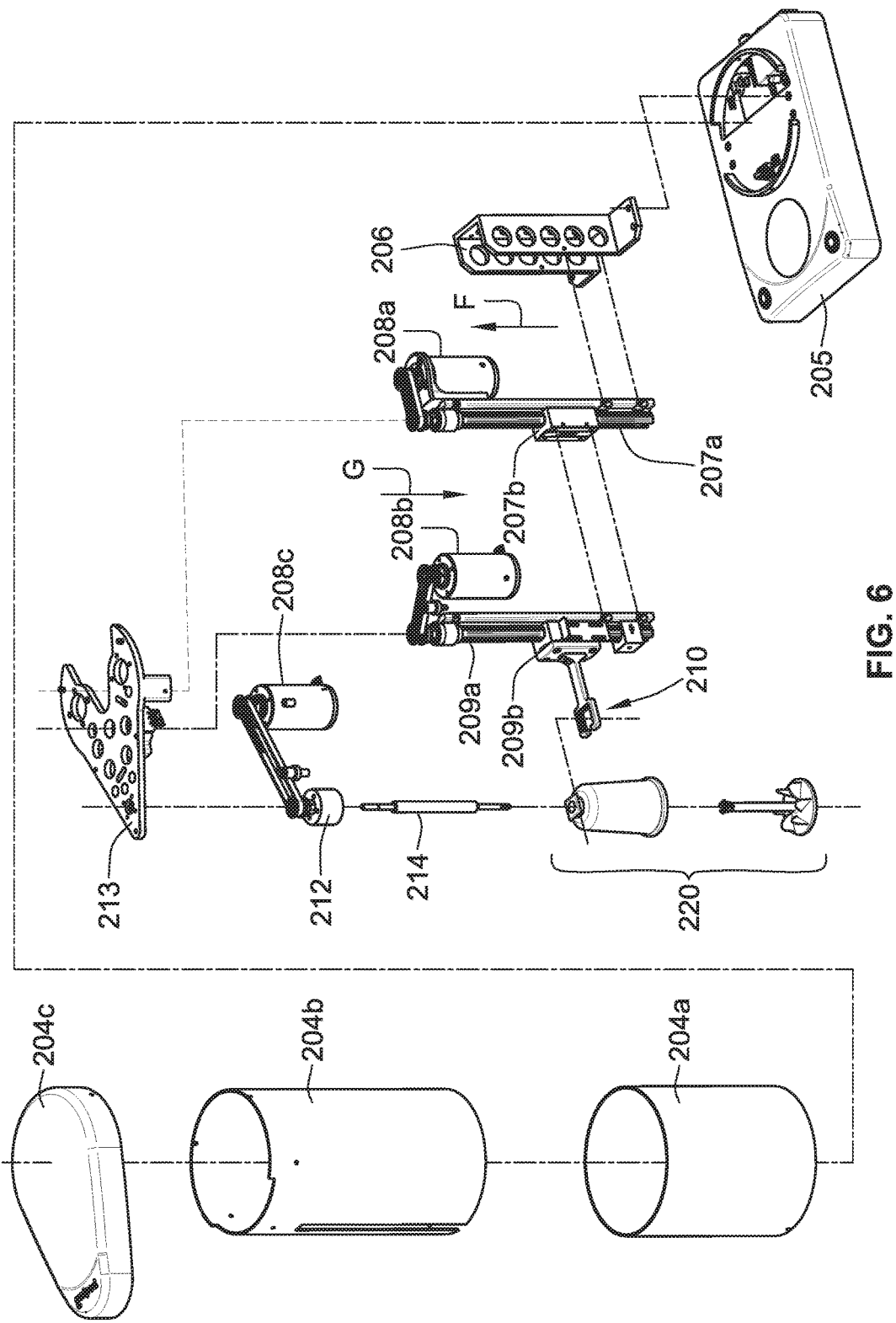
FIG. 6 is a partially exploded perspective view of the beverage mixing system and the compounding module of FIG. 2.

Referring to FIG. 6, an exploded view of the beverage mixing system 200 illustrates various internal components thereof. The internal components of the beverage mixing system 200 include a ground track/motor mounting 206, a ground track 207a, a ground carriage 207b, a ground motor 208a, a travel track 209a, a travel carriage 209b, and a travel motor 208b, a drive-shaft mounting 212, a drive shaft motor 208c, and a motor mounting 213.

Figure 5:
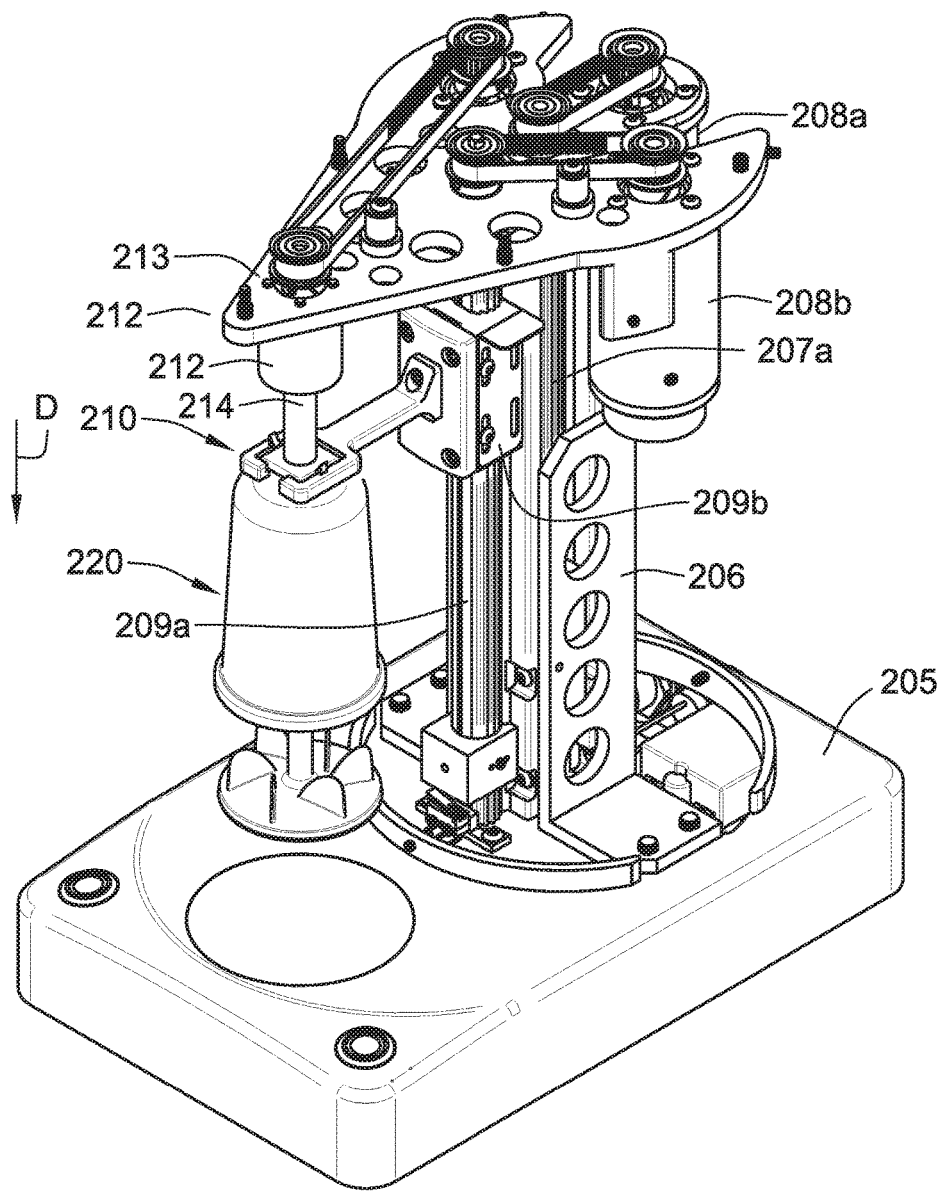
FIG. 5 is a perspective view of the beverage mixing system and compounding module of FIG. 3 with the drive shaft of the beverage mixing system engaging the compounding module in a second position causing an agitator of the compounding module to separate from a housing of the compounding module.

As shown generally in FIGS. 3-5, the ground track/motor mounting 206 is coupled to the base 205 using, for example, one or more fasteners (e.g., screws, rivets, welds, nails, etc.). The ground track/motor mounting 206 provides a rigid support for mounting the ground track 207a thereto in a fix relation to the base 205. The ground track 207a provides a track along which the ground carriage 207b travels under power of the ground motor 208a. Specifically, rotation of the ground motor 208a in a first direction causes the ground carriage 207b to translate in the direction of arrow F and rotation of the ground motor 208a in a second direction causes the ground carriage 207b to translate in the direction of arrow G.

The travel track 209a is mounted to the ground carriage 207b such that translation of the ground carriage 207b causes a corresponding translation of the travel track 209a and the travel motor 208b, which is coupled to the travel track 209a. The travel track 209a provides a track along which the travel carriage 209b travels under power of the travel motor 208b. Specifically, rotation of the travel motor 208b in a first direction causes the travel carriage 209b to translate in the direction of arrow F and rotation of the travel motor 208b in a second direction causes the travel carriage 209b to translate in the direction of arrow G. As the travel carriage 209b is coupled to the travel track 209a, the travel carriage 209b is able to translate independently from any translation of the ground carriage 207b. The coupling mechanism 210 is attached to the travel carriage 209b. As such, the coupling mechanism 210 can be translated by the travel motor 208b and/or the ground motor 208a.

The drive-shaft mounting 212 is coupled to the drive shaft 214. The drive-shaft motor 208c and the travel motor 208b are attached to the motor mounting 213. As such, translation of the ground carriage 207b results in a corresponding translation of the travel track 209a, the travel motor 208b, the drive-shaft mounting 212, the drive-shaft motor 208c, the motor mounting 213, and the drive shaft 214. While three separate and distinct motors 208a-c are shown and described, it is contemplated that a variety of other numbers of motors can be used to translate and rotate the drive shaft 214, such as, for example, two motors, one motor, etc. Specifically, one motor can be used to translate the drive shaft 214 and a second motor can be used to rotate the drive shaft 214, where no motor is used to separately translate the coupling mechanism 210. For another specific example, one motor can be used to translate and rotate the drive shaft, where no additional motors are needed in the beverage mixing system.

Figure 7A:
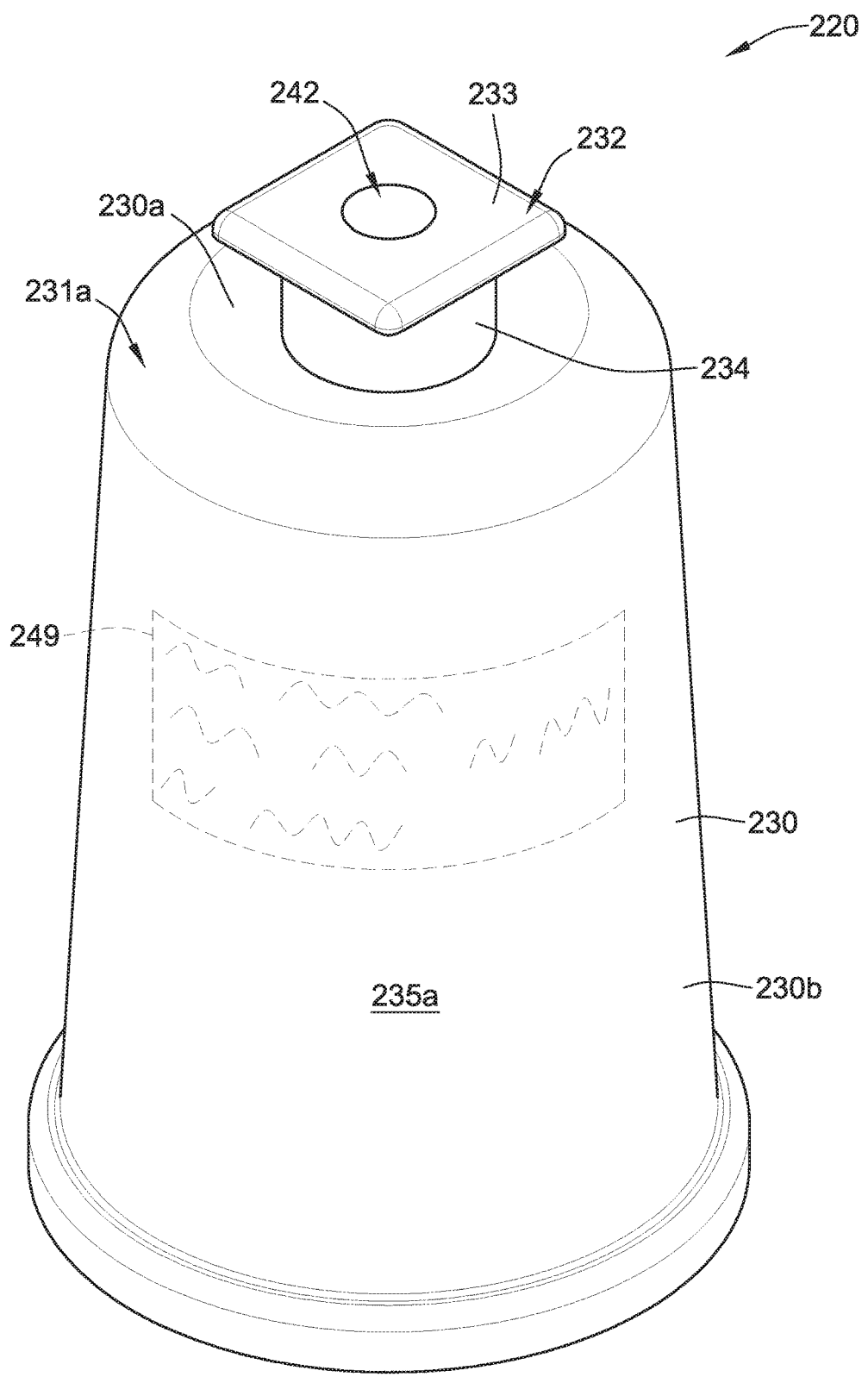
FIG. 7A is an assembled perspective view of the compounding module of FIG. 2.
Figure 7D:
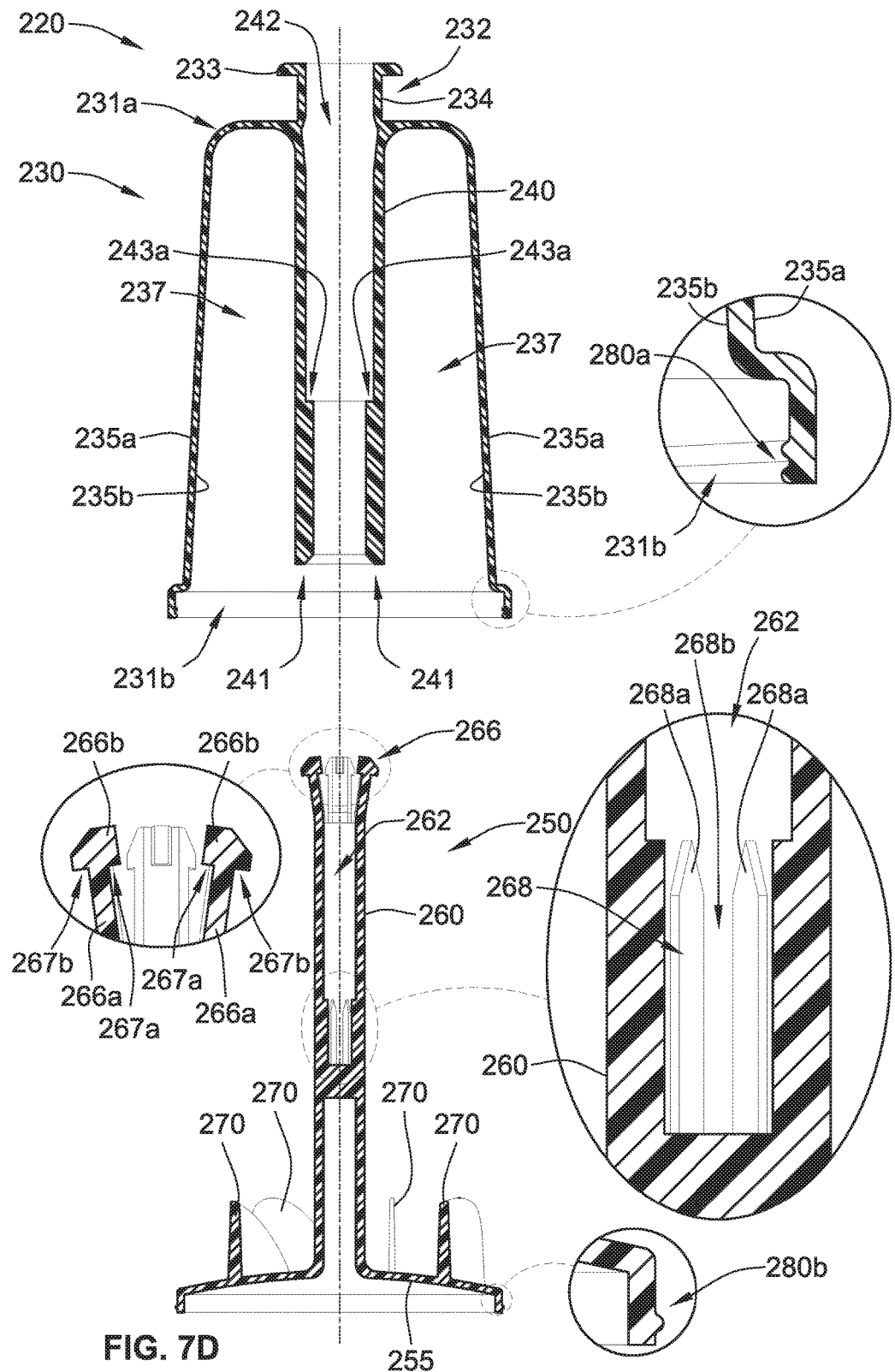
FIG. 7D is an exploded cross-sectional view of the compounding module of FIG. 7A.

Now referring generally to FIGS. 7A-7D, the compounding module 220 is shown and described. The compounding module 220 includes a housing 230 and an agitator 250. The housing 230 has a first end 231a and a second open end 231b (FIGS. 7C and 7D). The second open end 231b separates an outer surface 235a of the housing 230 from an inner surface 235b of the housing 230. The housing 230 includes a lid portion 230a and a side wall portion 230b extending away from the lid portion 230a.

The housing 230 includes a cavity 237 for storing a nutraceutical compound 222 (FIGS. 9B, 10B, and 11B), that is the same as, or similar to, the nutraceutical compound 122, prior to mixing the beverage in the operation position (FIGS. 11A and 11B). The cavity 237 is generally defined by the inner surface 235b of the housing 230 and a portion of the agitator 250. More specifically, as best shown in FIG. 9B, the cavity 237 of the housing 230 is generally defined by (i) an inner surface of the side wall portion 230b of the housing 230, (ii) an inner surface of the lid portion 230a of the housing 230, (iii) an outer surface of a boss 240 (FIG. 7D) of the housing 230, (iv) an inner surface of a base 255 (FIG. 7D) of the agitator 250, and (v) a portion of an outer surface of a shaft 260 of the agitator 250. Further, the inner surface of the side wall portion 230b of the housing 230, (ii) the inner surface of the lid portion 230a of the housing 230, and (iii) the outer surface of the boss 240 of the housing 230 are a contiguous surface.

The housing 230 includes the coupler 232 protruding from the first end 231a of the housing 230. The housing 230 also includes a boss 240 that extends through the housing 230 from the first end 231a towards the second open end 231b (best shown in FIG. 7D). In some implementations, the boss 240, the lid portion 230a, and the side wall portion 230b constitute a monolithic component that is formed, for example, using an injection molding technique. A first end of the boss 240 is integral with the lid portion 230a of the housing 230. The boss 240 defines an inner bore 242 (best shown in FIG. 7D) that extends the entire length of the boss 240 and through the coupler 232 as best shown in FIG. 7D. Part of the outer surface 235a of the housing 230 forms the inner bore 242 of the boss 240. That is, the outer surface 235a of the housing 230 and an inside surface of the inner bore 242 are contiguous like, for example, the outer surface of a Bundt cake pan. The boss 240 includes a terminus or end 241 that points toward the second open end 231b (FIGS. 7C and 7D) of the housing 230. As best shown in FIG. 7D, the terminus 241 can include an angled surface to aid in the initial coupling of the agitator 250 with the boss 240 when assembling the compounding module 220. Specifically, when positioning a shaft 260 of the agitator 250 within the boss 240, the angled surface of the terminus 241 urges outwardly biased deflectable fingers 266a (FIGS. 7C and 7D) of collet 266 inward such that the shaft 260 can be slid into the inner bore 242 of the boss 240 (shown in FIG. 9B).

The housing 230 can include one or more optional module identifiers 249 on the outer surface 235a, the inner surface, 235b, or in-between (i.e., built into the housing 230), that are the same as, or similar to, the optional module identifiers 149 described above in reference to FIGS. 1A-1C.

The agitator 250 of the compounding module 220 has a base 255, the shaft 260, and mixing elements 270. The shaft 260 and mixing elements 270 extend generally perpendicular from the base 255. Each of the mixing elements 270 is in the form of a blades having a fin-like shape; however, any shape for the mixing elements 270 is contemplated (e.g., square shape, triangular shape, semi-circular shape, etc.). Additional, while six blades are shown, any number of blades can be included, such as, for example, one blade, two blades, four blades, five blades, ten blades, etc.

As is evident from a comparison of FIGS. 9B, 10B, and 11B, the shaft 260 is slidably coupled to the boss 240 such that the agitator 250 can translate from a sealed position (FIGS. 9A-10B) to an unsealed position (FIGS. 11A and 11B). When the agitator 250 is in the sealed position (FIGS. 9A-10B), a sealing feature 280a,b of the compounding module 220 circumferentially seals the cavity 237 of the housing 230, thereby protecting the nutraceutical compound 222 (FIGS. 9B and 10B) contained therein. The sealing feature 280a,b includes a first sealing feature 280a that is integral with the housing 230 and a second sealing feature 280b that is integral with the base 255. As best shown in FIG. 7D, the first sealing feature 280a includes a groove between two projections at the second open end 231b of the housing 230 and the second sealing feature 280b includes a projection along an outer portion of the base 255 of the agitator 250. As such, when the agitator 250 is in the sealed position (FIGS. 9A-10B), the projection of the second sealing feature 280b on the base 255 engages with the groove of the first sealing feature 280a on the housing 230 to seal the cavity 237.

While the sealing feature 280a,b is shown as include a projection that engages a groove, a variety of alternative sealing features are contemplated to seal the base 255 with the housing 230, such as, for example, the connection described above relative to the base 155 and the housing 130.

The shaft 260 of the agitator 250 includes a translation locking feature or collet 266 and a rotation locking feature 268, which are best shown in FIG. 7D. The rotation locking feature 268 includes a multitude of agitator splines 268a that define a multitude of agitator channels 268b therebetween (FIG. 7D). The collet 266 includes a multitude of deflectable or bendable fingers 266a that are biased at an angle between about one degree and about twenty degrees from vertical (e.g., an axis of the shaft 260).

Each of the fingers 266a includes a hammer head-like member or a locking tab 266b at an end thereof. Each of the locking tabs 266b includes a first portion 267a adjacent to an inner bore 262 of the shaft 260 and a second portion 267b opposing the first portion 267a. The first portions 267a of the locking tabs 266b are sized and shaped to engage with a corresponding translation locking feature 216 (FIGS. 8A and 8B) of the drive shaft 214 in the manner shown in FIGS. 11A and 11B. The second portions 267b of the locking tabs 266b are sized and shaped to engage with a sealing surface 243a (FIG. 7D) of the inner bore 242 of the housing 230 to provide a mechanical seal 290 (FIG. 11B) between the agitator 250 and the boss 240 in the manner shown in FIGS. 11A and 11B. While four deflectable fingers 266a are shown, any number of deflectable fingers 266a can be included in the collet 266 (e.g., two fingers, three fingers, six fingers, etc.). In some alternative implementations, a gasket (not shown) can be included on or near the sealing surface 243a to aid in isolating and/or sealing the drive shaft 214.

Figure 8A:
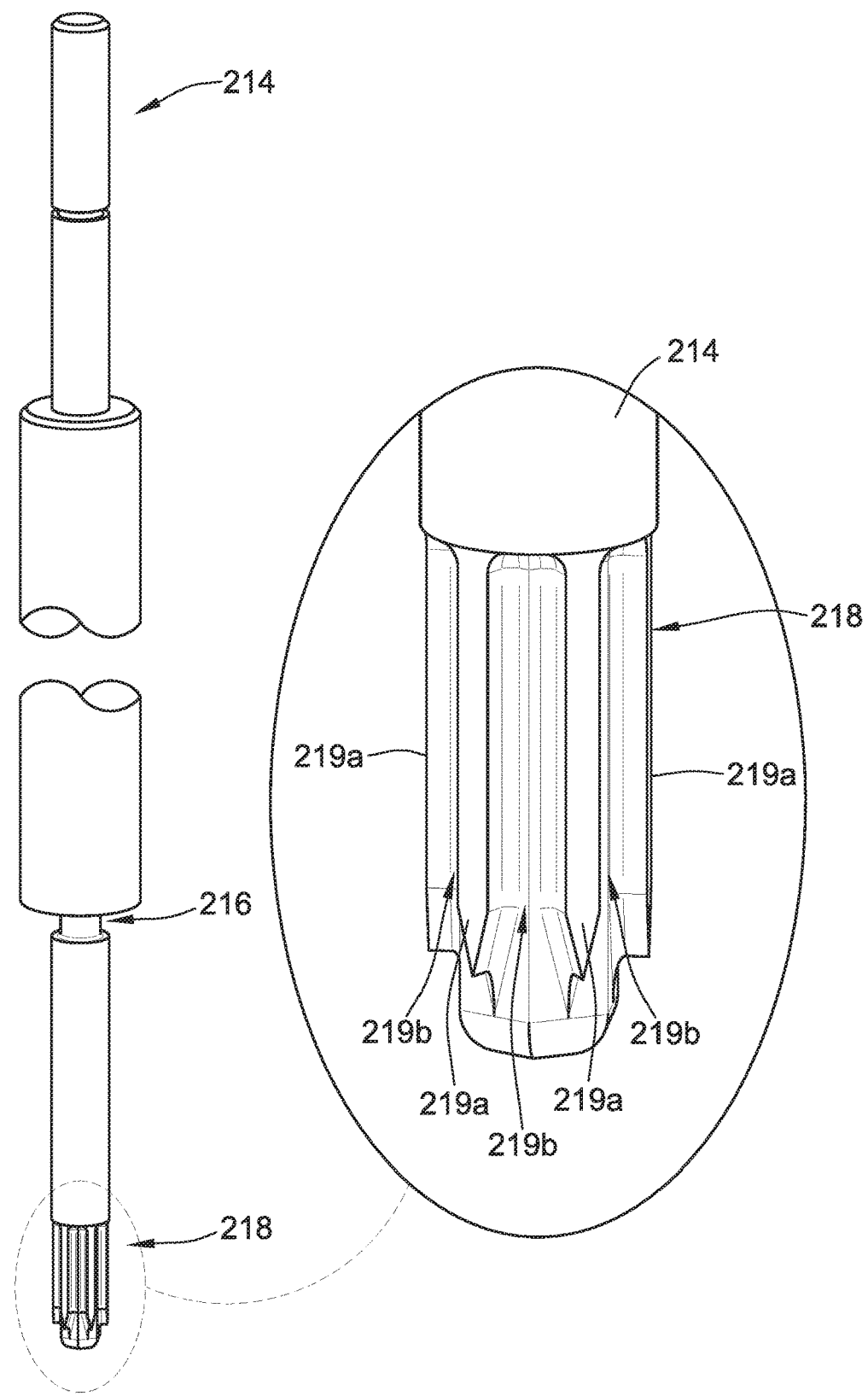
FIG. 8A is a partial perspective view of the drive shaft of the beverage mixing system of FIG. 2.
Figure 8B:
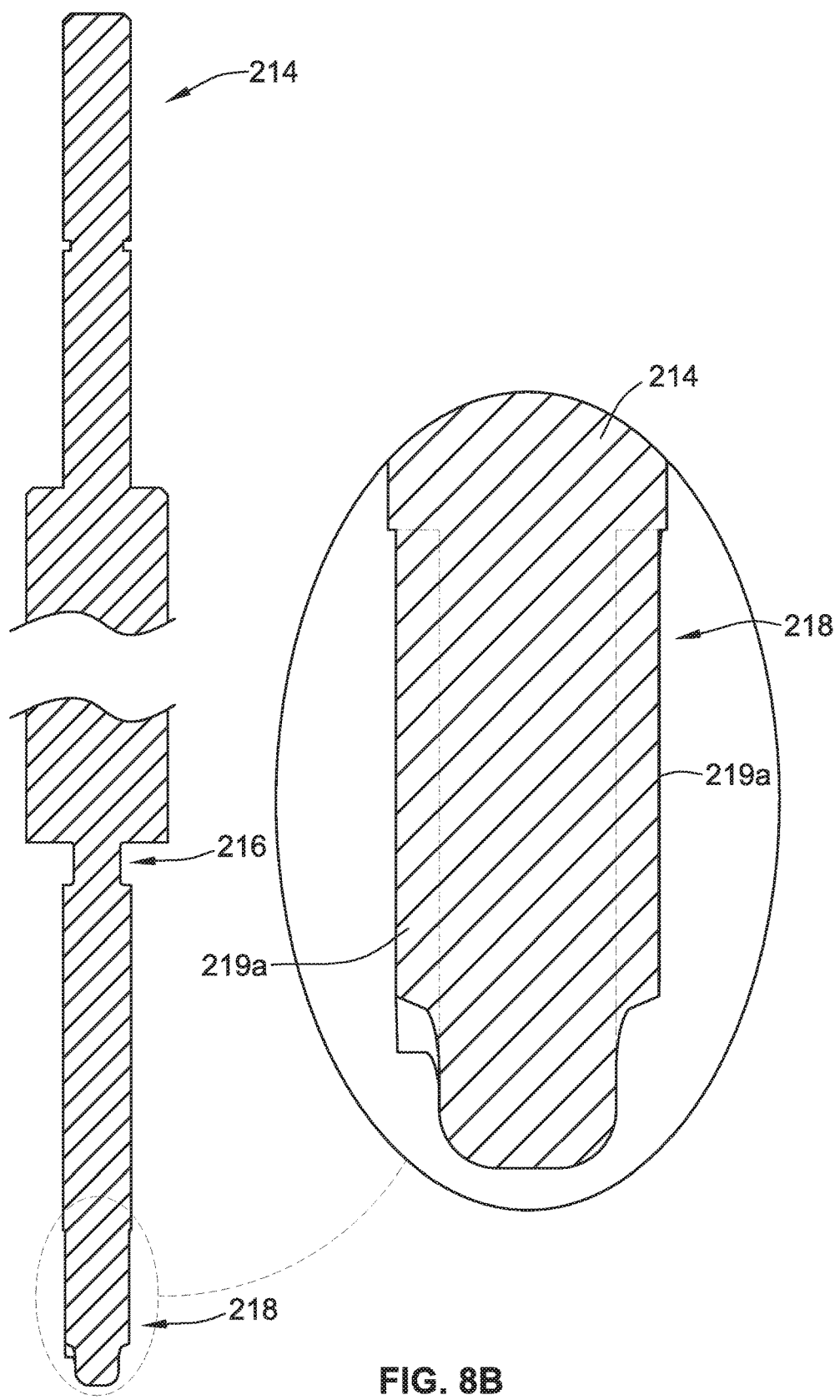
FIG. 8B is a partial cross-sectional view of the drive shaft of FIG. 8A.

Now referring generally to FIGS. 8A and 8B, the drive shaft 214 is shown and described. The drive shaft 214 includes a translation locking feature 216 and a rotation locking feature 218 that are operable to engage with the translation locking feature 266 and the rotation locking feature 268 of the compounding module 220 to lock relative translation and rotation of the drive shaft 214 with the agitator 250 of the compounding module 220. The translation locking feature 216 includes a groove or notch in the drive shaft 214 that is sized and shaped to be engaged by the first portions 267a of the locking tabs 266b as shown in FIG. 11B. The rotation locking feature 218 includes a multitude of drive-shaft splines 219a that define a multitude of drive-shaft channels 219b therebetween (FIG. 8A). The drive-shaft splines 219a are sized and shaped to be received between the multitude of agitator splines 268a and in the multitude of agitator channels 268b in an anti-rotational fashion. That is, the drive-shaft splines 219a engage the agitator splines 268a such that rotation of the drive shaft 214 causes the drive-shaft splines 219a to impart a force of the agitator splines 268a thereby causing the agitator 250 to rotate in a corresponding manner.

A method of engaging the compounding module 220 with the drive shaft 214 during operation of the beverage mixing system 200 is now described in relation generally to FIGS. 9A-11B. Only the compounding module 220 and a portion of the drive shaft 214 are shown for ease of illustration in FIGS. 9A-11B. As shown in FIGS. 9A and 9B, the drive shaft 214 is in the loading position ready to engage the compounding module 220. In this loading position, the sealing feature 280a,b is in the sealed/engaged position and the nutraceutical compound 222 is in the cavity 237 resting on the base 255 around the mixing elements 270. In addition to the sealing feature 280a,b protecting the nutraceutical compound 222 from the outside contaminates in the sealed position (FIG. 9B), the shaft 260 of the agitator 250 can be sized to snugly fit into a lower portion of the inner bore 242 (FIG. 7D) of the boss 240, thereby preventing contaminates and/or moisture from entering the cavity 237 from the inner bore 242 (FIG. 7D) of the boss 240. Additionally or alternatively, a seal (not shown) can be positioned between the shaft 260 and the boss 240 to aid in sealing the cavity 237.

Also shown in FIG. 9B, the collet 266 is in a relaxed or uncompressed position with the deflectable fingers 266a (FIGS. 7C and 7D) biased outward. To accommodate the deflectable fingers 266a in such a position, the inner bore 242 (FIG. 7D) of the boss 240 includes an outwardly tapered portion at an upper end thereof as best shown in FIG. 9B.

When the drive shaft 214 translates vertically downward from the loading position (FIGS. 9A and 9B) to the engaged position as shown in FIGS. 10A and 10B, the drive shaft 214 engages the shaft 260 of the agitator 250 such that the rotation locking feature 218 (FIG. 8A) of the drive shaft 214 non-rotationally engages the rotation locking feature 268 (FIG. 7D) of the shaft 260 of the agitator 250. Additionally, the collet 266 is positioned to be engaged with the translation locking feature 216. That is, the first portions 267a of the locking tabs 266b are not yet engaged with the translation locking feature 216 of the drive shaft 214.

Figure 12:
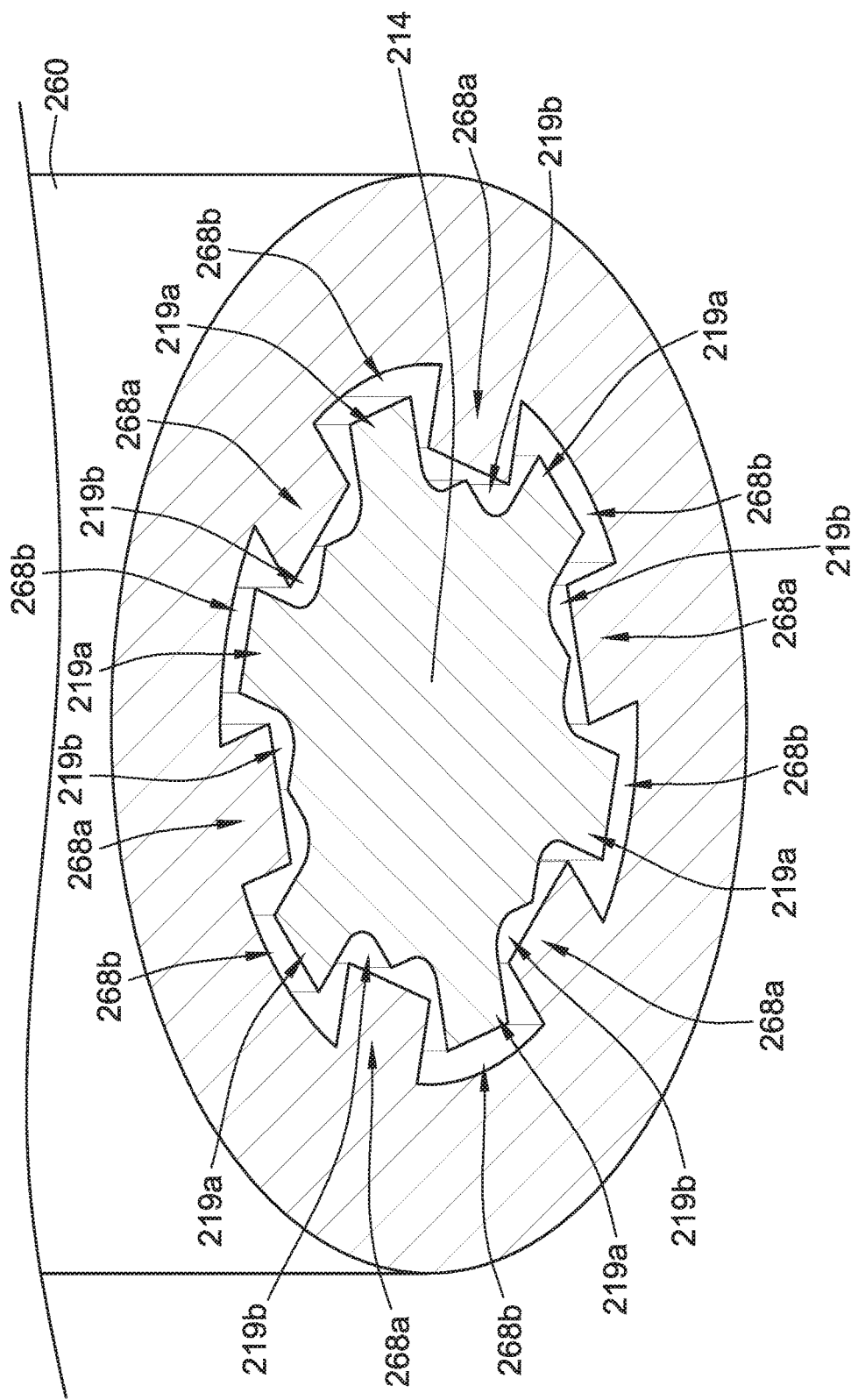
FIG. 12 is cross-sectional view of the drive shaft engaged with the shaft of the agitator of FIG. 11A.

When the drive shaft 214 continues to translate vertically downward from the engaged position (FIGS. 10A and 10B) to the operating position as shown in FIGS. 11A and 11B, the drive shaft remains engaged with the agitator 250 such that the rotation locking feature 218 (FIG. 8A) non-rotationally engages the rotation locking feature 268 (FIG. 7D). A cross-sectional view of the rotation locking feature 218 (FIG. 8A) non-rotationally engaging the rotation locking feature 268 is shown in FIG. 12.

Further, the continued translation of the drive shaft 214 into the operating position also causes the collet 266 to engage with the translation locking feature 216 such that first portions 267a of the locking tabs 266b are engaged with the translation locking feature 216 of the drive shaft 214, thereby locking translational movement of the agitator 250 with the drive shaft 214.

As the translation of the agitator 250 is locked to the drive shaft 214, the continued translation of the drive shaft 214 into the operating position also causes the base 255 to separate from the housing 230, thereby breaking the sealing feature 280a,b and permitting the nutraceutical compound 222 to fall from the cavity 237 and into the vessel 201 (not shown in FIGS. 11A and 11B). With the agitator 250 and the drive shaft 214 in the operating position, the drive shaft 214 can rotate thereby causing the agitator 250 to rotate such that the mixing elements 270 mix the nutraceutical compound 222 with the fluid 202 (FIG. 2) in the vessel 201 (FIG. 2).

Similar to the beverage mixing system 100, during operation of the beverage mixing system 200 (FIGS. 11A and 11B), the drive shaft 214 is isolated from encroachment by the fluid 202 (FIG. 2) and/or the nutraceutical compound 222. That is, while the compounding module 220 relies on the drive shaft 214 to impart rotation and/or translation to the agitator 250, the compounding module protects the drive shaft 214 from becoming contaminated by the fluid 202 (FIG. 2) and/or the nutraceutical compound 222 during the mixing operation (FIGS. 11A and 11B). Specifically, the drive shaft 214 is isolated by a mechanical seal 290 (FIG. 11B) between the inner bore 242 (FIG. 7D) of the boss 240 and the shaft 260 of the agitator 250 that prevents encroachment by the fluid 202 (FIG. 2) and/or the nutraceutical compound 222 into a clean area 243 (FIG. 11B). The clean area 243 is an area between the inner bore 242 and the shaft 260 and that is above the mechanical seal 290. In some implementations, the mechanical seal 290 can occur and/or be aided by, for example, a relatively tight slidable coupling of the boss 240 and the shaft 260 between the collet 266 and the terminus 241 (FIG. 11B). In some implementations, the mechanical seal 290 includes a seal that is separate and distinct from the boss 240 and the shaft 260. For example, the mechanical seal 290 includes a gasket (not shown) positioned between the inner bore 242 and the shaft 260. Regardless of the configuration of the mechanical seal 290, the mechanical seal 290 aids in preventing encroachment of the fluid 202 (FIG. 2) and/or the nutraceutical compound 222 into the clean area 243, which aids in preventing contamination of the drive shaft 214.

Figure 13A:
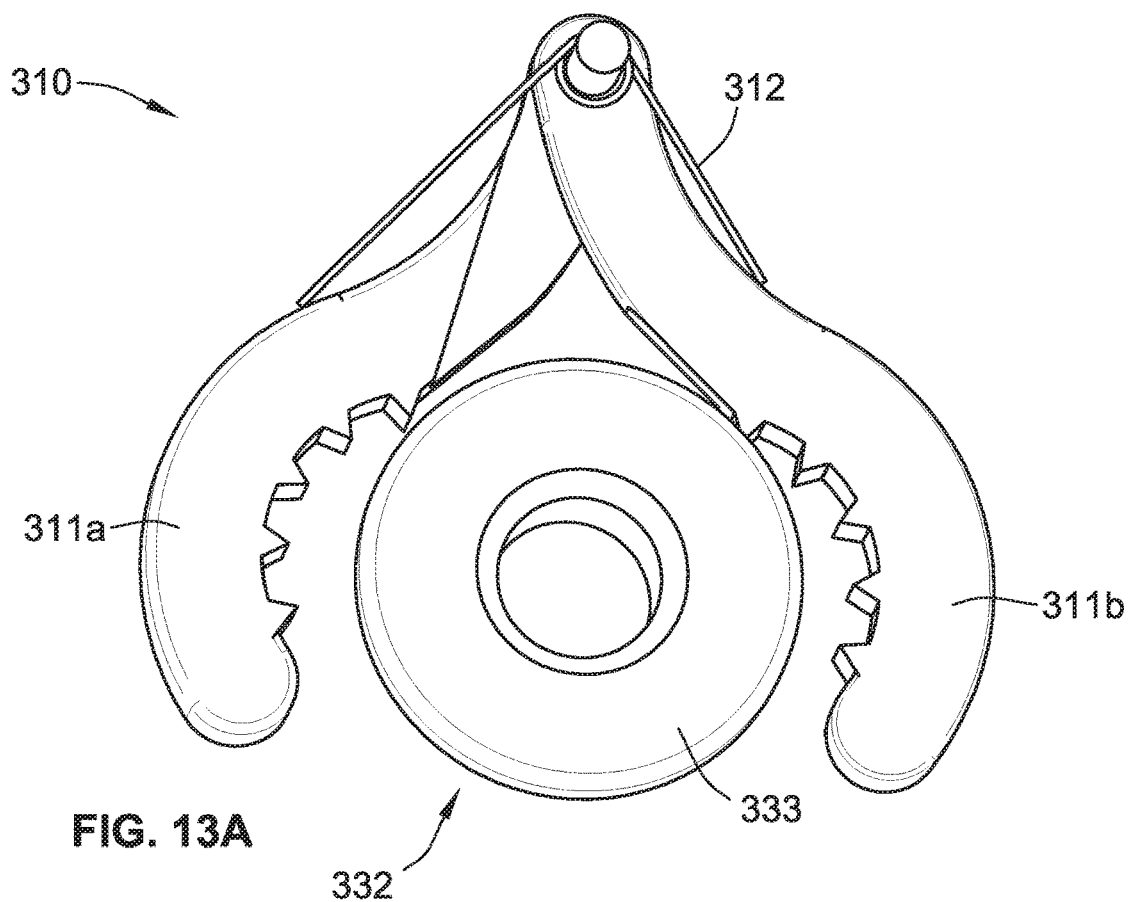
FIG. 13A is a top view of an alternative coupler and coupling mechanism according to some implementations of the present disclosure.
Figure 13B:
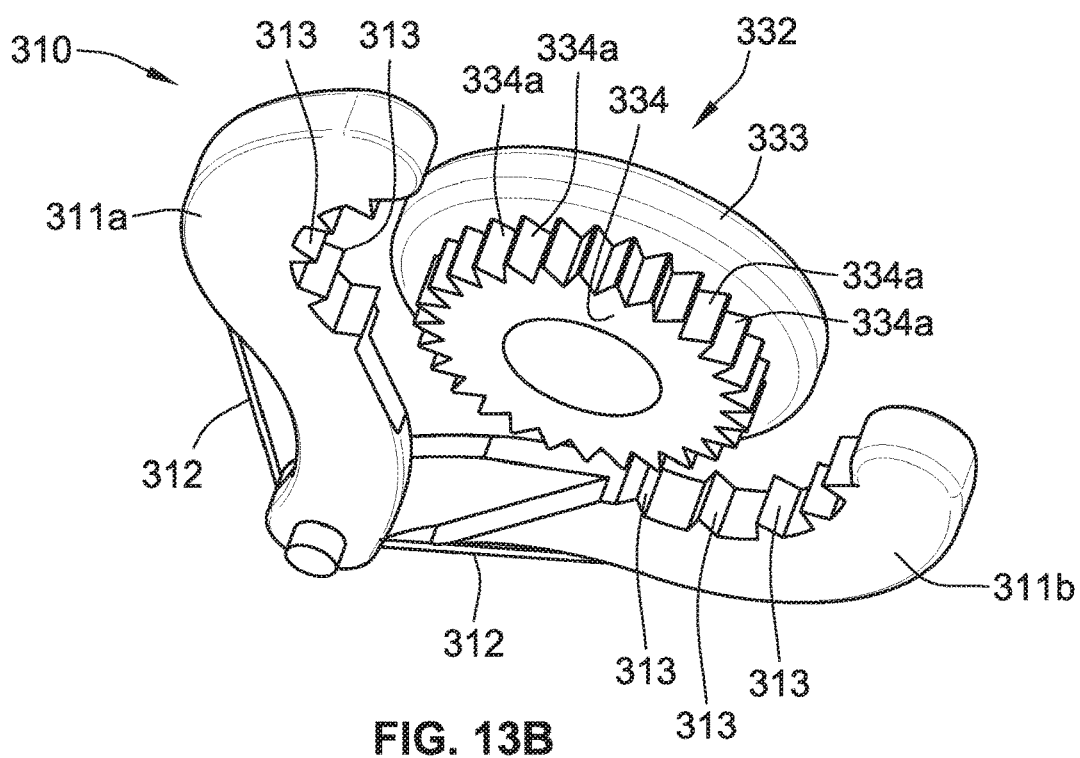
FIG. 13B is a perspective view of the alternative coupler and coupling mechanism of FIG. 13A.

Now referring to FIGS. 13A and 13B, while the coupling mechanism 210 was shown and described above to mate with the coupler 232 of the compounding module 220, it is contemplated that a variety of alternative couplers can be used with the compounding modules of the present disclosure, and it is further contemplated that corresponding alternative coupling mechanisms can be included in the beverage mixing systems of the present disclosure. For example, as shown in FIGS. 13A and 13B, an alternative coupler 332 has a generally circular head 333 and a generally circular base 334, where the base 334 includes a multitude of teeth or knurling 334a thereon in a gear-like fashion. An alternative coupling mechanism 310 is shown for mating with the alternative coupler 332. The alternative coupling mechanism 310 includes a first arm 311a and a second opposing arm 311b that are biased inward to a closed position by a biasing element 312 (e.g., a spring). Each of the arms 311a,b includes a multitude of teeth 313 that correspond with the teeth or knurling 334a to grab and hold the coupler 332 in a non-rotational fashion. Various additional couplers and coupling mechanisms are possible with the beverage mixing system and compounding modules of the present disclosure.

Now referring to FIGS. 14, and 15A-15C, another example of an alternative coupler and coupling mechanism is shown. Specifically, an alternative coupler 432 has a generally circular head 433 and a generally circular base 434, where the base 434 includes a multitude of teeth or knurling 434a thereon in a gear-like fashion. An alternative coupling mechanism 410 is shown for mating with the alternative coupler 432. The alternative coupling mechanism 410 includes a yoke 401 having a first leg 402a and a second leg 402b, a first arm 411a rotatably coupled to the first leg 402a via a first pivot pin 403a, and a second arm 411b rotatably coupled to the second leg 402b via a second pivot pin 403b. The first and the second arms 411a, 411b are biased to either a first position (e.g., an open position) shown in FIG. 15A or a second position (e.g., a closed position) shown in FIG. 15C by a biasing element 412 (e.g., a spring) coupled therebetween. Specifically, the biasing element 412 is coupled to the first arm 411a via a first protrusion 404a extending from the first arm 411a and the biasing element 412 is coupled to the second arm 411b via a second protrusion 404b extending from the second arm 411b, although various other methods of coupling the biasing element 412 to the arms 411a, 411b are contemplated.

Figure 15B:
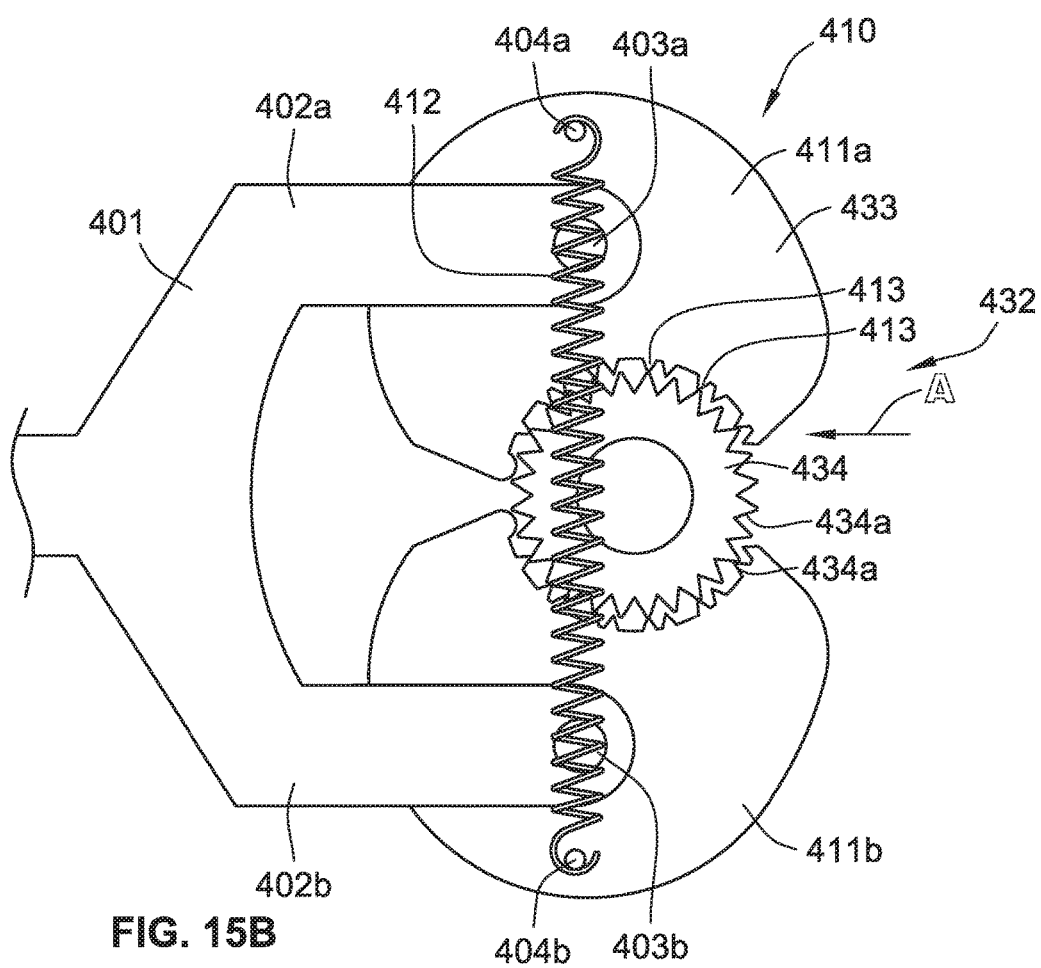
FIG. 15B is a top view of the alternative coupler and coupling mechanism of FIG. 14 in an intermediate position.
Figure 15C:
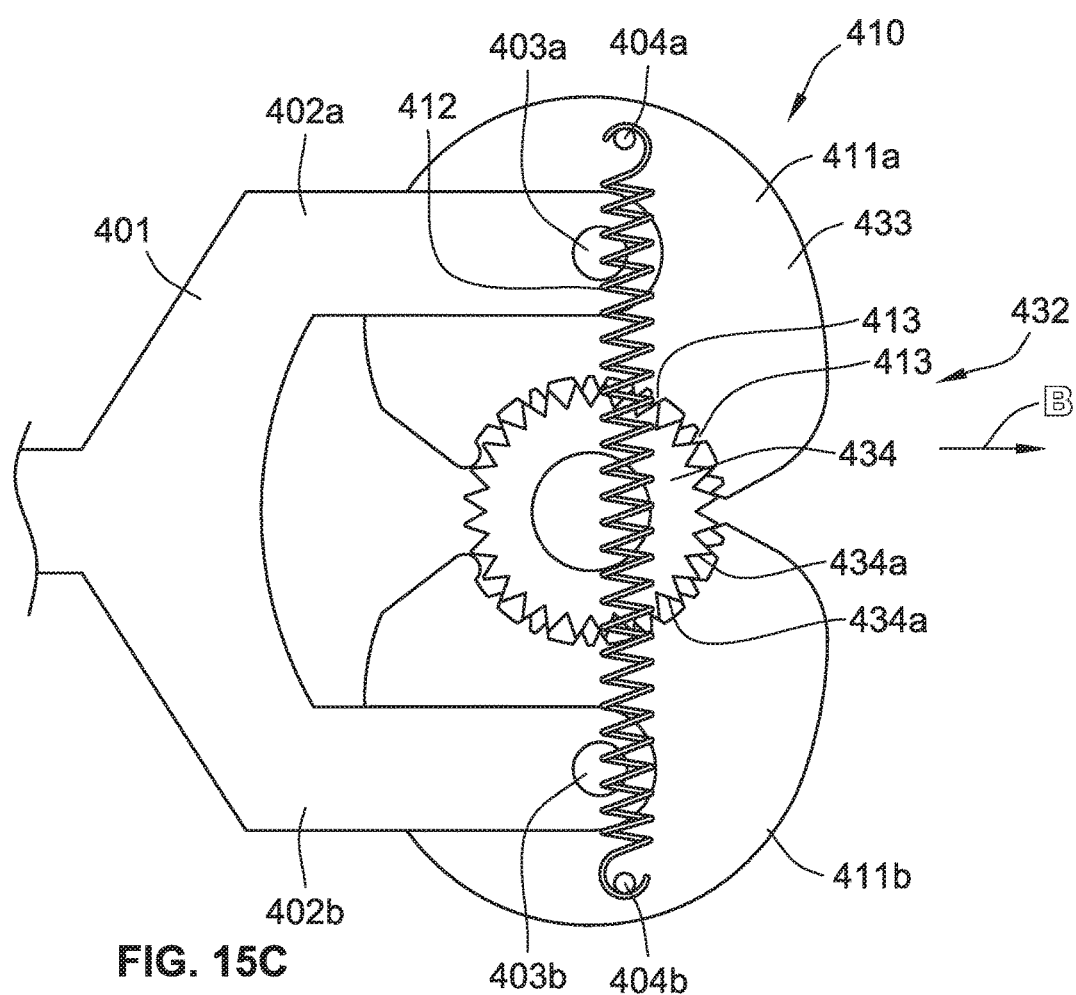
FIG. 15C is a top view of the alternative coupler and coupling mechanism of FIG. 14 in a closed position.
Figure 16A:
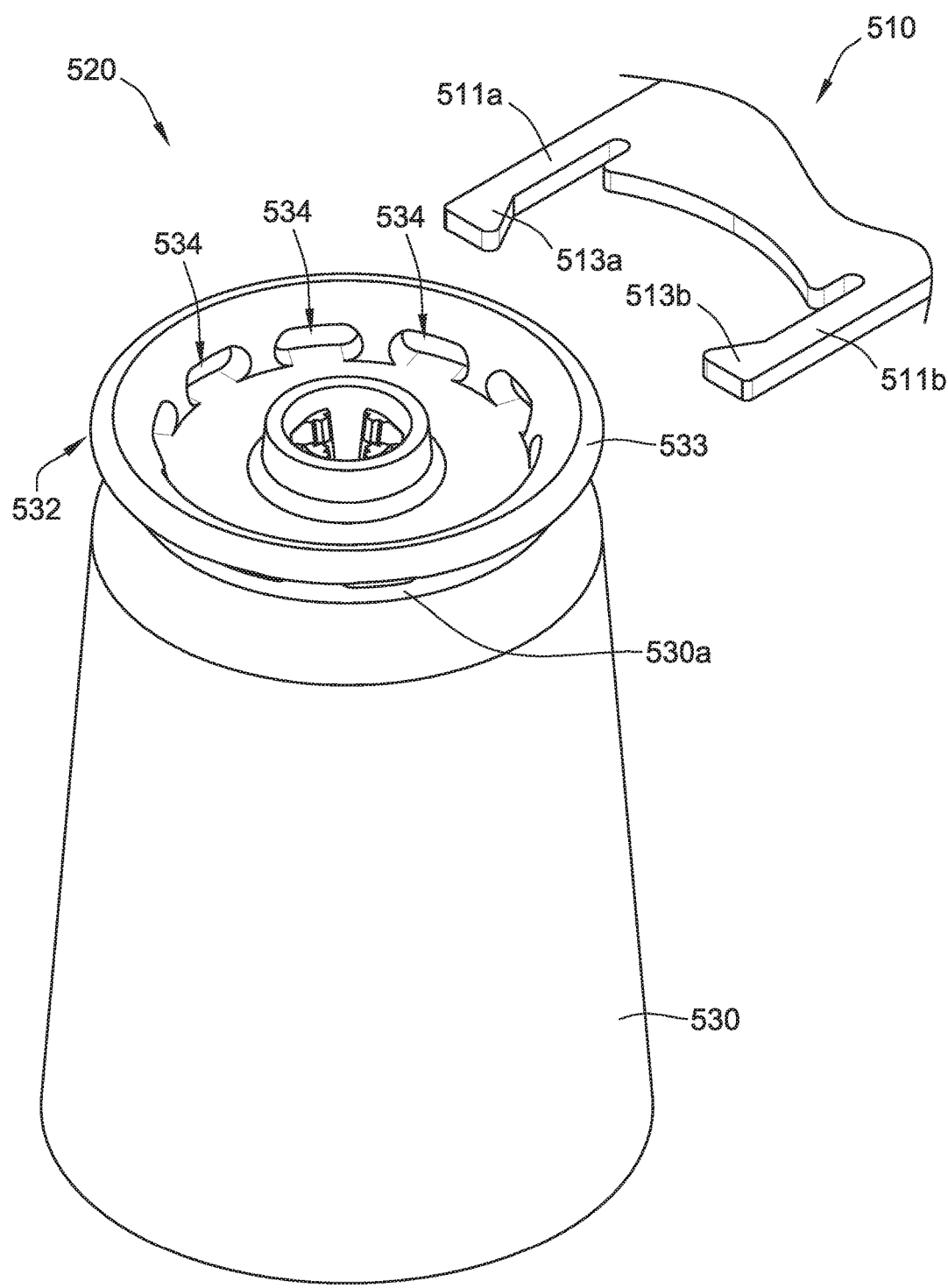
FIG. 16A is an assembled perspective view of an alternative compounding module and an alternative coupling mechanism according to some implementations of the present disclosure.
Figures 16D, 16E:
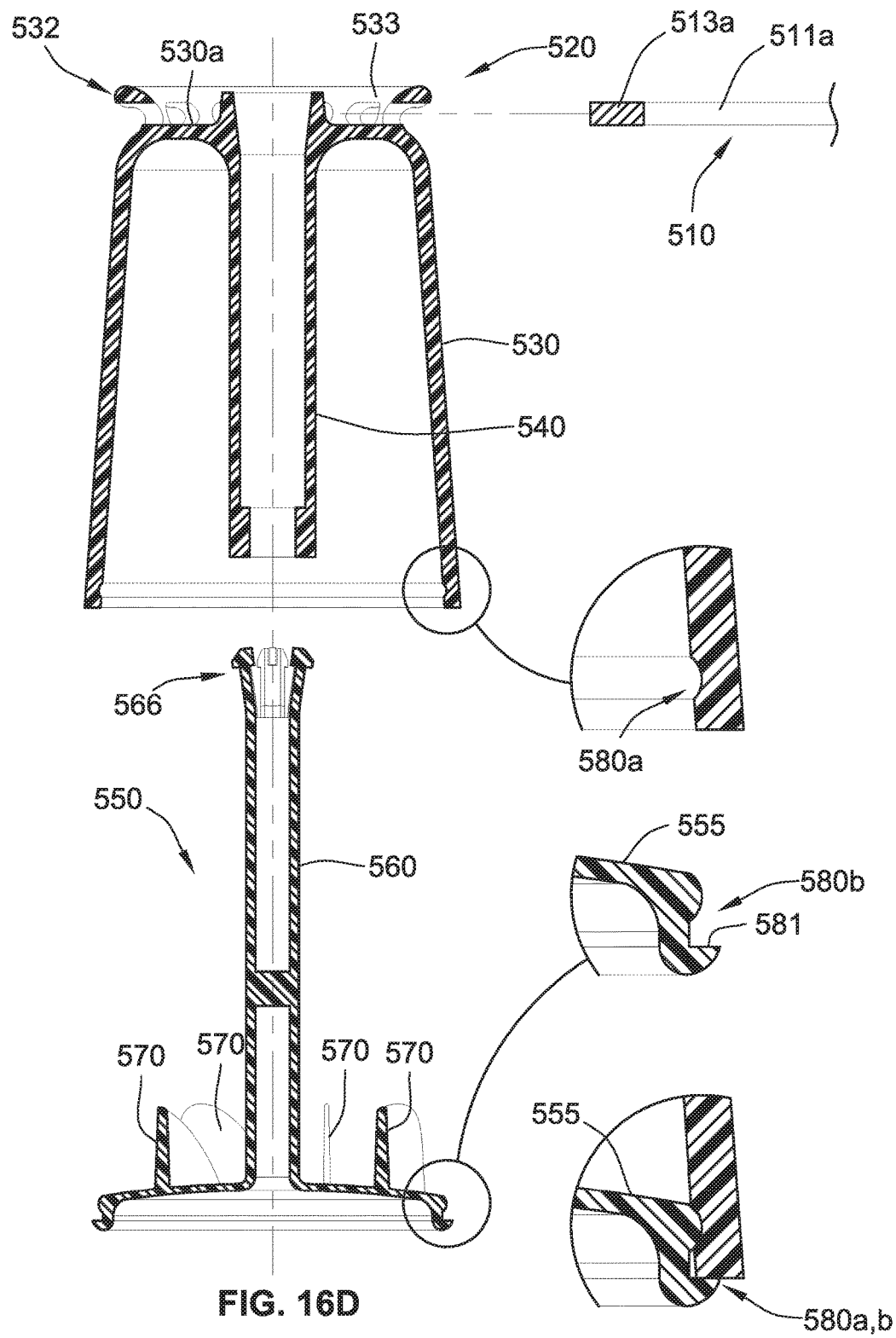
FIG. 16D is an exploded cross-sectional view of the alternative compounding module and the alternative coupling mechanism of FIG. 16A.
FIG. 16E is a partial cross-sectional view of a sealing feature of the alternative compounding module of FIG. 16A.

As shown in FIGS. 15A-15C, depending on the rotational positions of the arms 411a, 411b about the pivot pins 403a,b, the biasing element 412 is configured to bias the arms 411a, 411b into the open position (FIG. 15A) or the closed position (FIG. 15C). Essentially, the biasing element 412 biases or "snaps" the arms 411a, 411b into one of the first and the second positions (FIG. 15A or 15C). That is, when the arms 411a, 411b are rotated, for example, by being engaged by the coupler 432 moving in the direction of arrow A, the biasing member 412 stretches or extends from its position in FIG. 15A (e.g., resting position) to a maximum extended position in FIG. 15B, where the biasing element 412 and the position of the arms 411a, 411b are unstable. By unstable it is meant that the arms 411a, 411b will not remain in the position shown in FIG. 15B without an external force acting thereon due to the nature of the biasing element 412 acting thereon. Further, continued rotation of the arms 411a, 411b caused by further movement of the coupler 432 in the direction of arrow A causes the biasing member 412 to return to a resting position as shown in FIG. 15C. The arms 411a, 411b can be urged back to the open position (FIG. 15A) by moving the coupler 432 in the direction of arrow B shown in FIG. 15C. Each of the arms 411a,b includes a multitude of teeth 413 that correspond with the teeth or knurling 434a to grab and hold the coupler 432 in a non-rotational fashion. Various additional couplers and coupling mechanisms are possible with the beverage mixing system and compounding modules of the present disclosure.

Now referring to FIGS. 16A-16E, an alternative compounding module 520 is shown relative to a corresponding alternative coupling mechanism 510. The coupling mechanism 510 is similar to the coupling mechanism 210 in that the coupling mechanism 510 is for coupling the compounding module 520 to a beverage mixing system (e.g., beverage mixing system 100, 200) including the coupling mechanism 510. The compounding module 520 is similar to the compounding module 220 in that the compounding module 520 includes a housing 530 and an agitator 550 that are the same as, or similar to, various aspects of the housing 230 and the agitator 250 described herein and shown in the drawings. Further, the housing 530 includes a boss 540 (FIGS. 16C and 16D) that is the same as, or similar to, the boss 240; and the agitator 550 includes a base 555 (best shown in FIG. 16B), a shaft 560, a collet 566 and mixing element 570, that are the same as, or similar to, the base 255, the shaft 260, the collet 266, and the mixing elements 270, respectively. However, several differences exist between the compounding module 520 and the compounding module 220.

Specifically, for example, the compounding module 520 includes coupler 532 that is different than the coupler 232 of the compounding module 220. The coupler 532 of the compounding module 520 has a generally circular head 533 that forms a multitude of insertion holes 534 between a lid portion 530a of the housing 530 and the head 533 of the coupler 532. The insertion holes 534 are positioned around the coupler 532 for mating with the coupling mechanism 510 in a snap-in type engagement. Specifically, to load the compounding module 520 into the coupling mechanism 510, a user moves the compounding module 520 in a generally horizontal fashion (with respect to the orientation portrayed in FIG. 16D) toward the coupling mechanism 510 with the insertion holes 534 generally aligned with protrusions 513a,b of two arms 511a,b (FIG. 16A) of the coupling mechanism 510. To remove the compounding module 520, the user just pulls the compounding module 520 in an opposite direction away from the arms 511a,b, which will cause the arms 511a,b to move apart, thereby allowing for removal of the compounding module 520. To accommodate such a process, the arms 511a,b have a certain degree of flexibility and memory, similar to a leaf spring.

Another difference between the compounding module 520 and the compounding module 220 is that a sealing feature 580a,b (best shown in FIGS. 16D and 16E) of the compounding module 520 has a different configuration than the sealing feature 280a,b. Specifically, for example, the sealing feature 580b of the agitator 550 includes a lip 581 that acts as a positive stop to aid in preventing over installation and/or over insertion of the agitator 550 into the housing 530, thereby preventing and/or reducing the possibility of encroachment of the agitator 550 into a cavity 537 of the housing 530.

Now referring to FIGS. 17A-17D, an alternative compounding module 620 is shown relative to a corresponding alternative coupling mechanism 610. The coupling mechanism 610 is similar to the coupling mechanism 210 in that the coupling mechanism 610 is for coupling the compounding module 620 to a beverage mixing system (e.g., beverage mixing system 100, 200) including the coupling mechanism 610. The compounding module 620 is similar to the compounding module 220 in that the compounding module 620 includes a housing 630 and an agitator 650 that are the same as, or similar to, various aspects of the housing 230 and the agitator 250 described herein and shown in the drawings. Further, the agitator 650 includes a base 655 (best shown in FIG. 17B), a shaft 660, a collet 666 and mixing element 670, that are the same as, or similar to, the base 255, the shaft 260, the collet 266, and the mixing elements 270, respectively. However, several differences exist between the compounding module 620 and the compounding module 220.

Specifically, for example, while the compounding module 220 includes a coupler 232 and a boss 240 that are shown as being integral with the rest of the housing 230, the compounding module 620 includes a coupler/boss element 625 (FIGS. 17B, 17C, and 17D) that is separate and distinct from the rest of the housing 630. By separate and distinct, it is meant that the coupler/boss element 625 is formed separately from the housing 630 and then is coupled thereto via, for example, a snap-in connection, a click-in connection, a press-fit connection, a glue connection, a welded connection, etc., or any combination thereof.

The coupler/boss element 625 includes a coupler portion 632 coupled to a boss portion 640. The boss portion 640 includes a notch or an undercut 641 that mates with a projection 631 (FIG. 17D) of the housing 630 when the coupler/boss element 625 is installed and/or coupled to the housing 630 during fabrication of the compounding module 620. In some implementations, the projection 631 is an annular projection that circumscribes a complete circle. In other implementations, the projection 631 includes a plurality of projections or fingers that engage the notch 641. While the coupler/boss element 625 is formed as a separate and distinct component of the housing 630, when the coupler/boss element 625 is coupled to the housing 630 as shown in, for example, FIG. 17A, the boss portion 640 functions in the same, or similar, manner as the boss 240.

Figure 17A:
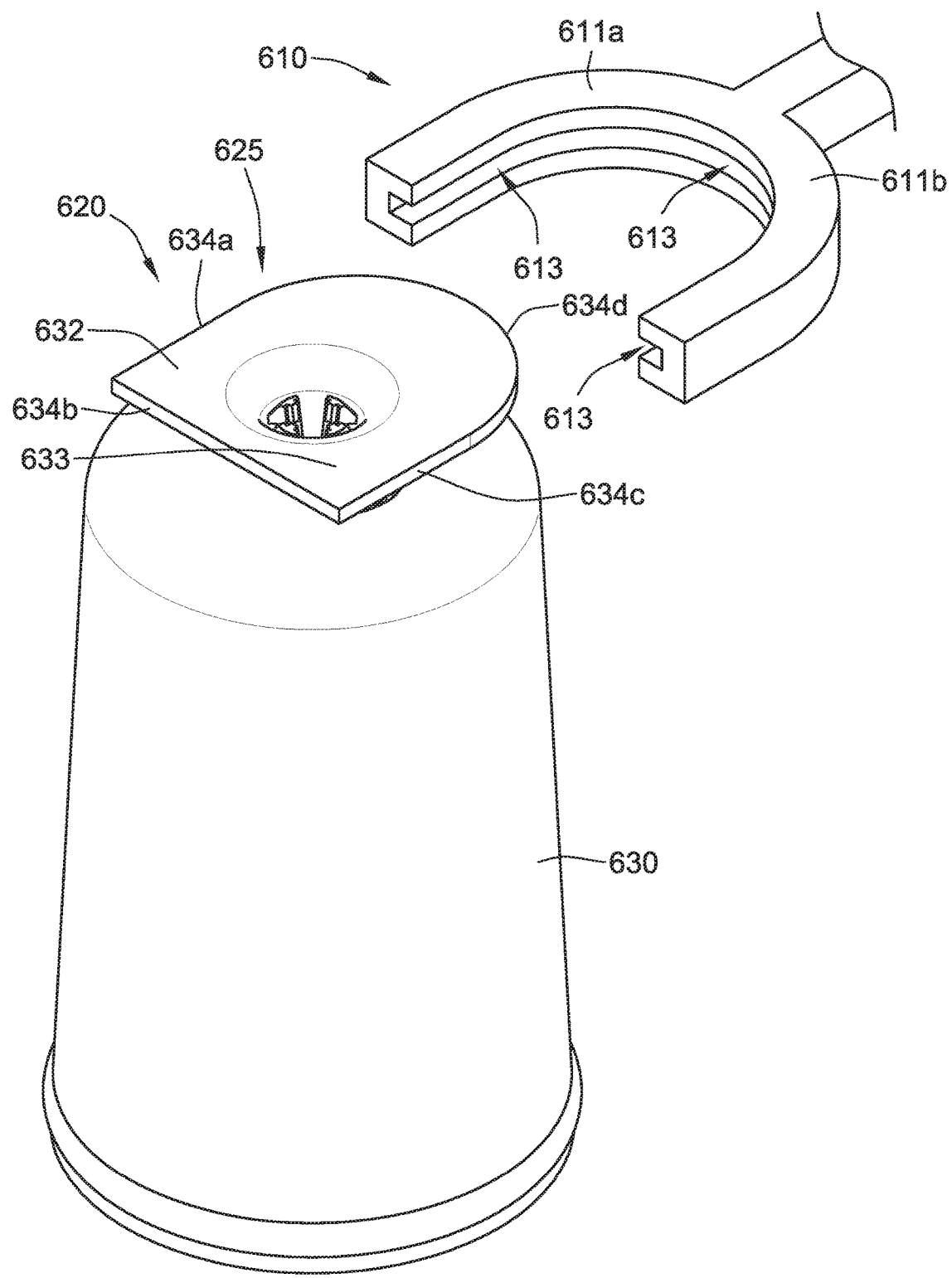
FIG. 17A is an assembled perspective view of an alternative compounding module and an alternative coupling mechanism according to some implementations of the present disclosure.
Figure 17B:
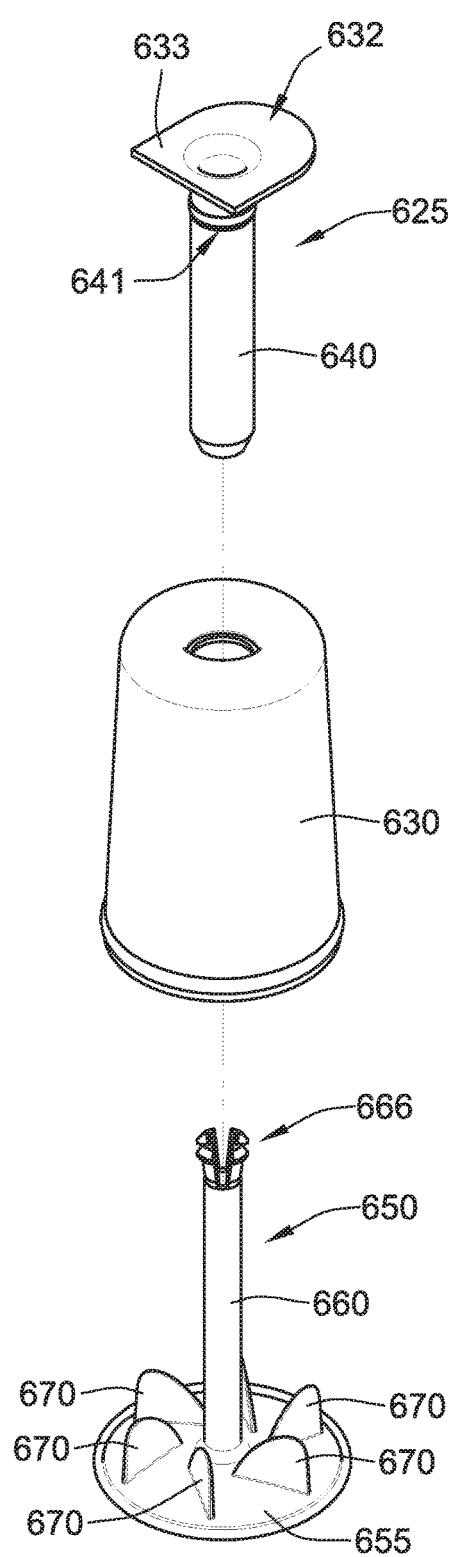
FIG. 17B is an exploded perspective view of the alternative compounding module of FIG. 17A.
Figure 17C:
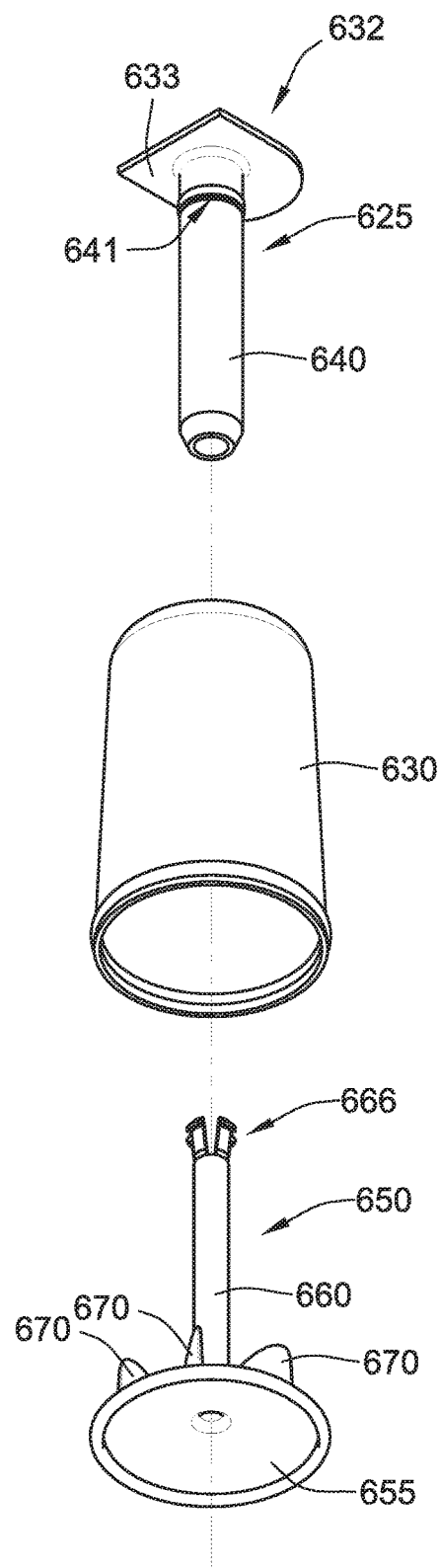
FIG. 17C is an exploded perspective view of the alternative compounding module of FIG. 17A.

The coupler portion 632 of the compounding module 620 has a head 633 with three generally straight edges 634a,b,c and one generally curved edge 634d (FIG. 17A). The head 633 is sized and shaped for mating with the coupling mechanism 610 in a slide-in type engagement. Specifically, to load the compounding module 620 into the coupling mechanism 610, a user moves the compounding module 620 in a generally horizontal fashion (with respect to the orientation portrayed in the FIG. 17A) toward the coupling mechanism 610 with the head 633 generally aligned with groove 613 formed in two arms 611a,b (FIG. 17A) of the coupling mechanism 610 and with the curved edge 634d leading (e.g., closest to the coupling mechanism 610 as shown in FIG. 17A). To remove the compounding module 620, the user slides and/or pulls the compounding module 620 in an opposite direction away from the arms 611a,b. While not shown in FIG. 17A, the coupling mechanism 610 can include a locking mechanism that temporarily locks the head 633 of the coupler 632 in the groove 613, such as, for example, one or more locking tabs or the like. Alternatively or additionally, the arms 611a,b and/or the groove 613 can be sized and shaped such that the head 633 is press fit (e.g., lightly press fit) into the groove 613, thereby rigidly holding the head 633 in the groove 613 and requiring a pulling force (e.g., a light pulling force) to remove the head 633 therefrom.

Figure 17D:
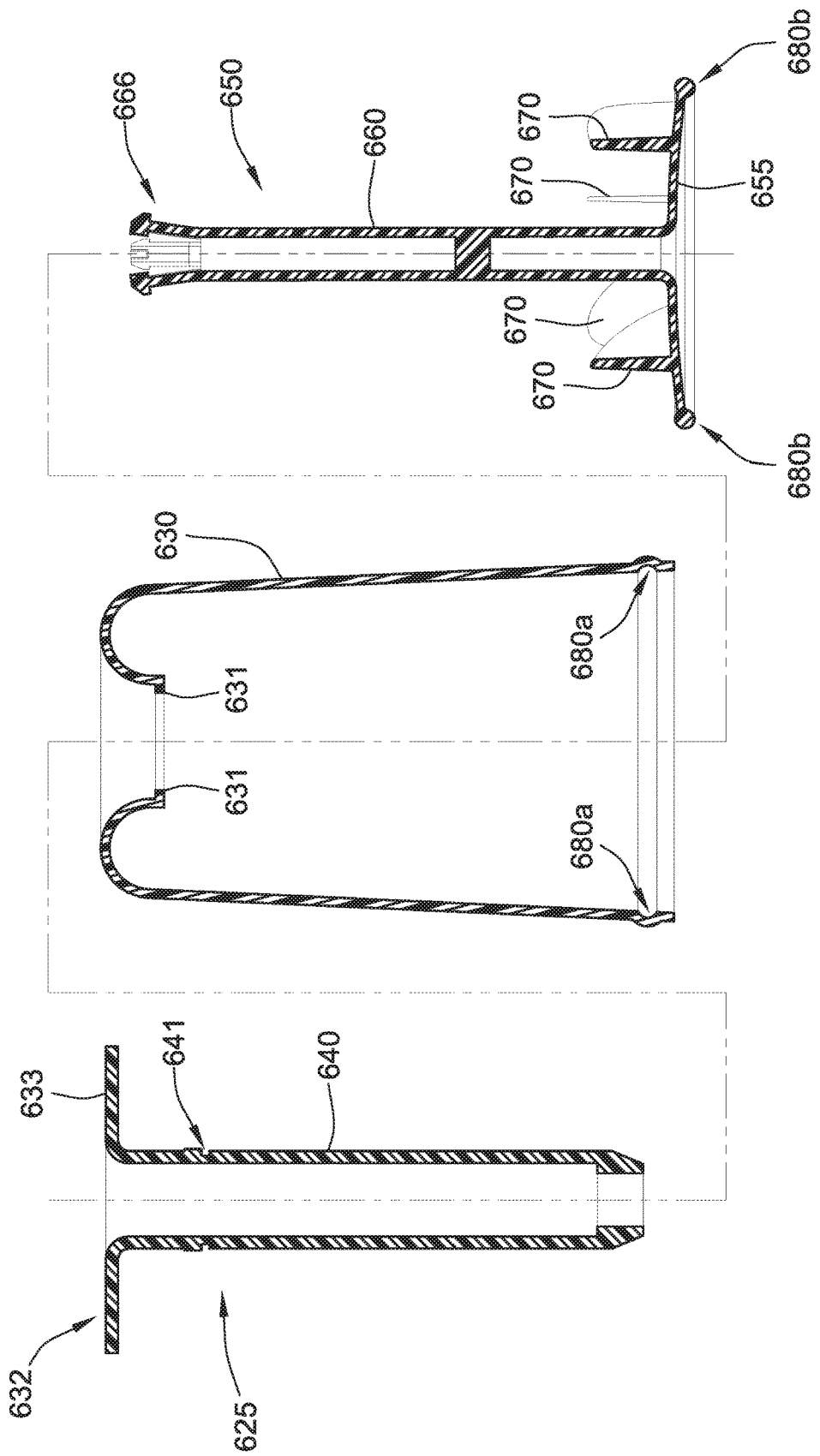
FIG. 17D is an exploded cross-sectional view of the alternative compounding module and the alternative coupling mechanism of FIG. 17A.

Another difference between the compounding module 220 and the compounding module 620 is that a sealing feature 680a,b (best shown in FIG. 17D) of the compounding module 620 has a different configuration than the sealing feature 280a,b, as is evident by a comparison of FIG. 7D (sealing feature 280a,b) with FIG. 17D (sealing feature 680a,b).

Figure 18A:
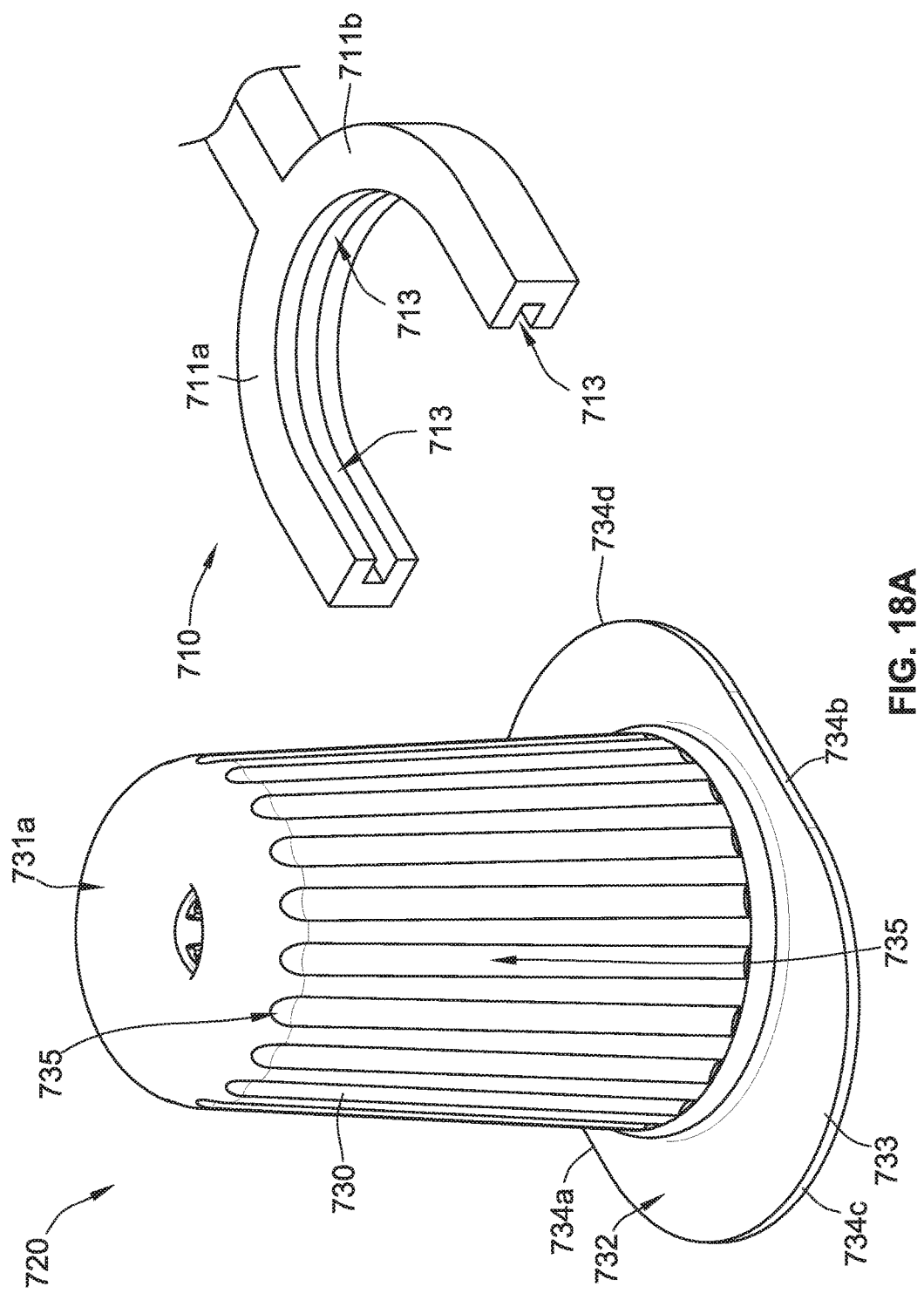
FIG. 18A is an assembled perspective view of an alternative compounding module and an alternative coupling mechanism according to some implementations of the present disclosure.

Now referring to FIGS. 18A-18E, an alternative compounding module 720 is shown relative to a corresponding alternative coupling mechanism 710 (FIG. 18A). The coupling mechanism 710 is the same as, or similar to, the coupling mechanism 610. The compounding module 720 is similar to the compounding module 220 in that the compounding module 720 includes a housing 730 and an agitator 750 that are the same as, or similar to, various aspects of the housing 230 and the agitator 250 described herein and shown in the drawings. Further, the housing 730 includes a boss 740 (FIGS. 18C and 18D) that is the same as, or similar to, the boss 240; and the agitator 750 includes a base 755 (best shown in FIG. 18B), a shaft 760, a collet 766 and mixing element 770, that are the same as, or similar to, the base 255, the shaft 260, the collet 266, and the mixing elements 270, respectively. However, several differences exist between the compounding module 720 and the compounding module 220.

Specifically, for example, the compounding module 720 includes coupler 732 that is different than the coupler 232 of the compounding module 220 in that the coupler 732 of the compounding module 720 is positioned at a second open end 731b (FIGS. 18C and 18D) of the housing 730 and not at a first end 731a, and in that the coupler 732 has a head 733 with two generally straight edges 734a,b and two generally curved edges 734c,d. The head 733 is sized and shaped for mating with the coupling mechanism 710 in a slide-in type engagement. Specifically, to load the compounding module 720 into the coupling mechanism 710, a user moves the compounding module 720 in a generally horizontal fashion (with respect to the orientation portrayed in the drawings) toward the coupling mechanism 710 with the head 733 generally aligned with groove 713 formed in two arms 711a,b (FIG. 18A) of the coupling mechanism 710 and with one of the two curved edges 734c,d leading (e.g., closest to the coupling mechanism 710 as shown in FIG. 18A). To remove the compounding module 720, the user just pulls the compounding module 720 in an opposite direction away from the arms 711a,b.

Another difference between the compounding module 720 and the compounding module 220 is that a sealing feature 780a,b (best shown in FIGS. 18D and 18E) of the compounding module 720 has a different configuration than the sealing feature 280a,b, as is evident by a comparison of FIG. 7D (sealing feature 280a,b) with FIGS. 18D and 18E (sealing feature 780a,b).

Another difference between the compounding module 720 and the compounding module 220 is that the housing 730 includes a multitude of grooves 735 (FIGS. 18A, 18B, and 18C) formed in an exterior surface of the housing 730 as compared to the generally flat exterior surface of the housing 230 of the compounding module 220. The grooves 735 can aid in adding rigidity to the housing 730 and/or aid in the automatic removal of a nutraceutical compound (not shown) contained within the housing 730, for example, when the agitator 750 is separated and lowered from the housing 730.

Now referring to FIGS. 19A-19D, an alternative compounding module 820 is shown relative to a corresponding alternative coupling mechanism 810. The coupling mechanism 810 is similar to the coupling mechanism 210 in that the coupling mechanism 810 is for coupling the compounding module 820 to a beverage mixing system (e.g., beverage mixing system 100, 200) including the coupling mechanism 810. The compounding module 820 is similar to the compounding module 220 in that the compounding module 820 includes a housing 830 and an agitator 850 that are the same as, or similar to, various aspects of the housing 230 and the agitator 250 described herein and shown in the drawings. Further, the housing 830 includes a boss 840 (FIGS. 19C and 19D) that is the same as, or similar to, the boss 240; and the agitator 850 includes a base 855 (best shown in FIG. 19D), a shaft 860, a collet 866 and mixing element 870, that are the same as, or similar to, the base 255, the shaft 260, the collet 266, and the mixing elements 270, respectively. However, several differences exist between the compounding module 820 and the compounding module 220.

Specifically, for example, the compounding module 820 includes coupler 832 that is different than the coupler 232 of the compounding module 220 in that the coupler 832 of the compounding module 820 is positioned at a second open end 831*b* of the housing 830 and not at a first end 831*a*. Further, the coupler 832 has a head 833 with a multitude of teeth 834. The head 833 and the teeth 834 thereon are sized and shaped for mating with the coupling mechanism 810 in an automatic drop-in type engagement. Specifically, to load the compounding module 820 into the coupling mechanism 810, a user positions the compounding module 820 above biased locking tabs 811*a,b* (the same as, or similar to, biased locking tabs 211*a,b*). Then the user drops and/or moves the compounding module 820 in a generally vertical-downward fashion (with respect to the orientation portrayed in the drawings) toward the coupling mechanism 810 with the teeth 834 of the coupler 832 generally aligned with teeth 813 formed in a ring 811 of the coupling mechanism 810. Such a movement of the compounding module 820 causes the head 833 and/or the teeth 834 to engage the biased locking tabs 811*a,b* and move the biased locking tabs 811*a,b* horizontally outward, thereby allowing the head 833 to move vertically downward past the biased locking tabs 811*a,b*. After clearing the biased locking tabs 811*a,b*, the teeth 834 engage the teeth 813 in an anti-rotational fashion and the biased locking tabs 811*a,b* return to their biased home position locking the compounding module 820 in its vertical position (not shown). To remove the compounding module 820, the user manually separates the biased locking tabs 811*a,b*, such as, for example, by pressing a button (not shown) and then lifts the compounding module 820 in a generally upward direction away from the ring 811.

Figure 19A:
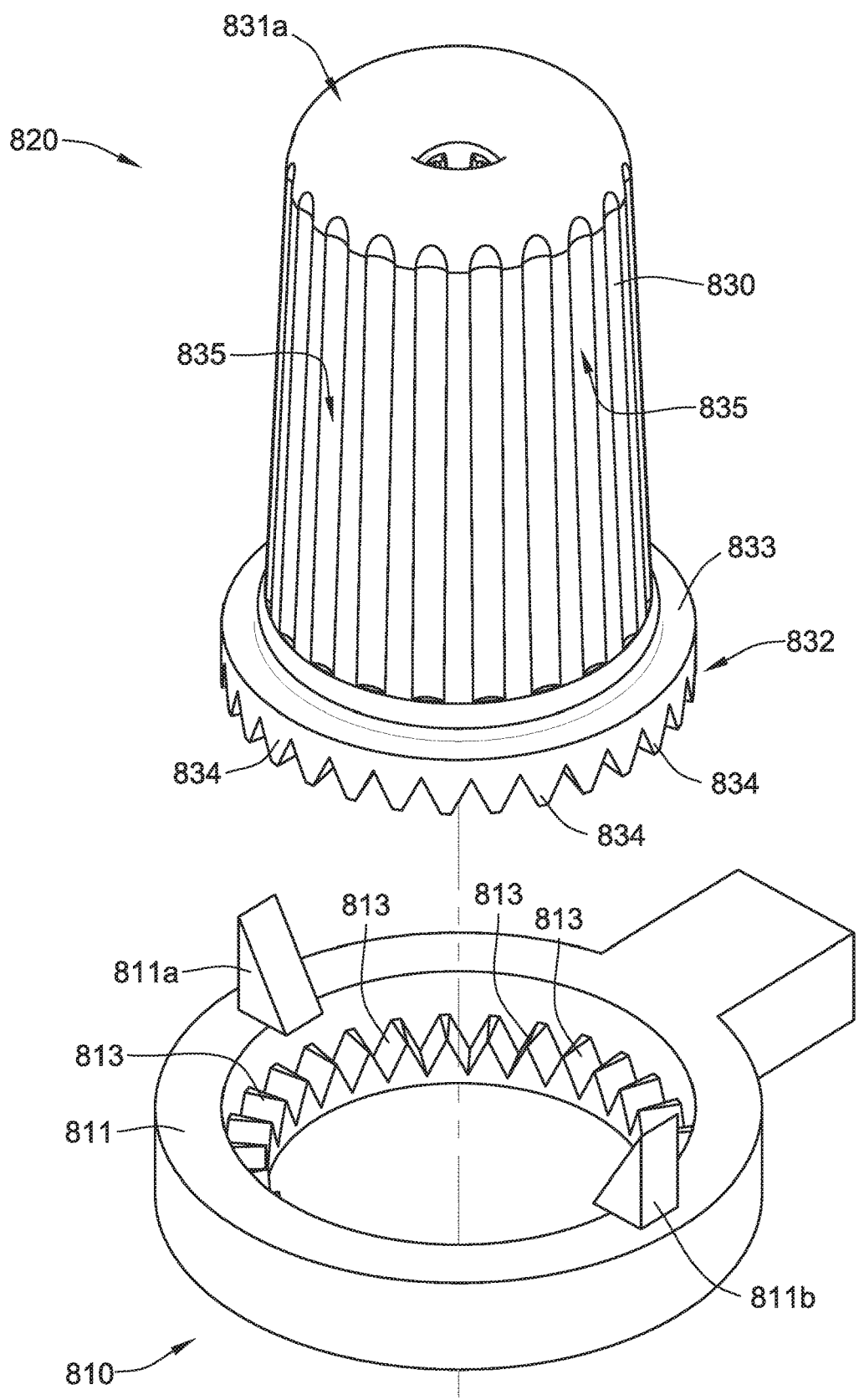
FIG. 19A is an assembled perspective view of an alternative compounding module and an alternative coupling mechanism according to some implementations of the present disclosure.
Figure 19B:
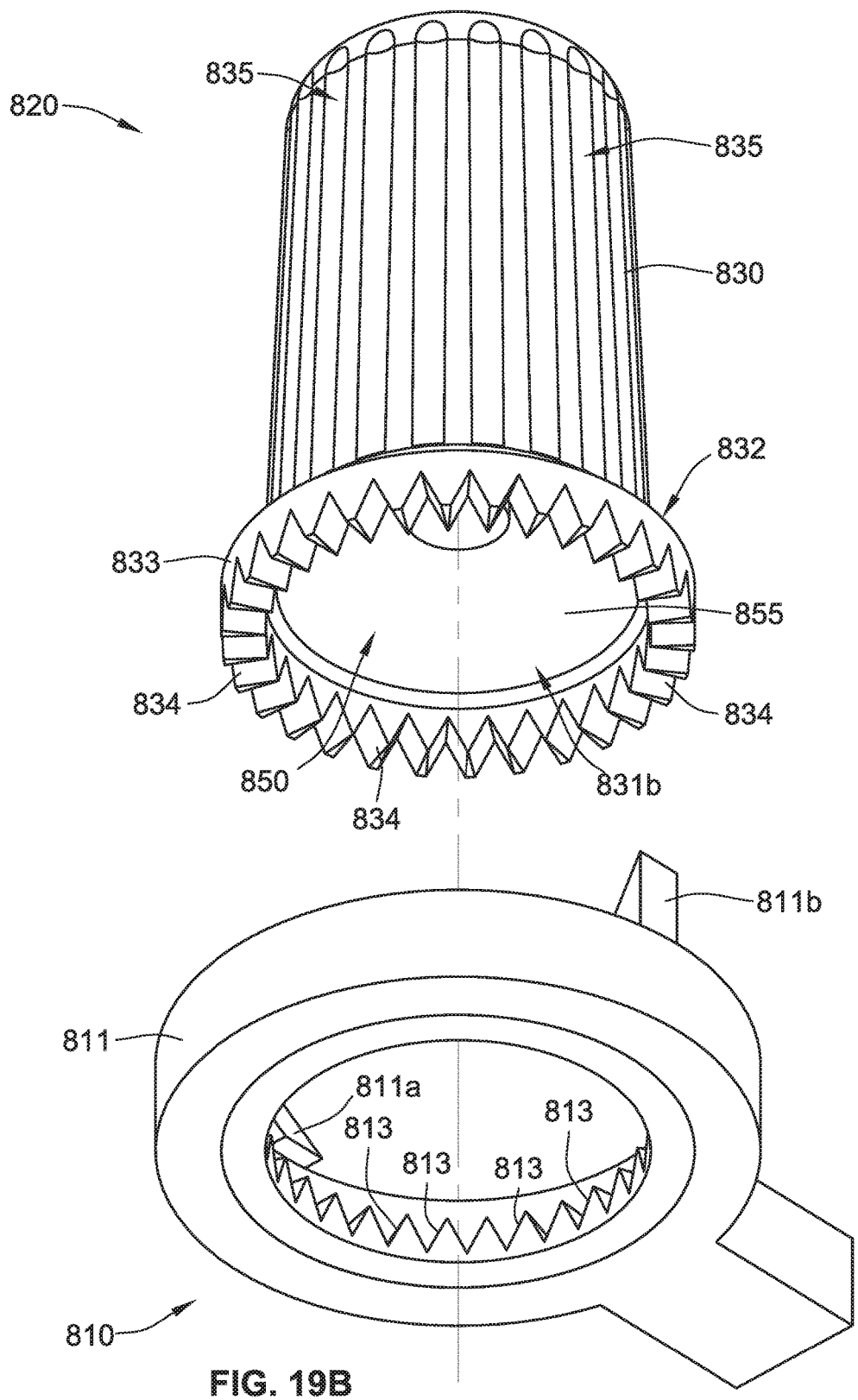
FIG. 19B is an assembled perspective view of the alternative compounding module and the alternative coupling mechanism of FIG. 19A.
Figure 19C:
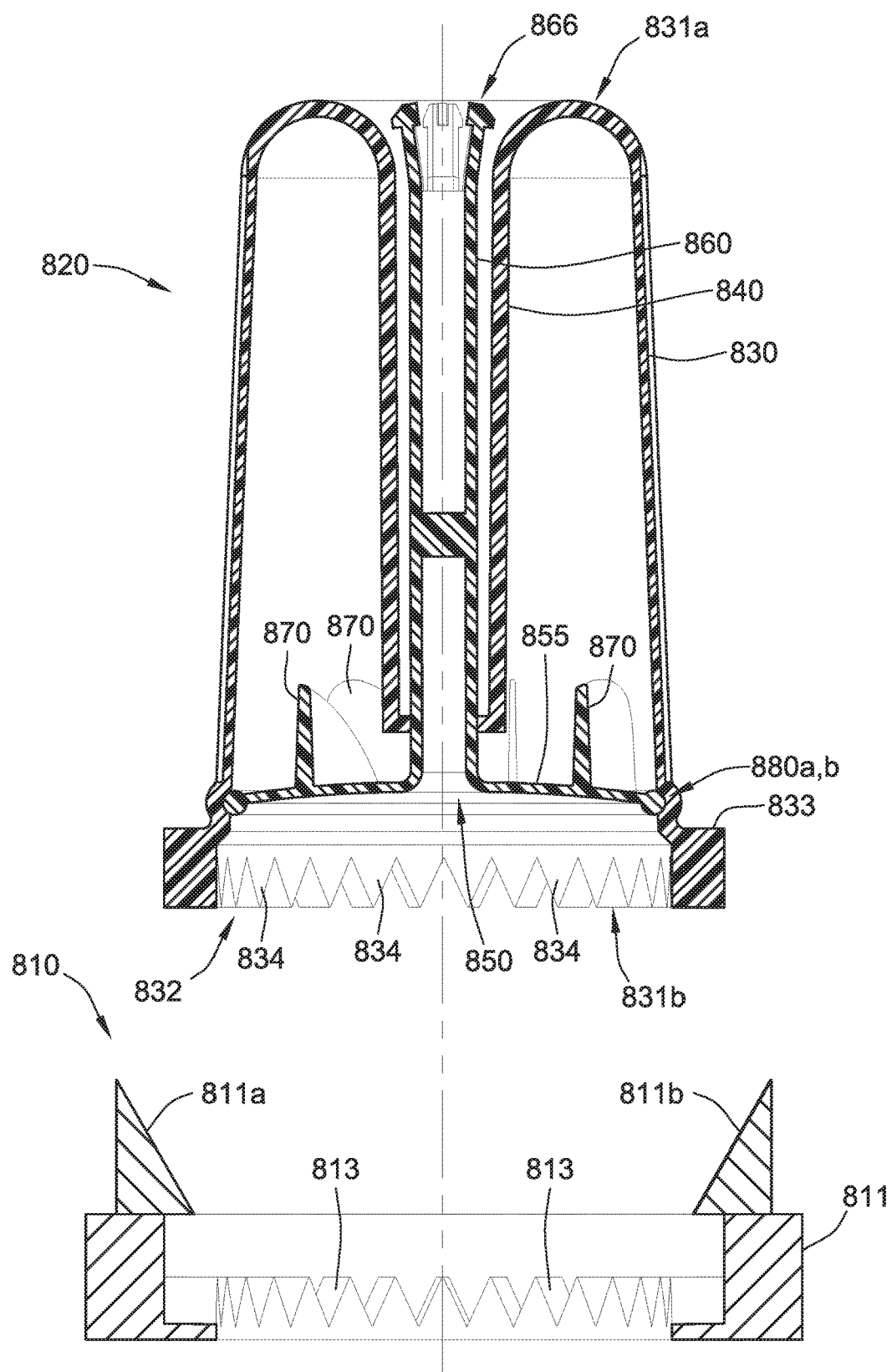
FIG. 19C is an assembled cross-sectional view of the alternative compounding module and the alternative coupling mechanism of FIG. 19A.
Figure 19D:
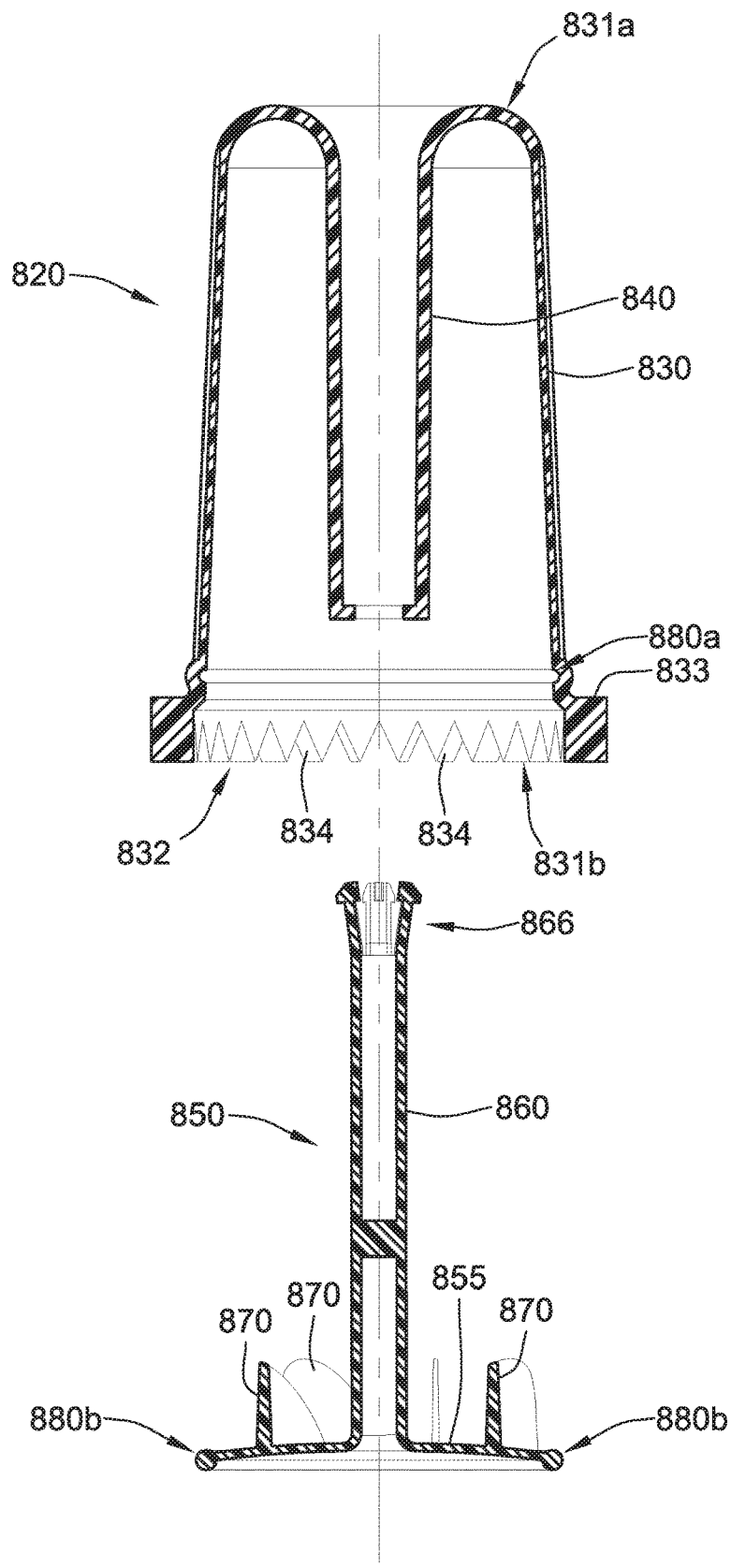
FIG. 19D is an exploded cross-sectional view of the alternative compounding module of FIG. 19A.

Another difference between the compounding module 820 and the compounding module 220 is that a sealing feature 880*a,b* (best shown in FIGS. 19C and 19D) of the compounding module 820 has a different configuration than the sealing feature 280*a,b*, as evident by a comparison of FIG. 7D (sealing feature 280*a,b*) with FIGS. 19C and 19D (sealing feature 880*a,b*).

Another difference between the compounding module 820 and the compounding module 220 is that the housing 830 includes a multitude of grooves 835 formed in an exterior surface of the housing 830 as compared to the generally flat exterior surface of the housing 230 of the compounding module 220. The grooves 835 can aid in adding rigidity to the housing 830 and/or aid in the automatic removal of a nutraceutical compound (not shown) contained within the housing 830, for example, when the agitator 850 is separated and lowered from the housing 830.

Figure 20A:
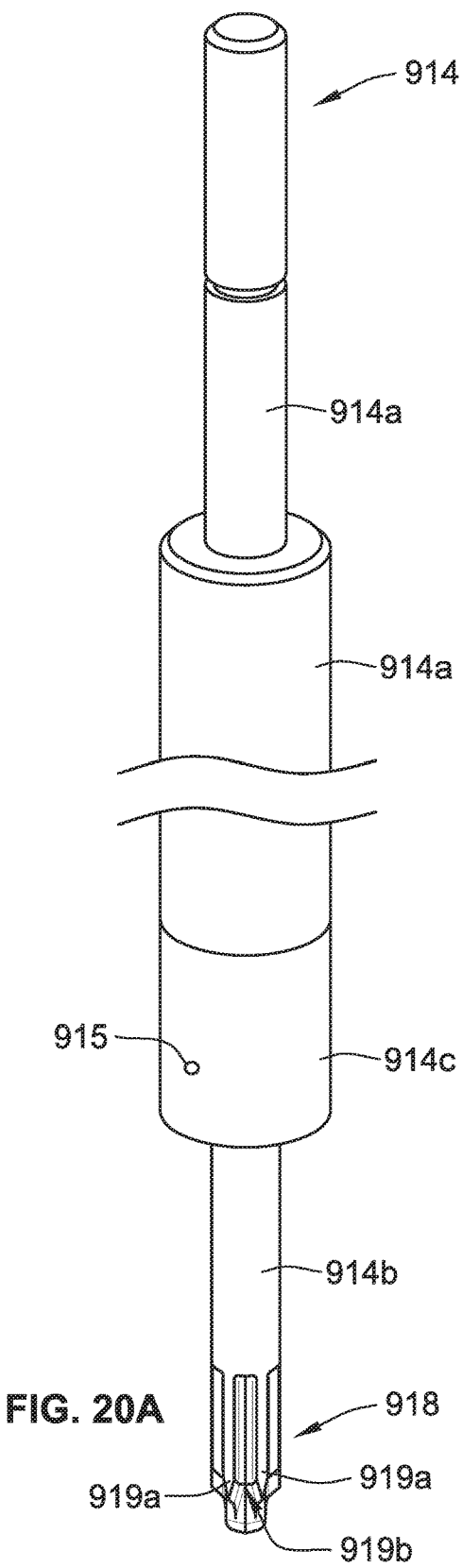
FIG. 20A is a partial perspective view of an assembled alternative drive shaft according to some implementations of the present disclosure.

Now referring generally to FIGS. 20A, 20B, and 20C, an alternative drive shaft 914 is shown and described. The drive shaft 914 is similar to the drive shaft 214 in that the drive shaft 914 is operatively coupled to a beverage mixing system (e.g., beverage mixing system 100, 200) and used for engaging a compounding module (e.g., compounding module 920 shown in FIG. 21A) such that the drive shaft 914 can impart a translational motion and/or a rotational motion to at least a portion of the compounding module as described herein. The drive shaft 914 includes a main shaft portion 914*a*, a secondary shaft portion 914*b*, and a sleeve portion 914*c* (e.g., a collar portion). The secondary shaft portion 914*b* is coupled to the main shaft portion 914*a* via a threaded connection, although, various other methods of connection are contemplated, such as, for example, a press-fit connection, a welded connection, a glue connection, a monolithic connection (i.e., the main shaft portion 914*a* and the secondary shaft portion 914*b* are formed as a single unitary part), etc. The sleeve portion 914*c* is coupled to the main shaft portion 914*a* via a slip on connection and held in place via a set-screw 915, although, various other methods of connection are contemplated, such as, for example, a press-fit connection, a welded connection, a glue connection, a monolithic connection (i.e., the main shaft portion 914*a* and the sleeve portion 914*c* are formed as a single unitary part), etc.

The drive shaft 914 includes a translation locking feature 916 and a rotation locking feature 918 that are operable to engage with a translation locking feature (e.g., translation locking feature 966 shown in FIG. 21D) and a rotation locking feature (e.g., rotation locking feature 968 shown in FIG. 21D) of the compounding module (e.g., the compounding module 920) to lock relative translation and rotation of the drive shaft 914 with an agitator (e.g., agitator 950 shown in FIG. 21B) of the compounding module.

The translation locking feature 916 is included in the sleeve portion 914*c* of the drive shaft 914 and forms an undercut or groove on an inside surface of the sleeve portion 914*c* of the drive shaft 914 that is sized and shaped to engage the translation locking feature (e.g., translation locking feature 966 shown in FIG. 21D) of the compounding module. For example, as best shown in FIG. 21H, the sleeve portion 914*c* engages the translation locking feature 966 on the compounding module 920. As best shown in FIG. 20C, the translation locking feature 916 of the drive shaft 914 includes a generally upward facing surface 917 (with reference to the orientation shown in FIG. 20C) that is positioned at an angle, $\theta_1$, with respect to horizontal. The angle, $\theta_1$, is generally between about ten and forty-five degrees, more preferably, the angle, $\theta_1$, is between about twenty and thirty-five degrees, and even more preferably, the angle, $\theta_1$, is between about twenty-eight and thirty-two degrees. The rotation locking feature 918 of the drive shaft 914 is the same as, or similar to, the rotation locking feature 218 and includes a multitude of drive-shaft splines 919*a* that define a multitude of drive-shaft channels 919*b* therebetween (FIG. 20A).

Now referring generally to FIGS. 21A-21J, an alternative compounding module 920 is shown relative to a corresponding alternative coupling mechanism 910. The coupling mechanism 910 is similar to the coupling mechanism 210 in that the coupling mechanism 910 is for coupling a compounding module (e.g., the compounding module 920) to a beverage mixing system (e.g., beverage mixing system 100, 200) including the coupling mechanism 910.

Figure 21A:
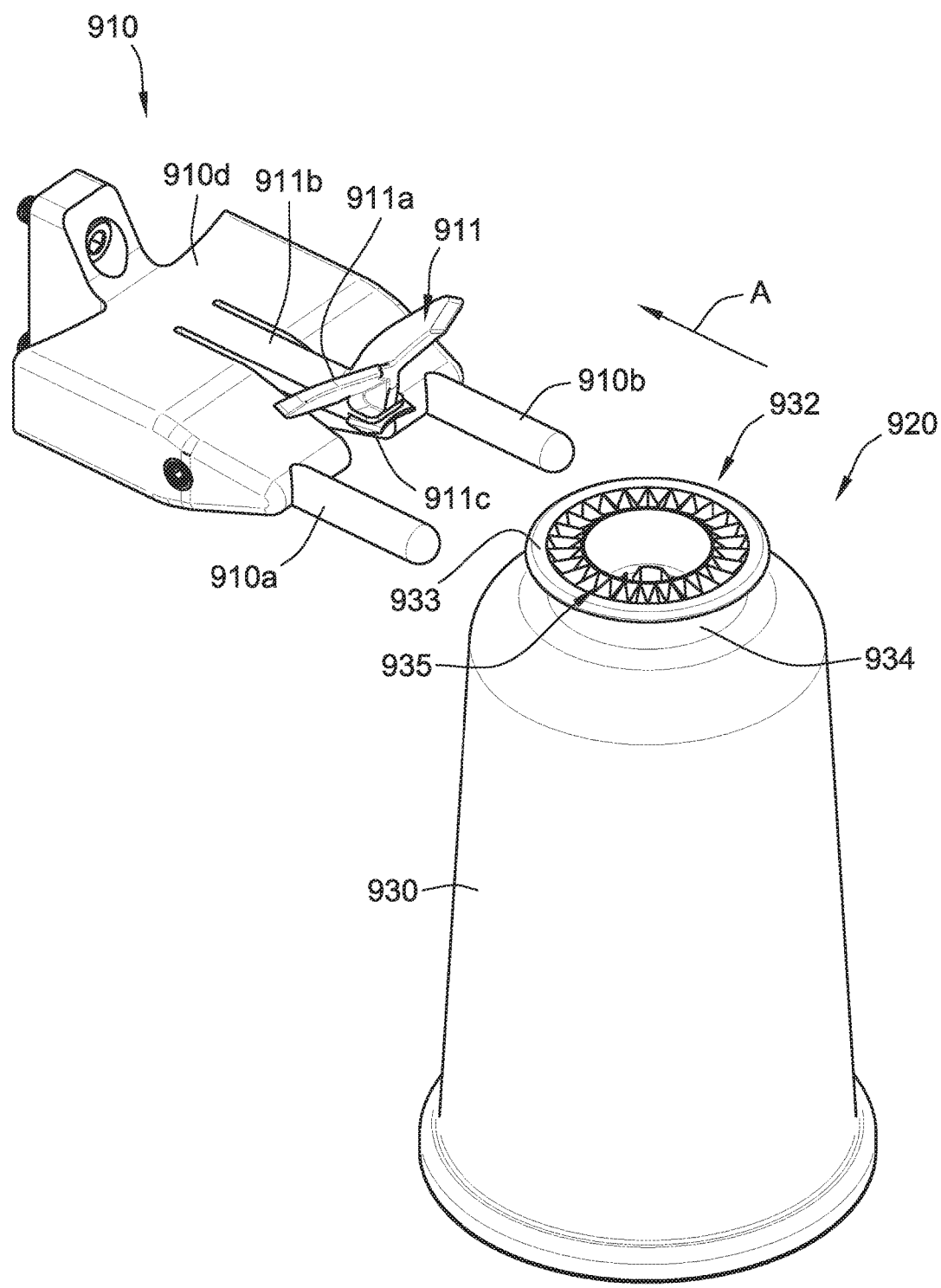
FIG. 21A is a perspective view of an assembled module and a coupling mechanism of a beverage mixing system according to some implementations of the present disclosure.

As best shown in FIG. 21A, the coupling mechanism 910 includes a pair of arms 910a, 910b for receiving a base or neck portion 934 of a coupler 932 of the compounding module 920 therebetween. Each of the arms 910a, 910b has a general rod shape with a generally circular cross-section such that the neck portion 934 of the coupler 932 of the compounding module 920 can easily slide therebetween without any rotational-orientation constraints for the compounding module 920. Various other cross-sections for the arms 910a, 910b are contemplated, such as, for example, square, rectangular, oval, semi-circular, polygonal, etc.

Figure 23A:
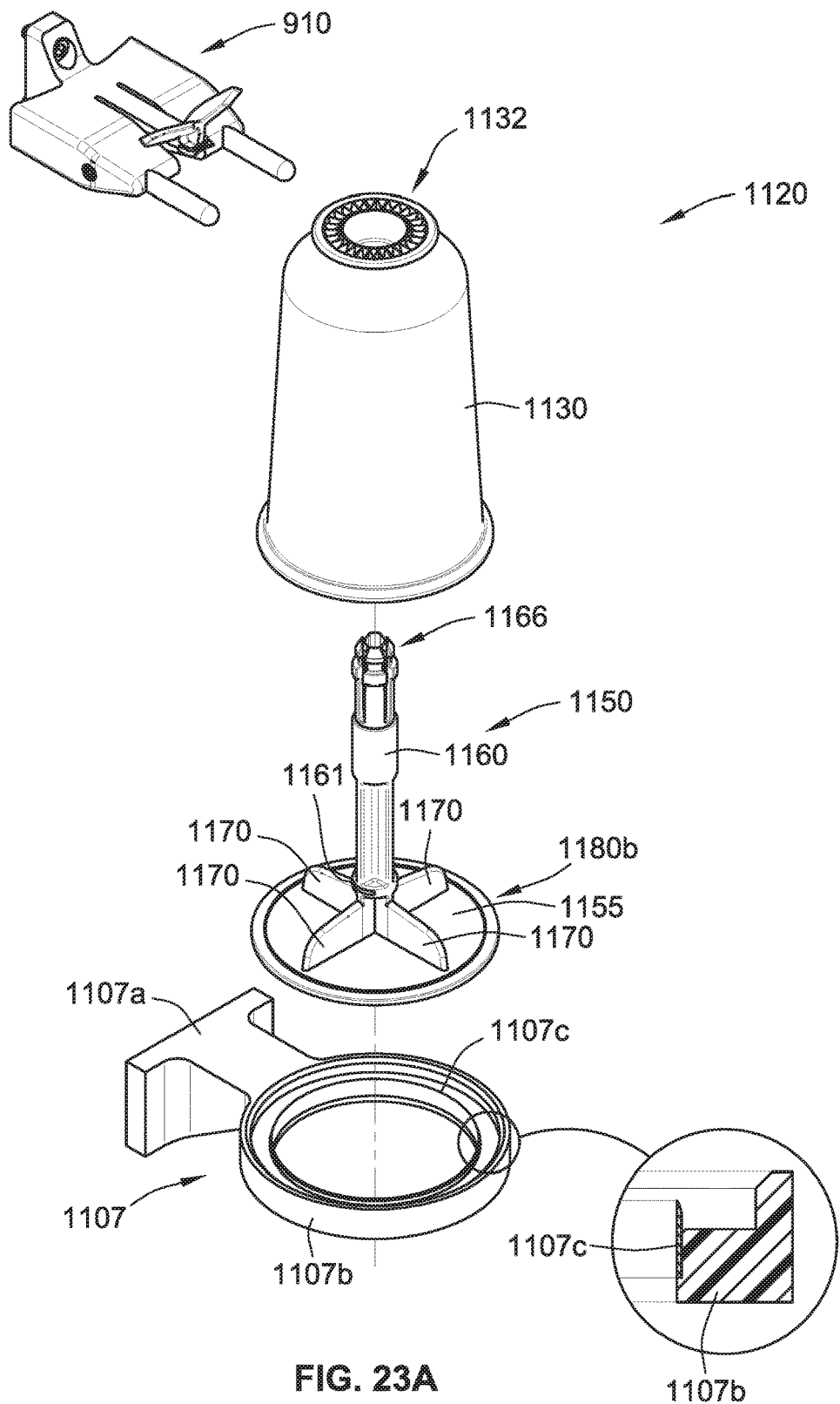
FIG. 23A is an exploded perspective view of a module relative to a coupling mechanism and a knife base of a beverage mixing system according to some implementations of the present disclosure.
Figure 23B:
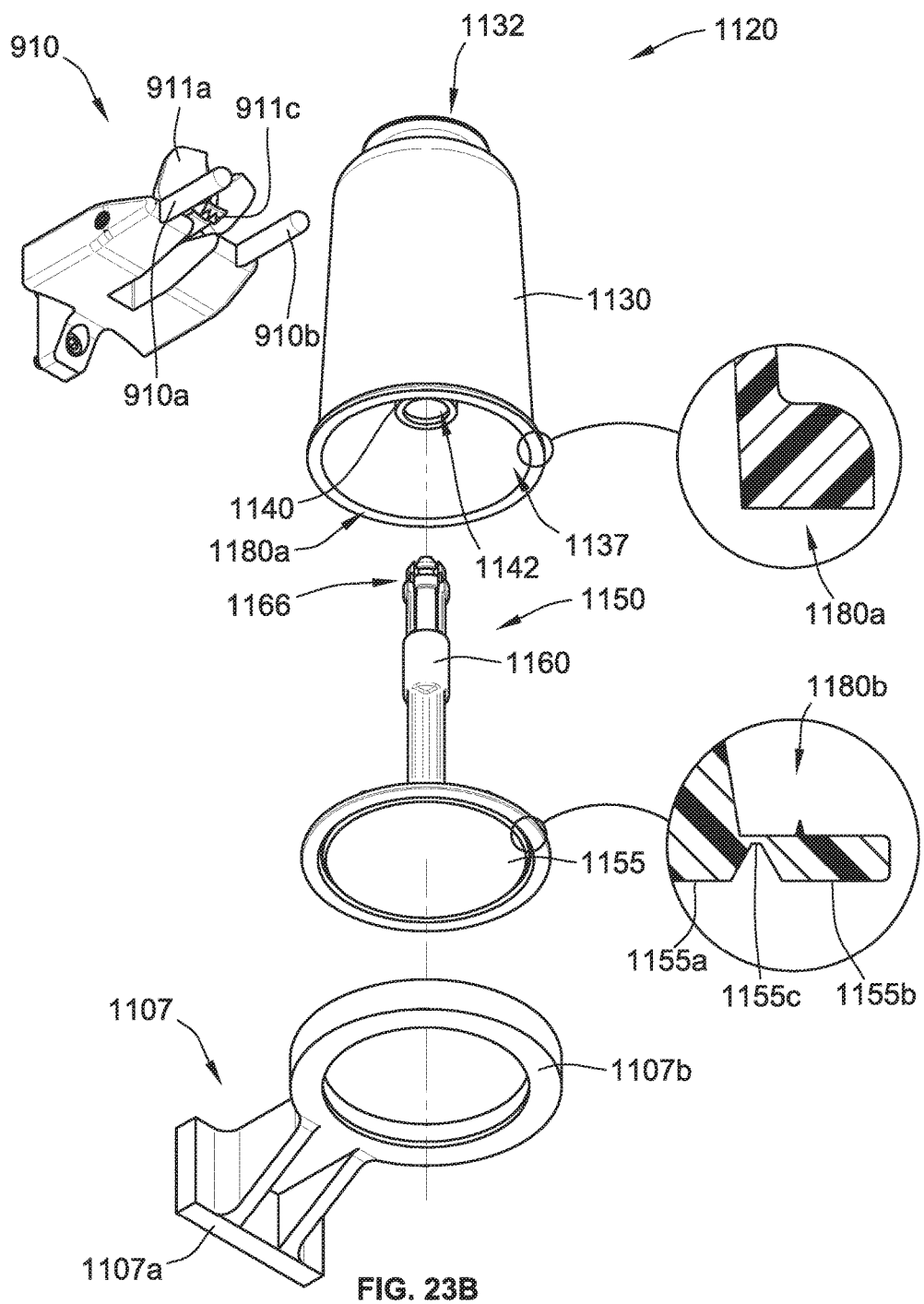
FIG. 23B is an exploded perspective view of the module of FIG. 23A relative to the coupling mechanism and the knife base of FIG. 23A.

The coupling mechanism 910 also includes a latch mechanism 911 (e.g., a thumb-latch mechanism) for removably retaining the compounding module 920 in the coupling mechanism 910 during operation of the beverage mixing system (e.g., beverage mixing system 200). The latch mechanism 911 includes a lever portion 911a, a cantilever-beam portion 911b, and a non-rotational gripping portion 911c (best shown in FIG. 23B). The lever portion 911a extends from an upward facing surface of the cantilever-beam portion 911b and the non-rotational gripping portion 911c extends from an opposing downward facing surface of the cantilever-beam portion 911b. The cantilever-beam portion 911b is coupled to a body 910d of the coupling mechanism 910 such that an upward force on the lever portion 911a causes the cantilever-beam portion 911b to bend relative to the body 910d, thereby moving the non-rotational gripping portion 911c generally upward. Such an upward force can be imparted to the lever portion 911a by, for example, a thumb or finger(s) of a user of the beverage mixing system 100, 200. Similarly, an upward force on the non-rotational gripping portion 911c causes the cantilever-beam portion 911b to bend thereby moving the lever portion 911a generally upward. Such an upward force can be imparted to the non-rotational gripping portion 911c by, for example, a head 933 of the coupler 932 of the compounding module 920 when being coupled to the coupling mechanism 910 during loading of the compounding module 920 into the beverage mixing system 100, 200.

The compounding module 920 (FIG. 21A) is similar to the compounding module 220 (FIG. 7A) in that the compounding module 920 includes a housing 930 and an agitator 950 that are the same as, or similar to, various aspects of the housing 230 and the agitator 250 described herein and shown in the drawings. Further, the housing 930 includes a boss 940 with an inner bore 942 (best shown in FIG. 21D) and forms a cavity 937 that is the same as, or similar to, the boss 240 and the cavity 237; and the agitator 950 includes a base 955 (best shown in FIGS. 21B, 21C), a shaft 960 (best shown in FIGS. 21B, 21C), a collet 966 (best shown in FIGS. 21B, 21C), and mixing elements 970 (best shown in FIG. 21C), that are similar to the base 255, the shaft 260, the collet 266, and the mixing elements 270, respectively. However, several differences exist between the compounding module 920 and the compounding module 220, some of which are highlighted and described herein and others of which are discernible with reference to and comparison of the various figures of the compounding modules 220, 920.

Specifically, for example, the compounding module 920 includes the coupler 932 that is different than the coupler 232 of the compounding module 220. The coupler 932 of the compounding module 920 includes the neck 934 and the generally circular head 933 that has a multitude of non-rotational locking grooves 935. The non-rotational locking grooves 935 are positioned around an opening of the inner bore 942 (FIGS. 21B, 21C, 21D) of the boss 940 that is formed in the head 933 of the coupler 932 for mating with the non-rotational gripping portion 911c of the latch mechanism 911 of the coupling mechanism 910 in a non-rotational/snap-in type engagement. Specifically, to load the compounding module 920 into the coupling mechanism 910, a user moves the compounding module 920 in the direction of arrow A (FIG. 21A) toward the coupling mechanism 910 with the neck 934 generally aligned between the arms 910a, 910b and with the head 933 generally above the arms 910a, 910b. The compounding module 920 is moved in such a direction until the latch mechanism 911 bends up and snaps into a non-rotational engagement with the head 933. Specifically, the non-rotational gripping portion 911c of the latch mechanism 911 engages the non-rotational locking grooves 935 of the coupler 932 in a non-rotational manner, thereby preventing rotation of the housing 930 of the compounding module 920 relative to the coupling mechanism 910 and relative to the beverage mixing system including the coupling mechanism 910 (e.g., the beverage mixing system 100, 200). To remove the compounding module 920 from the coupling mechanism 910, the user exerts a generally upward force on the lever portion 911a of the latch mechanism 911, thereby disengaging the non-rotational gripping portion 911c from the non-rotational locking grooves 935, and pulls/slides the compounding module 920 in direction opposite that of arrow A and away from the arms 910a, 910b.

Figure 21D:
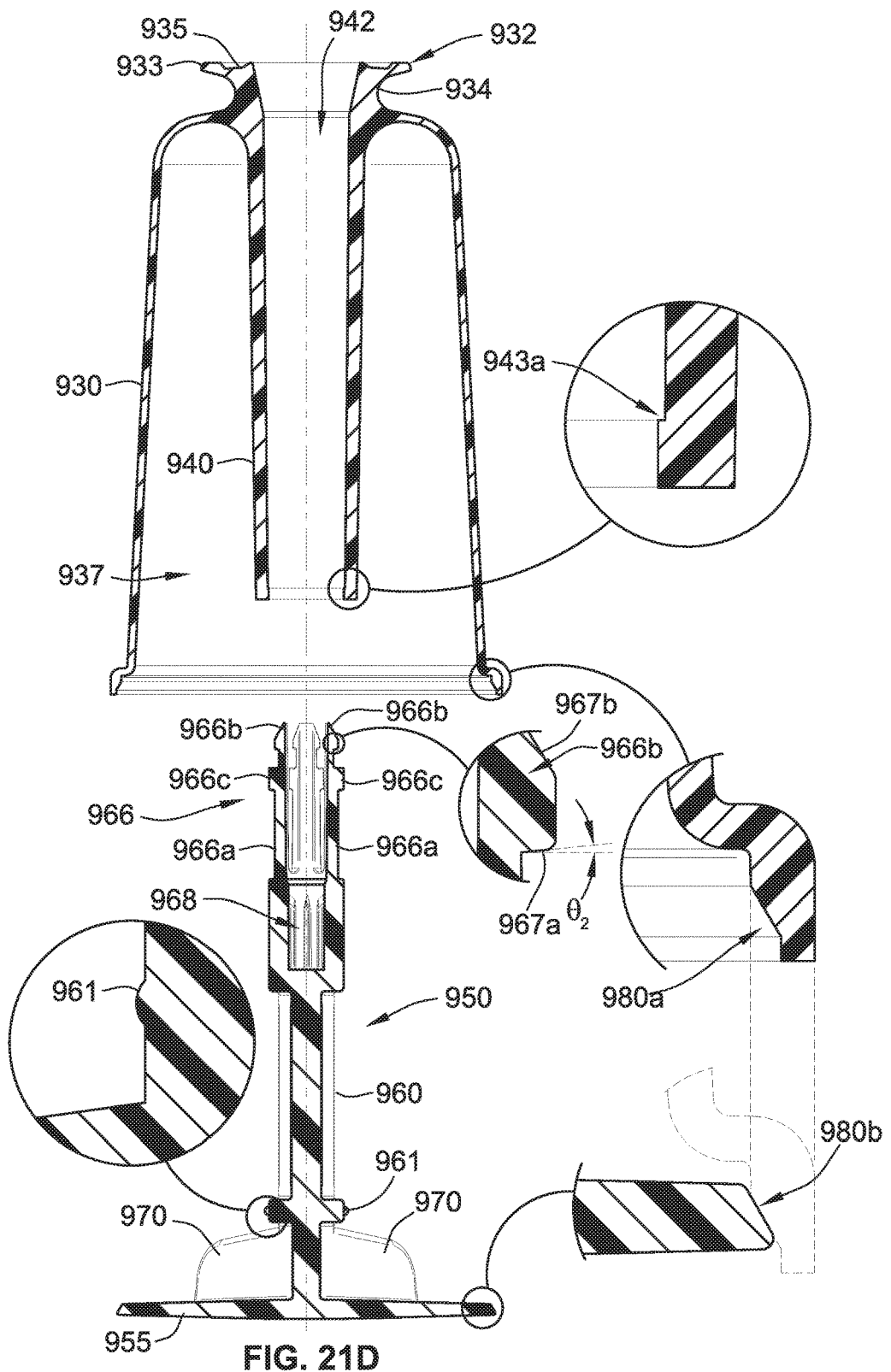
FIG. 21D is an exploded cross-sectional view of the module of FIG. 21A.

Another difference between the compounding module 920 and the compounding module 220 is that a sealing feature 980a,b (best shown in FIGS. 21D and 21F) of the compounding module 920 has a different configuration than the sealing feature 280a,b, as is evident by a comparison of FIGS. 21D and 21F (sealing feature 980a,b) with FIG. 7D (sealing feature 280a,b). Specifically, for example, the sealing feature 980a,b lacks a structure for holding the agitator 950 to the housing 930. Put another way, the sealing feature 980a,b does not aid in preventing the agitator 950 from falling from engagement with the housing 930. Rather, to prevent the agitator 950 from falling from engagement with the housing 930, the agitator 950 includes one or more circumferentially extending protrusions 961 (best shown in FIG. 21C) that mate with an undercut or notch 943a (best shown in FIG. 21D) formed in the inner bore 942 of the boss 940. While two protrusions 961 are shown, any number of protrusions 961 can be included, such as, for example, one protrusion, three protrusions, four protrusions, etc. Further, while the protrusions 961 are shown as having a particular circumferential length about the shaft 960 of the agitator 950, each protrusion 961 can have any circumferential length such that the protrusion 961 can engage with the undercut 943a to aid in holding the agitator 950 within the housing 930.

Another difference between the compounding module 920 and the compounding module 220 is that the mixing elements 970 (best shown in FIG. 21C) of the compounding module 920 have a different configuration than the mixing elements 270 (best shown in FIG. 7B), as is evident by a comparison of FIG. 21C (mixing elements 970) with FIG. 7B (mixing elements 270). Specifically, for example, the agitator 950 includes four mixing elements 970 as compared with the agitator 250, which includes six mixing elements 270. Further, the mixing elements 970 are coupled directly to and extend from the shaft 960 of the agitator 950 as best shown in FIG. 21C, whereas the mixing elements 270 are not directly coupled to the shaft 260 of the agitator 250 as best shown in FIG. 7B.

Another difference between the compounding module 920 and the compounding module 220 is that the collet 966

(best shown in FIGS. 21B and 21C) of the compounding module 920 has a different configuration than the collet 266 (best shown in FIGS. 7B and 7C), as is evident by a comparison of FIGS. 21B and 21C (collet 966) with FIGS. 7B and 7C (collet 266). Specifically, for example, the collet 966 includes four deflectable fingers 966a that are generally straight (e.g., angle of zero with respect to vertical), whereas the collet 266 includes four deflectable fingers 266a that are outwardly biased (e.g., a non-zero angle with respect to vertical). Further, each of the deflectable fingers 966a differs in configuration from the deflectable fingers 266a. Specifically, the deflectable fingers 966a each includes a hammer head-like member or a locking tab 966b (best shown in FIG. 21D) at an end thereof and a tab/protrusion 966c therebelow. Each of the locking tabs 966b is sized and shaped to engage with the translation locking feature 916 (FIG. 20C) of the sleeve portion 914c of the drive shaft 914 in the manner best shown in FIG. 21H. As best shown in FIG. 21D, each of the locking tabs 966b includes a generally downward facing surface 967a (with reference to the orientation shown in FIG. 21D) that is positioned at an angle, $\theta_2$, with respect to horizontal and a generally upward facing surface 967b. The angle, $\theta_2$, is generally between about five and thirty-five degrees, more preferably, the angle, θ2, is between about fourteen and twenty-four degrees, and even more preferably, the angle, θ2, is about nineteen degrees. Each of the tabs 966c includes a generally upward facing surface (with reference to the orientation shown in FIG. 21D) that is positioned to be engaged by the sleeve portion 914c of the drive shaft 914 during operation to move (e.g., translate) the agitator 950 relative to the housing 930 (e.g., in a downward direction) as described herein.

A method of engaging the compounding module 920 with the drive shaft 914 during operation of the beverage mixing system 200 is now described in relation generally to FIGS. 21E-21J. Only the compounding module 920, a portion of the drive shaft 914, and a portion of the coupling mechanism 910 are shown for ease of illustration in FIGS. 21E-21J. As shown in FIGS. 21E and 21F, the compounding module 920 is engaged with the coupling mechanism 910 and the drive shaft 914 is in the loading position ready to engage the compounding module 920. In this loading position, the sealing feature 980a,b is in the sealed/engaged position, the circumferentially extending protrusions 961 are engaged with the undercut 943a, and nutraceutical compound 922 is in the cavity 937 resting on the base 955 around the mixing elements 970.

When the drive shaft 914 moves (e.g., translates) vertically downward from the loading position (FIGS. 21E and 21F) to the engaged position (FIGS. 21G and 21H), the drive shaft 914 engages the shaft 960 of the agitator 950 such that the rotation locking feature 918 (FIG. 20A) of the drive shaft 914 non-rotationally engages the rotation locking feature 968 (FIG. 21D) of the shaft 960 of the agitator 950. Additionally, the collet 966 is engaged with the translation locking feature 916 of the drive shaft 914. In order for the collet 966 to engage the translation locking feature 916 of the drive shaft 914, as the drive shaft 914 is moved downward, the sleeve portion 914c engages the top of each of the deflectable fingers 966a. Specifically, the sleeve portion 914c engages the upward facing surfaces 967b of each of the locking tabs 966b, thereby causing the deflectable fingers 966a to deflect inward (e.g., towards a central axis of the agitator shaft 960) allowing the drive shaft 914 to continue moving downward. Eventually, the drive shaft 914 is moved into the engaged position shown in FIGS. 21G and 21H where the locking tabs 966b engage the translation locking feature 916.

Further downward movement of the drive shaft 914 causes the sleeve portion 914c to engage an upper surface of the tabs 966c protruding from each of the deflectable fingers 966a. Thus, downward movement of the drive shaft 914 results in a corresponding downward movement of the agitator 950. As the translation of the agitator 950 is locked to the drive shaft 914, the continued downward movement of the drive shaft 914 into the operating position (FIGS. 21I and 21J) also causes the base 955 of the agitator 950 to separate from the housing 930 and the one or more circumferentially extending protrusions 961 to disengage from the undercut 943a, thereby breaking the sealing feature 980a,b and permitting the nutraceutical compound 922 to fall from the cavity 937 and into a vessel (e.g., vessel 201, not shown in FIGS. 21A-21J) therebelow. With the agitator 950 and the drive shaft 914 in the operating position (FIGS. 21I and 21J), the drive shaft 914 can rotate thereby causing the agitator 950 to rotate such that the mixing elements 970 mix the nutraceutical compound 922 with a fluid (e.g., fluid 202 shown in FIG. 2) in the vessel (e.g., vessel 201 shown in FIG. 2).

Once the mixing is complete, the agitator 950 can be retracted into the housing 930 of the compounding module 920 for removal and disposal. In order to retract the agitator 950, the drive shaft 914 is moved vertically upward. As such, the generally upward facing surface 917 of the translation locking feature 916 of the sleeve portion 914c of the drive shaft 914 engages the generally downward facing surface 967a of the locking tab 966b. As the drive shaft 914 is moved vertically upward, the sleeve portion 914c exerts an upward force on the agitator 950, which causes the agitator 950 to also move vertically upward and back into the housing 930. Eventually, the sealing feature 980b of the agitator 950 mates with the sealing feature 980a of the housing 930 thereby preventing further upward movement of the agitator 950. As the drive shaft 914 continues to move upward, the generally upward facing surface 917 and the generally downward facing surface 967a slide relative to each other, thereby causing the deflectable fingers 966a to deflect inward (e.g., towards a central axis of the agitator shaft 960) allowing the drive shaft 914 to continue moving upward. The angles, $\theta_1$ and $\theta_2$, are designed such that the translation locking feature 916 of the sleeve portion 914c of the drive shaft 914 is able to exert enough of a generally upward force on the agitator 950 to retract the agitator 950 back into the housing 930, but also allow for sufficient decoupling/slipping therebetween (e.g., allowing the deflectable fingers 966a to deflect inward) when the agitator 950 is fully retracted and the drive shaft 914 needs to disengage the compounding module 920.

Now referring generally to FIGS. 22A-22I, an alternative compounding module 1020 is shown relative to the coupling mechanism 910 and the drive shaft 914. The compounding module 1020 is similar to the compounding module 920 (FIGS. 21A-21J) in that the compounding module 1020 includes a housing 1030 and an agitator 1050 that are the same as, or similar to, various aspects of the housing 930 and the agitator 950 described herein and shown in the drawings. Further, the housing 1030 includes a coupler 1032, a boss 1040 with an inner bore 1042 (best shown in FIG. 22C), and forms a cavity 1037 that is the same as, or similar to, coupler 932, the boss 940, and the cavity 937; and the agitator 1050 includes a base 1055 (best shown in FIGS. 22A, 22B), a shaft 1060 (best shown in FIGS. 22A, 22B), a collet 1066

(best shown in FIGS. 22A, 22B), and mixing elements 1070a, 1070b (best shown in FIG. 22B), that are the same as, or similar to, the base 955, the shaft 960, the collet 966, and the mixing elements 970, respectively. However, several differences exist between the compounding module 1020 and the compounding module 920, some of which are highlighted and described herein and others of which are discernible with reference to and comparison of the various figures of the compounding modules 1020, 920.

Figures 22A, 22B:
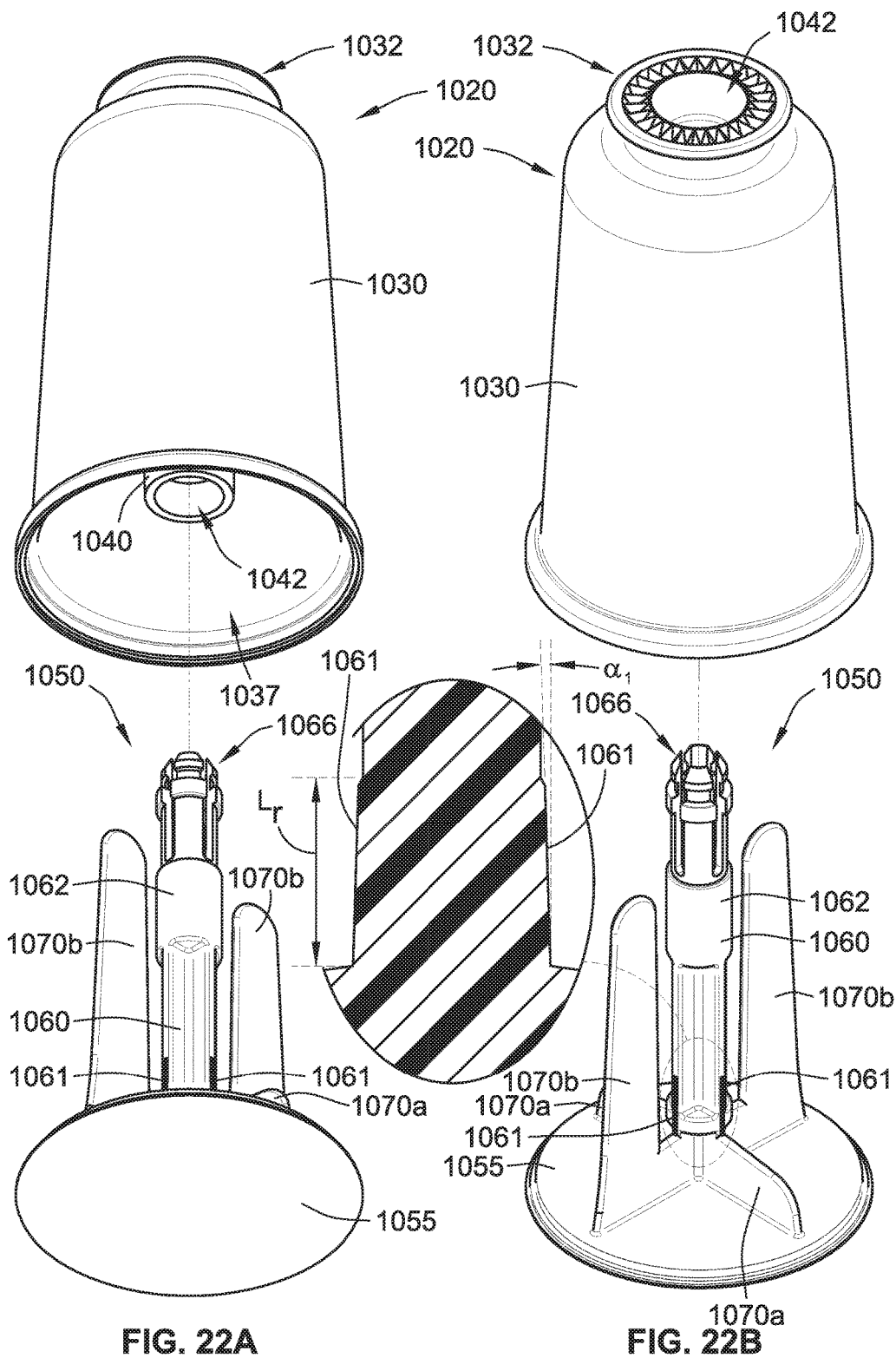
FIG. 22A is an exploded perspective view of a module according to some implementations of the present disclosure.
FIG. 22B is an exploded perspective view of the module of FIG. 22A.
Figure 22C:
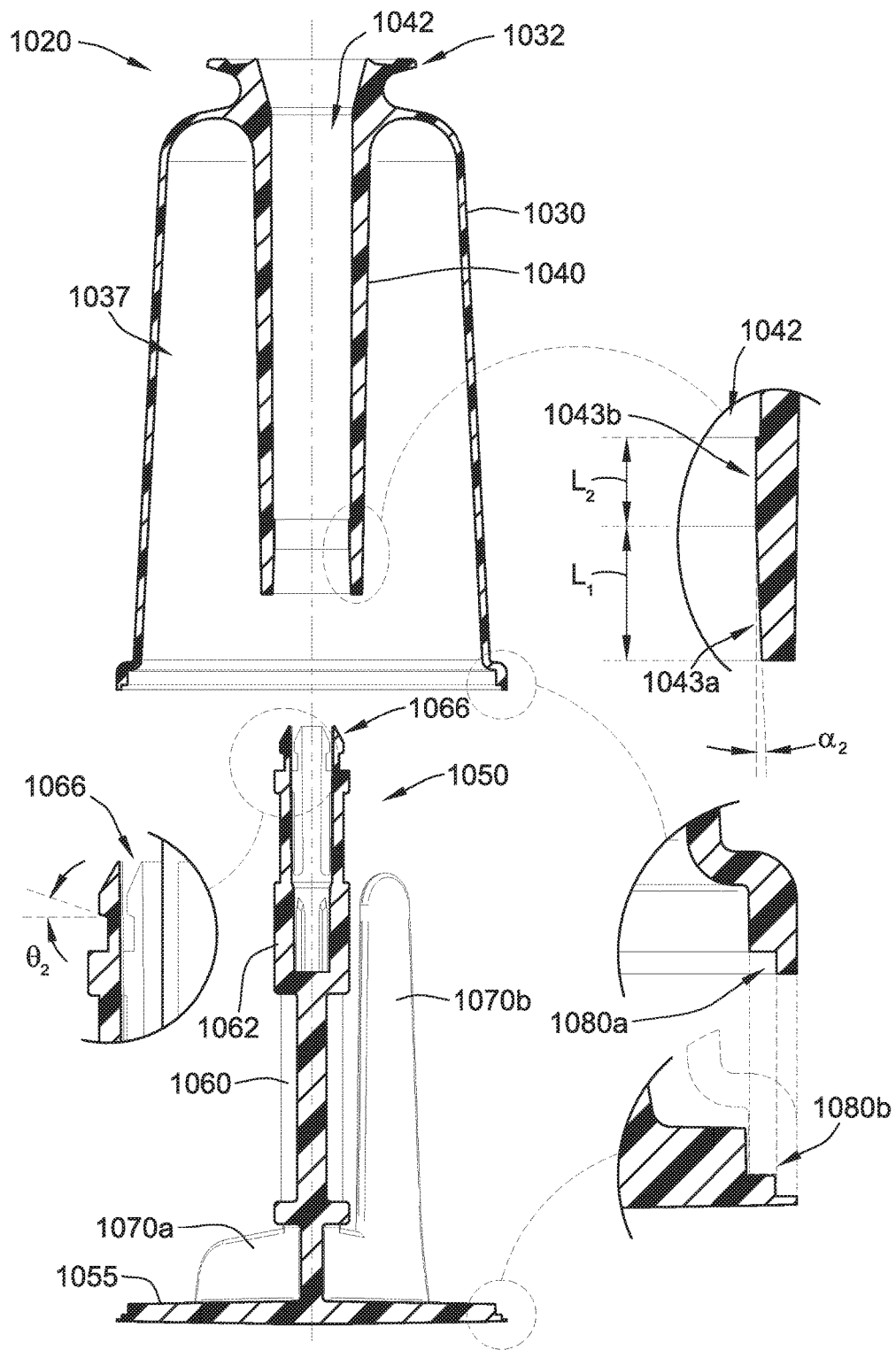
FIG. 22C is an exploded cross-sectional view of the module of FIG. 22A.

Specifically, for example, a difference between the compounding module 1020 and the compounding module 920 is that a sealing feature 1080a,b (best shown in FIGS. 22C and 22E) of the compounding module 1020 has a different configuration than the sealing feature 980a,b, as is evident by a comparison of FIGS. 22C and 22E (sealing feature 1080a,b) with FIGS. 21D and 21F (sealing feature 980a,b). Specifically, for example, the sealing feature 1080a,b includes a stair-step feature increasing a path that nutraceutical compound 1022 must take to escape from the cavity 1037 relative to the sealing feature 980a,b.

Another difference between the compounding module 1020 and the compounding module 920 is that instead of the compounding module 1020 including protrusions 961 to prevent the agitator 1050 from falling from engagement with the housing 1030, the agitator 1050 of the compounding module 1020 includes ribs 1061 (best shown in FIG. 22B) that mate with the inner bore 1042 of the boss 1040 as best shown in FIG. 22E. The ribs 1061 can also be referred to as crush ribs as the ribs 1061 can be designed to deform and/or crush when in the engaged position (FIG. 22E). Each of the ribs 1061 can have a tapered profile such that a front surface of the rib 1061 is at an angle, $\alpha_1$, with respect to vertical as shown in FIG. 22B. Such a tapered profile of the ribs 1061 can aid in the mating of the agitator 1050 with the housing 1030. The angle, $\alpha_1$, is generally between about 0.05 and ten degrees, more preferably, the angle, $\alpha_1$, is between about 0.05 and one degree, and even more preferably, the angle, $\alpha_1$, is between about 0.1 and 0.5 degrees. While four ribs 1061 are shown, any number of ribs 1061 can be included, such as, for example, one rib, two ribs, three ribs, etc. Further, while the ribs 1061 are shown as having a particular axial length, $L_r$, along the shaft 1060 of the agitator 1050, each rib 1061 can have any axial length such that the rib 1061 can engage with the inner bore 1042 of the boss 1040 to aid in holding the agitator 1050 within the housing 1030.

Further, as best shown in FIG. 22C, a lower portion of the inner bore 1042 of the boss 1040 has a different configuration than the lower portion of the inner bore 942 of the boss 940, as is evident by a comparison of FIG. 22C (inner bore 1042) with FIG. 21D (inner bore 942). Specifically, the inner bore 1042 includes a rib-tapered section 1043a having a particular axial length, $L_1$, along the inner bore 1042 of the boss 1040. The rib-tapered section 1043a has a tapered profile at an angle, $\alpha_2$, with respect to vertical as shown in FIG. 22C. Such a tapered profile of the rib-tapered section 1043a can aid in the mating of the agitator 1050 with the housing 1030. The angle, $\alpha_2$, is generally between about 0.05 and ten degrees, more preferably, the angle, $\alpha_2$, is between about 0.05 and one degree, and even more preferably, the angle, $\alpha_2$, is between about 0.1 and 0.5 degrees. The angle, $\alpha_2$, can be the same as, or different from the angle, $\alpha_1$.

Additionally, the inner bore 1042 includes a bearing section 1043b having a particular axial length, $L_2$, along the inner bore 1042 of the boss 1040. The bearing section 1043b has a generally vertical profile (e.g., an angle of zero relative to vertical) as shown in FIG. 22C. The bearing section 1043b provides a bearing surface for at least a portion of the agitator 1050 to bear against during rotation of the agitator 1050 during operation, thereby aiding the stability of the agitator 1050 during rotation (e.g., preventing and/or minimizing wobbling of the agitator 1050). For example, the shaft 1060 of the agitator 1050 includes a generally cylindrical portion 1062 that bears on the bearing section 1043b as best shown in FIGS. 22H and 22I during operation (e.g., rotation of the agitator 1050).

Another difference between the compounding module 1020 and the compounding module 920 is that instead of the agitator 1050 including four equally sized and shaped mixing elements 970, the agitator 1050 includes a pair first of mixing elements 1070a that are the same as, or similar to, the mixing elements 970 and a second pair of mixing elements 1070b that have a different size and shape than the mixing elements 1070a. Generally, the mixing elements 1070b have a portion that extends generally vertical further into the cavity 1037 as compared with the mixing elements 1070a, 970. This added height on the mixing elements 1070b aids in dislodging the nutraceutical compound 1022 from the cavity 1037 when being moved downward by the drive shaft 914. While the length of the mixing elements 1070b is shown in the drawings as being about seventy-five percent of the length of the agitator shaft 1060, the mixing elements 1070b can have a length that is about twenty-five percent of the length of the agitator shaft 1060, about thirty percent of the length of the agitator shaft 1060, about fifty percent of the length of the agitator shaft 1060, about ninety percent of the length of the agitator shaft 1060, etc.

A method of engaging the compounding module 1020 with the drive shaft 914 during operation of the beverage mixing system 200 is now described in relation generally to FIGS. 22D-22I. Only the compounding module 1020, a portion of the drive shaft 914, and a portion of the coupling mechanism 910 are shown for ease of illustration in FIGS. 22D-22I. As shown in FIGS. 22D and 22E, the compounding module 1020 is engaged with the coupling mechanism 910 and the drive shaft 914 is in the loading position ready to engage the compounding module 1020. In this loading position, the sealing feature 1080a,b is in the sealed/engaged position, the ribs 1061 are engaged with the rib-tapered section 1043a and/or the bearing section 1043b, and the nutraceutical compound 1022 is in the cavity 1037 resting on the base 1055 around the mixing elements 1070a, 1070b.

When the drive shaft 914 moves (e.g., translates) vertically downward from the loading position (FIGS. 22D and 22E) to the engaged position (FIGS. 22F and 22G), the drive shaft 914 engages the shaft 1060 of the agitator 1050 in the same, or similar, manner as described herein for the compounding module 920. As the translation of the agitator 1050 is locked to the drive shaft 914, continued downward movement of the drive shaft 914 into the operating position (FIGS. 22H and 22I) also causes the base 1055 of the agitator 1050 to separate from the housing 1030 and the ribs 1061 to disengage from the rib-tapered section 1043a and/or the bearing section 1043b, thereby breaking the sealing feature 1080a,b and permitting the nutraceutical compound 1022 to fall from the cavity 1037 and into a vessel (e.g., vessel 201, not shown in FIGS. 22A-22I) therebelow. With the agitator 1050 and the drive shaft 914 in the operating position (FIGS. 22H and 22I), the drive shaft 914 can rotate thereby causing the agitator 1050 to rotate such that the mixing elements 1070a, 1070b mix the nutraceutical compound 1022 with a fluid (e.g., fluid 202 shown in FIG. 2) in the vessel (e.g., vessel 201 shown in FIG. 2). As the mixing elements 1070b remain at least partially within the cavity 1037 when the drive shaft 914 is in the operating position (FIGS. 22H and 22I), in some implementations, the rotating of the mixing elements 1070b can aid in the removal of the nutraceutical compound 1022 from the cavity 1037. Once the mixing is complete, the agitator 1050 can be retracted into the housing 1030 of the compounding module 1020 for removal and disposal in the same, or similar, manner as described herein for the compounding module 920.

Now referring generally to FIGS. 23A-23F, an alternative compounding module 1120 is shown relative to the coupling mechanism 910, the drive shaft 914, and a knife base 1107. The compounding module 1120 is similar to the compounding module 920 (FIGS. 21A-21J) in that the compounding module 1120 includes a housing 1130 and an agitator 1150 that are the same as, or similar to, various aspects of the housing 930 and the agitator 950 described herein and shown in the drawings. Further, the housing 1130 includes a coupler 1132, a boss 1140 with an inner bore 1142, and forms a cavity 1137 that is the same as, or similar to, coupler 932, the boss 940, and the cavity 937; and the agitator 1150 includes a base 1155 (best shown in FIGS. 23A, 23B), a shaft 1160 (best shown in FIGS. 23A, 23B), a collet 1166 (best shown in FIGS. 23A, 23B), mixing elements 1170 (best shown in FIG. 23A), and one or more circumferentially extending protrusions 1161 that are the same as, or similar to, the base 955, the shaft 960, the collet 966, the mixing elements 970, and the one or more circumferentially extending protrusions 961, respectively. However, several differences exist between the compounding module 1120 and the compounding module 920, some of which are highlighted and described herein and others of which are discernible with reference to and comparison of the various figures of the compounding modules 1120, 920.

Figure 23C:
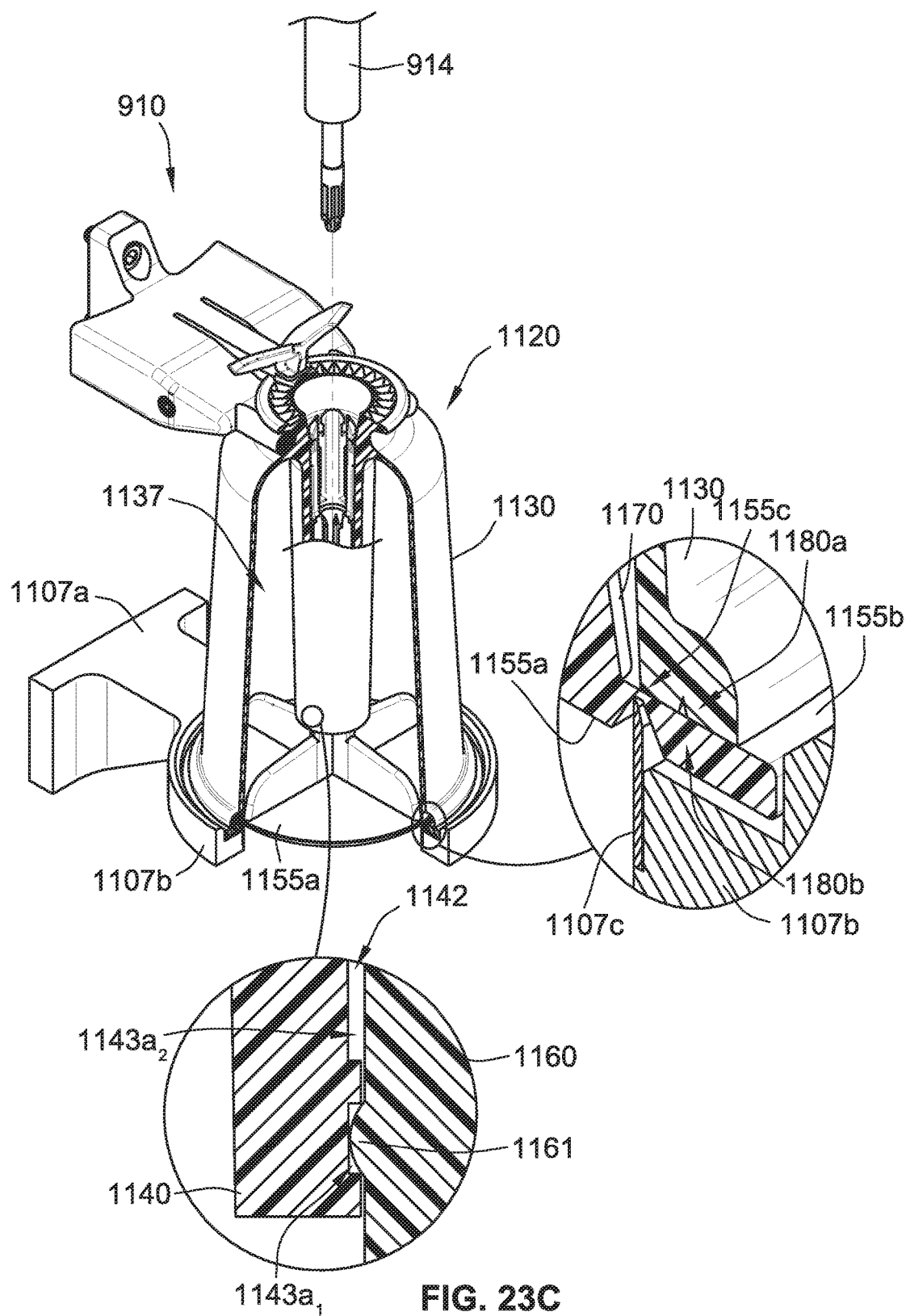
FIG. 23C is a partial perspective view of the module of FIG. 23A in an assembled configuration coupled to the coupling mechanism of FIG. 23A and positioned on the knife base of FIG. 23A relative to a portion of the drive shaft of FIG. 20A in a loading position with a portion of the module removed to illustrate an interior thereof.
Figure 23D:
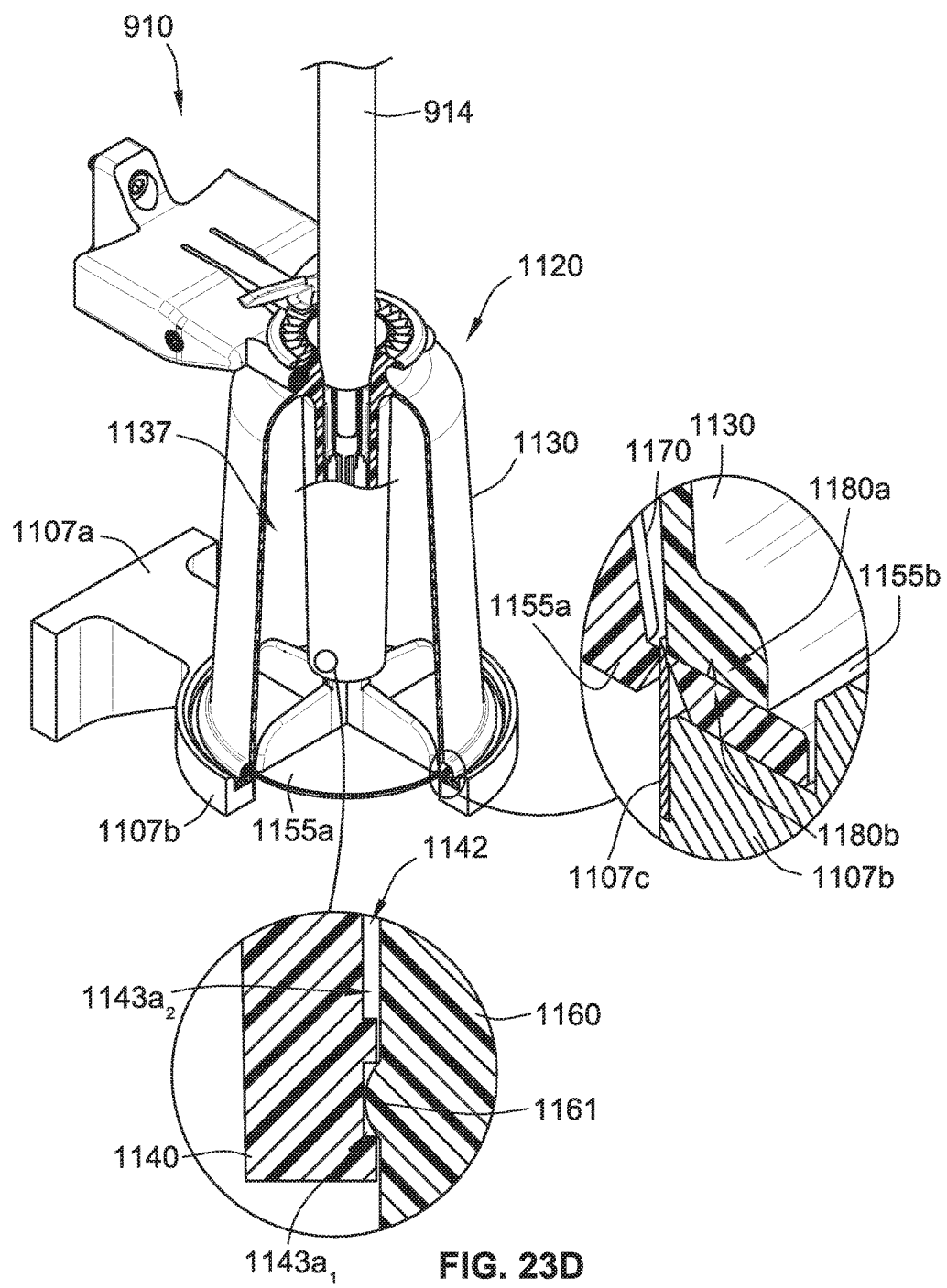
FIG. 23D is a partial perspective view of the module of FIG. 23A in an assembled configuration coupled to the coupling mechanism of FIG. 23A and positioned on the knife base of FIG. 23A relative to a portion of the drive shaft of FIG. 20A in an engaged position with a portion of the module removed to illustrate an interior thereof.
Figure 23E:
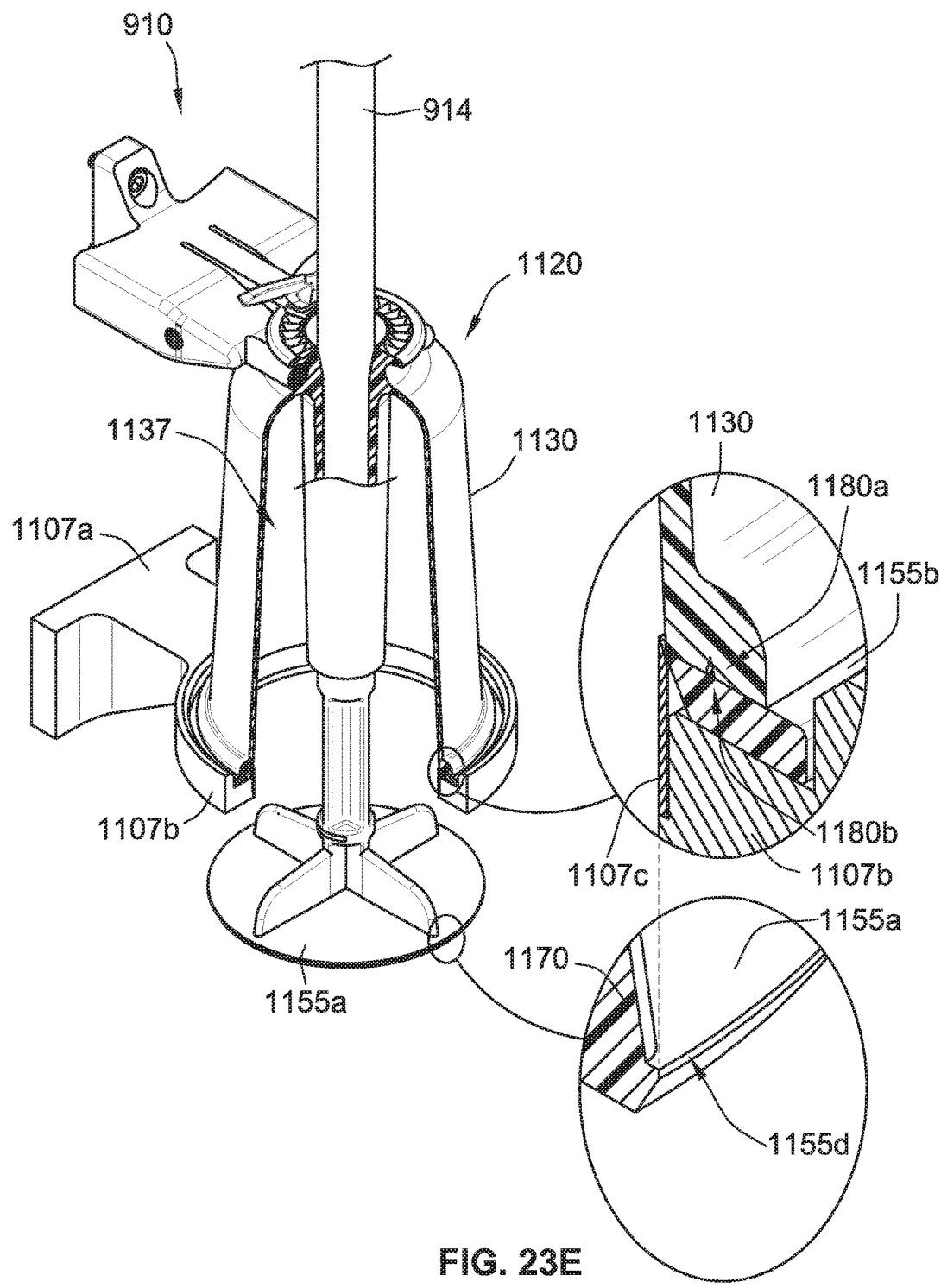
FIG. 23E is a partial perspective view of the module of FIG. 23A in an assembled configuration coupled to the coupling mechanism of FIG. 23A and positioned on the knife base of FIG. 23A relative to a portion of the drive shaft of FIG. 20A in an operating position with a portion of the module removed to illustrate an interior thereof.

The knife base 1107 is for piercing and/or cutting/slicing/tearing a portion of the base 1155 of the agitator 1150, thereby breaking a seal 1180a,b between the agitator 1150 and the housing 1130 formed by, for example, welding (e.g., sonically welding) a portion of the base 1155 to a portion of the housing 1130. Specifically, as best shown in FIG. 23C, an end the housing 1130 includes a sealing feature 1180a, which has an energy director receiving portion and an outer/perimeter edge of the base 1155 includes a sealing feature 1180b, which has an energy director that mates with the energy director receiving portion. When energy is applied thereto (e.g., sonic energy, heat energy, etc.), the base 1155 becomes welded to the housing 1130, thereby forming the sealing feature 1180a,b (best shown in FIG. 23C).

The agitator base 1155 has a main portion 1155a, an outer removable portion 1155b, and a thinned portion 1155c therebetween. The thinned portion 1155c holds the main portion 1155a to the outer removable portion 1155b prior to being cut using the knife base 1107. A ratio of a thickness of the thinned portion 1155c to a thickness of the main portion 1155a and the outer removable portion 1155b can be between 0.1 and 0.9, more preferably between 0.1 and 0.3, such that the knife base 1107 can readily cut through the thinned portion 1155c during operation. In some implementations, the thinned portion 1155c has a thickness between about ten thousandths of an inch and about fifty thousandths of an inch.

The knife base 1107 includes a base portion 1107a, a knife supporting portion 1107b, and a knife 1107c. The base portion 1107a is coupled to a housing of a beverage mixing system (e.g., body 104 of beverage mixing system 100). The base portion 1107a can be rigidly coupled to the housing in a fixed relationship or dynamically coupled to the housing such that the base portion 1107a is movable (e.g., upward or downward) relative to the housing of the beverage mixing system. The knife supporting portion 1107b is integral with and/or coupled to the base portion 1107a and provides a support for the knife 1107c, which is coupled thereto. The cutting profile of the knife 1107c can be beveled, double bevel, etc. In some implementations, the knife 1107c includes one or more barbs or pointing protrusions to aid in the starting of the cutting of the thinned portion 1155c.

Figure 23F:
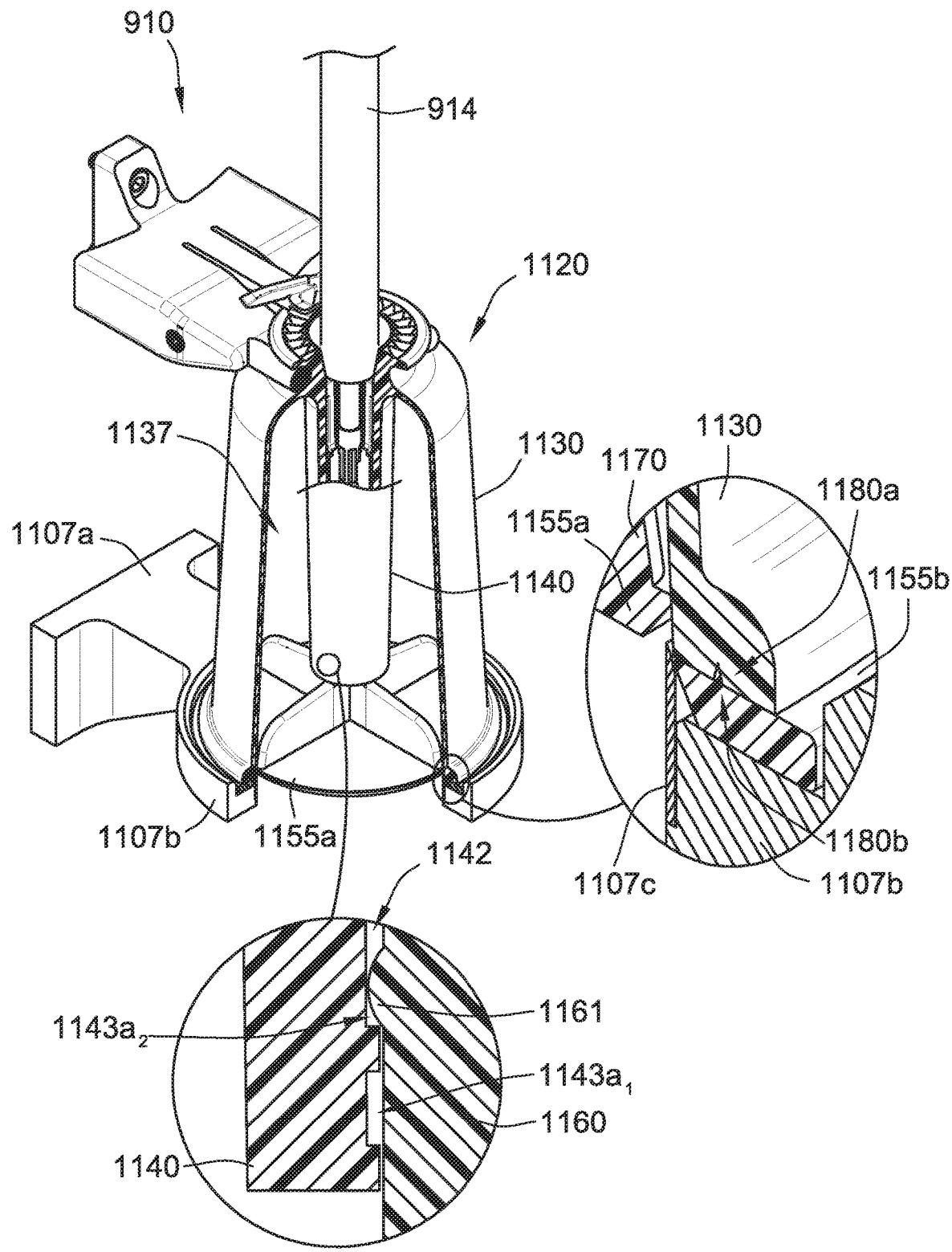
FIG. 23F is a partial perspective view of the module of FIG. 23A in an assembled configuration coupled to the coupling mechanism of FIG. 23A and positioned on the knife base of FIG. 23A relative to a portion of the drive shaft of FIG. 20A in a retracted position with a portion of the module removed to illustrate an interior thereof.

A difference between the compounding module 1120 and the compounding module 920 is that, as best shown in FIG. 23C, a lower portion of the inner bore 1142 of the boss 1140 has a different configuration than the lower portion of the inner bore 942 of the boss 940, as is evident by a comparison of FIG. 23C (inner bore 1142) with FIG. 21D (inner bore 942). Specifically, the inner bore 1142 includes a dual undercut or dual notch feature $1143a_1$, $1143a_2$. Each of the undercuts or notches $1143a_1$, $1143a_2$, is designed to be engaged by the one or more circumferentially extending protrusions 1161, thus, capable of holding the agitator 1150 at one of two different vertical locations. When the compounding module 1120 is in an assembled configuration prior to being cut by the knife base 1107 (FIG. 23C), the one or more circumferentially extending protrusions 1161 engage the first undercut $1143a_1$. However, after the base 1155 is cut and after operation (e.g., mixing of a beverage), the agitator 1150 can be retracted into the housing 1130 such that the one or more circumferentially extending protrusions 1161 engage the second undercut $1143a_2$ (FIG. 23F). Retracting the agitator 1150 further into the housing 1130 can aid in causing a cut edge 1155d (FIG. 23E) of the base 1155 to seal with an inner wall of the housing 1130, thereby preventing or aiding in preventing any residue (water, etc.) on the agitator 1150 and/or the housing 1130 from leaking out when disposing of the used compounding module 1120.

A method of engaging the compounding module 1120 with the drive shaft 914 during operation of the beverage mixing system 200 is now described in relation generally to FIGS. 23C-23F. Only the compounding module 1120, a portion of the drive shaft 914, a portion of the coupling mechanism 910, and the knife base 1107 are shown for ease of illustration in FIGS. 23C-23F. As shown in FIG. 23C, the compounding module 1120 is engaged with the coupling mechanism 910 and resting on the knife base 1107. Further, the drive shaft 914 is in the loading position ready to engage the compounding module 1120. In this loading position, the sealing feature 1180a,b is in the sealed/engaged position, the one or more circumferentially extending protrusions 1161 are engaged with the first undercut $1143a_1$, and nutraceutical compound (not shown) is in the cavity 1137 resting on the base 1155 around the mixing elements 1170.

When the drive shaft 914 moves (e.g., translates) vertically downward from the loading position (FIG. 23C) to the engaged position (FIG. 23D), the drive shaft 914 engages the shaft 1160 of the agitator 1150 in the same, or similar, manner as described herein for the compounding module 920. As the translation of the agitator 1150 is locked to the drive shaft 914, continued downward movement of the drive shaft 914 into the operating position (FIG. 23E) causes the knife 1107c to engage and cut through the thinned portion 1155c of the base 1155 (FIG. 23D), thereby breaking the sealing feature 1180a,b and separating the agitator 1150 from the housing 1130. Additionally, the continued downward movement of the drive shaft 914 into the operating position (FIG. 23E) causes the one or more circumferentially extending protrusions 1161 to disengage from the first undercut $1143a_1$. As such, the nutraceutical compound (not shown) is free to fall from the cavity 1137 and into a vessel (e.g., vessel 201, not shown in FIGS. 23A-23F) therebelow. With the agitator 1150 and the drive shaft 914 in the operating position (FIG. 23E), the drive shaft 914 can rotate thereby causing the agitator 1150 to rotate such that the mixing elements 1170 mix the nutraceutical compound (not shown) with a fluid (e.g., fluid 202 shown in FIG. 2) in the vessel (e.g., vessel 201 shown in FIG. 2).

Once the mixing is complete, the agitator 1150 can be retracted into the housing 1130 of the compounding module 1120 for removal and disposal as described herein. Specifically, in some implementations, the agitator 1150 is retracted such that the one or more circumferentially extending protrusions 1161 engage the second undercut 1143$a_2$ and such that the cut edge 1155*d* of the base 1155 seals with the inner wall of the housing 1130.

Now referring generally to FIGS. 24A-24H, an alternative compounding module 1220 is shown relative to the coupling mechanism 910, the drive shaft 914, and a snap-on knife base 1207. The compounding module 1220 is similar to the compounding modules 920, 1120 (FIGS. 21A-21J; FIGS. 23A-23F) in that the compounding module 1220 includes a housing 1230 and an agitator 1250 that are the same as, or similar to, various aspects of the housings 930, 1130 and the agitators 950, 1150 described herein and shown in the drawings. Further, the housing 1230 includes a coupler 1232, a boss 1240 with an inner bore 1242, forms a cavity 1237, and includes a sealing feature 1280*a* that is the same as, or similar to, the coupler 932, the boss 940, the inner bore 1142, the cavity 937, and the sealing feature 1180*a*; and the agitator 1250 includes a base 1255 with a main portion 1255*a*, an outer removable portion 1255*b*, and a thinned portion 1255*c* therebetween (best shown in FIGS. 24A, 24B), a shaft 1260 (best shown in FIGS. 24A, 24B), a collet 1266 (best shown in FIGS. 24A, 24B), mixing elements 1270 (best shown in FIG. 24A), one or more circumferentially extending protrusions 1261, and a sealing feature 1280*b* that are the same as, or similar to, the base 1155 with the main portion 1155*a*, the outer removable portion 1155*b*, and the thinned portion 1155*c* therebetween, the shaft 960, the collet 966, the mixing elements 970, the one or more circumferentially extending protrusions 961, and the sealing feature 1180*b*, respectively. However, several differences exist between the compounding module 1220 and the compounding modules 920, 1120 some of which are highlighted and described herein and others of which are discernible with reference to and comparison of the various figures of the compounding modules 1220, 1120, 920.

Like, the knife base 1107, the snap-on knife base 1207 is for piercing and/or cutting/slicing/tearing a portion of the base 1255 of the agitator 1250, thereby breaking a seal 1280*a,b* between the agitator 1250 and the housing 1230 formed by, for example, welding (e.g., sonically welding) a portion of the base 1255 to a portion of the housing 1230. The snap-on knife base 1207 differs from the knife base 1107 in that the snap-on knife base 1207 is portable and not coupled to a beverage mixing system. In some implementations, the each compounding module 1220 includes its own snap-on knife base 1207. Alternatively, the snap-on knife base 1207 can be reused (e.g., after washing) with multiple compounding modules 1220.

The snap-on knife base 1207 includes a body portion 1207*a*, a plurality of locking tabs 1207*b*, and a knife 1207*c*. The body portion 1207*a* and the plurality of locking tabs 1207*b* are integral/monolithic. Additionally, the body portion 1207*a* provides a support for the knife 1207*c*, which is coupled thereto. As shown, the knife 1207*c* includes one or more barbs or pointing protrusions 1207*d* that aid in the starting of the cutting of the thinned portion 1255*c*. In some implementations, the body portion 1207*a*, the plurality of locking tabs 1207*b*, and the knife 1207*c* are made of the same material and/or are monolithic (i.e., the same part). In some implementations, the snap-on knife base 1207 is made of the same material as the agitator 1250 and/or the housing 1230.

Figure 24A:
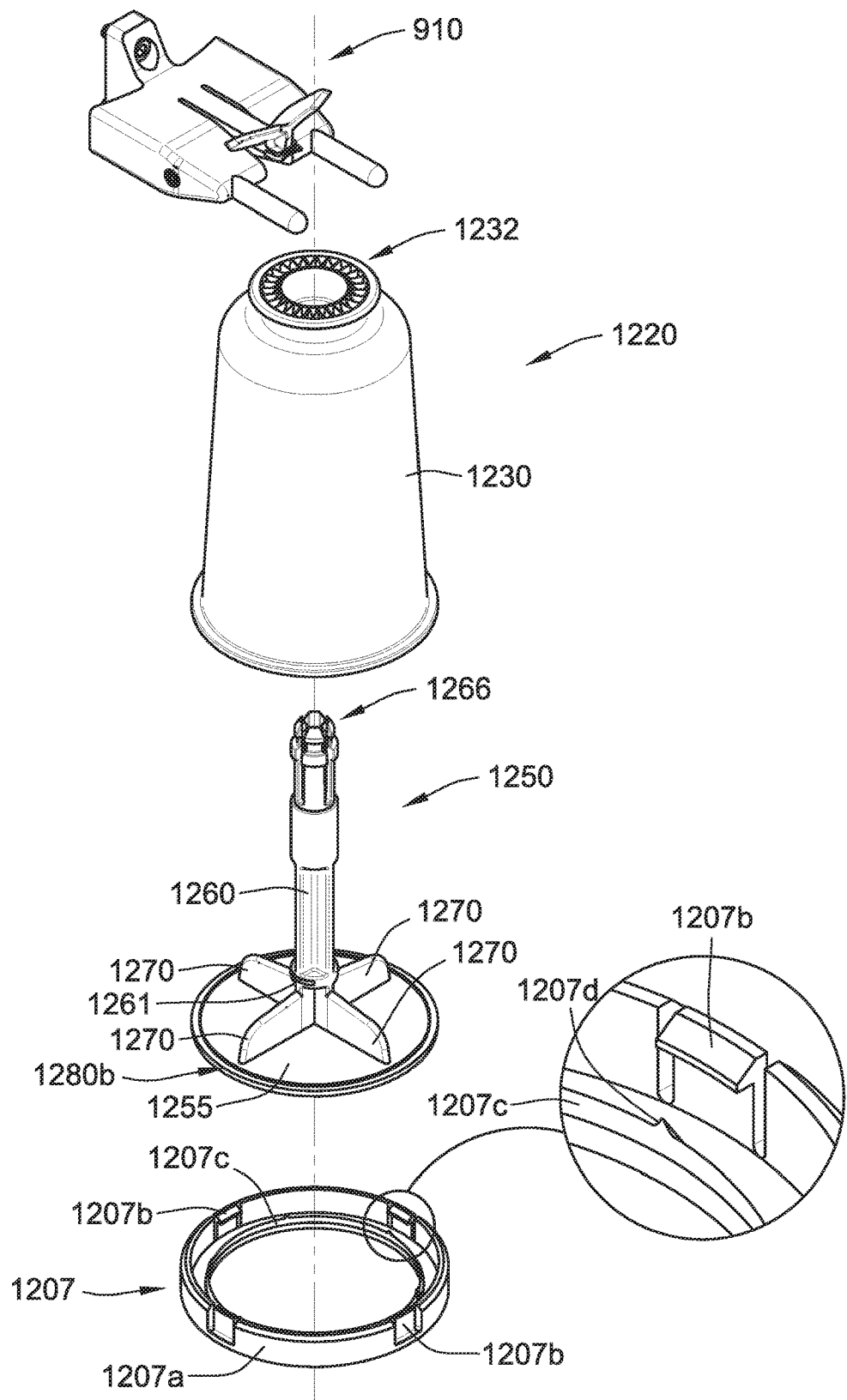
FIG. 24A is an exploded perspective view of a module including a snap-on knife base relative to a coupling mechanism a beverage mixing system according to some implementations of the present disclosure.
Figure 24B:
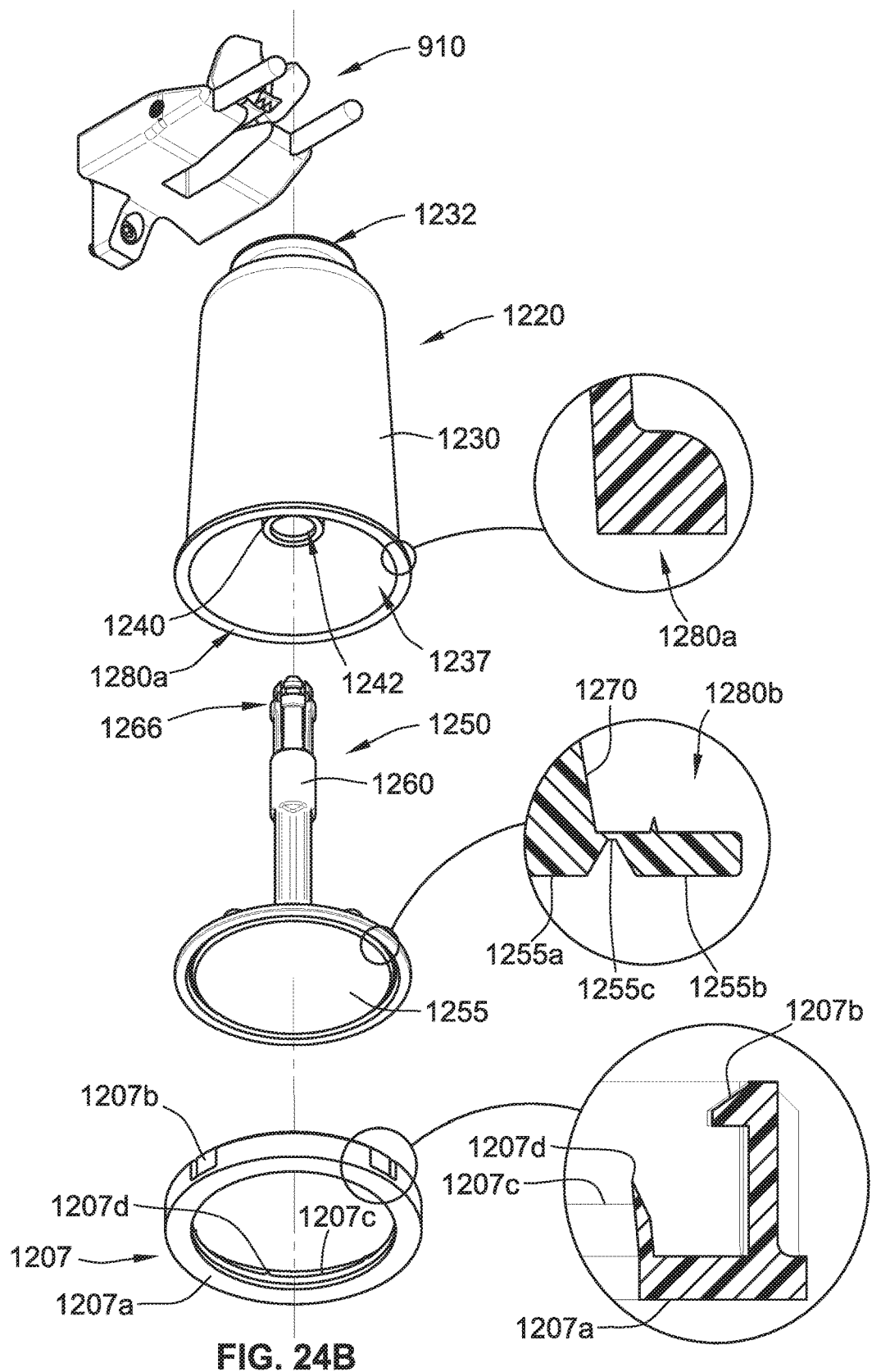
FIG. 24B is an exploded perspective view of the module of FIG. 24A relative to the coupling mechanism and the knife base of FIG. 24A.
Figure 24C:
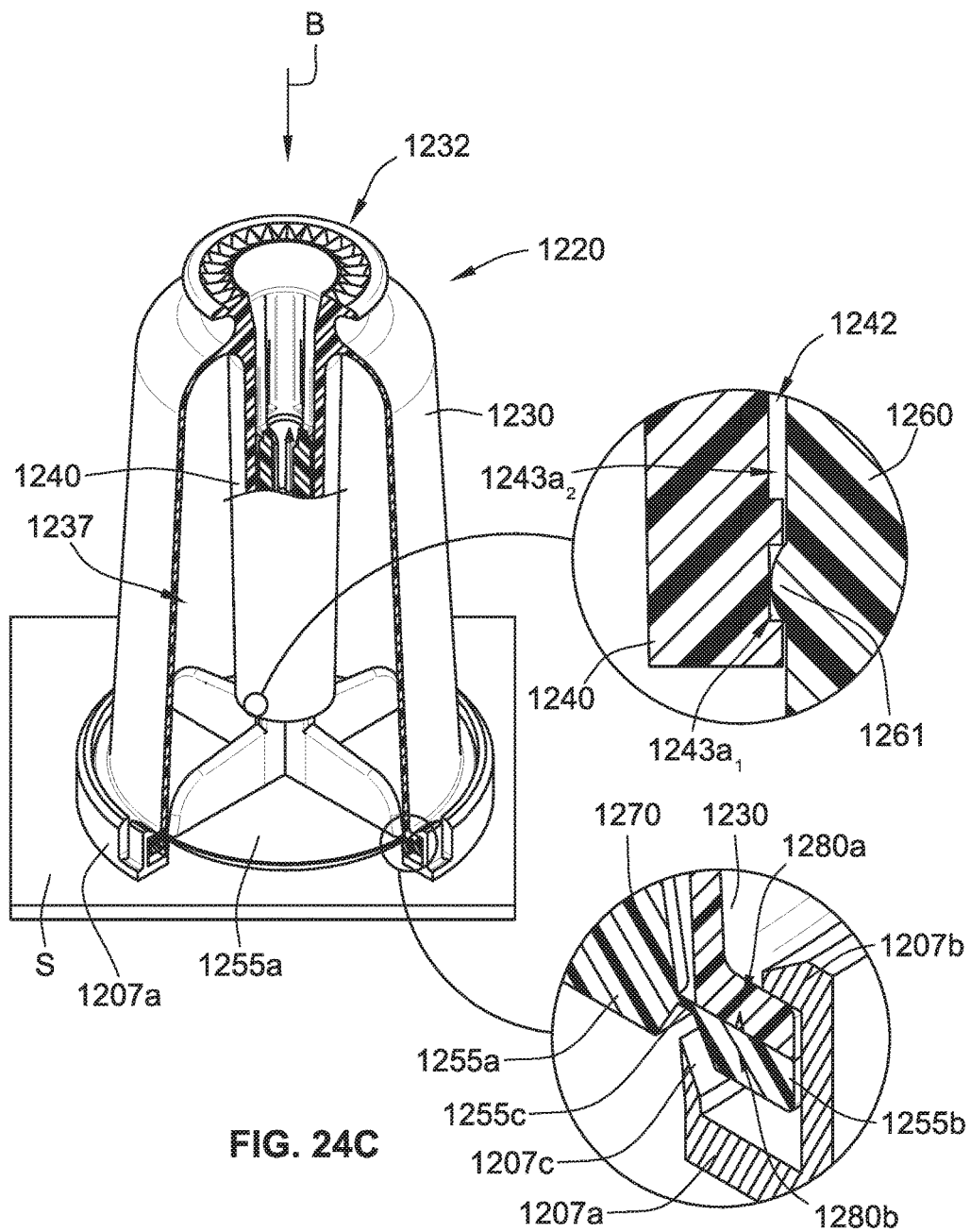
FIG. 24C is a partial perspective view of the module of FIG. 24A in an assembled configuration resting on a surface in a pre-cut position.

A method of engaging the compounding module 1220 with the drive shaft 914 during operation of the beverage mixing system 200 is now described in relation generally to FIGS. 24C-24H. Only the compounding module 1220, a portion of the drive shaft 914, a portion of the coupling mechanism 910, and the snap-on knife base 1207 are shown for ease of illustration in FIGS. 24C-24H. As shown in FIG. 24C, the snap-on knife base 1207 is coupled to a bottom edge or rim of the compounding module 1220 such that each of the locking tabs 1207*b* hold the snap-on knife base 1207 to the compounding module 1220 and such that the knife 1207*c* is positioned adjacent to the thinned section 1255*c* of the base 1255. In this position (FIG. 24C), the sealing feature 1280*a,b* is in the sealed/engaged position, the one or more circumferentially extending protrusions 1261 are engaged with a first undercut 1243$a_1$, and nutraceutical compound (not shown) is in the cavity 1237 resting on the base 1255 around the mixing elements 1270.

Figure 24D:
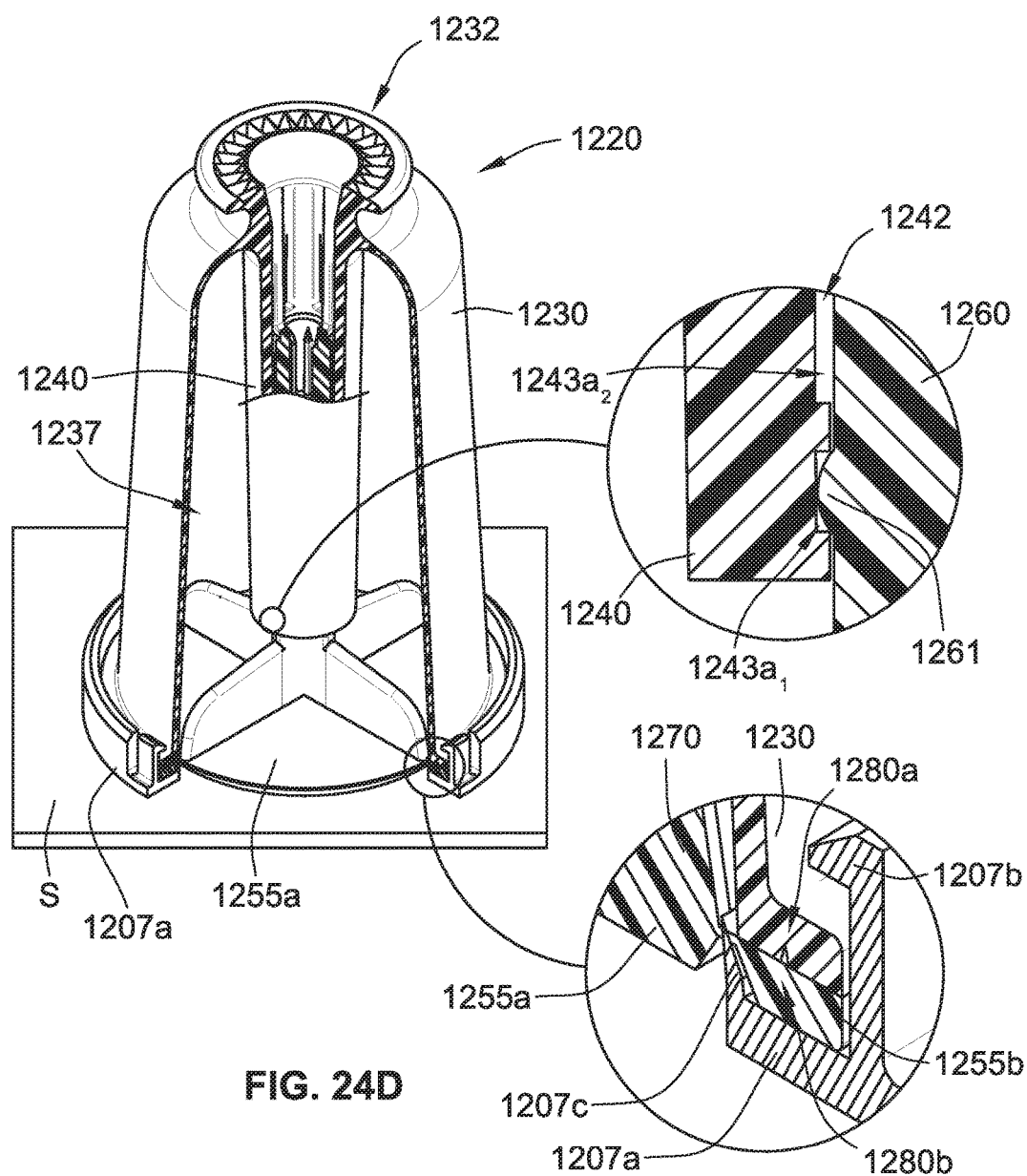
FIG. 24D is a partial perspective view of the module of FIG. 24A in an assembled configuration resting on the surface in a cut or pierced position.

To cut the thinned section 1255*c* and at least begin to separate the agitator 1250 from the housing 1230, the compounding module 1220, with the snap-on knife base 1207 attached, is placed on, for example, a surface S and a force is exerted in the direction of arrow B (FIG. 24C). The force is enough to cause the knife 1207*c* to pierce at least a portion of the thinned section 1255*c* as shown in FIG. 24D. At this point, the agitator 1255 may or may not be completely separated from the housing 1230.

Figure 24E:
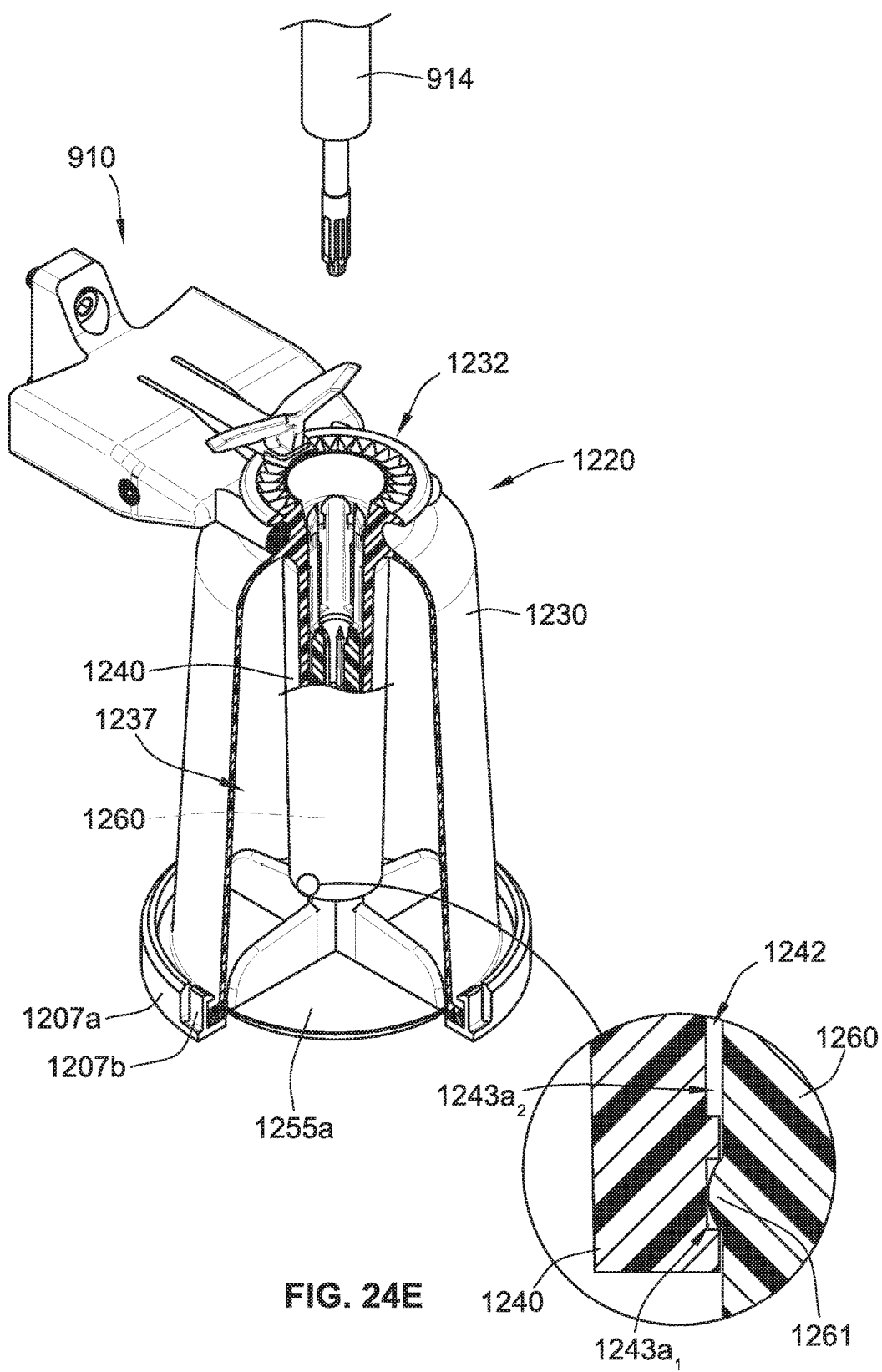
FIG. 24E is a partial perspective view of the module of FIG. 24D in the assembled, cut position coupled to the coupling mechanism and snap-on knife base of FIG. 24A relative to a portion of the drive shaft of FIG. 20A in a loading position with a portion of the module removed to illustrate an interior thereof.
Figure 24F:
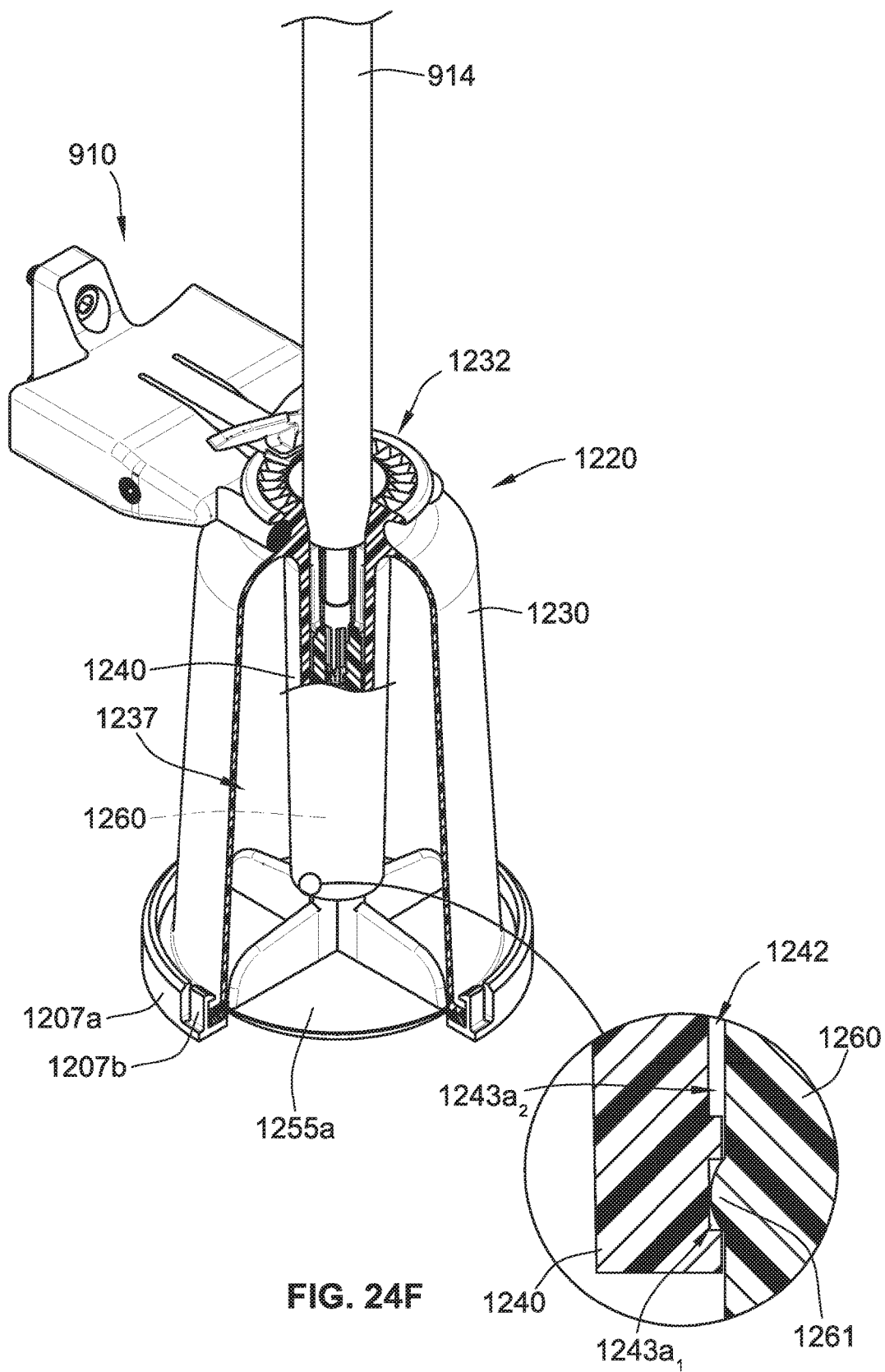
FIG. 24F is a partial perspective view of the module of FIG. 24D in the assembled, cut position coupled to the coupling mechanism and snap-on knife base of FIG. 24A relative to a portion of the drive shaft of FIG. 20A in an engaged position with a portion of the module removed to illustrate an interior thereof.
Figure 24G:
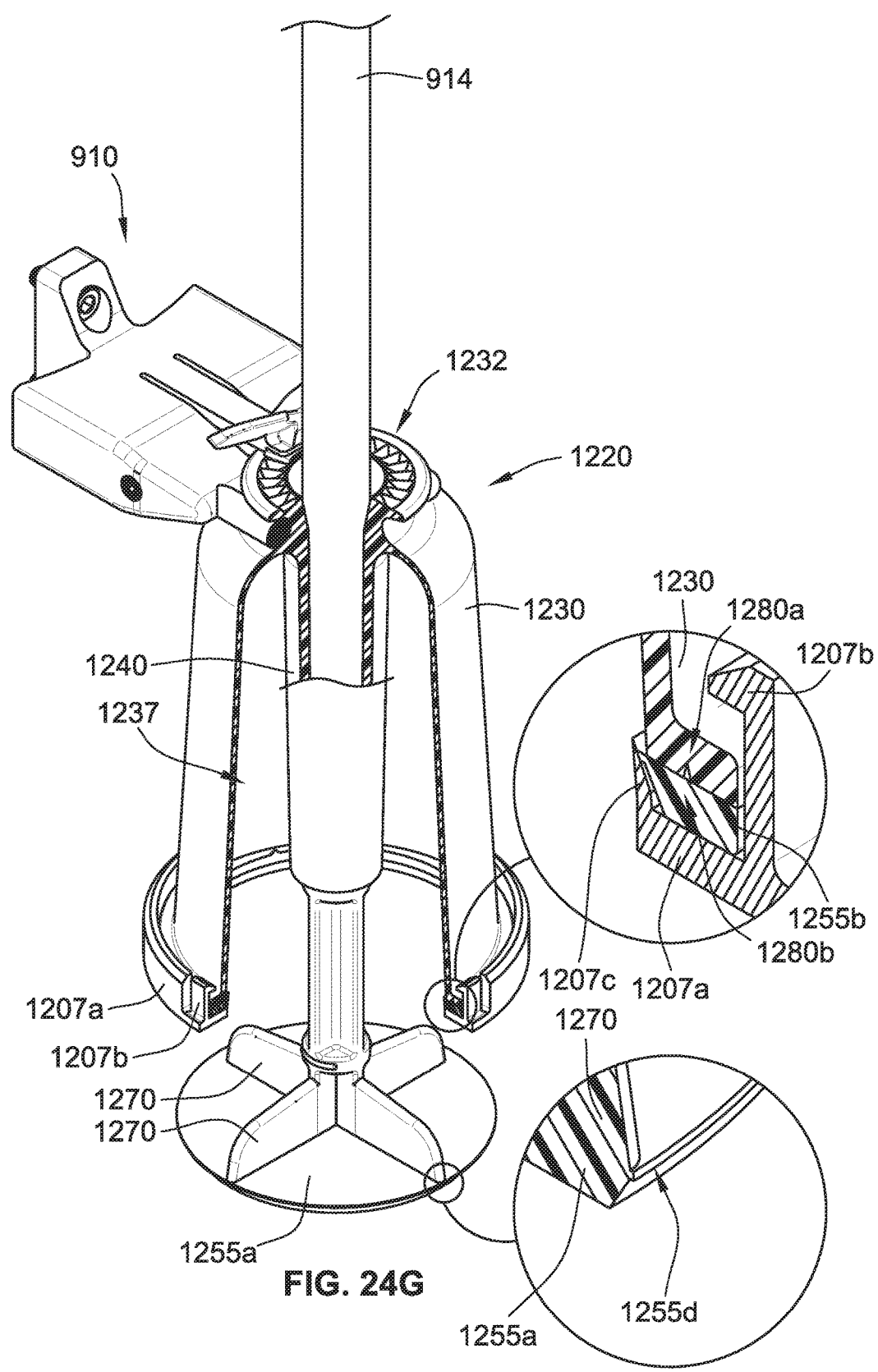
FIG. 24G is a partial perspective view of the module of FIG. 24D in the assembled, cut position coupled to the coupling mechanism and snap-on knife base of FIG. 24A relative to a portion of the drive shaft of FIG. 20A in an operating position with a portion of the module removed to illustrate an interior thereof.

As shown in FIG. 24E, the compounding module 1220 is engaged with the coupling mechanism 910 with the snap-on knife base 1207 attached thereto. Further, the drive shaft 914 is in the loading position ready to engage the compounding module 1220. When the drive shaft 914 moves (e.g., translates) vertically downward from the loading position (FIG. 24E) to the engaged position (FIG. 24F), the drive shaft 914 engages the shaft 1260 of the agitator 1250 in the same, or similar, manner as described herein for the compounding module 920. As the translation of the agitator 1250 is locked to the drive shaft 914, continued downward movement of the drive shaft 914 into the operating position (FIG. 24G) causes the knife 1207*c* to complete the cut through the thinned portion 1255*c* of the base 1255 (e.g., if not completed prior to loading the compounding module 1220 into the coupling mechanism 910), thereby breaking the sealing feature 1280*a,b* and separating the agitator 1250 from the housing 1230. Additionally, the continued downward movement of the drive shaft 914 into the operating position (FIG. 24G) causes the one or more circumferentially extending protrusions 1261 to disengage from the first undercut 1243$a_1$. As such, the nutraceutical compound (not shown) is free to fall from the cavity 1237 and into a vessel (e.g., vessel 201, not shown in FIGS. 24A-24H) therebelow. With the agitator 1250 and the drive shaft 914 in the operating position (FIG. 24G), the drive shaft 914 can rotate thereby causing the agitator 1250 to rotate such that the mixing elements 1270 mix the nutraceutical compound (not shown) with a fluid (e.g., fluid 202 shown in FIG. 2) in the vessel (e.g., vessel 201 shown in FIG. 2).

Figure 24H:
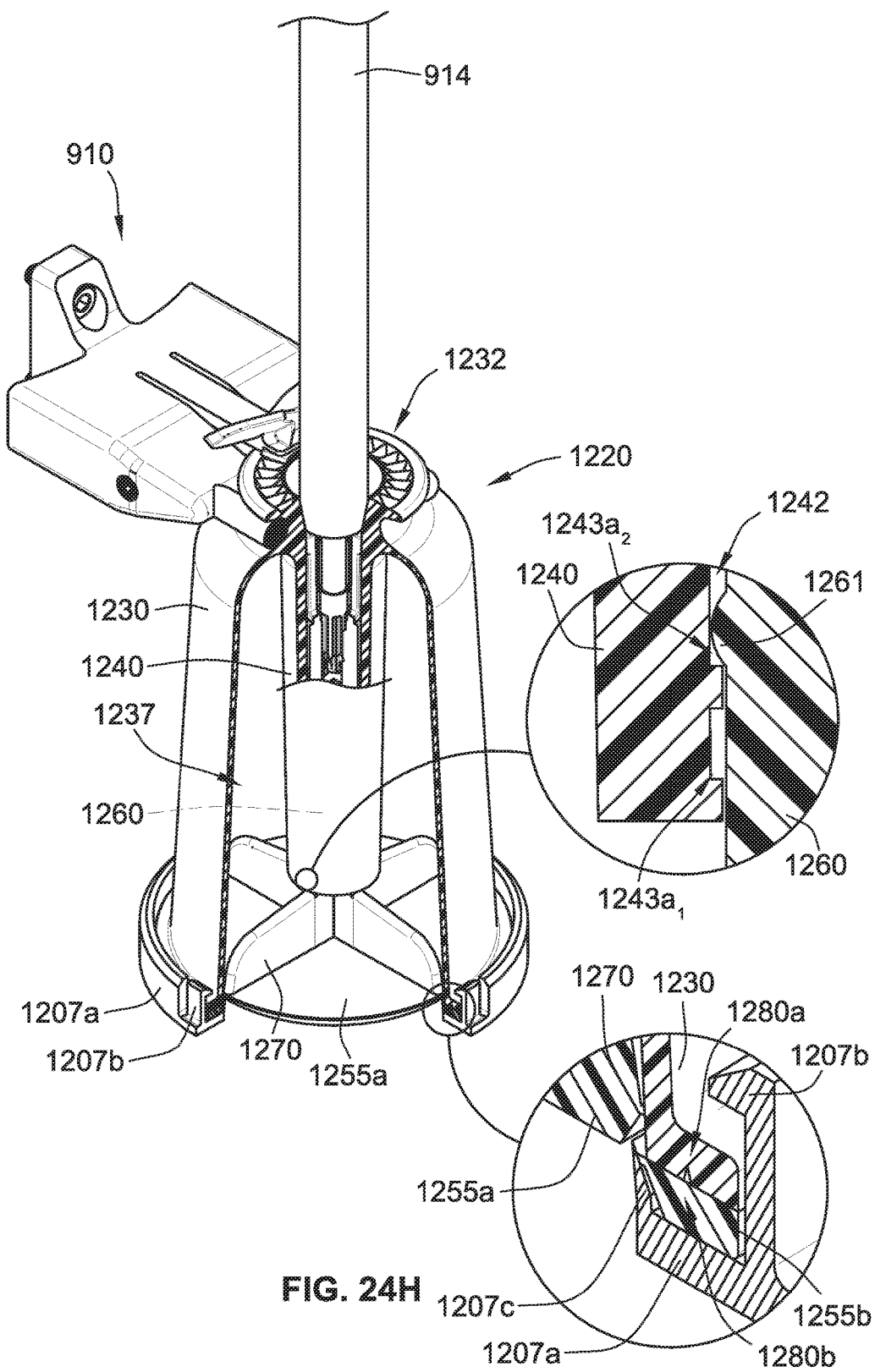
FIG. 24H is a partial perspective view of the module of FIG. 24D in the assembled, cut position coupled to the coupling mechanism and snap-on knife base of FIG. 24A relative to a portion of the drive shaft of FIG. 20A in a retracted position with a portion of the module removed to illustrate an interior thereof.

Once the mixing is complete, the agitator 1250 can be retracted into the housing 1230 of the compounding module 1220 for removal and disposal as described herein. Specifically, in some implementations, as shown in FIG. 24H, the agitator 1250 is retracted such that the one or more circumferentially extending protrusions 1261 engage a second undercut 1243a$_2$ and such that a cut edge 1255d (FIG. 24G) of the base 1255 seals with the inner wall of the housing 1230.

Now referring generally to FIGS. 25A-25E, an alternative compounding module 1320 is shown relative to the coupling mechanism 910 and the drive shaft 914. The compounding module 1320 is similar to the compounding module 920 (FIGS. 21A-21J) in that the compounding module 1320 includes a housing 1330 and an agitator 1350 that are the same as, or similar to, various aspects of the housing 930 and the agitator 950 described herein and shown in the drawings. Further, the housing 1330 includes a coupler 1332, a boss 1340 with an inner bore 1342 (FIG. 25B) having an undercut 1343a, and a sealing feature 1380a that are the same as, or similar to, the coupler 932, the boss 940 with the inner bore 942 having the undercut 943a, and the sealing feature 980a; and the agitator 1350 includes a base 1355 (best shown in FIG. 25B), a shaft 1360 (best shown in FIGS. 25A, 25B), a collet 1366 (best shown in FIGS. 25A, 25B), mixing elements 1370 (best shown in FIG. 25B), one or more circumferentially extending protrusions 1361, and a sealing feature 1380b, that are the same as, or similar to, the base 955, the shaft 960, the collet 966, the mixing elements 970, the one or more circumferentially extending protrusions 961, and the sealing feature 980b, respectively. However, several differences exist between the compounding module 1320 and the compounding module 920, some of which are highlighted and described herein and others of which are discernible with reference to and comparison of the various figures of the compounding modules 1320, 920.

Figure 25C:
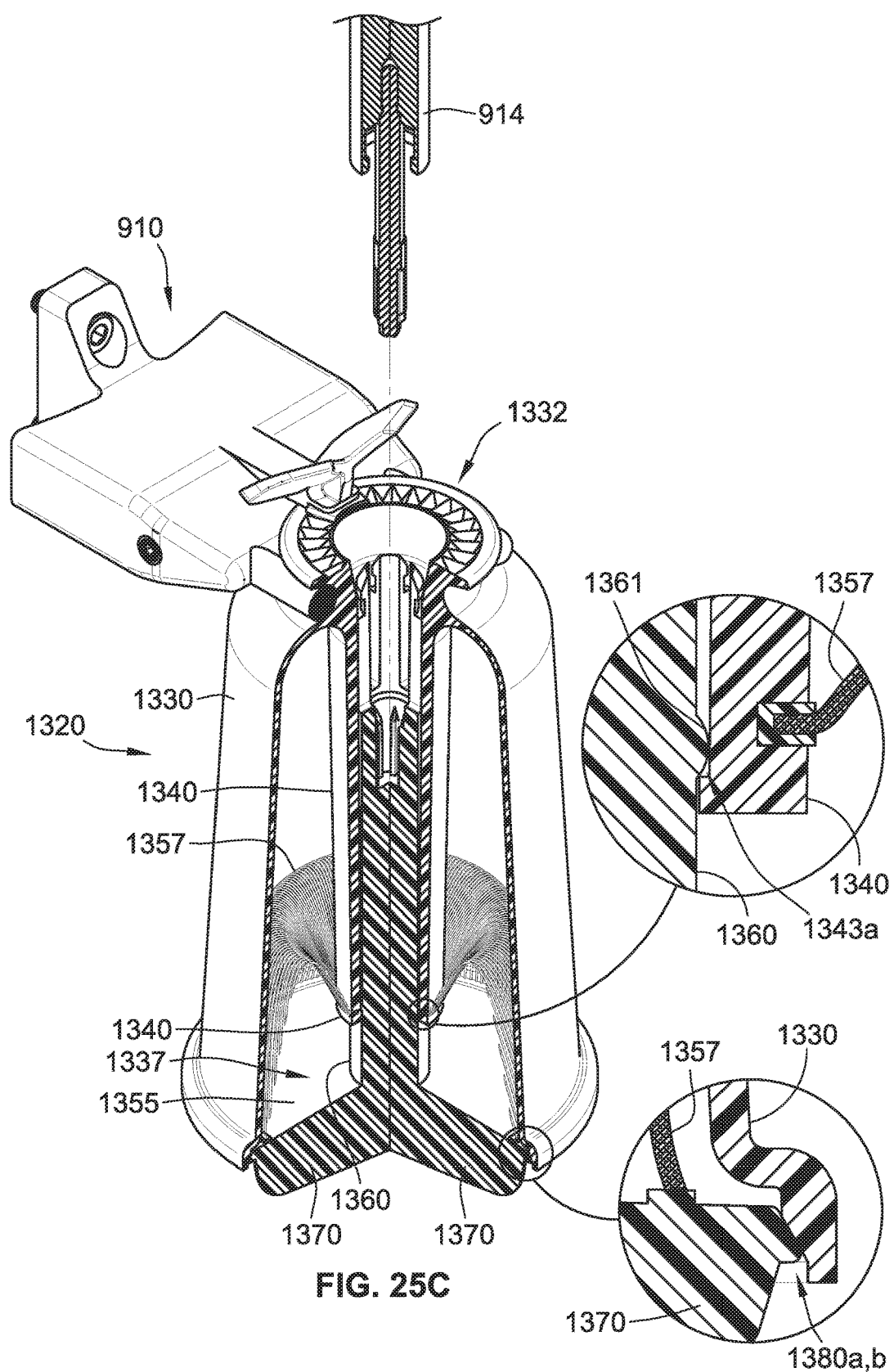
FIG. 25C is a partial perspective view of the module of FIG. 25A in an assembled configuration coupled to the coupling mechanism of FIG. 25A relative to a portion of the drive shaft of FIG. 20A in a loading position with a portion of the module removed to illustrate an interior thereof.

Specifically, for example, a difference between the compounding module 1320 and the compounding module 920 is that the compounding module 1320 includes mesh 1357 that forms a cavity 1337 therein. The cavity 1337 is sized and shaped to hold/contain therein, for example, tea leaves or some other materials therein (e.g., nutraceutical compound 922) for use in making a beverage. The cavity 1337 is bounded by an inside surface of the mesh 1357, a portion of the base 1355, a portion of the shaft 1360, and a portion of the boss 1340, as best shown in FIG. 25C. The mesh 1357 is flexible and/or bendable such that the mesh 1357 can move/flex when the agitator 1350 is moved downward from the sealing position (FIG. 25C) into the operational position (FIG. 25E). The mesh 1357 can be made of any material, such as, for example, metal, plastic, or a combination thereof. As best shown in FIG. 25A, the mesh 1357 is coupled at a first end about a circumference of the base 1355 of the agitator 1350. Further, as best shown in FIG. 25C, the mesh 1357 is coupled at a second end about a circumference of an end or terminus of the boss 1340. Various methods for attachment of the mesh 1357 to the base 1355 and/or the boss 1340 are contemplated, such as, for example, a glue connection, a welded connection (e.g., sonically welding a portion of the base 1355 and/or the boss 1340 to the mesh 1357), a snap-in connection (e.g., the edge of the mesh 1357 is snapped into a groove in the base 1355 and/or the boss 1340), a taped connection, etc.

According to some alternative implementations, the first end of the mesh 1357 can be coupled to the base 1355 as shown in FIGS. 25A-25E; however, instead of the second end of the mesh 1357 being coupled to the boss 1340 as shown, the second end of the mesh 1357 can also be coupled to the base 1355 of the agitator 1350 at or near the base of the shaft 1360 (e.g., where the shaft 1360 is connected to the base 1355). In such an alternative implementation, the mesh 1357 does not need to stretch and/or bend as is shown in a comparison of FIGS. 25C to 25E.

Another difference between the compounding module 1320 and the compounding module 920 is that instead of the compounding module 1320 having the mixing elements 1370 protruding from the base 1355 into the cavity 1337, the mixing elements 1370 protrude from an opposite (e.g., underside or bottom) surface of the base 1355 away from the housing 1330.

Figure 25D:
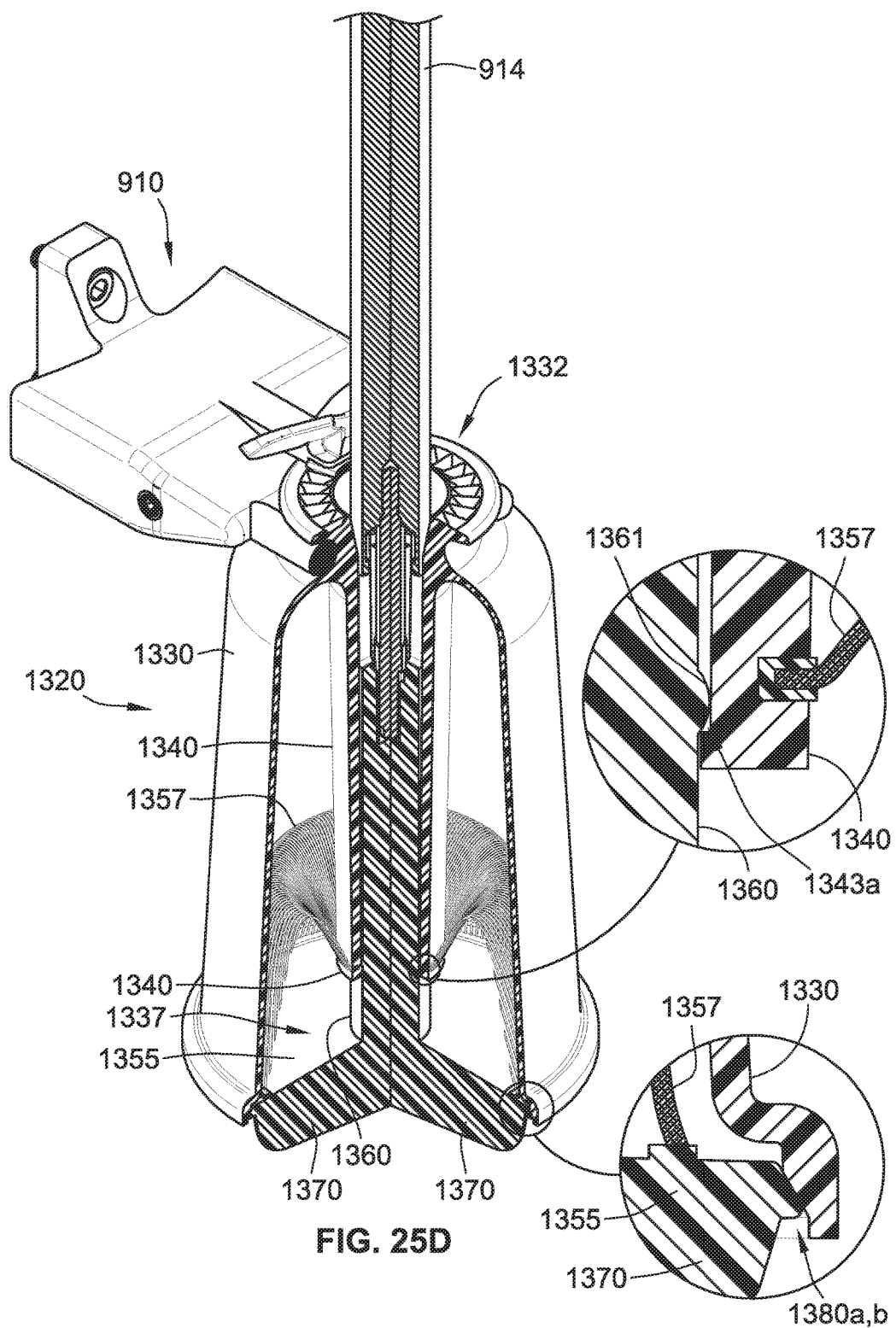
FIG. 25D is a partial perspective view of the module of FIG. 25A in an assembled configuration coupled to the coupling mechanism of FIG. 25A relative to a portion of the drive shaft of FIG. 20A in an engaged position with a portion of the module removed to illustrate an interior thereof.
Figure 25E:
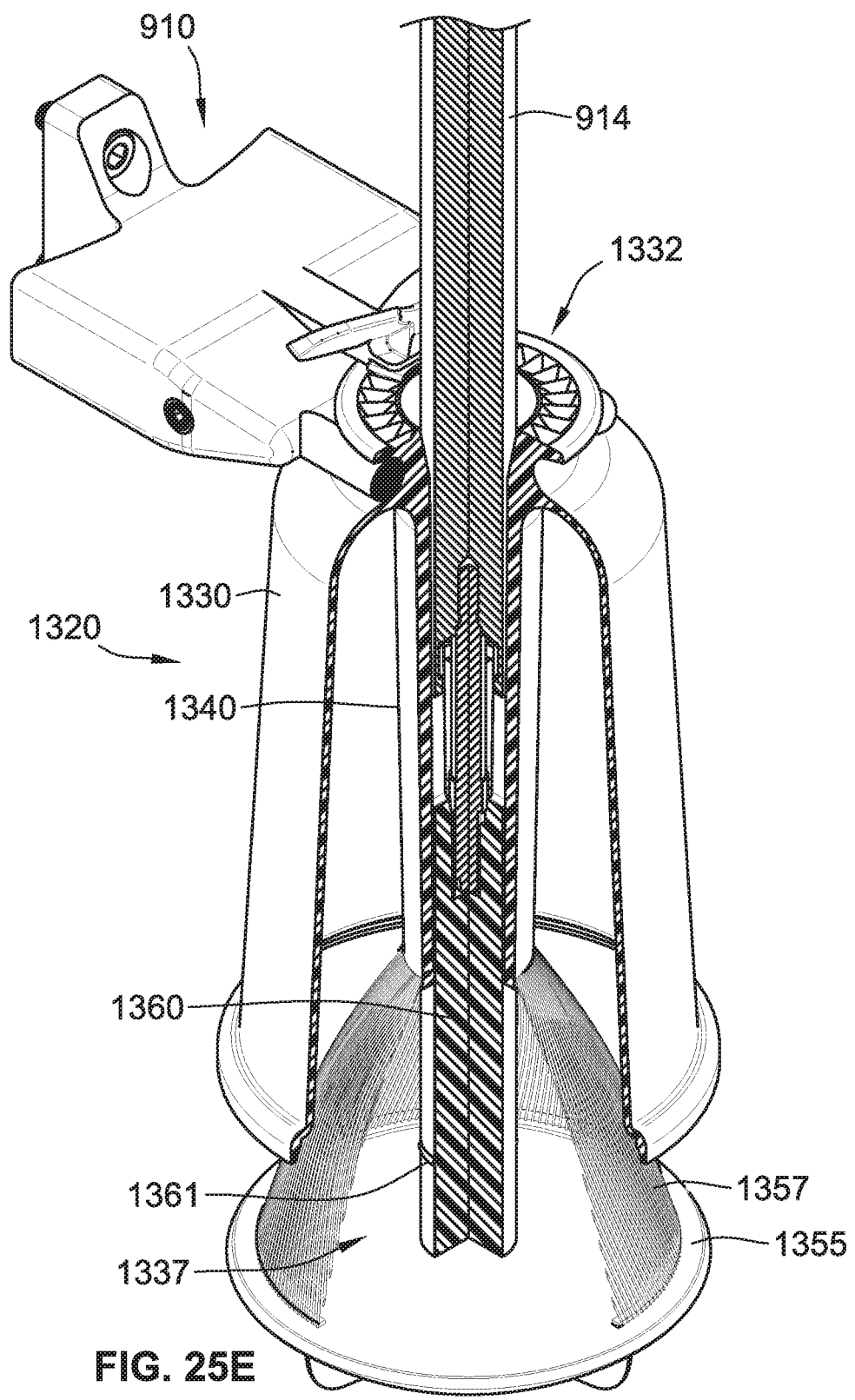
FIG. 25E is a partial perspective view of the module of FIG. 25A in an assembled configuration coupled to the coupling mechanism of FIG. 25A relative to a portion of the drive shaft of FIG. 20A in an operating position with a portion of the module removed to illustrate an interior thereof.

A method of engaging the compounding module 1320 with the drive shaft 914 during operation of the beverage mixing system 200 is now described in relation generally to FIGS. 25C-25E. Only the compounding module 1320, a portion of the drive shaft 914, and a portion of the coupling mechanism 910 are shown for ease of illustration in FIGS. 25C-25E. As shown in FIG. 25C, the compounding module 1320 is engaged with the coupling mechanism 910 and the drive shaft 914 is in the loading position ready to engage the compounding module 1320. In this loading position, the sealing feature 1380a,b is in the sealed/engaged position, the one or more circumferentially extending protrusions 1361 are engaged with the undercut 1343a, and in some implementations, tea leaves (not shown) are in the cavity 1337 resting on the base 1355 and surrounded, at least in part, by the mesh 1357.

When the drive shaft 914 moves (e.g., translates) vertically downward from the loading position (FIG. 25C) to the engaged position (FIG. 25D), the drive shaft 914 engages the shaft 1360 of the agitator 1350 in the same, or similar, manner as described herein for the compounding module 920. As the translation of the agitator 1350 is locked to the drive shaft 914, continued downward movement of the drive shaft 914 into the operating position (FIG. 25E) causes the agitator 1350 to separate from the housing 1330, thereby breaking the sealing feature 1380a,b. Additionally, the continued downward movement of the drive shaft 914 into the operating position (FIG. 25E) causes the one or more circumferentially extending protrusions 1361 to disengage from the undercut 1343a. As such, at least a portion of the agitator 1350 is positioned inside of a vessel (e.g., vessel 201, not shown in FIGS. 25A-25E) therebelow. The method differs here as compared to the method described herein in reference to the compounding module 920 as the contents in the cavity 1337 are not free to fall into the vessel as the mesh 1357 operated to prevent the contents from spilling or fallout out of the cavity 1337. Specifically, at least a portion of the mesh 1357 and the contents therein (e.g., tea leaves), the mixing elements 1370, and the base 1355 are positioned inside of the vessel. With the agitator 1350 and the drive shaft 914 in the operating position (FIG. 25E), the drive shaft 914 can rotate thereby causing the agitator 1350 to rotate such that the mixing elements 1370 mix the contents inside the cavity 1337 (contained by the mesh 1357) with a fluid (e.g., fluid 202 shown in FIG. 2) in the vessel (e.g., vessel 201 shown in FIG. 2). By mixing, it is meant that the fluid is at least urged into contact with the contents within the cavity 1337 such that at least a portion of the fluid is flavored by or similarly altered by the contents in the cavity 1337, similar to how a teabag flavors water. Once the mixing is complete, the agitator 1350 can be retracted into the housing 1330 of the compounding module 1320 for removal and disposal as described herein.

Now referring generally to FIGS. 26A-26D, an alternative compounding module 1420 is shown relative to the coupling mechanism 910 (FIGS. 26C, 26D) and the drive shaft 914

(FIG. 26D). The compounding module 1420 is similar to the compounding modules 920, 1320 (FIGS. 21A-21J, FIGS. 25A-25E) in that the compounding module 1420 includes a housing 1430 and an agitator 1450 that are the same as, or similar to, various aspects of the housings 930, 1330 and the agitators 950, 1350 described herein and shown in the drawings. Further, the housing 1430 includes a coupler 1432, a boss 1440 with an inner bore 1442 (FIG. 26B) having an undercut 1443a (FIG. 26C), and a sealing feature 1480a that are the same as, or similar to, the coupler 932, the boss 940 with the inner bore 942 having the undercut 943a, and the sealing feature 980a; and the agitator 1450 includes a base 1455, a shaft 1460, a collet 1466, mixing elements 1470, one or more circumferentially extending protrusions 1461, and a sealing feature 1480b, that are the same as, or similar to, the base 955, 1355, the shaft 960, 1360, the collet 966, 1366, the mixing elements 970, 1370, the one or more circumferentially extending protrusions 961, 1361, and the sealing feature 980b, 1380b, respectively. However, several differences exist between the compounding module 1420 and the compounding modules 920, 1320, some of which are highlighted and described herein and others of which are discernible with reference to and comparison of the various figures of the compounding modules 1420, 1320, 920.

Specifically, for example, a difference between the compounding module 1420 and the compounding module 920 is that the compounding module 1420 includes a stacking structure 1457. The stacking structure 1457 includes a generally cylindrical core 1457a, a circumferentially extending support platform 1457b, and a multitude of circumferentially extending barbs 1458a,b,c. The generally cylindrical core 1457a is coupled with and/or integral with (e.g., monolithic part) the base 1455 of the agitator 1450 and extends generally vertically upward therefrom. As shown, a central axis of the generally cylindrical core 1457a is coaxial with a central axis of the shaft 1460 and with a central axis of the bore 1442 of the boss 1440.

The circumferentially extending support platform 1457b is coupled with and/or integral with (e.g., monolithic part) the generally cylindrical core 1457a and is adjacent to the base 1455. Moving generally upward from the circumferentially extending support platform 1457b, the circumferentially extending barbs 1458a,b,c are each coupled with and/or integral with (e.g., monolithic part) the generally cylindrical core 1457a. The circumferentially extending barbs 1458a,b,c are spaced along the generally cylindrical core 1457a such that one or more compound rings can be stacked therebetween (FIG. 26C). That is, while a single compound ring 1422a,b,c is shown between a pair of the circumferentially extending barbs 1458a,b,c, in alternative implementations, two or more (e.g., three, four, etc.) compound rings can be stacked between a pair of circumferentially extending barbs.

The circumferentially extending support platform 1457b provides a support for receiving a first compound ring 1422a thereon (FIG. 26C). Similarly, each of the circumferentially extending barbs 1458a,b,c provides a support surface for receiving and supporting a compound ring. As shown in FIG. 26C, the first circumferentially extending barb 1458a provides a support surface 1458a_1 for receiving and supporting thereon a second compound ring 1422b; the second circumferentially extending barb 1458b provides a support surface 1458b_1 for receiving and supporting thereon a third compound ring 1422c; and the third circumferentially extending barb 1458c provides a support surface 1458c_1 for receiving and supporting thereon a fourth compound ring (not shown). The support surfaces 1458a_1, 1458b_1, and 1458c_1 are shown as having a generally curved, tapered profile (best shown in FIGS. 26C, 26D), which aids in the installing of and/or sliding of the compound rings 1422 onto the stacking structure 1457. While three circumferentially extending barbs are shown, any number of circumferentially extending barbs can be included in the stacking structure 1457, such as, for example, one, two, four, ten, etc. While the stacking structure 1457 is shown as including the circumferentially extending support platform 1457b, in some alternative implementations, the circumferentially extending support platform 1457b can be replaced with a circumferentially extending barb.

In addition to providing support surfaces (e.g., support surface 1458a_1), each of the circumferentially extending barbs 1458a,b,c includes an undercut that acts like a locking tab and aids in retaining the compound rings 1422a,b,c on the stacking structure 1457 once positioned thereon. Specifically, the first circumferentially extending barb 1458a includes a first undercut 1458a_2, the second circumferentially extending barb 1458b includes a second undercut 1458b_2, and the third circumferentially extending barb 1458c includes a third undercut 1458c_2 (best shown in FIG. 26A).

The compound rings 1422a,b,c are included in the compounding module 1420 instead of the nutraceutical compound 922 included in the compounding module 920. As such, a user of the compounding module 1420 can customize a beverage by picking and choosing from a multitude of compound rings to be included in the compounding module 1420. For example, to make a first beverage, a user may select a first compound ring including a calcium supplement therein and second compound ring including a vitamin C supplement therein. Then the user would slide the first and second compound rings onto the stacking structure 1457, push the agitator 1450 into the housing 1430 such that the one or more circumferentially extending protrusions 1461 engage the undercut 1443a in the boss 1440, and then load the compounding module 1420 into the beverage mixing system (e.g., beverage mixing system 100, 200) for mixing with a fluid in a vessel as described herein.

For another example, to make a second beverage, the user may select a third compound ring including a pharmaceutical therein, a fourth compound ring including an iron supplement therein, and a fifth compound ring including a vitamin B 12 supplement therein. Then the user would slide the third, fourth, and fifth compound rings onto the stacking structure 1457, push the agitator 1450 into the housing 1430 such that the one or more circumferentially extending protrusions 1461 engage the undercut 1443a in the boss 1440, and then load the compounding module 1420 into the beverage mixing system (e.g., beverage mixing system 100, 200) for mixing with a fluid in a vessel as described herein.

While the compound rings 1422a,b,c are shown and described as having a circular outer profile and a circular inner profile, various other shapes, sizes, and configuration of the compound rings 1422a,b,c are contemplated. For example, the compound rings can have a square inner profile. For another example, the compound rings can be solid cubes, solid rectangles, solid spheres, solid capsules, etc. Basically, the compound rings can take on any form, shape, or otherwise, such that the compound rings 1422a,b,c include a material therein (e.g., vitamins, pharmaceutical, etc.) and can be positioned within the compounding module 1420.

Another difference between the compounding module 1420 and the compounding module 920 is that instead of the compounding module 1420 having the mixing elements 1470 protruding from the base 1455 into the cavity 1437, the mixing elements 1470 protrude from an opposite (e.g., underside or bottom) surface of the base 1455 away from the housing 1430.

Another difference between the compounding module 1420 and the compounding module 920 is that the housing 1430 includes one or more knife edges/blades 1439 that protrude from an inside surface of the housing 1430. The knife edges/blades 1439 are positioned relatively below the compound rings 1422a,b,c when loaded on the stacking structure 1457 and when the one or more circumferentially extending protrusions 1461 engage the undercut 1443a in the boss 1440 as shown in FIG. 26C). The knife edges/blades 1439 are for engaging and piercing an outer shell of the compound rings 1422a,b,c when the agitator 1450 is moved vertically upward or downward with the compound rings 1422a,b,c on the stacking structure 1457. Once the knife edges/blades 1439 pierce the compound rings 1422a,b,c, the contents of each pierced compound ring 1422a,b,c is free to fall therefrom and into a vessel located below the compounding module 1420 when the compounding module is in the operating position (FIG. 26D). While a specific number of knife edges/blades 1439 are shown, any number of knife edges/blades 1439 can be included in the compounding module (e.g., one knife blade, two knife blades, four knife blades, etc.) such that the knife edges/blades 1439 cut and/or pierce the compound rings 1422a,b,c sufficiently to allow the contents therein to be mixed into a beverage.

In some alternative implementations, the outer shell of the compound rings 1422a,b,c is dissolvable in fluid (e.g., water) such that the compounding module 1420 does not need to include the knife edges/blades 1439 therein. For example, the outer shell of the compound rings 1422a,b,c can be the same as, or similar to, the standard pill capsule that dissolves when swallowed.

A method of engaging the compounding module 1420 with the drive shaft 914 during operation of the beverage mixing system 200 is now described in relation generally to FIGS. 26C-26D. Only the compounding module 1420, a portion of the drive shaft 914, and a portion of the coupling mechanism 910 are shown for ease of illustration in FIGS. 26C-26D. As shown in FIG. 26C, the compounding module 1420 is engaged with the coupling mechanism 910 and the drive shaft 914 (not shown) is in the loading position ready to engage the compounding module 1420. In this loading position, the sealing feature 1480a,b is in the sealed/engaged position, the one or more circumferentially extending protrusions 1461 are engaged with the undercut 1443a, and three compound rings 1422a,b,c are loaded onto the stacking structure 1457.

When the drive shaft 914 moves (e.g., translates) vertically downward from the loading position to the engaged position, the drive shaft 914 engages the shaft 1460 of the agitator 1450 in the same, or similar, manner as described herein for the compounding module 920. As the translation of the agitator 1450 is locked to the drive shaft 914, continued downward movement of the drive shaft 914 into the operating position (FIG. 26D) causes the agitator 1450 to separate from the housing 1430, thereby breaking the sealing feature 1480a,b. Additionally, the continued downward movement of the drive shaft 914 into the operating position (FIG. 26D) causes the one or more circumferentially extending protrusions 1461 to disengage from the undercut 1443a and further causes the knife edges/blades 1439 to pierce, one at a time with the downward movement of the agitator 1450, each of the compound rings 1422a,b,c. As such, the contents in each of the compound rings 1422a,b,c are free to fall into a vessel (e.g., vessel 201, not shown in FIGS. 26A-26D) therebelow. With the agitator 1450 and the drive shaft 914 in the operating position (FIG. 26D), the drive shaft 914 can rotate thereby causing the agitator 1450 to rotate such that the mixing elements 1470 mix the contents from the compound rings 1422a,b,c with a fluid (e.g., fluid 202 shown in FIG. 2) in the vessel.

Once the mixing is complete, the agitator 1450 can be retracted into the housing 1430 of the compounding module 1420 along with the depleted outer shells of the compound rings 1422a,b,c for removal and disposal as described herein.

Now referring generally to FIGS. 27A-27F, an alternative compounding module 1520 is shown relative to the coupling mechanism 910 (FIGS. 27D-27F), which is a component of a beverage mixing system 1500. The beverage mixing system 1500 (FIGS. 27D-27F) is similar to the beverage mixing systems 100, 200 in that the beverage mixing system 1500 includes a body 1504, a base 1505, and the coupling mechanism 910 that are the same as, or similar to, the body 104, the base 105, and the coupling mechanism 110 described herein and shown in the drawings. Additionally, the coupling mechanism 910 is operatively coupled to the body 1504 such that the coupling mechanism 910 can move vertically up and down relative to the body 1504 and/or the base 1505 in the same, or similar, fashion that the coupling mechanisms 110, 210 can move as described herein. However, several differences exist between the beverage mixing system 1500 and the beverage mixing systems 100, 200, some of which are highlighted and described herein and others of which are discernible with reference to and comparison of the various figures of the beverage mixing systems 1500 200, 100.

For example, the beverage mixing system 1500 does not include a drive shaft (e.g., drive shaft 114, 214, 914) to engage an agitator 1550 of the compounding module 1520. Rather, the beverage mixing system 1500 uses one or more magnetic fields to magnetically engage one or more magnets (e.g., drive magnet 1557) in the compounding module 1520 to cause the agitator 1550 of the compounding module 1520 to move vertically up and down (e.g., translate) and to rotate about an axis. Specifically, for example, the base 1505 includes a nest or vessel receiving structure 1506 that houses one or more electrical coils 1507a,b therein. One or more voltages and/or currents can be applied to the coils 1507a,b to induce a magnetic field, which can interact with magnets in the compounding module 1520 to cause a desired motion of the agitator 1550 of the compounding module 1520. The nest 1506 is generally cylindrical in shape such that a standard drinking vessel 1502 can be positioned therein. While the nest 1506 is shown as having a relative height compared with the vessel 1502, it is contemplated that the nest 1506 can have any height relative to the vessel 1502 and/or relative to the compounding module 1520. For example, the height of the nest 1506 can be about the same as or any percent of the height of the vessel 1502 and/or the same as or any percent of the height of the compounding module 1520. While two electrical coils 1507a,b are shown, the nest 1506 can include any number of coils therein, such as, for example, one coil, three coils, four coils, etc.

The compounding module 1520 (best shown in FIGS. 27A-27C) is similar to the compounding module 920 (FIGS. 21A-21J) in that the compounding module 1520 includes a housing 1530 and the agitator 1550 that are the same as, or similar to, various aspects of the housing 930 and the agitator 950 described herein and shown in the drawings. Further, the housing 1530 includes a coupler 1532, a boss 1540 with an inner bore 1542 (FIG. 27C) having an undercut 1543a, forms a cavity 1537, and includes a sealing feature 1580a that are the same as, or similar to, the coupler 932, the boss 940 with the inner bore 942 having the undercut 943a, the cavity 937, and the sealing feature 980a; and the agitator 1550 includes a base 1555 (best shown in FIGS. 27A, 27B), a shaft 1560 (best shown in FIGS. 27A, 27B), mixing elements 1570 (best shown in FIG. 27A), one or more circumferentially extending protrusions 1561, and a sealing feature 1580b, that are the same as, or similar to, the base 955, the shaft 960, the mixing elements 970, the one or more circumferentially extending protrusions 961, and the sealing feature 980b, respectively. However, several differences exist between the compounding module 1520 and the compounding module 920, some of which are highlighted and described herein and others of which are discernible with reference to and comparison of the various figures of the compounding modules 1520, 920.

Figure 27C:
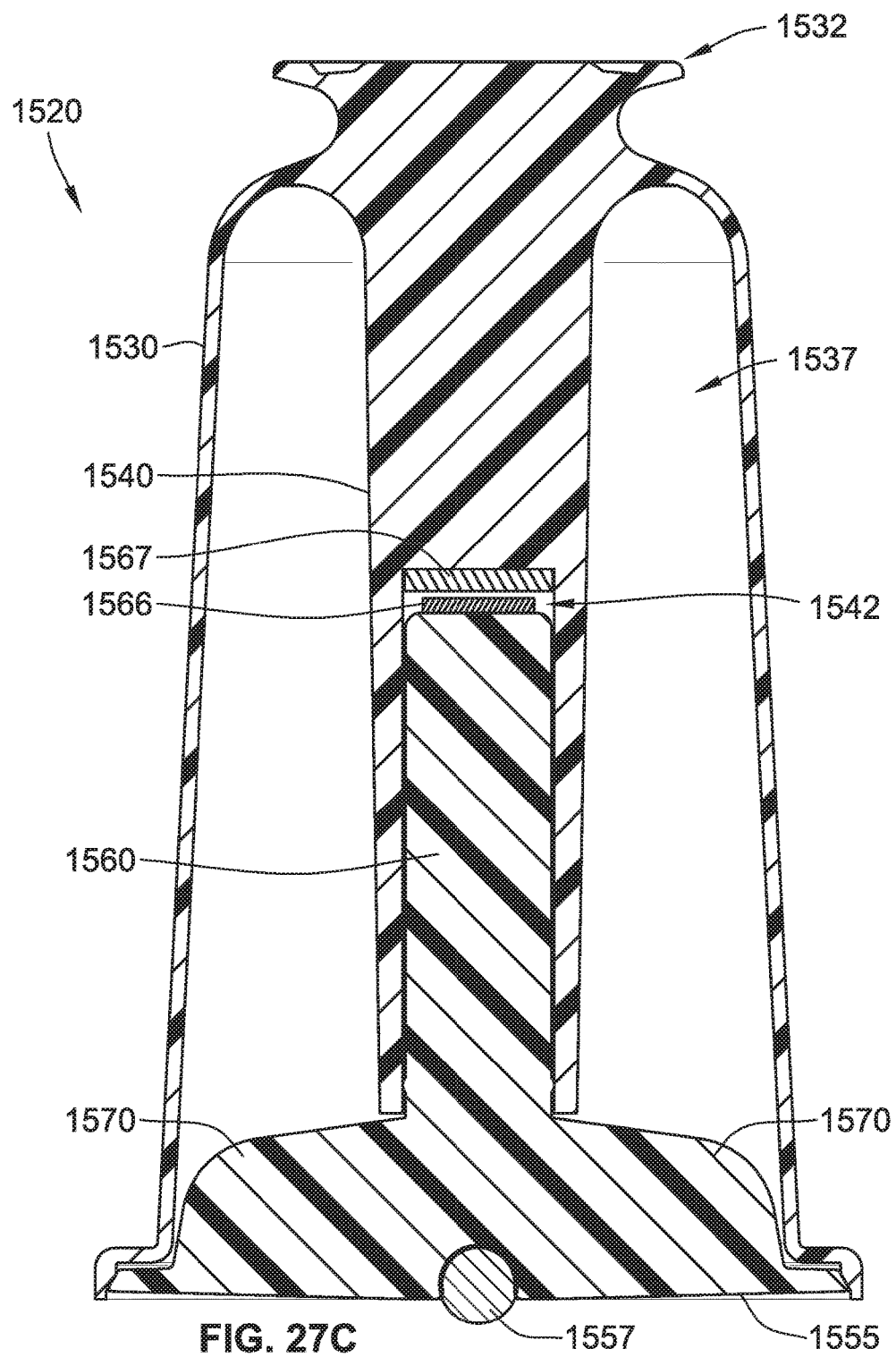
FIG. 27C is a front cross-sectional view of the module of FIG. 27A in an assembled configuration.
Figure 27D:
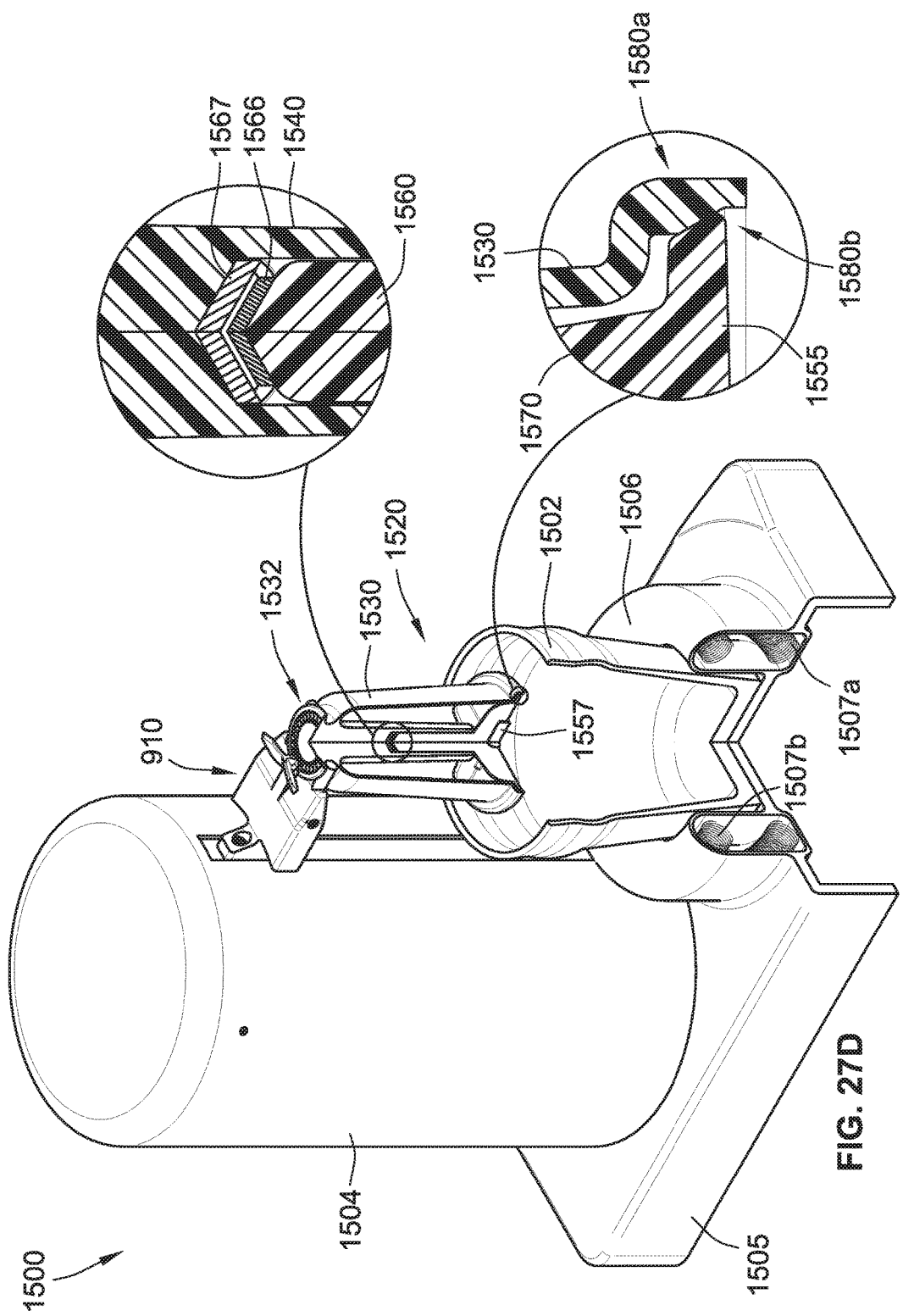
FIG. 27D is a partial perspective view of a beverage mixing system including a coupling mechanism in a loading position and being coupled to the module of FIG. 27A in an assembled, sealed position, with a portion of the module removed to illustrate an interior thereof.

Specifically, for example, a difference between the compounding module 1520 and the compounding module 920 is that instead of the shaft 1560 including a collet that mates with a drive shaft, an upper end of the shaft 1560 includes a first closure magnet 1566 coupled thereto. Additionally, the inner bore 1542 of the boss 1540 is not a throughbore. That is, the inner bore 1542 does not extend through the coupler 1532. As best shown in FIG. 27C, the inner bore 1542 extends at its bottom from an end or terminus of the boss 1540 partially upward into the boss 1540 to an inner surface that is coupled with a second closure magnet 1567. The first closure magnet 1566 magnetically engages with the second closure magnet 1567 to aid in holding the agitator 1550 within the housing 1530 as shown in FIG. 27D. In some alternative implementations, the compounding module 1520 does not include the first and the second closure magnets 1566, 1567 and the agitator 1550 is held within the housing 1530 using the one or more circumferentially extending protrusions 1561.

The agitator 1550 includes a drive magnet 1557 coupled to and/or embedded within the base 1555 of the agitator 1550. The drive magnet 1557 is operable to be driven by the coils 1507a,b in the nest 1506 such that the drive magnet 1557 is urged to move, thereby moving the agitator 1550 coupled therewith. For example, the drive magnet 1557 can be driven by one or both of the coils 1507a,b (or any other coils) such that the agitator 1550 rotates about an axis (e.g., central axis) of the shaft 1560. For another example, the drive magnet 1557 can be driven by one or both of the coils 1507a,b (or any other coils) such that the agitator 1550 moves linearly (e.g., translates) along the axis (e.g., central axis) of the shaft 1560. In some such implementations, the magnetic field created by the coils 1507a,b is strong enough to overcome the magnetic attraction force between the first and the second closure magnets 1566, 1567 and further strong enough to cause the one or more circumferentially extending protrusions 1561 to disengage from the undercut 1543a in the boss 1540. While the drive magnet 1557 is shown as having a generally cylindrical shape, the drive magnet 1557 can have any shape or size, such as, for example, the drive magnet can have a cross-section that is square, rectangular, oval, circular, semi-circular, polygonal, etc.

Figure 27E:
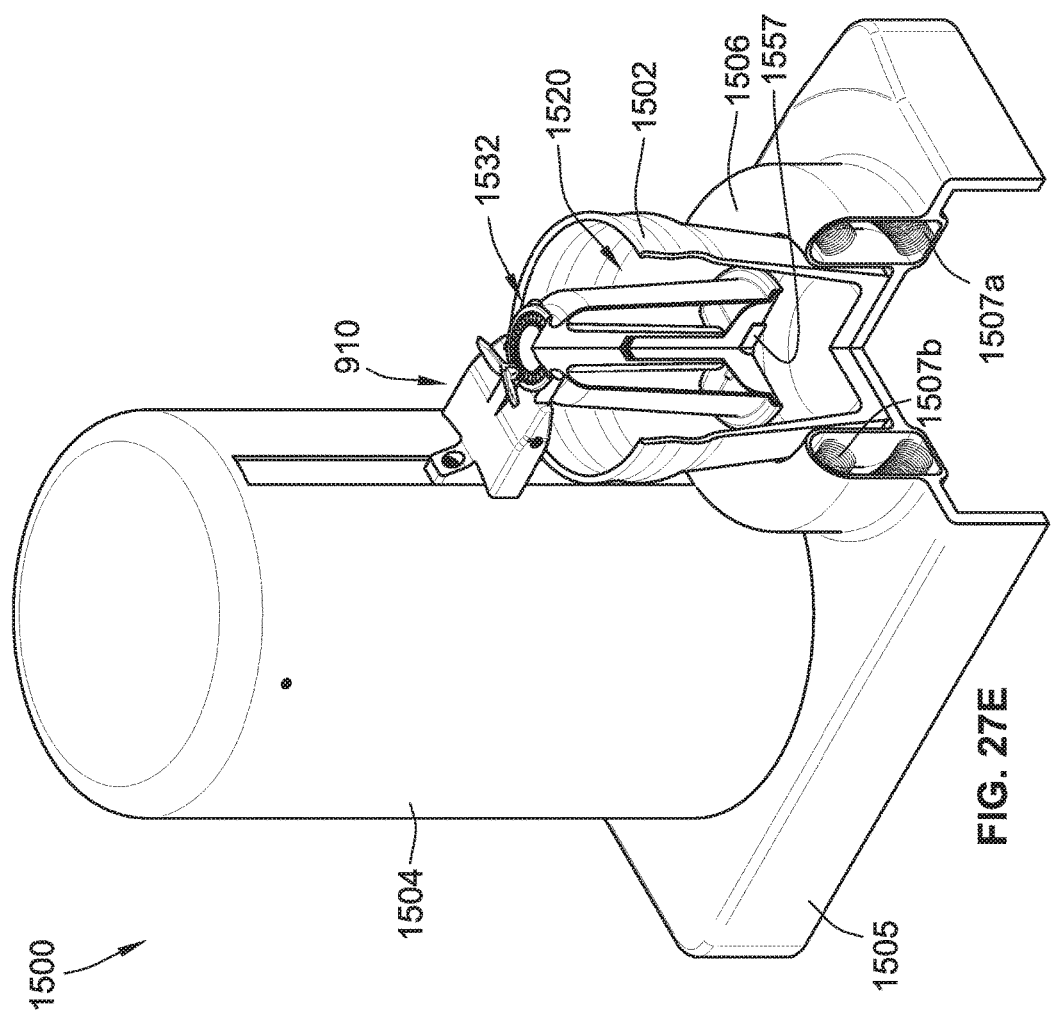
FIG. 27E is a partial perspective view of the beverage mixing system of FIG. 27D with the coupler coupling mechanism in an operating position coupled to the module of FIG. 27A in the assembled, sealed position, with a portion of the module removed to illustrate an interior thereof.
Figure 27F:
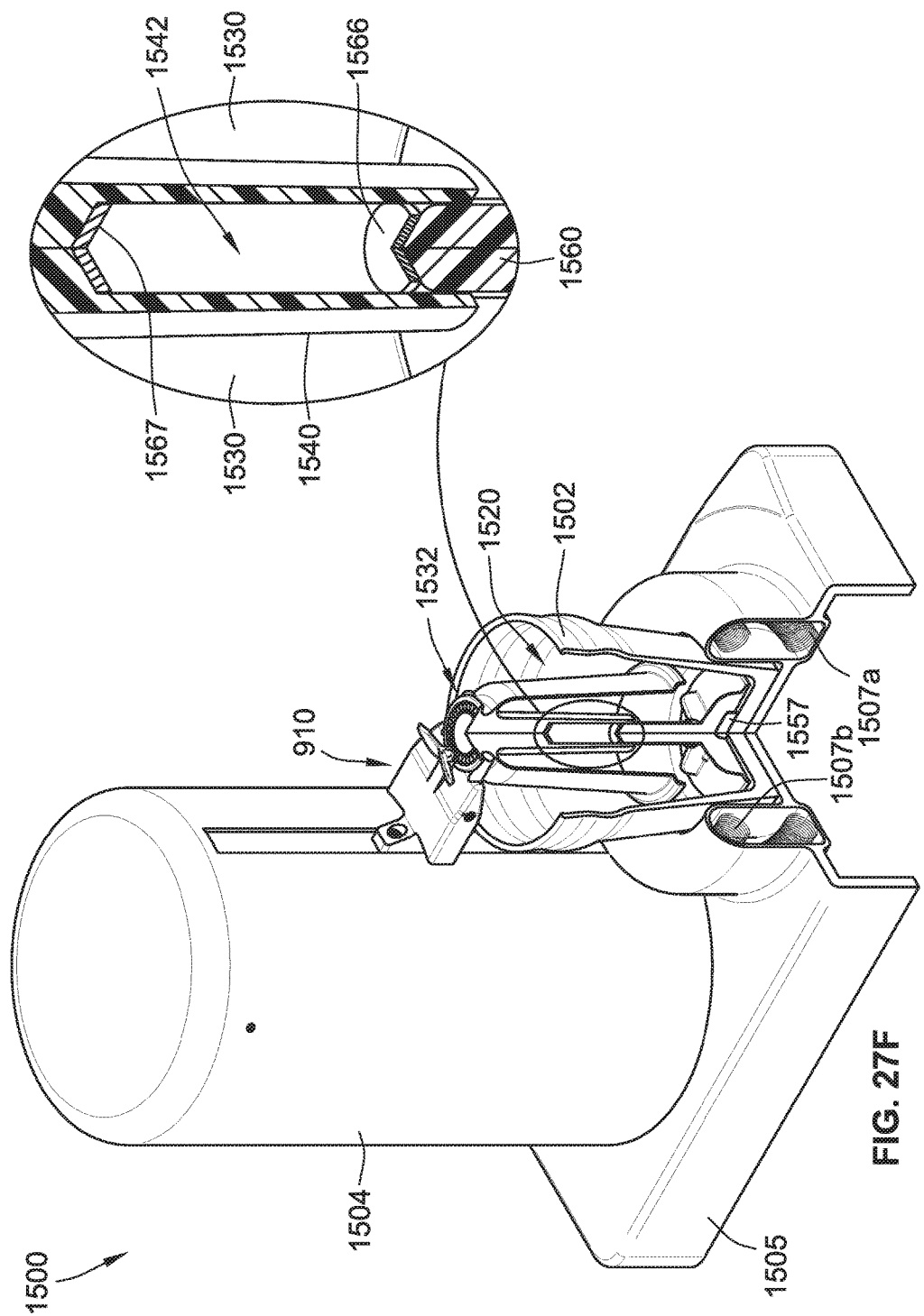
FIG. 27F is a partial perspective view of the beverage mixing system of FIG. 27D with the coupling mechanism in the operating position coupled to the module of FIG. 27A in an assembled, unsealed position, with a portion of the module removed to illustrate an interior thereof.

A method of operating the beverage mixing system 1500 with the compounding module 1520 coupled thereto via the coupling mechanism 910 is now described in relation generally to FIGS. 27D-27F. As shown in FIG. 27D, the compounding module 1520 is engaged with the coupling mechanism 910 and positioned generally above the vessel 1502, which is positioned within the nest 1506. In this position, the sealing feature 1580a,b is in the sealed/engaged position, the first closure magnet 1566 is magnetically coupled with the second closure magnet 1567 such that the first and the second closure magnets 1566, 1567 are abutting each other, the one or more circumferentially extending protrusions 1561 are engaged with the undercut 1543a, and nutraceutical compound (not shown) is in the cavity 1537 resting on the base 1555 around the mixing elements 1570.

With the compounding module 1520 engaged with the coupling mechanism 910, the coupling mechanism 910 moves (e.g., translates) vertically downward from the loading position (FIG. 27D) to an operating position (FIG. 27E), which causes the compounding module 1520 to be positioned at least partially within the vessel 1502. Then the agitator 1550 is moved downward from the sealed position (FIGS. 27D, 27E) to the unsealed and operating position (FIG. 27F) by use of magnetic forces generated using one or more coils (e.g., coils 1507a,b) as described above. The downward movement of the agitator 1550 from the sealed position (FIGS. 27D, 27E) to the unsealed position (FIG. 27F) causes the agitator 1550 to separate from the housing 1530, thereby breaking the sealing feature 1580a,b. Additionally, the downward movement of the agitator 1550 causes the one or more circumferentially extending protrusions 1561 to disengage from the undercut 1543a and further causes the first closure magnet 1566 to separate from the second closure magnet 1567. As such, the nutraceutical compound (not shown) is free to fall from the cavity 1537 and into the vessel 1502 therebelow. With the agitator 1550 in the operating position (FIG. 27F), the drive magnet 1557 can be driven (e.g., rotated and/or translated) via one or both of the coils 1507a,b (or another coil), thereby causing the agitator 1550 to move such that the mixing elements 1570 mix the nutraceutical compound (not shown) with a fluid (not shown) in the vessel 1502. Once the mixing is complete, the agitator 1550 can be retracted into the housing 1530 of the compounding module 1520 for removal and disposal as described herein.

Now referring generally to FIGS. 28A, 28B, and 28C, an alternative drive shaft 1614 is shown and described. The drive shaft 1614 is similar to the drive shafts 214, 914 in that the drive shaft 1614 is operatively coupled to a beverage mixing system (e.g., beverage mixing system 100, 200) and used for engaging a compounding module (e.g., compounding module 1620 shown in FIG. 29A) such that the drive shaft 1614 can impart a translational motion and/or a rotational motion to at least a portion of the compounding module as described herein. The drive shaft 1614 includes an inner drive shaft 1614a and an outer drive shaft 1614b. The inner drive shaft 1614a is slidably coupled to the outer drive shaft 1614b such that the outer drive shaft 1614b can move (e.g., translate) along an axis (e.g., central axis of the outer drive shaft 1614b and/or of the inner drive shaft 1614a) relative to the inner drive shaft 1614a.

Figures 29D, 29E:
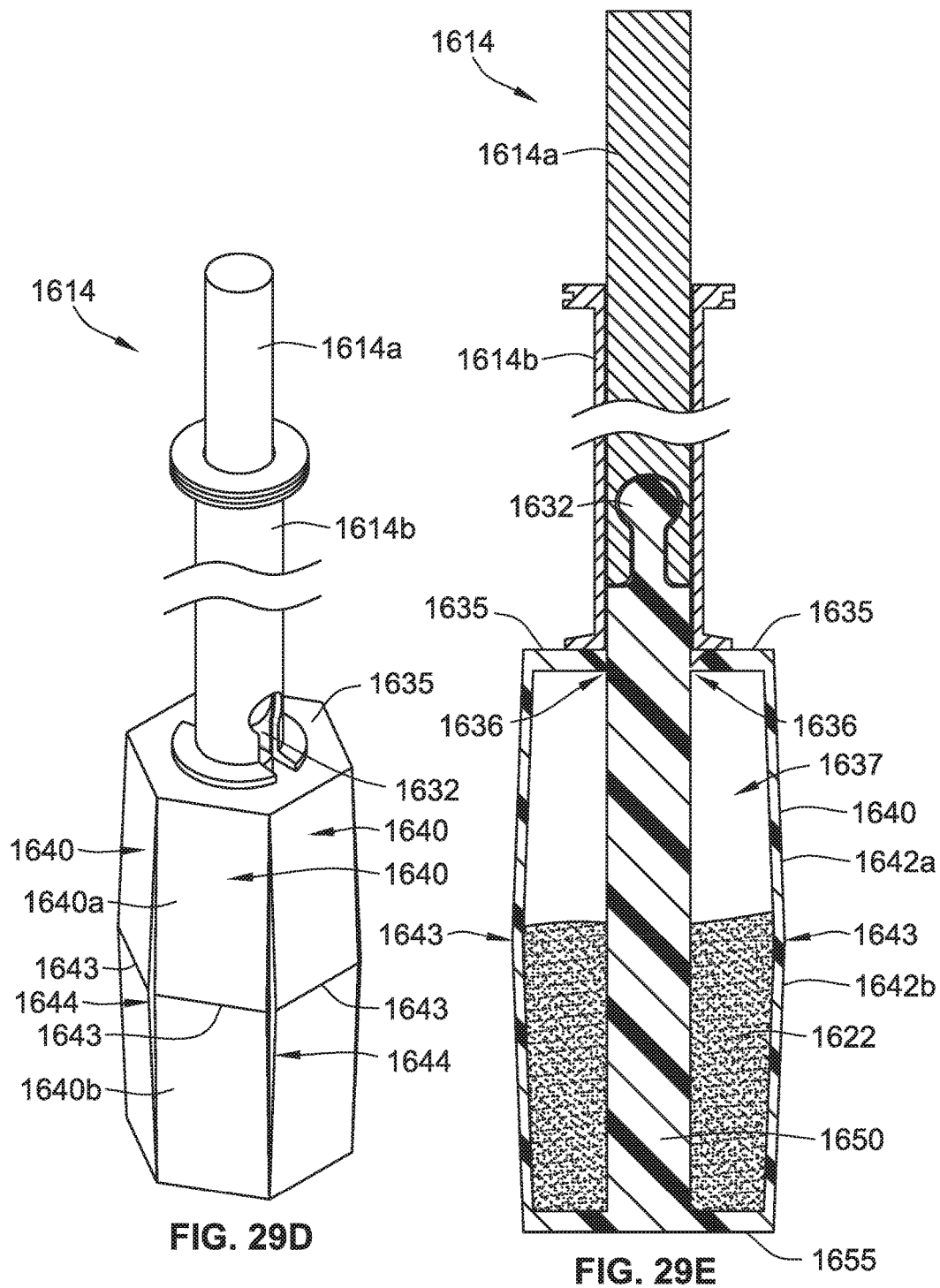
FIG. 29D is a perspective view of the module of FIG. 29A in the sealed, uncrushed position coupled to the drive shaft of FIG. 28C.
FIG. 29E is a front cross-sectional view of FIG. 29D.

The inner drive shaft 1614a includes a locking feature 1616 at an end thereof (best shown in FIGS. 28A, 28B) that is operable to engage with a coupler (e.g., coupler 1632 best shown in FIGS. 29A, 29B) of the compounding module (e.g., the compounding module 1620) to lock relative translation and rotation of the inner drive shaft 1614a with a shaft (e.g., shaft 1650 best shown in FIG. 29C) of the compounding module. The locking feature 1616 forms a slot in the end of the inner drive shaft 1614a that is sized and shaped to engage the coupler (e.g., coupler 1632 shown in FIGS. 29A, 29B) of the compounding module in a non-rotational fashion. For example, as best shown in FIG. 29E, the locking feature 1616 engages the coupler 1632 of the compounding module 1620 in a non-rotational fashion. The outer drive shaft 1614b includes a slot that is similar to the slot in the inner drive shaft 1614a such that the coupler 1632 of the compounding module 1620 can pass therethrough and into the slot formed in the inner drive shaft 1614a. When the compounding module 1620 is coupled with the inner drive shaft 1614a (as shown in FIGS. 29D and 29E), the outer drive shaft 1614b is moveable (e.g., vertically up and/or down) with respect to at least a portion of the compounding module 1620 as described herein.

Now referring generally to FIGS. 29A-29G, an alternative compounding module 1620 is shown relative to the drive shaft 1614. The compounding module 1620 includes a housing 1630 and a shaft 1650. The housing 1630 includes a lid 1635 with a thinned portion 1636, a multitude of side panels 1640, and a base 1655. The lid 1635 forms an opening in a generally central portion thereof such that a portion of the shaft 1650 passes therethrough. Prior to use of the compounding module 1620, the thinned portion 1636 of the lid 1635 surrounds the shaft 1650 and is attached thereto as best shown in FIG. 29C.

Each of the side panels 1640 is separated by a line of weakness 1643 into a first panel section 1642a and a second panel section 1642b. Additionally, prior to use or crushing of the compounding module 1620 (as shown in FIGS. 29A-29E), each of the side panels 1640 abuts adjacent side panels 1640, which forms a seam 1644 therebetween. It is contemplated that in some implementations, the seams 1644 are physically sealed by, for example, use a sealant (e.g., glue, etc.), a coating applied to the compounding module 1620, a packaging wrapped around the compounding module 1620 (not shown), welding of the side panels together (e.g., sonic welding), etc. Yet, in other implementations, the seams 1644 between the side panels 1640 are sealed by means of the side panels 1640 abutting each other in a sufficient fashion to prevent nutraceutical compound 1622 contained in a cavity 1637 of housing 1630 from falling out prematurely (e.g., prior to crushing of the housing 1630 as described below). Further, in other implementations, the side panels 1640 are formed from a monolithic part such that the seams 1644 are lines of weakness, thinned sections, break-lines, etc.

A method of engaging the compounding module 1620 with the drive shaft 1614 during operation of the beverage mixing system 200 is now described in relation generally to FIGS. 29D-29G. Only the compounding module 1620 and a portion of the drive shaft 1614 are shown for ease of illustration in FIGS. 29D-29G. As shown in FIGS. 29D and 29E, the compounding module 1620 is engaged with the drive shaft 1614 such that the coupler 1632 of the compounding module 1620 is positioned in the slot of the locking feature 1616 of the inner drive shaft 1614a, thereby locking relative translation and rotation between the shaft 1650 (and the coupler 1632 and the base 1655) and the inner drive shaft 1614a. In this position, the thinned portion 1636 of the lid 1635 is attached to the shaft 1650 (FIG. 29E), the side panels 1640 are uncrushed such that the seams 1644 therebetween remain sealed, and the nutraceutical compound 1622 is in the cavity 1637 resting on the base 1655.

Then, the outer drive shaft 1614b moves (e.g., translates) vertically downward relative to the inner drive shaft 1614a, which causes the compounding module 1620 to switch from the uncrushed position (FIGS. 29D and 29E) to the crushed position (FIGS. 29F and 29G). Specifically, the downward movement of the outer drive shaft 1614b relative to the inner drive shaft 1614a causes a bottom end of the outer drive shaft 1614b to engage the lid 1635 around the thinned portion 1636, which eventually causes the thinned portion 1636 to snap or otherwise break/separate from the shaft 1650 (best shown in FIG. 29G). Further downward movement of the outer drive shaft 1614b relative to the inner drive shaft 1614a causes the seams 1644 to separate (e.g., snap, break, move apart, etc.) and the side panels 1640 to bend about the lines of weakness 1643 as best shown in FIGS. 29F and 29G. As such, the nutraceutical compound 1622 is free to fall from the cavity 1637 and into a vessel (e.g., vessel 201, not shown in FIGS. 29D-29G) therebelow.

With the housing 1630 in the crushed configuration, the drive shaft 1614 (e.g., the inner drive shaft 1614a) can rotate thereby causing the shaft 1650 to rotate such that the side panels 1640 (in their bent configuration) aid in mixing the nutraceutical compound 1622 with a fluid (e.g., fluid 202 shown in FIG. 2) in the vessel (e.g., vessel 201 shown in FIG. 2). That is, as the side panels 1640 are attached to the base 1655, which is attached to the shaft 1650, the side panels 1640, in their bent configuration (FIGS. 29F, 29G), act like mixing elements when the shaft 1650 is rotated.

Once the mixing is complete, the outer drive shaft 1614b can be retracted upward relative to the inner drive shaft 1614a allowing for the compounding module 1620 to be removed from the locking feature 1616 of the drive shaft 1614 and disposed as described herein.

Now referring generally to FIGS. 30A, 30B, and 30C, an alternative drive shaft 1714 is shown and described. The drive shaft 1714 is similar to the drive shafts 214, 914, 1614 in that the drive shaft 1714 is operatively coupled to a beverage mixing system (e.g., beverage mixing system 100, 200) and used for engaging a compounding module (e.g., compounding module 1720 shown in FIG. 31C) such that the drive shaft 1714 can impart a translational motion and/or a rotational motion to at least a portion of the compounding module as described herein. The drive shaft 1714 includes an inner drive shaft 1714a and an outer drive shaft 1714b. The inner drive shaft 1714a and the outer drive shaft 1714b are rotatably coupled together such that the outer drive shaft 1714b can rotate about an axis (e.g., central axis of the outer drive shaft 1714b and/or of the inner drive shaft 1714a) relative to the inner drive shaft 1714a and such that the inner drive shaft 1714a can rotate about the axis relative to the outer drive shaft 1714b. Further, the outer drive shaft 1714b and the inner drive shaft 1714a can be rotated together in unison (e.g., by one or more motors/gears in the beverage mixing system).

The inner drive shaft 1714a includes a first locking feature 1716a at an end thereof (best shown in FIGS. 30B, 31G) that is operable to engage with a first coupler (e.g., first coupler 1732a best shown in FIGS. 31A, 31B) of the compounding module (e.g., the compounding module 1720) to lock relative rotation of the inner drive shaft 1714a with a shaft (e.g., shaft 1750 best shown in FIG. 31A) of the compounding module. The first locking feature 1716a forms a non-rotational inner bore in the end of the inner drive shaft 1714a that is sized and shaped to engage the first coupler (e.g., the first coupler 1732a shown in FIGS. 31A, 31B) of the compounding module in a non-rotational fashion. For example, as shown in FIG. 31H, the first locking feature 1716a engages the first coupler 1732a of the compounding module 1720 in a non-rotational fashion. Additionally, inner drive shaft 1714a includes one or more protrusions 1761 therein as shown in FIG. 31G. The one or more protrusions 1761 are sized and positioned to engage with one or more undercuts or grooves (e.g., grooves $1732a_1$ best shown in FIGS. 31C and 31E) of the first coupler. For example, as shown in FIG. 31H, the one or more protrusions 1761 engage with grooves 1732$a_1$ of the first coupler 1732a, thereby locking translational motion between the first coupler 1732a and the inner drive shaft 1714a.

The outer drive shaft 1714b includes a second locking feature 1716b at an end thereof (best shown in FIGS. 30B, 31G) that is operable to engage with a second coupler (e.g., second coupler 1732b best shown in FIGS. 31A, 31B) of the compounding module (e.g., the compounding module 1720) to lock relative rotation of the outer drive shaft 1714b with an upper housing portion (e.g., upper housing portion 1730b best shown in FIG. 31A) of the compounding module. The second locking feature 1716b forms a non-rotational inner bore in the end of the outer drive shaft 1714b that is sized and shaped to engage the second coupler (e.g., the second coupler 1732b shown in FIGS. 31A, 31B) of the compounding module in a non-rotational fashion. For example, as shown in FIG. 31H, the second locking feature 1716b engages the second coupler 1732b of the compounding module 1720 in a non-rotational fashion.

Figure 31C:
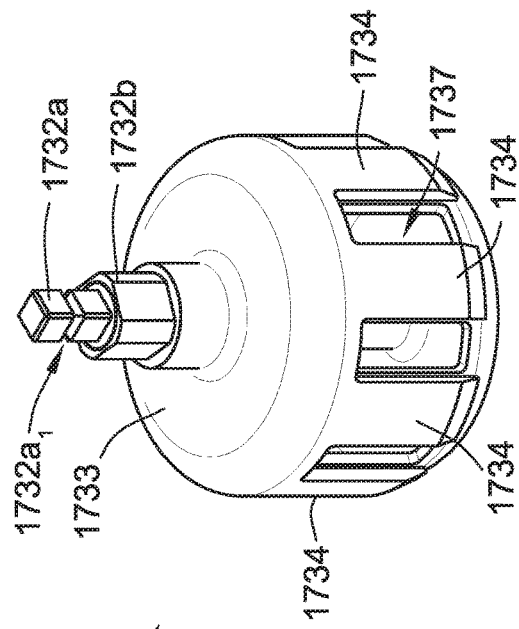
FIG. 31C is an assembled perspective view of the module of FIG. 31A in a sealed position.
Figure 31E:
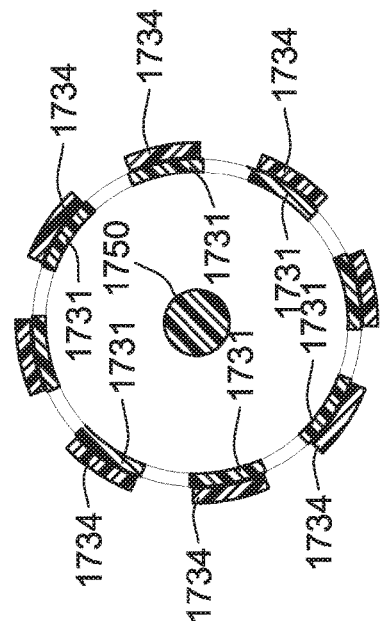
FIG. 31E is an assembled perspective view of the module of FIG. 31A in an unsealed position.
Figure 31D:
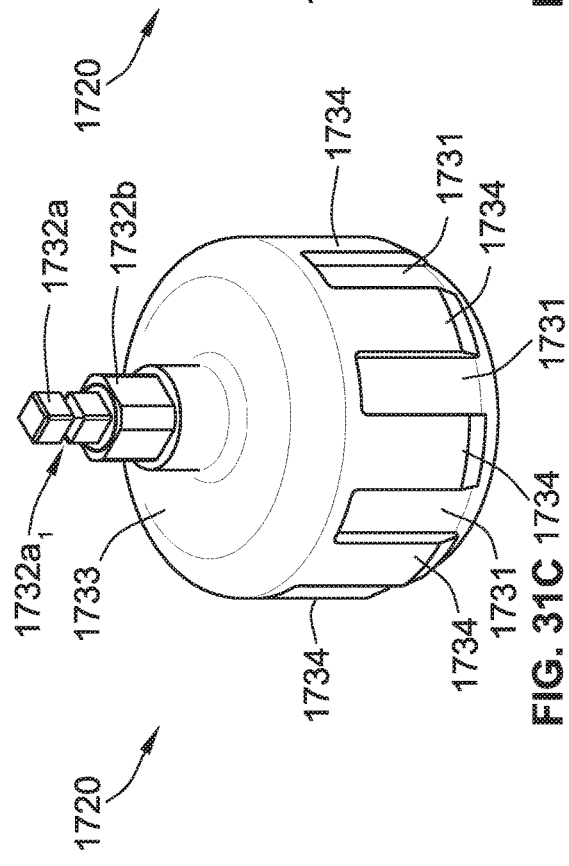
FIG. 31D is a cross-sectional view of the module of FIG. 31C in the sealed position.
Figure 31F:
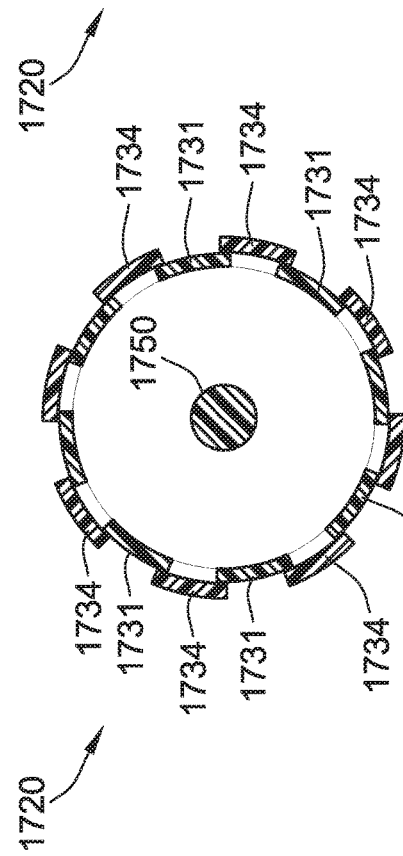
FIG. 31F is a cross-sectional view of the module of FIG. 31E in the unsealed position.
Figures 31G, 31H:
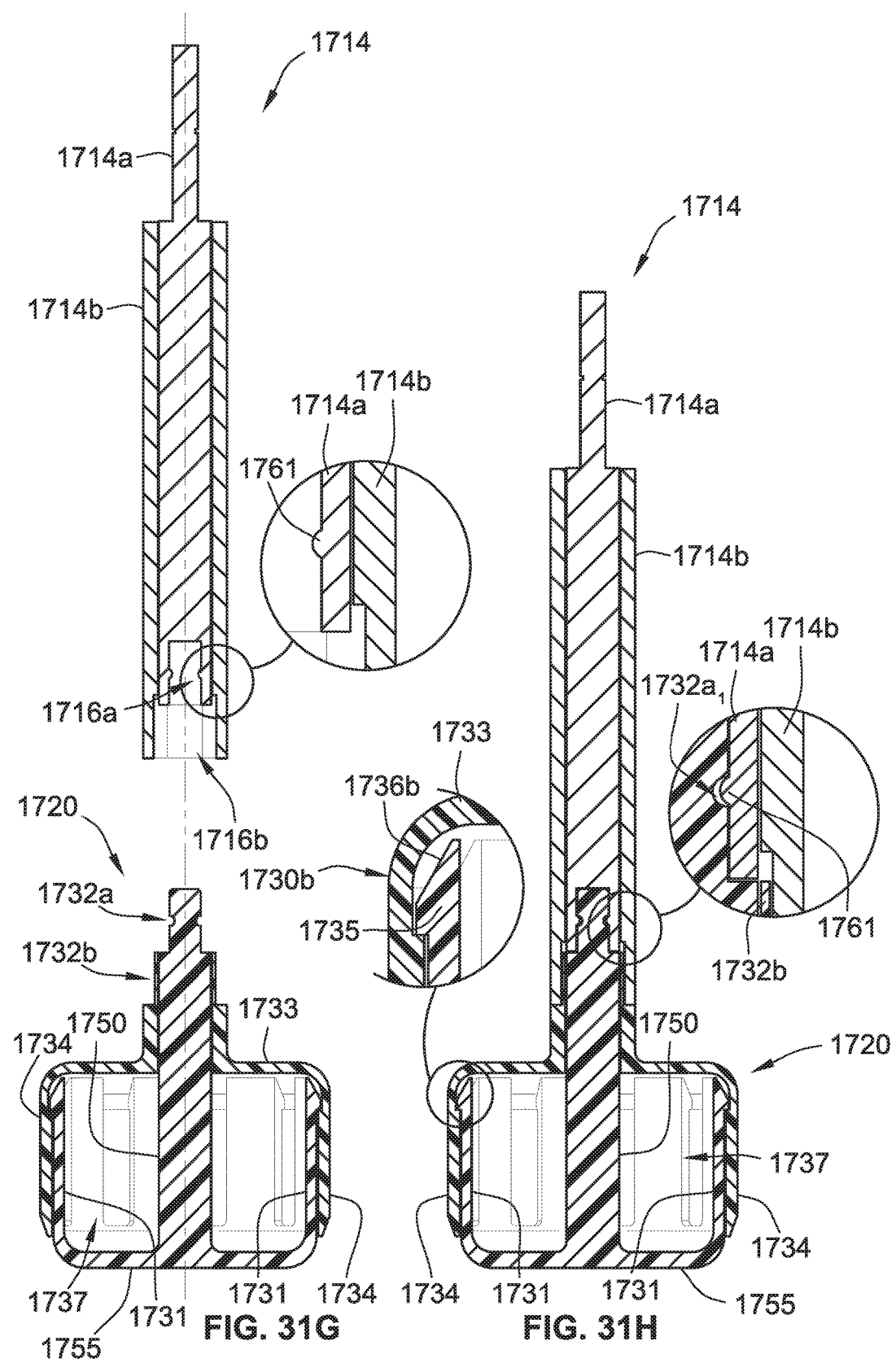
FIG. 31G is a cross-sectional assembled view of the module of FIG. 31A in a sealed position relative to the drive shaft of FIG. 30A.
FIG. 31H is a cross-sectional assembled view of the module of FIG. 31A in a sealed position coupled to the drive shaft of FIG. 30A in a non-rotational fashion.

Now referring generally to FIGS. 31A-31H, an alternative compounding module 1720 is shown relative to the drive shaft 1714. The compounding module 1720 includes a first or bottom housing portion 1730a, a second or top housing portion 1730b, and a shaft 1750. The bottom housing portion 1730a includes a base 1755 and a multitude of deflectable fingers 1731 extending generally upward from the base 1755 about a circumference of the base 1755, which is best shown in FIG. 31A. Each of the fingers 1731 has a generally arced-shaped cross section and includes a locking tab 1735 at an end thereof opposing the base 1755. Each of the locking tabs 1735 forms an undercut 1736a and has an angled upper surface 1736b (with respect to vertical). The shaft 1750 extends generally upward from the base 1755 and includes the first coupler 1732a on an end thereof as best shown in FIG. 31A.

The top housing portion 1730b includes a lid 1733 and a multitude of fingers 1734 extending generally downward from the lid 1733 about a circumference of the lid 1733, which is best shown in FIG. 31B. Each of the fingers 1734 has a generally arced-shaped cross section. The fingers 1734 can be rigid or deflectable (e.g., like the deflectable fingers 1731). The second coupler 1732b extends from an upper surface of the lid 1733 and includes a general circular inner bore 1742 passing therethrough. As best shown in FIG. 31B, the top housing portion 1730b includes an annular groove or undercut 1743a that is positioned to receive a portion of each of the locking tabs 1735 when the bottom housing portion 1730a is coupled with the top housing portion 1730b, which is best shown in FIGS. 31G and 31H. Additionally, when the bottom housing portion 1730a is coupled with the top housing portion 1730b, a portion of the shaft 1750 is positioned within the inner bore 1742 of the top housing portion 1730b such that at least a portion of the first coupler 1732a extends outside of the inner bore 1742, as best shown in FIGS. 31C and 31E.

Referring to FIGS. 31C-31F, the compounding module 1720 is shown in its assembled configuration where the bottom housing portion 1730a is coupled with the top housing portion 1730b. In order to assemble the compounding module 1720, the shaft 1750 is aligned with the inner bore 1742 and the bottom housing portion 1730a is moved into the top housing portion 1730b. Initially, the angled upper surface 1736b of each locking tab 1735 engages with a bottom or edge of each of the fingers 1734. As the locking tabs 1735 are attached to (e.g., integral with) the deflectable fingers 1731, the fingers 1731 deflect inward towards a central axis of the shaft 1750 allowing the bottom housing portion 1730a to be fully inserted until the locking tabs 1735 engage the annular undercut 1743a.

In the assembled configuration, a portion of the shaft 1750 is positioned within the inner bore 1742 and rotatable with respect thereto. Further, each of the first and the second couplers 1732a,b is accessible from an outside of the compounding module 1720 such that the drive shaft 1714 can engage the first and the second couplers 1732a,b in a non-rotational fashion. Also, each of the locking tabs 1735 is engaged with the annular undercut 1743a such that the undercut 1736a of each locking tab 1735 rests on the annular undercut 1743a (best shown in FIG. 31H), thereby preventing the bottom housing portion 1730a from falling from engagement with the top housing portion 1730b.

As shown in FIGS. 31C and 31D, the compounding module is in a closed position such that a cavity 1737 of the compounding module 1720 holding nutraceutical compound therein (not shown) is sealed from external contaminants. That is, in the closed position, the fingers 1731 of the bottom housing portion 1730a overlap with the fingers 1734 of the top housing portion 1730b sealing the cavity 1737 therein. The compounding module 1720 can be switched from the closed position into an open position (FIGS. 31E and 31F) by rotating the bottom housing portion 1730a and the top housing portion 1730b relative to one another using, for example, the drive shaft 1714 coupled to the beverage mixing system. The amount of relative rotation to switch between the open and closed positions depends on the number and size (e.g., width) of the fingers 1731, 1734. Further, the bottom housing portion 1730a can be rotated while the top housing portion 1730b is held in place, or the top housing portion 1730b can be rotated while the bottom housing portion 1730a is held in place, or both the bottom and top housing portions 1730a,b can be rotated simultaneously (e.g., at the same exact time or near the same exact time). In some implementations, the amount of relative rotation between the bottom housing portion 1730a and the top housing portion 1730b is between about two degrees and about ninety degrees, more preferably between about five degrees and about forty-five degrees, and even more preferably between about ten degrees and about twenty degrees.

A method of engaging the compounding module 1720 with the drive shaft 1714 during operation of the beverage mixing system 200 is now described in relation generally to FIGS. 31A-31H. Only the compounding module 1720 and the drive shaft 1714 are shown for ease of illustration in FIGS. 31A-31H. As shown in FIG. 31H, the compounding module 1720 is engaged with the drive shaft 1714 such that the first coupler 1732a of the compounding module 1720 is engaged by the first locking feature 1716a of the inner drive shaft 1714a, thereby locking relative translation and rotation between the shaft 1750 (and the first coupler 1732a and the base 1755) and the inner drive shaft 1714a. Further, the second coupler 1732b of the compounding module 1720 is engaged by the second locking feature 1716b of the outer drive shaft 1714b, thereby locking relative rotation between the top housing portion 1730b (including the second coupler 1732b, the lid 1733, and the fingers 1734) and the outer drive shaft 1714b. As shown in FIG. 31H, the compounding module 1720 is in the closed or sealed configuration (FIGS. 31C and 31D) such that the fingers 1731 and 1734 overlap, and the nutraceutical compound (not shown) remains in the cavity 1737 resting on the base 1755.

Then, the drive shaft 1714 moves (e.g., translates) vertically downward to position the compounding module 1720 within a vessel (not shown) including a fluid (not shown). The drive shaft 1714 moves enough such that at least a portion of the compounding module 1720 is positioned within the fluid. Then the compounding module 1720 is switched from the closed position (FIGS. 31C, 31D) into the open position (FIGS. 31E, 31F) by rotating the inner drive shaft 1714*a* and/or the outer drive shaft 1714*b* relative to each other. As such, the nutraceutical compound (not shown) is free to fall from the cavity 1737 and into the vessel (e.g., vessel 201, not shown in FIGS. 31A-31H) therebelow. In some alternative implementations, the compounding module 1720 is switched from the closed position (FIGS. 31C, 31D) into the open position (FIGS. 31E, 31F) prior to being moved vertically downward and into the fluid (not shown).

With the compounding module 1720 in the open configuration (FIGS. 31E, 31F), the drive shaft 1714 (e.g., the inner drive shaft 1714*a*, the outer drive shaft 1714*b*, or both) can rotate thereby causing the bottom and the top housing portions 1730*a,b* to rotate (via the first and the second couplers 1732*a,b*) such that the fingers 1731, 1734 (in the open configuration) aid in mixing the nutraceutical compound with the fluid in the vessel. That is, as the fingers 1731, 1734 are attached to the bottom and the top housing portions 1730*a,b*, respectively, the fingers 1731, 1734 act like mixing elements when the first and the second couplers 1732*a,b* are rotated.

Once the mixing is complete, the drive shaft 1714 can be retracted upward and the compounding module 1720 can be removed from the first and the second locking features 1716*a,b* of the drive shaft 1714 and disposed as described herein.

According to some implementations of the present disclosure, one or more protection sheets (e.g., burst foil, plastic sheet, etc.) can be attached to the first end and/or the second end of the compounding module (e.g., compounding module 120, 220, 520, 620, 720, 820, 920, 1020, 1120, 1220, 1320, 1420, 1520, 1620, 1720) to aid in preventing contaminants from entering into one or more crevices of the compounding module prior to use in a beverage mixing system (e.g., beverage mixing system 100, 200, 1500). For example, a burst foil (not shown) can be coupled (e.g., via glue or tape) to the first end 831*a* of the compounding module 820 to prevent dirt or the like from entering the space between the boss 840 and the shaft 860, which is best shown in FIG. 19C.

Figure 32:
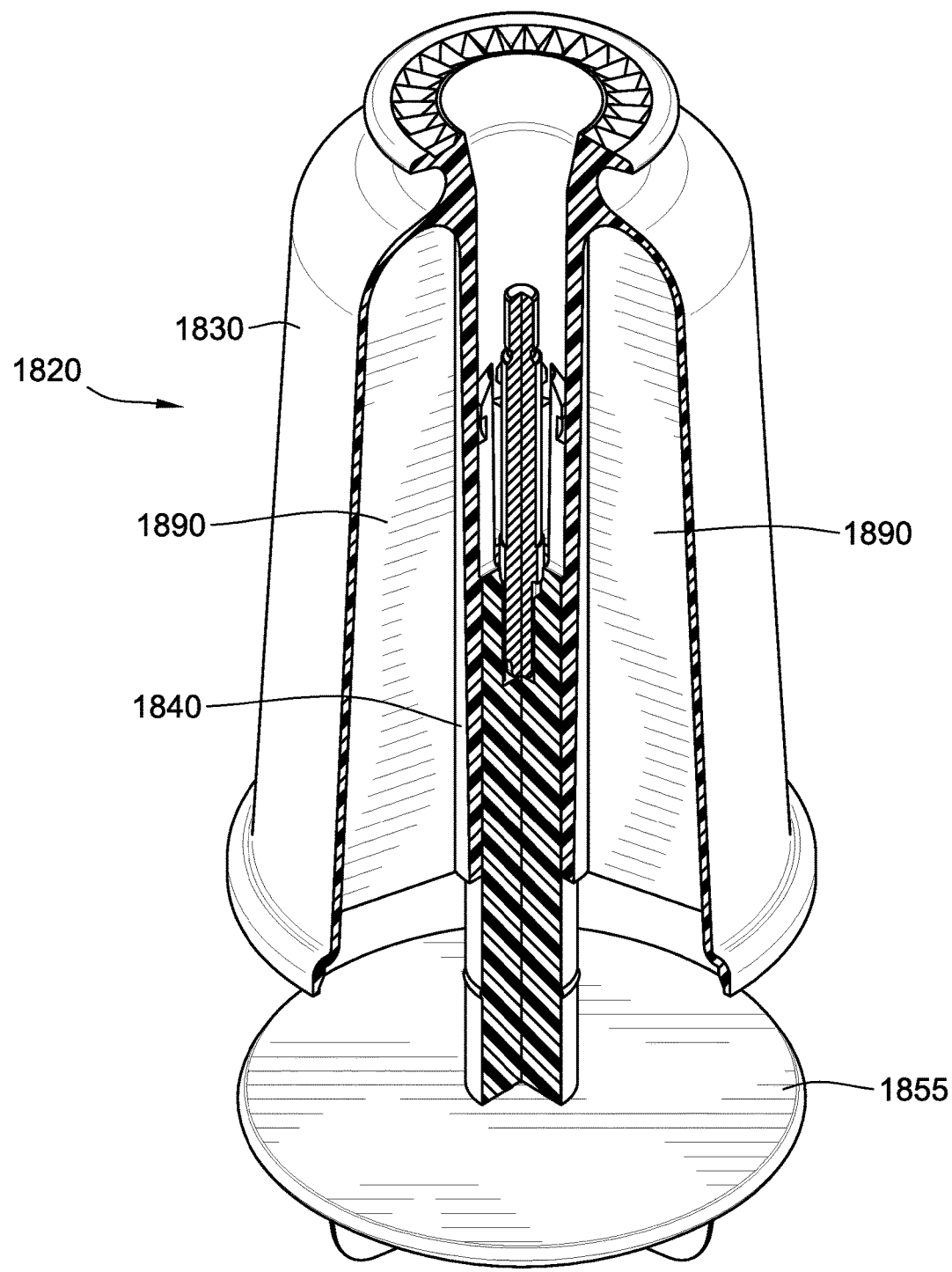
FIG. 32 is a partial perspective view of a module according to some implementations of the present disclosure.

According to some implementations of the present disclosure, as shown in FIG. 32, the housing 1830 of the compounding module 1820 can be divided into two or more sections, thereby defining two or more corresponding sub-cavities therein, which are sealed by the base 1855 of the agitator. To form the sub-cavities, the housing 1830 can include a plurality of separator walls 1890 or fins that extend from and are attached to an interior surface of the housing 1830 and an exterior surface of the boss 1840. When the agitator is in the sealed position, each of the sub-cavities is sealed and when the agitator is moved into its unsealed position, the sub-cavities are opened and thereby allow any ingredients therein to fall into a vessel (e.g., a drinking cup) located therebelow in the same or similar fashion as described elsewhere herein. Each of the sub-cavities can have any size, shape, and orientation. In some implementations, each sub-cavity has a generally triangular cross-section, a generally square cross-section, a generally rectangular cross-section, a generally polygonal cross-section, a generally circular cross-section, a generally oval cross-section, or any combination thereof. The housing 1830 and agitator of such alternative implementations can be the same as, or similar to, any of the housings and agitators described herein and shown in the drawings. Each of the sub-cavities can be filled with one or more ingredients and maintained separately from one another, which can aid in preserving each of the ingredients and also aid in preventing non-desired organic or chemical reactions from occurring prior to consumption.

It is expressly contemplated that any element or elements from any one or more of the claims enumerated herein can be combined with any other element or elements in any of the other claims to form a contemplated implementation of the present disclosure.

Each of the above implementations and obvious variations thereof is contemplated as falling within the spirit and scope of the claimed invention, which is set forth in the following claims.

What is claimed is:

1. A module comprising:
a housing including a plurality of separator walls and a boss that extends from a first end of the housing towards a second opposing end of the housing, the boss defining an inner bore, each of the plurality of separator walls extending from and being attached to an interior surface of the housing and an exterior surface of the boss thereby separating an interior cavity of the housing into a plurality of sub-cavities; and
an agitator including a base and a shaft, the shaft of the agitator extending from the base and being slidable relative to the inner bore of the boss such that the agitator is movable between a sealed position and an unsealed position.

2. The module of claim 1, wherein when the agitator is in the sealed position, each of the sub-cavities is sealed from one another.

3. The module of claim 1, wherein when the agitator is in the unsealed position, each of the sub-cavities is opened and unsealed from one another.

4. The module of claim 1, wherein each of the sub-cavities has a generally triangular cross-section.

5. The module of claim 1, further comprising one or more mixing elements.

6. The module of claim 5, wherein the one or more mixing elements extend from the base of the agitator in a direction opposite of the shaft such that the one or more mixing elements are positioned outside of the sub-cavities when the agitator is in the sealed position.

7. The module of claim 5, wherein the one or more mixing elements includes a first type of mixing element and a second type of mixing element.

8. The module of claim 7, wherein the first type of mixing element includes a blade having a first height and the second type of mixing element includes a blade having a second height that is greater than the first height.

9. The module of claim 8, wherein the second height is greater than half of a height of the shaft of the agitator such that at least a portion of the second type of mixing element remains within the interior cavity when the agitator is moved into the unsealed position.

10. The module of claim 8, wherein when the agitator is moved into the unsealed position, at least a portion of the second type of mixing element remains within the interior cavity and the first type of mixing element is completely outside of the interior cavity.

11. The module of claim 8, wherein the second type of mixing element aids in removing compound stuck in the interior cavity when the agitator is in the unsealed position or when the agitator moves from the sealed position to the unsealed position.

12. The module of claim 1, wherein the shaft of the agitator includes one or more circumferentially extending protrusions that mate with an undercut formed in the inner bore of the boss of the housing to aid in holding the agitator in the housing.

13. The module of claim 1, wherein the housing includes a first sealing feature at the second opposing end of the housing and the base of the agitator includes a second sealing feature along a perimeter thereof, the first and the second sealing feature mating to seal the interior cavity when the agitator is in the sealed position.

14. The module of claim 13, wherein the first and the second sealing features are stair-stepped.

15. The module of claim 1, wherein each of the plurality of sub-cavities in conjunction with the base of the agitator is configured to contain an ingredient therein and maintain separation of the contained ingredient from ingredients contained in the other ones of the plurality of sub-cavities, and wherein each ingredient contained in one of the plurality of sub-cavities is a different ingredient.

16. A module comprising:
a housing forming a plurality of sub-cavities therein and including a boss that extends from a first end of the housing towards a second opposing end of the housing, the boss defining an inner bore; and
an agitator including a base, a shaft, and one or more mixing blades, the shaft of the agitator extending from the base and being slidable relative to the inner bore of the boss such that the agitator is movable between a sealed position and an unsealed position, the one or more mixing blades extending from the base of the agitator in a direction opposite of the shaft such that the one or more mixing blades are positioned outside of the sub-cavities when the agitator is in the sealed position.

17. The module of claim 16, wherein each of the sub-cavities has a generally triangular cross-section.

18. A module comprising:
a housing forming a plurality of sub-cavities therein and including a boss that extends from a first end of the housing towards a second opposing end of the housing, the boss defining an inner bore; and
an agitator including a base and a shaft, the shaft of the agitator extending from the base and being slidable relative to the inner bore of the boss such that the agitator is movable between a sealed position and an unsealed position,
wherein the sub-cavities are modular and can be customized for different users of the module by including specific compound bags in one or more of the sub-cavities prior to mixing using a beverage mixing system.

19. The module of claim 18, further comprising one or more mixing blades.

20. The module of claim 19, wherein the one or more mixing blades extend from the base of the agitator in a direction opposite of the shaft such that the one or more mixing blades are positioned outside of the sub-cavities when the agitator is in the sealed position.

21. A module for use with a system, the module comprising:
a housing defining an interior cavity and including a boss that extends from a first end of the housing into the interior cavity towards a second opposing end of the housing, the boss defining an inner bore, the housing including a plurality of separator walls extending from an inner surface of the housing to the boss such that the interior cavity is separated into a plurality of sub-cavities; and
an agitator including a base, a shaft, and a mixing element, the shaft of the agitator extending from the base and being slidable relative to the inner bore of the boss such that the agitator is movable between a first position and a second position, a portion of the shaft of the agitator to be engaged by a drive shaft of the system during operation of the system.

22. The module of claim 21, wherein each sub-cavity in conjunction with the base of the agitator is configured to contain an ingredient therein and maintain separation of the contained ingredient from ingredients contained in the other sub-cavities.

23. The module of claim 22, wherein each ingredient contained in one of the sub-cavities is a different ingredient.

* * * * *